(12) United States Patent
Park et al.

(10) Patent No.: US 12,022,503 B2
(45) Date of Patent: Jun. 25, 2024

(54) SIDELINK BEARER MODE SELECTION

(71) Applicant: Comcast Cable Communications, LLC, Philadelphia, PA (US)

(72) Inventors: Kyungmin Park, Herndon, VA (US); Esmael Dinan, McLean, VA (US); Hyukjin Chae, Reston, VA (US); Taehun Kim, Reston, VA (US); Jinsook Ryu, Herndon, VA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 288 days.

(21) Appl. No.: 17/061,765

(22) Filed: Oct. 2, 2020

(65) Prior Publication Data

US 2021/0105787 A1 Apr. 8, 2021

Related U.S. Application Data

(60) Provisional application No. 62/910,361, filed on Oct. 3, 2019.

(51) Int. Cl.
*H04W 72/08* (2009.01)
*H04L 41/0803* (2022.01)
(Continued)

(52) U.S. Cl.
CPC ....... *H04W 72/542* (2023.01); *H04L 41/0803* (2013.01); *H04L 43/16* (2013.01);
(Continued)

(58) Field of Classification Search
CPC ........... H04W 72/085; H04W 28/0252; H04W 28/0278; H04W 72/14; H04W 92/18; H04W 72/087; H04W 72/02; H04W 72/1278; H04W 76/19; H04W 72/0413; H04W 72/04; H04W 72/0406; H04W 36/0044; H04W 52/0229; H04W 88/04; H04W 48/16; H04W 76/14; H04W 72/042; H04W 52/0212; H04W 72/048; H04W 24/10; H04W 72/1289; H04W 8/24; H04W 74/0833; H04W 52/0216; H04W 48/12; H04W 24/08; H04W 72/005; H04W 64/00; H04W 72/542; H04W 72/23; H04W 72/20; H04W 72/543; H04L 41/0803;
(Continued)

(56) References Cited

U.S. PATENT DOCUMENTS

2019/0306835 A1* 10/2019 Hoang ................... H04W 72/53
2020/0015272 A1* 1/2020 Lee ...................... H04W 72/121
(Continued)

OTHER PUBLICATIONS

Kang et al. KR10-2019-0048607 (translated) filed on Apr. 25, 2019 (Year: 2019).*
(Continued)

*Primary Examiner* — Wutchung Chu
(74) *Attorney, Agent, or Firm* — Banner & Witcoff, Ltd.

(57) ABSTRACT

Wireless devices may communicate with each other via a sidelink. At least two wireless devices may communicate via a sidelink using a resource allocation mode that may be determined with or without assistance from a base station. A wireless device may select, based on one or more conditions, from at least two resource allocation modes of operation for the sidelink.

23 Claims, 33 Drawing Sheets

(51) Int. Cl.
  *H04L 43/16*      (2022.01)
  *H04W 28/02*     (2009.01)
  *H04W 72/542*    (2023.01)
  *H04W 72/23*     (2023.01)
  *H04W 92/18*     (2009.01)

(52) U.S. Cl.
  CPC .... *H04W 28/0252* (2013.01); *H04W 28/0278* (2013.01); *H04W 72/23* (2023.01); *H04W 92/18* (2013.01)

(58) Field of Classification Search
  CPC ....... H04L 43/16; H04L 1/1896; H04L 63/04; H04L 41/0668; H04L 5/0091; H04L 69/04; H04L 1/189; H04L 5/0053; H04L 5/0032; H04L 5/001; H04L 5/0048; H04L 27/26025; H04L 5/0042; H04B 7/15507; H04B 7/0617; H04B 7/0626; H04B 7/0452
  See application file for complete search history.

(56) References Cited

U.S. PATENT DOCUMENTS

| | | | | |
|---|---|---|---|---|
| 2020/0229198 | A1* | 7/2020 | Kung | H04W 72/54 |
| 2020/0305169 | A1* | 9/2020 | Loehr | H04W 4/40 |
| 2020/0314612 | A1* | 10/2020 | Kang | H04W 4/70 |
| 2020/0344771 | A1* | 10/2020 | Kang | H04W 28/0263 |
| 2021/0007002 | A1* | 1/2021 | Kang | H04L 5/0053 |
| 2021/0022139 | A1* | 1/2021 | Shin | H04W 24/08 |
| 2021/0068125 | A1* | 3/2021 | Lin | H04W 72/0453 |
| 2021/0219269 | A1* | 7/2021 | Lee | H04W 24/10 |
| 2021/0250802 | A1* | 8/2021 | Zheng | H04W 74/006 |
| 2021/0258922 | A1* | 8/2021 | Xiao | H04W 72/02 |
| 2021/0266945 | A1* | 8/2021 | Ma | H04W 76/14 |

OTHER PUBLICATIONS

Kung et al. U.S. Appl. No. 62/791,500, filed Jan. 11, 2019 (Year: 2019).*
R2-1908708 3GPP TSG-RAN WG2 Meeting #107, Prague, Czech Republic, Aug. 26-30, 2019, Source: OPPO, Title: Discussion on sidelink related capability signalling.
R2-1908709 3GPP TSG-RAN WG2 Meeting #107, Prague, Czech Republic, Aug. 26-30, 2019, Source: OPPO, Title: Left issue on cell reselection for NR-V2X.
R2-1908710 3GPP TSG-RAN WG2 Meeting #107, Prague, Czech Republic, Aug. 26-30, 2019, Source: OPPO, Title: Discussion on SL-related UL RRC report.
R2-1908711 3GPP TSG-RAN WG2 Meeting #107, Prague, Czech Republic, Aug. 26-30, 2019, Source: OPPO, Title: Left issues on LCP for NR-V2X.
R2-1908712 3GPP TSG-RAN WG2 Meeting #107, Prague, Czech Republic, Aug. 26-30, 2019, Source: OPPO, Title: Discussion on RLC mode configuration collision.
R2-1908713 3GPP TSG-RAN WG2 Meeting #107, Prague, Czech Republic, Aug. 26-30, 2019, Source: OPPO, Title: Discussion on RLC for NR-V2X.
R2-1908714 3GPP TSG-RAN WG2 Meeting #107, Prague, Czech Republic, Aug. 26-30, 2019, Source: OPPO, Title: Discussion on PDCP aspects for NR-V2X.
R2-1908715 3GPP TSG-RAN WG2 Meeting #107, Prague, Czech Republic, Aug. 26-30, 2019, Source: OPPO, Title: Discussion on SDAP for NR-V2X.
R2-1908716 3GPP TSG-RAN WG2 Meeting #107, Prague, Czech Republic, Aug. 26-30, 2019, Source: OPPO, Title: Left issues on HARQ for NR-V2X.
R2-1908717 3GPP TSG-RAN WG2 Meeting #107, Prague, Czech Republic, Aug. 26-30, 2019, Source: OPPO (rapporteur) Title: Summary of [106#77] UL/SL prioritization.
R2-1908718 3GPP TSG-RAN WG2 Meeting #107, Prague, Czech Republic, Aug. 26-30, 2019, Source: OPPO, Title: Left issues on UL/SL prioritization for NR-V2X.
R2-1908719 3GPP TSG-RAN WG2 Meeting #107, Prague, Czech Republic, Aug. 26-30, 2019, Source: OPPO [to be RAN2], Title: [Draft] LS on UL-SL prioritization.
R2-1908720 3GPP TSG-RAN WG2 Meeting #107, Prague, Czech Republic, Aug. 26-30, 2019, Source: OPPO [to be RAN2], Title: [Draft] LS on HARQ option for group-cast.
R2-1909059 3GPP TSG-RAN WG2 Meeting #107, Prague, Czech Republic, Aug. 26-30, 2019, Source: ZTE Corporation, Sanechips, Title: Discussion on NR V2X UE operations under different RRC states.
R2-1909065 3GPP TSG-RAN WG2 Meeting #107, Prague, Czech Republic, Aug. 26-30, 2019, Source: ZTE Corporation, Sanechips, Title: Considerations on sidelink RLC.
R2-1909067 3GPP TSG-RAN WG2 Meeting #107, Prague, Czech Republic, Aug. 26-30, 2019, Source: ZTE Corporation, Sanechips, Title: Discussion on UL and SL prioritisation.
R2-1909069 3GPP TSG-RAN WG2 Meeting #107, Prague, Czech Republic, Aug. 26-30, 2019, Source: ZTE Corporation, Sanechips, Title: Consideration on multi-mode co-existence.
R2-1909070 3GPP TSG-RAN WG2 Meeting #107, Prague, Czech Republic, Aug. 26-30, 2019, Source: ZTE, Title: Discussion on HARQ feedback enable and disable.
R2-1909077 3GPP TSG-RAN WG2 Meeting #107, Prague, Czech Republic, Aug. 26-30, 2019, Source: ZTE, Title: Left issues for MAC PDU design in NR V2X.
R2-1909078 3GPP TSG-RAN WG2 Meeting #107, Prague, Czech Republic, Aug. 26-30, 2019, Source: ZTE, Title: Discussion on Groupcast feedback for NR V2X.
R2-1909080 3GPP TSG-RAN WG2 Meeting #107, Prague, Czech Republic, Aug. 26-30, 2019, Source: ZTE Corporation, Sanechips, Title: Discussion on SDAP issues.
R2-1909279 3GPP TSG-RAN WG2 Meeting #107, Prague, Czech Republic, Aug. 26-30, 2019, Source: Nokia, Nokia Shanghai Bell, Title: Further views on NR V2X System Information.
R2-1909280 3GPP TSG-RAN WG2 Meeting #107, Prague, Czech Republic, Aug. 26-30, 2019, Source: Nokia, Nokia Shanghai Bell, Title: SL/UL prioritization for NR V2X.
R2-1909281 3GPP TSG-RAN WG2 Meeting #107, Prague, Czech Republic, Aug. 26-30, 2019, Source: Nokia, Nokia Shanghai Bell, Title: Further granularity of prioritizing UCI versus SL transmissions.
R2-1910128 3GPP TSG-RAN WG2 Meeting #107, Prague, Czech Republic, Aug. 26-30, 2019, Source: Ericsson, Title: Discussion on the content of SidelinkUEInformation message.
R2-1910129 3GPP TSG-RAN WG2 Meeting #107, Prague, Czech Republic, Aug. 26-30, 2019, Source: Ericsson, Title: Discussion on SL UE report(s).
R2-1910135 3GPP TSG-RAN WG2 Meeting #107, Prague, Czech Republic, Aug. 26-30, 2019, Source: Ericsson, Title: Handling of SL in Uu RRC State Transitions.
R2-1910137 3GPP TSG-RAN WG2 Meeting #107, Prague, Czech Republic, Aug. 26-30, 2019, Source: Ericsson, Title: SL handling during handover in NR.
R2-1911083 3GPP TSG-RAN WG2 Meeting #107, Prague, Czech Republic, Aug. 26-30, 2019, Source: Huawei, HiSilicon, Title: Discussion about mode coexistence for NR sidelink.
R2-1911322 3GPP TSG-RAN WG2 Meeting #107, Prague, Czech Republic, Aug. 26-30, 2019, Source: Samsung, Title: Discussion on SLRB handling at transition from IDLE/INACTIVE to CONNECTED.
CATT: "Resource Allocation Mode Control", 3GPP Draft; Feb. 15, 2019 (Feb. 15, 2019).
VIVO: "Discussion on support of 4-6 simultaneous mode 1 and mode 2", 3GPP Draft, Aug. 16, 2019 (Aug. 16, 2019).
VIVO: "QoS management for sidelink", 3GPP Draft; May 13, 2019 (May 13, 2019).
Intel Corporation: "NR V2X Sidelink 1-15 Communication Under gNB Control", 3GPP Draft; Aug. 17, 2019 (Aug. 17, 2019).
Dec. 2, 20203—European Search Report—20199883.8.

* cited by examiner

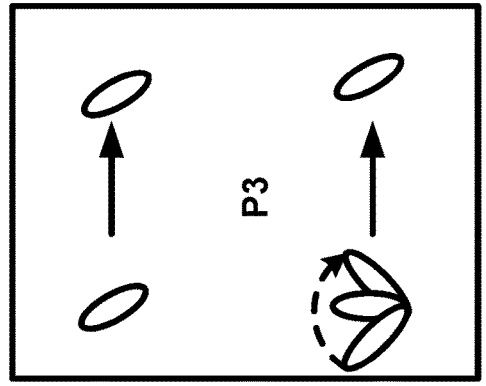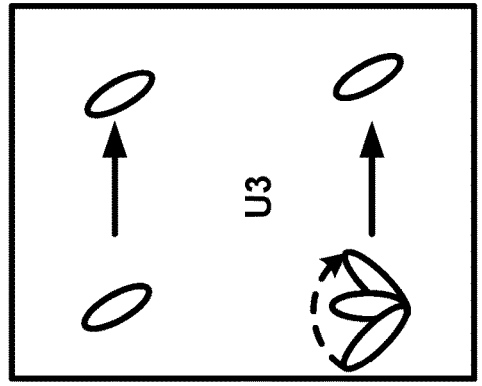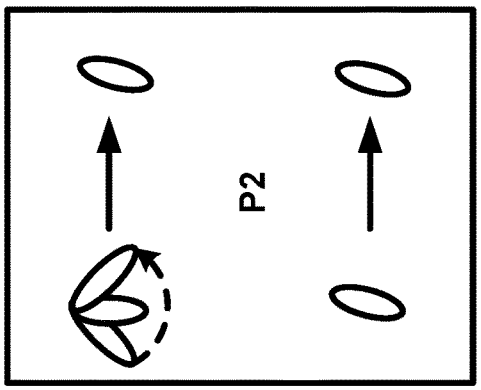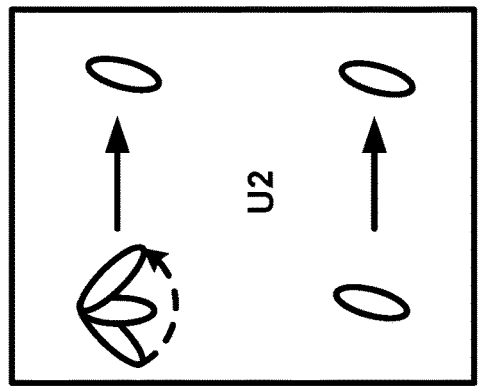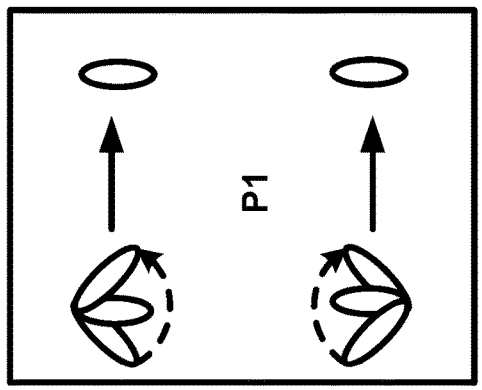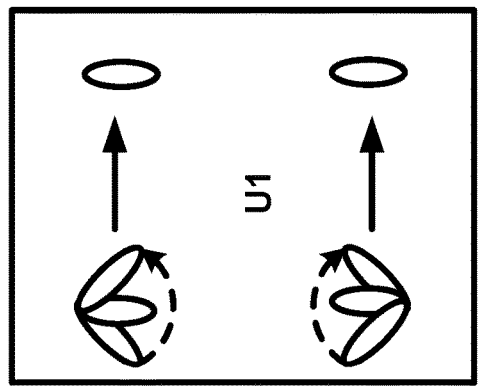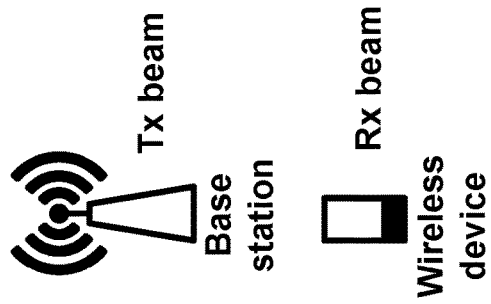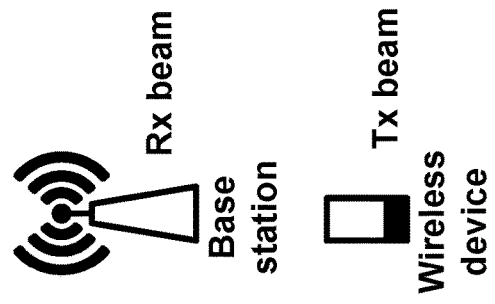
FIG. 12A
FIG. 12B

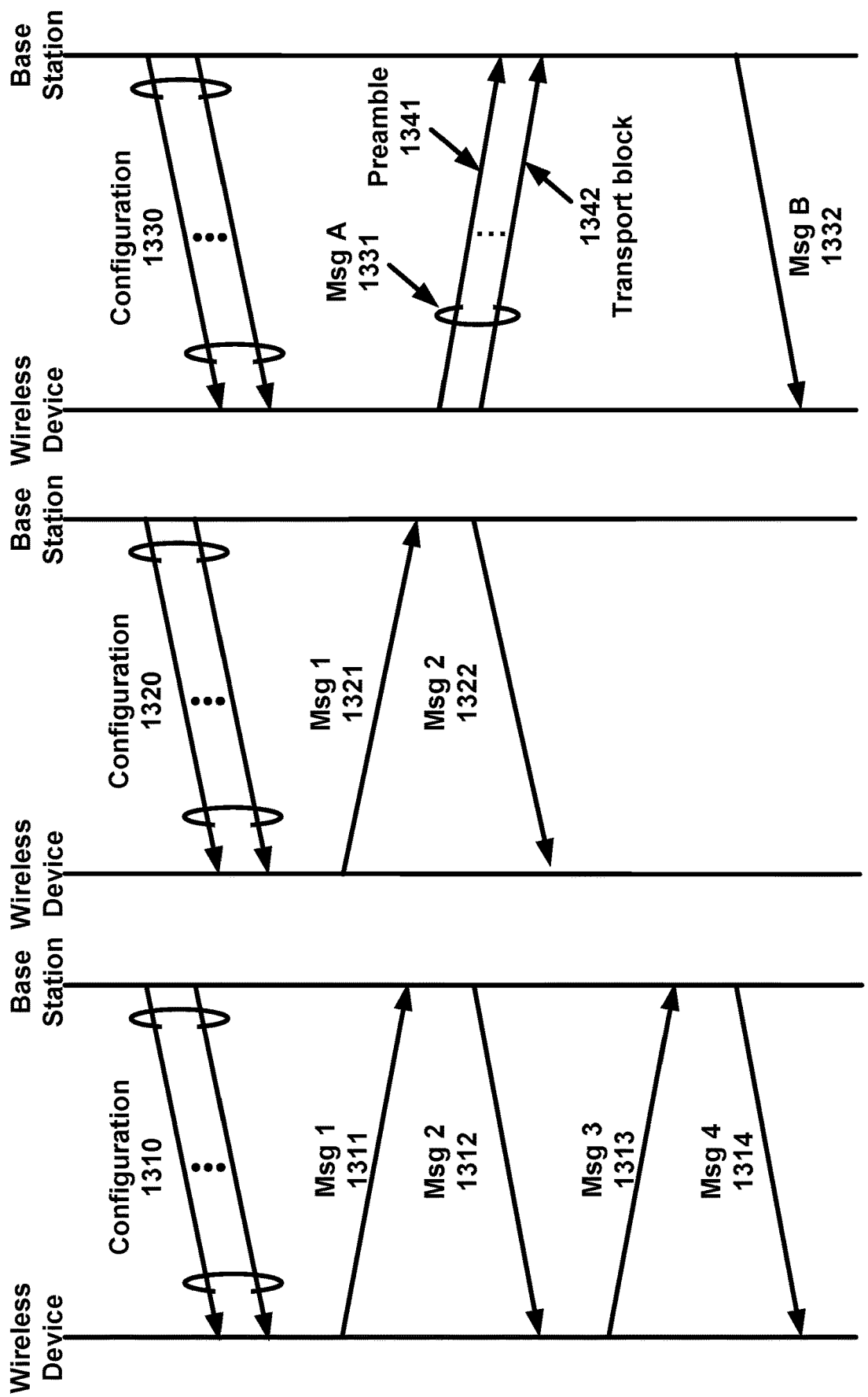

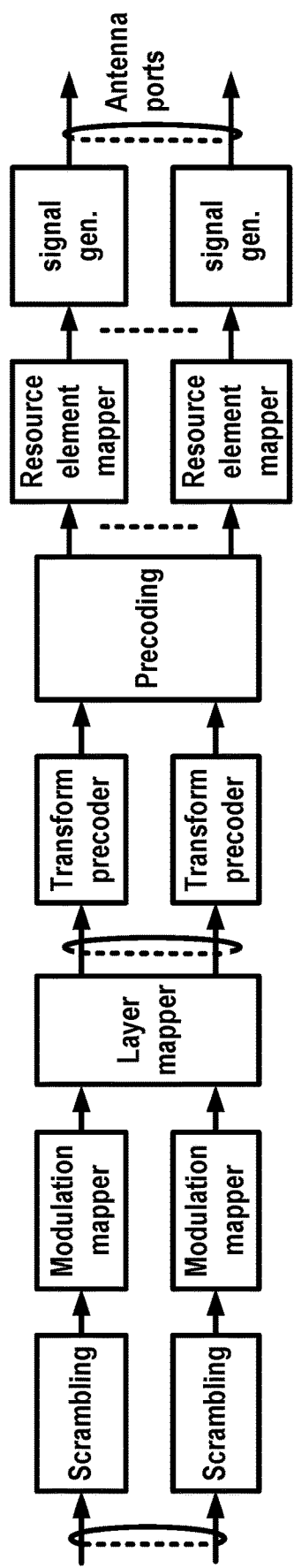
FIG. 16A
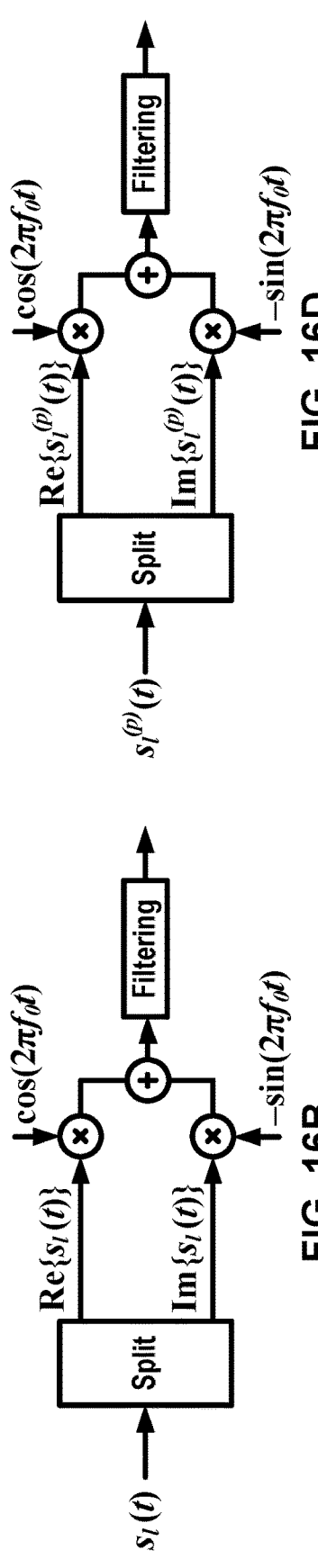
FIG. 16B
FIG. 16D
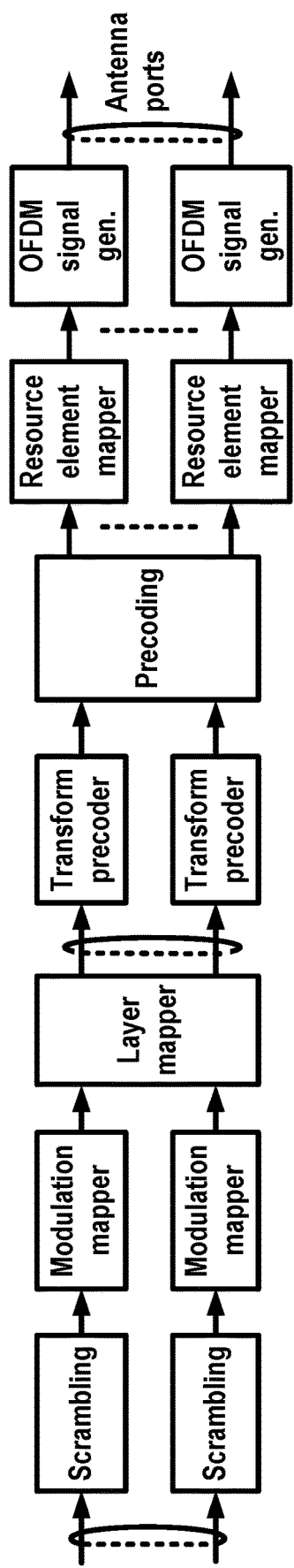
FIG. 16C

SIDELINK BEARER MODE SELECTION

CROSS-REFERENCE TO RELATED APPLICATIONS

This application claims the benefit of U.S. Provisional Application No. 62/910,361, filed on Oct. 3, 2019. The above-referenced application is hereby incorporated by reference in its entirety.

BACKGROUND

A base station and a wireless device communicate via uplink and/or downlink communications. A wireless device communicates with some devices (e.g., other wireless devices) via sidelink communications.

SUMMARY

The following summary presents a simplified summary of certain features. The summary is not an extensive overview and is not intended to identify key or critical elements.

Wireless devices may communicate with each other. Communications may be via a communication link, such as a sidelink. A wireless device may be configured to use more than one mode (e.g., sidelink bearer mode 1, sidelink bearer mode 2, etc.) for communications (e.g., sidelink communications) with another wireless device. A base station may indicate one or more conditions (e.g., thresholds, policies, etc.) that the wireless device may use, along with one or more parameters for the condition(s), to determine the mode for the sidelink communications. The one or more parameters may comprise, for example, a quality of service (QoS), a channel occupancy ratio (CR), received signal strength indication (RSSI) of radio resources, and/or any other parameter associated with a mode. Each mode may have an associated set of the one or more parameters. The wireless device may be able to determine (e.g., dynamically select) a mode for the sidelink communications that may provide advantages such as increased efficiency, reduced interference, and reduced latency.

These and other features and advantages are described in greater detail below.

BRIEF DESCRIPTION OF THE DRAWINGS

Some features are shown by way of example, and not by limitation, in the accompanying drawings. In the drawings, like numerals reference similar elements.

FIG. 12A shows examples of downlink beam management procedures.

FIG. 12B shows examples of uplink beam management procedures.

FIG. 13A shows an example four-step random access procedure.

FIG. 13B shows an example two-step random access procedure.

FIG. 13C shows an example two-step random access procedure.

FIG. 16A, FIG. 16B, FIG. 16C, and FIG. 16D show examples of uplink and downlink signal transmission.

DETAILED DESCRIPTION

Figure 1A:
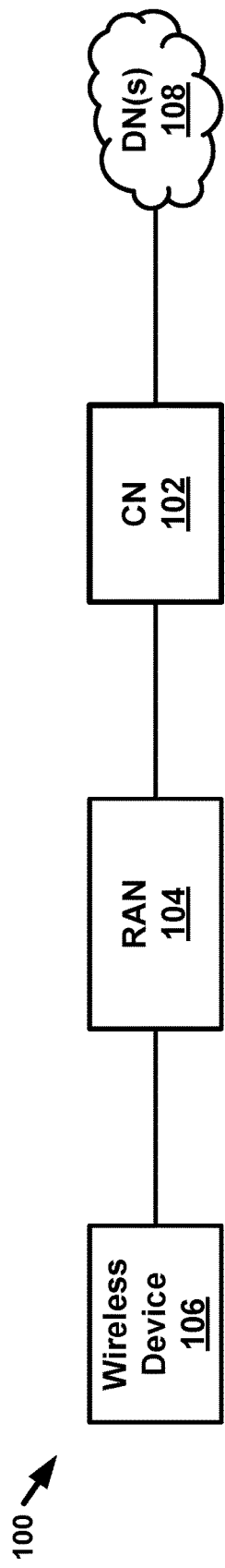
FIG. 1A and FIG. 1B show example communication networks.

The accompanying drawings and descriptions provide examples. It is to be understood that the examples shown in the drawings and/or described are non-exclusive, and that features shown and described may be practiced in other examples. Examples are provided for operation of wireless communication systems, which may be used in the technical field of multicarrier communication systems. More particularly, the technology disclosed herein may relate to sidelink communications between two wireless devices.

FIG. 1A shows an example communication network 100. The communication network 100 may comprise a mobile communication network). The communication network 100 may comprise, for example, a public land mobile network (PLMN) operated/managed/run by a network operator. The communication network 100 may comprise one or more of a core network (CN) 102, a radio access network (RAN) 104, and/or a wireless device 106. The communication network 100 may comprise, and/or a device within the communication network 100 may communicate with (e.g., via CN 102), one or more data networks (DN(s)) 108. The wireless device 106 may communicate with one or more DNs 108, such as public DNs (e.g., the Internet), private DNs, and/or intra-operator DNs. The wireless device 106 may communicate with the one or more DNs 108 via the RAN 104 and/or via the CN 102. The CN 102 may provide/configure the wireless device 106 with one or more interfaces to the one or more DNs 108. As part of the interface functionality, the CN 102 may set up end-to-end connections between the wireless device 106 and the one or more DNs 108, authenticate the wireless device 106, provide/configure charging functionality, etc.

The wireless device 106 may communicate with the RAN 104 via radio communications over an air interface. The RAN 104 may communicate with the CN 102 via various communications (e.g., wired communications and/or wireless communications). The wireless device 106 may establish a connection with the CN 102 via the RAN 104. The RAN 104 may provide/configure scheduling, radio resource management, and/or retransmission protocols, for example, as part of the radio communications. The communication direction from the RAN 104 to the wireless device 106 over/via the air interface may be referred to as the downlink and/or downlink communication direction. The communication direction from the wireless device 106 to the RAN 104 over/via the air interface may be referred to as the uplink and/or uplink communication direction. Downlink transmissions may be separated and/or distinguished from uplink transmissions, for example, based on at least one of: frequency division duplexing (FDD), time-division duplexing (TDD), any other duplexing schemes, and/or one or more combinations thereof.

As used throughout, the term "wireless device" may comprise one or more of: a mobile device, a fixed (e.g., non-mobile) device for which wireless communication is configured or usable, a computing device, a node, a device capable of wirelessly communicating, or any other device capable of sending and/or receiving signals. As non-limiting examples, a wireless device may comprise, for example: a telephone, a cellular phone, a Wi-Fi phone, a smartphone, a tablet, a computer, a laptop, a sensor, a meter, a wearable device, an Internet of Things (IoT) device, a hotspot, a cellular repeater, a vehicle road side unit (RSU), a relay node, an automobile, a wireless user device (e.g., user equipment (UE), a user terminal (UT), etc.), an access terminal (AT), a mobile station, a handset, a wireless transmit and receive unit (WTRU), a wireless communication device, and/or any combination thereof.

The RAN 104 may comprise one or more base stations (not shown). As used throughout, the term "base station" may comprise one or more of: a base station, a node, a Node B (NB), an evolved NodeB (eNB), a gNB, an ng-eNB, a relay node (e.g., an integrated access and backhaul (IAB) node), a donor node (e.g., a donor eNB, a donor gNB, etc.), an access point (e.g., a Wi-Fi access point), a transmission and reception point (TRP), a computing device, a device capable of wirelessly communicating, or any other device capable of sending and/or receiving signals. A base station may comprise one or more of each element listed above. For example, a base station may comprise one or more TRPs. As other non-limiting examples, a base station may comprise for example, one or more of: a Node B (e.g., associated with Universal Mobile Telecommunications System (UMTS) and/or third-generation (3G) standards), an Evolved Node B (eNB) (e.g., associated with Evolved-Universal Terrestrial Radio Access (E-UTRA) and/or fourth-generation (4G) standards), a remote radio head (RRH), a baseband processing unit coupled to one or more remote radio heads (RRHs), a repeater node or relay node used to extend the coverage area of a donor node, a Next Generation Evolved Node B (ng-eNB), a Generation Node B (gNB) (e.g., associated with NR and/or fifth-generation (5G) standards), an access point (AP) (e.g., associated with, for example, Wi-Fi or any other suitable wireless communication standard), any other generation base station, and/or any combination thereof. A base station may comprise one or more devices, such as at least one base station central device (e.g., a gNB Central Unit (gNB-CU)) and at least one base station distributed device (e.g., a gNB Distributed Unit (gNB-DU)).

A base station (e.g., in the RAN 104) may comprise one or more sets of antennas for communicating with the wireless device 106 wirelessly (e.g., via an over the air interface). One or more base stations may comprise sets (e.g., three sets or any other quantity of sets) of antennas to respectively control multiple cells or sectors (e.g., three cells, three sectors, any other quantity of cells, or any other quantity of sectors). The size of a cell may be determined by a range at which a receiver (e.g., a base station receiver) may successfully receive transmissions from a transmitter (e.g., a wireless device transmitter) operating in the cell. One or more cells of base stations (e.g., by alone or in combination with other cells) may provide/configure a radio coverage to the wireless device 106 over a wide geographic area to support wireless device mobility. A base station comprising three sectors (e.g., or n-sector, where n refers to any quantity n) may be referred to as a three-sector site (e.g., or an n-sector site) or a three-sector base station (e.g., an n-sector base station).

One or more base stations (e.g., in the RAN 104) may be implemented as a sectored site with more or less than three sectors. One or more base stations of the RAN 104 may be implemented as an access point, as a baseband processing device/unit coupled to several RRHs, and/or as a repeater or relay node used to extend the coverage area of a node (e.g., a donor node). A baseband processing device/unit coupled to RRHs may be part of a centralized or cloud RAN architecture, for example, where the baseband processing device/unit may be centralized in a pool of baseband processing devices/units or virtualized. A repeater node may amplify and send (e.g., transmit, retransmit, rebroadcast, etc.) a radio signal received from a donor node. A relay node may perform the substantially the same/similar functions as a repeater node. The relay node may decode the radio signal received from the donor node, for example, to remove noise before amplifying and sending the radio signal.

The RAN 104 may be deployed as a homogenous network of base stations (e.g., macrocell base stations) that have similar antenna patterns and/or similar high-level transmit powers. The RAN 104 may be deployed as a heterogeneous network of base stations (e.g., different base stations that have different antenna patterns). In heterogeneous networks, small cell base stations may be used to provide/configure small coverage areas, for example, coverage areas that overlap with comparatively larger coverage areas provided/configured by other base stations (e.g., macrocell base stations). The small coverage areas may be provided/configured in areas with high data traffic (or so-called "hotspots") or in areas with a weak macrocell coverage. Examples of small cell base stations may comprise, in order of decreasing coverage area, microcell base stations, picocell base stations, and femtocell base stations or home base stations.

Examples described herein may be used in a variety of types of communications. For example, communications may be in accordance with the Third-Generation Partnership Project (3GPP) (e.g., one or more network elements similar to those of the communication network 100), communications in accordance with Institute of Electrical and Electronics Engineers (IEEE), communications in accordance with International Telecommunication Union (ITU), communications in accordance with International Organization for Standardization (ISO), etc. The 3GPP has produced specifications for multiple generations of mobile networks: a 3G network known as UMTS, a 4G network known as Long-Term Evolution (LTE) and LTE Advanced (LTE-A), and a 5G network known as 5G System (5GS) and NR system. 3GPP may produce specifications for additional generations of communication networks (e.g., 6G and/or any other generation of communication network). Examples may be described with reference to one or more elements (e.g., the RAN) of a 3GPP 5G network, referred to as a next-generation RAN (NG-RAN), or any other communication network, such as a 3GPP network and/or a non-3GPP network. Examples described herein may be applicable to other communication networks, such as 3G and/or 4G networks, and communication networks that may not yet be finalized/specified (e.g., a 3GPP 6G network), satellite communication networks, and/or any other communication network. NG-RAN implements and updates 5G radio access technology referred to as NR and may be provisioned to implement 4G radio access technology and/or other radio access technologies, such as other 3GPP and/or non-3GPP radio access technologies.

Figure 1B:
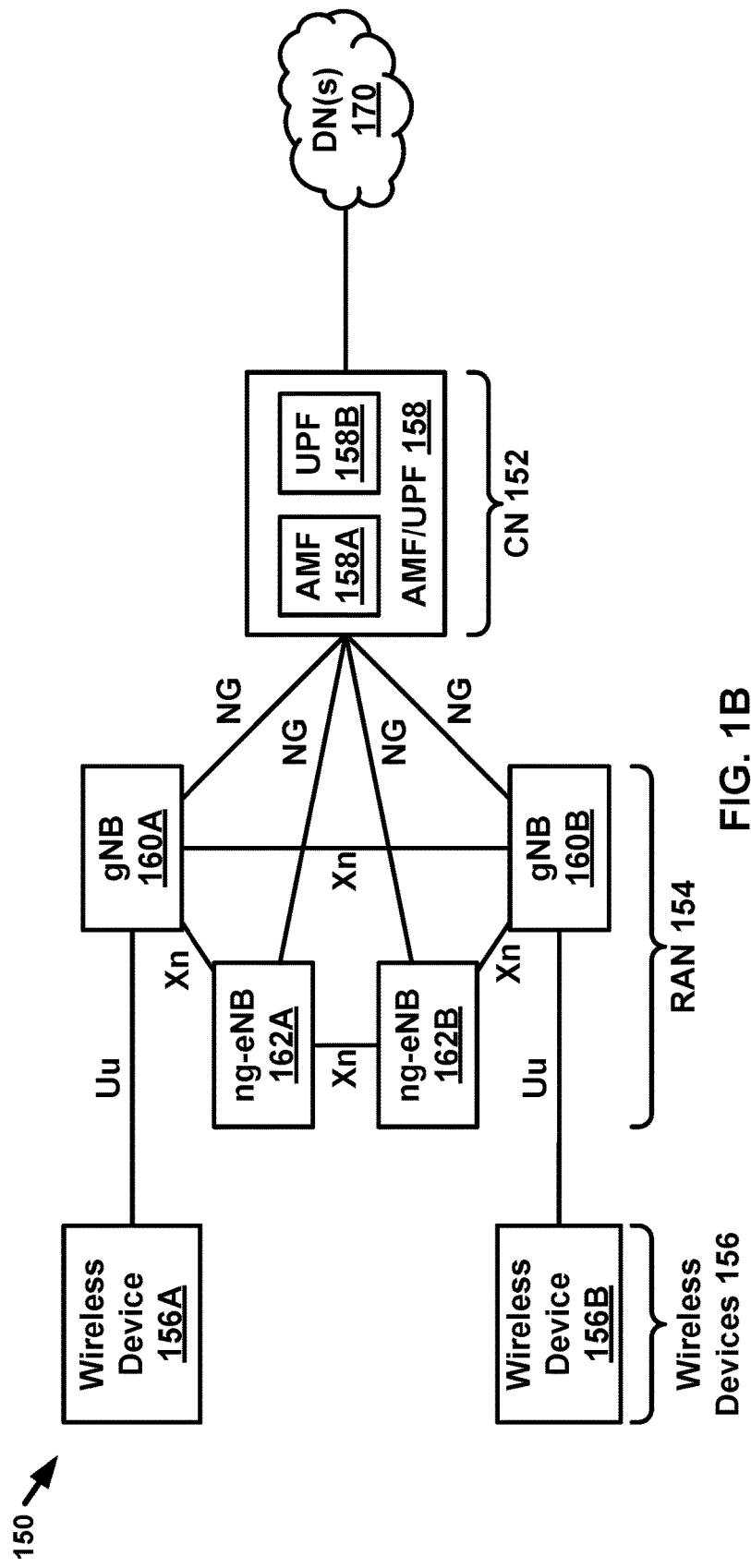

FIG. 1B shows an example communication network 150. The communication network may comprise a mobile communication network. The communication network 150 may comprise, for example, a PLMN operated/managed/run by a network operator. The communication network 150 may comprise one or more of: a CN 152 (e.g., a 5G core network (5G-CN)), a RAN 154 (e.g., an NG-RAN), and/or wireless devices 156A and 156B (collectively wireless device(s) 156). The communication network 150 may comprise, and/or a device within the communication network 150 may communicate with (e.g., via CN 152), one or more data networks (DN(s)) 170. These components may be implemented and operate in substantially the same or similar manner as corresponding components described with respect to FIG. 1A.

The CN 152 (e.g., 5G-CN) may provide/configure the wireless device(s) 156 with one or more interfaces to one or more DNs 170, such as public DNs (e.g., the Internet), private DNs, and/or intra-operator DNs. As part of the interface functionality, the CN 152 (e.g., 5G-CN) may set up end-to-end connections between the wireless device(s) 156 and the one or more DNs, authenticate the wireless device(s) 156, and/or provide/configure charging functionality. The CN 152 (e.g., the 5G-CN) may be a service-based architecture, which may differ from other CNs (e.g., such as a 3GPP 4G CN). The architecture of nodes of the CN 152 (e.g., 5G-CN) may be defined as network functions that offer services via interfaces to other network functions. The network functions of the CN 152 (e.g., 5G CN) may be implemented in several ways, for example, as network elements on dedicated or shared hardware, as software instances running on dedicated or shared hardware, and/or as virtualized functions instantiated on a platform (e.g., a cloud-based platform).

The CN 152 (e.g., 5G-CN) may comprise an Access and Mobility Management Function (AMF) device 158A and/or a User Plane Function (UPF) device 158B, which may be separate components or one component AMF/UPF device 158. The UPF device 158B may serve as a gateway between a RAN 154 (e.g., NG-RAN) and the one or more DNs 170. The UPF device 158B may perform functions, such as: packet routing and forwarding, packet inspection and user plane policy rule enforcement, traffic usage reporting, uplink classification to support routing of traffic flows to the one or more DNs 170, quality of service (QoS) handling for the user plane (e.g., packet filtering, gating, uplink/downlink rate enforcement, and uplink traffic verification), downlink packet buffering, and/or downlink data notification triggering. The UPF device 158B may serve as an anchor point for intra-/inter-Radio Access Technology (RAT) mobility, an external protocol (or packet) data unit (PDU) session point of interconnect to the one or more DNs, and/or a branching point to support a multi-homed PDU session. The wireless device(s) 156 may be configured to receive services via a PDU session, which may be a logical connection between a wireless device and a DN.

The AMF device 158A may perform functions, such as: Non-Access Stratum (NAS) signaling termination, NAS signaling security, Access Stratum (AS) security control, inter-CN node signaling for mobility between access networks (e.g., 3GPP access networks and/or non-3GPP networks), idle mode wireless device reachability (e.g., idle mode UE reachability for control and execution of paging retransmission), registration area management, intra-system and inter-system mobility support, access authentication, access authorization including checking of roaming rights, mobility management control (e.g., subscription and policies), network slicing support, and/or session management function (SMF) selection. NAS may refer to the functionality operating between a CN and a wireless device, and AS may refer to the functionality operating between a wireless device and a RAN.

The CN 152 (e.g., 5G-CN) may comprise one or more additional network functions that may not be shown in FIG.

1B. The CN 152 (e.g., 5G-CN) may comprise one or more devices implementing at least one of: a Session Management Function (SMF), an NR Repository Function (NRF), a Policy Control Function (PCF), a Network Exposure Function (NEF), a Unified Data Management (UDM), an Application Function (AF), an Authentication Server Function (AUSF), and/or any other function.

The RAN 154 (e.g., NG-RAN) may communicate with the wireless device(s) 156 via radio communications (e.g., an over the air interface). The wireless device(s) 156 may communicate with the CN 152 via the RAN 154. The RAN 154 (e.g., NG-RAN) may comprise one or more first-type base stations (e.g., gNBs comprising a gNB 160A and a gNB 160B (collectively gNBs 160)) and/or one or more second-type base stations (e.g., ng eNBs comprising an ng-eNB 162A and an ng-eNB 162B (collectively ng eNBs 162)). The RAN 154 may comprise one or more of any quantity of types of base station. The gNBs 160 and ng eNBs 162 may be referred to as base stations. The base stations (e.g., the gNBs 160 and ng eNBs 162) may comprise one or more sets of antennas for communicating with the wireless device(s) 156 wirelessly (e.g., an over an air interface). One or more base stations (e.g., the gNBs 160 and/or the ng eNBs 162) may comprise multiple sets of antennas to respectively control multiple cells (or sectors). The cells of the base stations (e.g., the gNBs 160 and the ng-eNBs 162) may provide a radio coverage to the wireless device(s) 156 over a wide geographic area to support wireless device mobility.

The base stations (e.g., the gNBs 160 and/or the ng-eNBs 162) may be connected to the CN 152 (e.g., 5G CN) via a first interface (e.g., an NG interface) and to other base stations via a second interface (e.g., an Xn interface). The NG and Xn interfaces may be established using direct physical connections and/or indirect connections over an underlying transport network, such as an internet protocol (IP) transport network. The base stations (e.g., the gNBs 160 and/or the ng-eNBs 162) may communicate with the wireless device(s) 156 via a third interface (e.g., a Uu interface). A base station (e.g., the gNB 160A) may communicate with the wireless device 156A via a Uu interface. The NG, Xn, and Uu interfaces may be associated with a protocol stack. The protocol stacks associated with the interfaces may be used by the network elements shown in FIG. 1B to exchange data and signaling messages. The protocol stacks may comprise two planes: a user plane and a control plane. Any other quantity of planes may be used (e.g., in a protocol stack). The user plane may handle data of interest to a user. The control plane may handle signaling messages of interest to the network elements.

One or more base stations (e.g., the gNBs 160 and/or the ng-eNBs 162) may communicate with one or more AMF/UPF devices, such as the AMF/UPF 158, via one or more interfaces (e.g., NG interfaces). A base station (e.g., the gNB 160A) may be in communication with, and/or connected to, the UPF 158B of the AMF/UPF 158 via an NG-User plane (NG-U) interface. The NG-U interface may provide/perform delivery (e.g., non-guaranteed delivery) of user plane PDUs between a base station (e.g., the gNB 160A) and a UPF device (e.g., the UPF 158B). The base station (e.g., the gNB 160A) may be in communication with, and/or connected to, an AMF device (e.g., the AMF 158A) via an NG-Control plane (NG-C) interface. The NG-C interface may provide/perform, for example, NG interface management, wireless device context management (e.g., UE context management), wireless device mobility management (e.g., UE mobility management), transport of NAS messages, paging, PDU session management, configuration transfer, and/or warning message transmission.

A wireless device may access the base station, via an interface (e.g., Uu interface), for the user plane configuration and the control plane configuration. The base stations (e.g., gNBs 160) may provide user plane and control plane protocol terminations towards the wireless device(s) 156 via the Uu interface. A base station (e.g., the gNB 160A) may provide user plane and control plane protocol terminations toward the wireless device 156A over a Uu interface associated with a first protocol stack. A base station (e.g., the ng-eNBs 162) may provide Evolved UMTS Terrestrial Radio Access (E UTRA) user plane and control plane protocol terminations towards the wireless device(s) 156 via a Uu interface (e.g., where E UTRA may refer to the 3GPP 4G radio-access technology). A base station (e.g., the ng-eNB 162B) may provide E UTRA user plane and control plane protocol terminations towards the wireless device 156B via a Uu interface associated with a second protocol stack. The user plane and control plane protocol terminations may comprise, for example, NR user plane and control plane protocol terminations, 4G user plane and control plane protocol terminations, etc.

The CN 152 (e.g., 5G-CN) may be configured to handle one or more radio accesses (e.g., NR, 4G, and/or any other radio accesses). It may also be possible for an NR network/device (or any first network/device) to connect to a 4G core network/device (or any second network/device) in a non-standalone mode (e.g., non-standalone operation). In a non-standalone mode/operation, a 4G core network may be used to provide (or at least support) control-plane functionality (e.g., initial access, mobility, and/or paging). Although only one AMF/UPF 158 is shown in FIG. 1B, one or more base stations (e.g., one or more gNBs and/or one or more ng-eNBs) may be connected to multiple AMF/UPF nodes, for example, to provide redundancy and/or to load share across the multiple AMF/UPF nodes.

An interface (e.g., Uu, Xn, and/or NG interfaces) between network elements (e.g., the network elements shown in FIG. 1B) may be associated with a protocol stack that the network elements may use to exchange data and signaling messages. A protocol stack may comprise two planes: a user plane and a control plane. Any other quantity of planes may be used (e.g., in a protocol stack). The user plane may handle data associated with a user (e.g., data of interest to a user). The control plane may handle data associated with one or more network elements (e.g., signaling messages of interest to the network elements).

The communication network 100 in FIG. 1A and/or the communication network 150 in FIG. 1B may comprise any quantity/number and/or type of devices, such as, for example, computing devices, wireless devices, mobile devices, handsets, tablets, laptops, internet of things (IoT) devices, hotspots, cellular repeaters, computing devices, and/or, more generally, user equipment (e.g., UE). Although one or more of the above types of devices may be referenced herein (e.g., UE, wireless device, computing device, etc.), it should be understood that any device herein may comprise any one or more of the above types of devices or similar devices. The communication network, and any other network referenced herein, may comprise an LTE network, a 5G network, a satellite network, and/or any other network for wireless communications (e.g., any 3GPP network and/or any non-3GPP network). Apparatuses, systems, and/or methods described herein may generally be described as implemented on one or more devices (e.g., wireless device, base station, eNB, gNB, computing device, etc.), in one or more networks, but it will be understood that one or more features and steps may be implemented on any device and/or in any network.

Figure 2A:
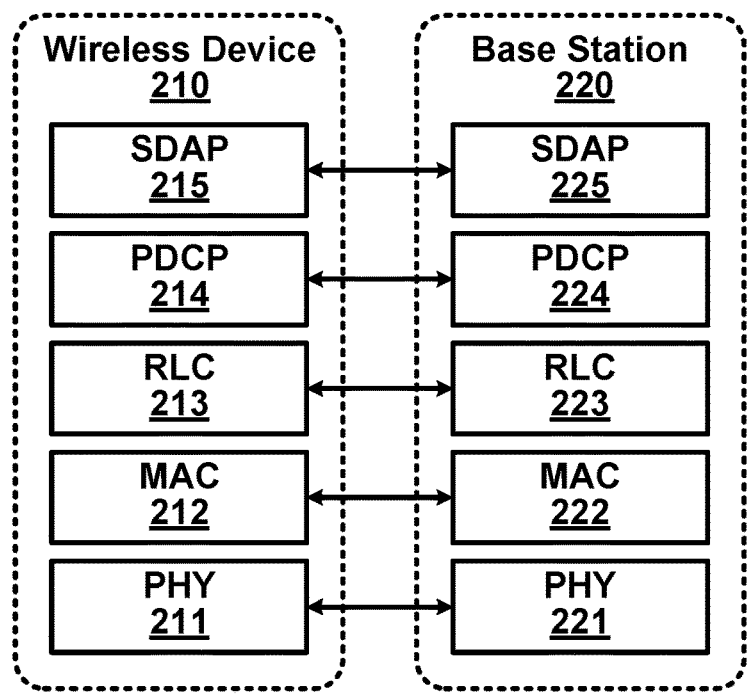
FIG. 2A shows an example user plane.
Figure 2B:
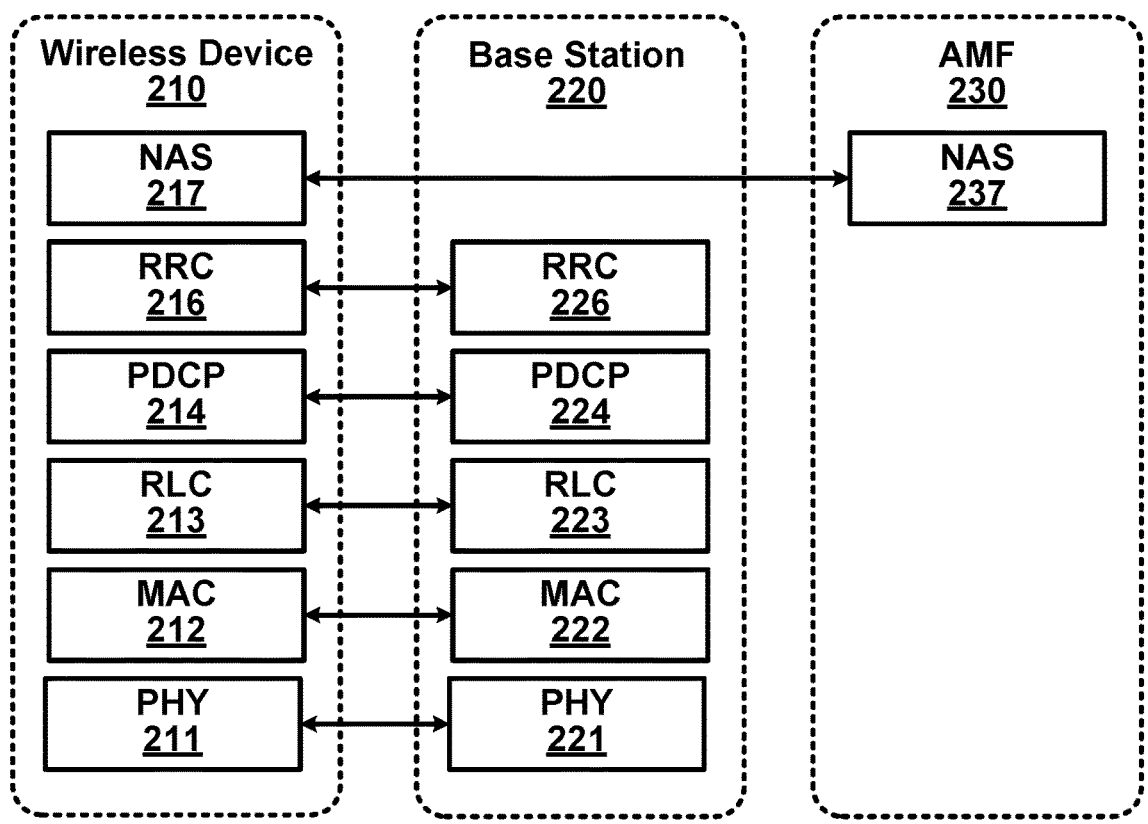
FIG. 2B shows an example control plane configuration.

FIG. 2A shows an example user plane configuration. The user plane configuration may comprise, for example, an NR user plane protocol stack. FIG. 2B shows an example control plane configuration. The control plane configuration may comprise, for example, an NR control plane protocol stack. One or more of the user plane configuration and/or the control plane configuration may use a Uu interface that may be between a wireless device 210 and a base station 220. The protocol stacks shown in FIG. 2A and FIG. 2B may be substantially the same or similar to those used for the Uu interface between, for example, the wireless device 156A and the base station 160A shown in FIG. 1B.

A user plane configuration (e.g., an NR user plane protocol stack) may comprise multiple layers (e.g., five layers or any other quantity of layers) implemented in the wireless device 210 and the base station 220 (e.g., as shown in FIG. 2A). At the bottom of the protocol stack, physical layers (PHYs) 211 and 221 may provide transport services to the higher layers of the protocol stack and may correspond to layer 1 of the Open Systems Interconnection (OSI) model. The protocol layers above PHY 211 may comprise a medium access control layer (MAC) 212, a radio link control layer (RLC) 213, a packet data convergence protocol layer (PDCP) 214, and/or a service data application protocol layer (SDAP) 215. The protocol layers above PHY 221 may comprise a medium access control layer (MAC) 222, a radio link control layer (RLC) 223, a packet data convergence protocol layer (PDCP) 224, and/or a service data application protocol layer (SDAP) 225. One or more of the four protocol layers above PHY 211 may correspond to layer 2, or the data link layer, of the OSI model. One or more of the four protocol layers above PHY 221 may correspond to layer 2, or the data link layer, of the OSI model.

Figure 3:
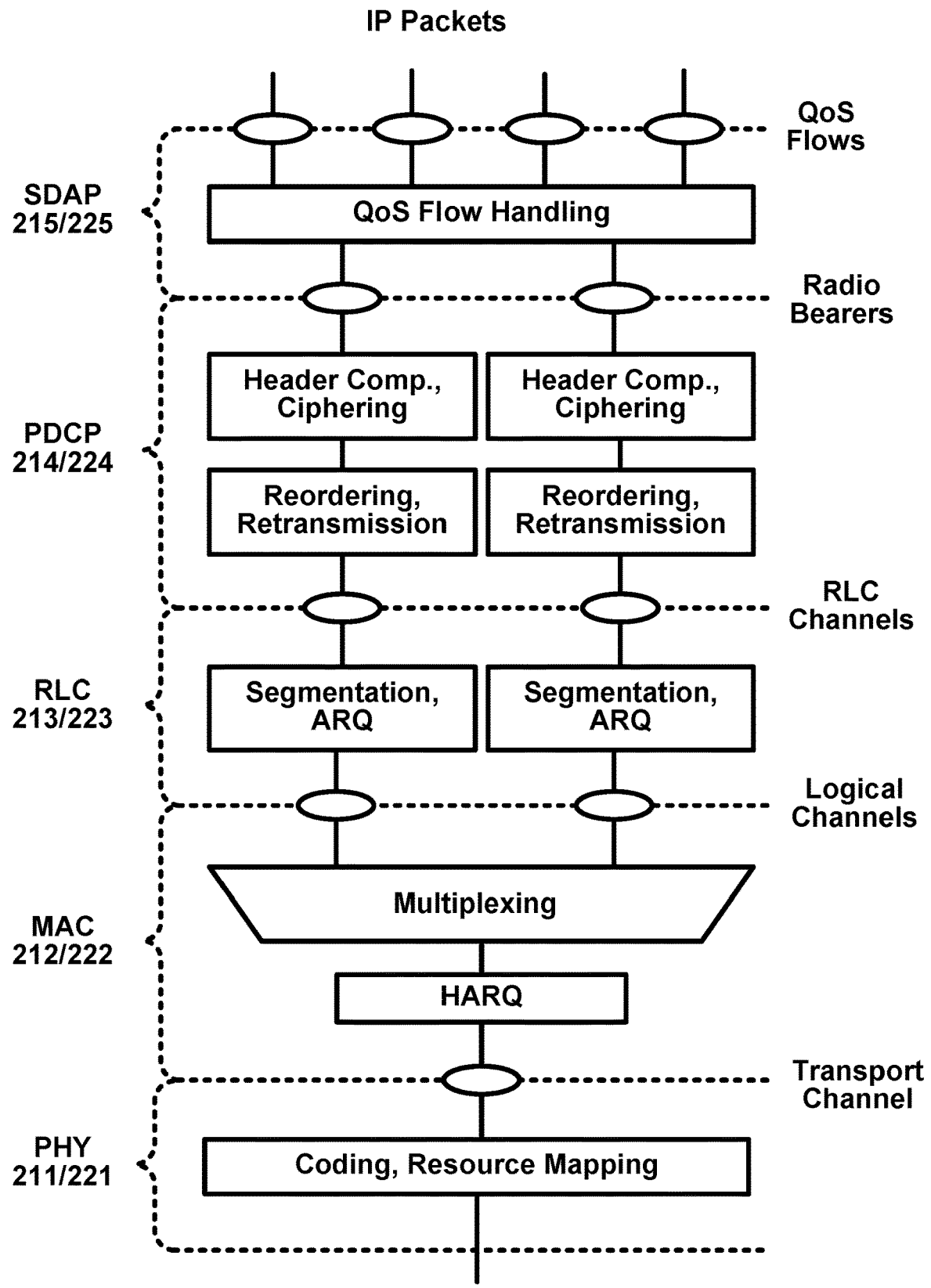
FIG. 3 shows example of protocol layers.

FIG. 3 shows an example of protocol layers. The protocol layers may comprise, for example, protocol layers of the NR user plane protocol stack. One or more services may be provided between protocol layers. SDAPs (e.g., SDAPS 215 and 225 shown in FIG. 2A and FIG. 3) may perform Quality of Service (QoS) flow handling. A wireless device (e.g., the wireless devices 106, 156A, 156B, and 210) may receive services through/via a PDU session, which may be a logical connection between the wireless device and a DN. The PDU session may have one or more QoS flows 310. A UPF (e.g., the UPF 158B) of a CN may map IP packets to the one or more QoS flows of the PDU session, for example, based on one or more QoS requirements (e.g., in terms of delay, data rate, error rate, and/or any other quality/service requirement). The SDAPs 215 and 225 may perform mapping/de-mapping between the one or more QoS flows 310 and one or more radio bearers 320 (e.g., data radio bearers). The mapping/de-mapping between the one or more QoS flows 310 and the radio bearers 320 may be determined by the SDAP 225 of the base station 220. The SDAP 215 of the wireless device 210 may be informed of the mapping between the QoS flows 310 and the radio bearers 320 via reflective mapping and/or control signaling received from the base station 220. For reflective mapping, the SDAP 225 of the base station 220 may mark the downlink packets with a QoS flow indicator (QFI), which may be monitored/detected/identified/indicated/observed by the SDAP 215 of the wireless device 210 to determine the mapping/de-mapping between the one or more QoS flows 310 and the radio bearers 320.

PDCPs (e.g., the PDCPs 214 and 224 shown in FIG. 2A and FIG. 3) may perform header compression/decompression, for example, to reduce the amount of data that may need to be sent/transmitted over the air interface, ciphering/deciphering to prevent unauthorized decoding of data sent/transmitted over the air interface, and/or integrity protection (e.g., to ensure control messages originate from intended sources). The PDCPs 214 and 224 may perform retransmissions of undelivered packets, in-sequence delivery and reordering of packets, and/or removal of packets received in duplicate due to, for example, a handover (e.g., an intra-gNB handover). The PDCPs 214 and 224 may perform packet duplication, for example, to improve the likelihood of the packet being received. A receiver may receive the packet in duplicate and may remove any duplicate packets. Packet duplication may be useful for certain services, such as services that require high reliability.

The PDCP layers (e.g., PDCPs 214 and 224) may perform mapping/de-mapping between a split radio bearer and RLC channels (e.g., RLC channels 330) (e.g., in a dual connectivity scenario/configuration). Dual connectivity may refer to a technique that allows a wireless device to communicate with multiple cells (e.g., two cells) or, more generally, multiple cell groups comprising: a master cell group (MCG) and a secondary cell group (SCG). A split bearer may be configured and/or used, for example, if a single radio bearer (e.g., such as one of the radio bearers provided/configured by the PDCPs 214 and 224 as a service to the SDAPs 215 and 225) is handled by cell groups in dual connectivity. The PDCPs 214 and 224 may map/de-map between the split radio bearer and RLC channels 330 belonging to the cell groups.

RLC layers (e.g., RLCs 213 and 223) may perform segmentation, retransmission via Automatic Repeat Request (ARQ), and/or removal of duplicate data units received from MAC layers (e.g., MACs 212 and 222, respectively). The RLC layers (e.g., RLCs 213 and 223) may support multiple transmission modes (e.g., three transmission modes: transparent mode (TM); unacknowledged mode (UM); and acknowledged mode (AM)). The RLC layers may perform one or more of the noted functions, for example, based on the transmission mode an RLC layer is operating. The RLC configuration may be per logical channel. The RLC configuration may not depend on numerologies and/or Transmission Time Interval (TTI) durations (or other durations). The RLC layers (e.g., RLCs 213 and 223) may provide/configure RLC channels as a service to the PDCP layers (e.g., PDCPs 214 and 224, respectively), such as shown in FIG. 3.

The MAC layers (e.g., MACs 212 and 222) may perform multiplexing/demultiplexing of logical channels and/or mapping between logical channels and transport channels. The multiplexing/demultiplexing may comprise multiplexing/demultiplexing of data units/data portions, belonging to the one or more logical channels, into/from Transport Blocks (TBs) delivered to/from the PHY layers (e.g., PHYs 211 and 221, respectively). The MAC layer of a base station (e.g., MAC 222) may be configured to perform scheduling, scheduling information reporting, and/or priority handling between wireless devices via dynamic scheduling. Scheduling may be performed by a base station (e.g., the base station 220 at the MAC 222) for downlink/or and uplink. The MAC layers (e.g., MACs 212 and 222) may be configured to perform error correction(s) via Hybrid Automatic Repeat Request (HARQ) (e.g., one HARQ entity per carrier in case of Carrier Aggregation (CA)), priority handling between logical channels of the wireless device 210 via logical channel prioritization and/or padding. The MAC layers (e.g., MACs 212 and 222) may support one or more numerologies and/or transmission timings. Mapping restrictions in a logical channel prioritization may control which numerology and/or transmission timing a logical channel may use. The MAC layers (e.g., the MACs 212 and 222) may provide/configure logical channels 340 as a service to the RLC layers (e.g., the RLCs 213 and 223).

The PHY layers (e.g., PHYs 211 and 221) may perform mapping of transport channels to physical channels and/or digital and analog signal processing functions, for example, for sending and/or receiving information (e.g., via an over the air interface). The digital and/or analog signal processing functions may comprise, for example, coding/decoding and/or modulation/demodulation. The PHY layers (e.g., PHYs 211 and 221) may perform multi-antenna mapping. The PHY layers (e.g., the PHYs 211 and 221) may provide/configure one or more transport channels (e.g., transport channels 350) as a service to the MAC layers (e.g., the MACs 212 and 222, respectively).

Figure 4:
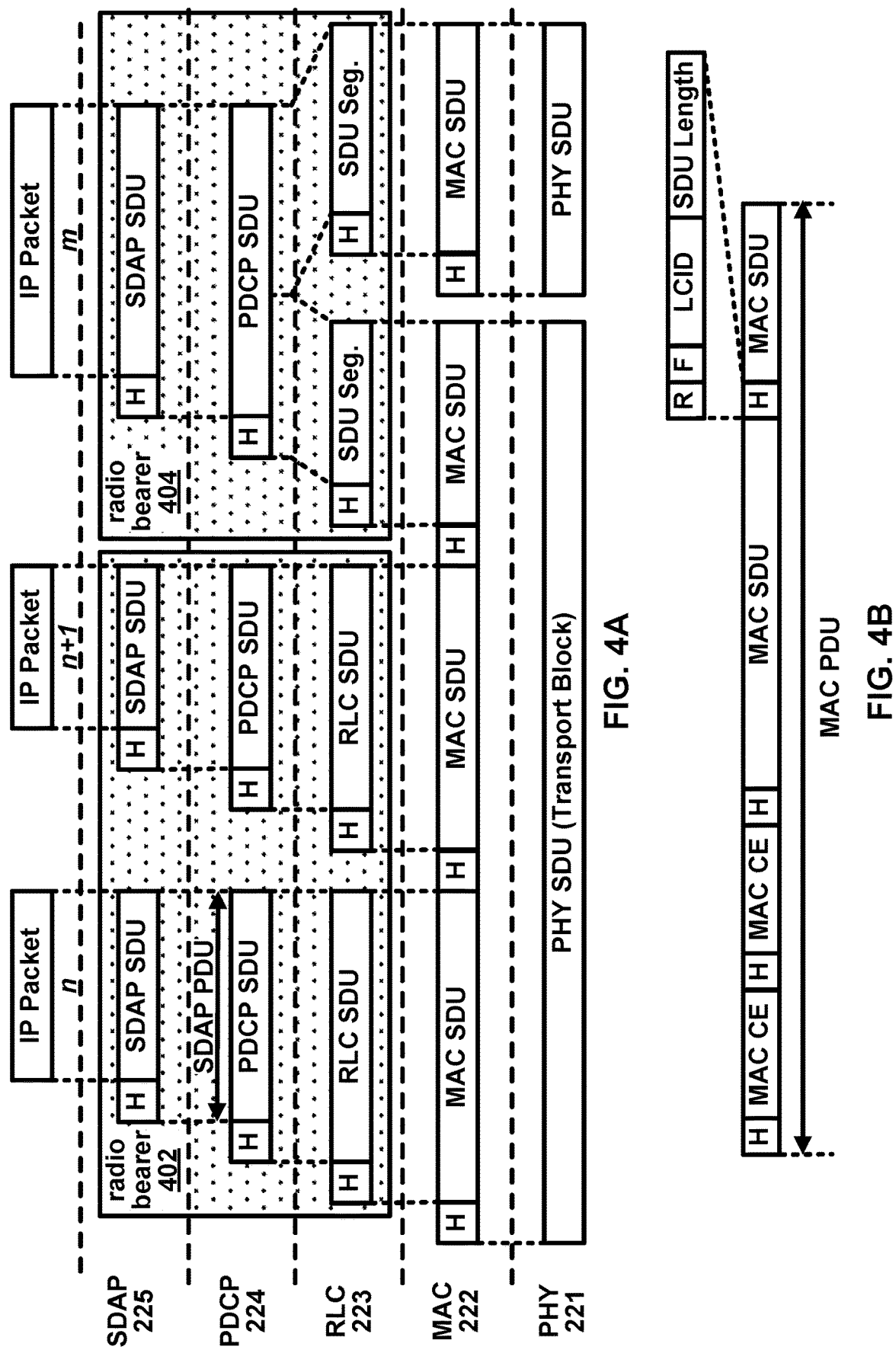
FIG. 4A shows an example downlink data flow for a user plane configuration.
FIG. 4B shows an example format of a Medium Access Control (MAC) subheader in a MAC Protocol Data Unit (PDU).

FIG. 4A shows an example downlink data flow for a user plane configuration. The user plane configuration may comprise, for example, the NR user plane protocol stack shown in FIG. 2A. One or more TBs may be generated, for example, based on a data flow via a user plane protocol stack. As shown in FIG. 4A, a downlink data flow of three IP packets (n, n+1, and m) via the NR user plane protocol stack may generate two TBs (e.g., at the base station 220). An uplink data flow via the NR user plane protocol stack may be similar to the downlink data flow shown in FIG. 4A. The three IP packets (n, n+1, and m) may be determined from the two TBs, for example, based on the uplink data flow via an NR user plane protocol stack. A first quantity of packets (e.g., three or any other quantity) may be determined from a second quantity of TBs (e.g., two or another quantity).

The downlink data flow may begin, for example, if the SDAP 225 receives the three IP packets (or other quantity of IP packets) from one or more QoS flows and maps the three packets (or other quantity of packets) to radio bearers (e.g., radio bearers 402 and 404). The SDAP 225 may map the IP packets n and n+1 to a first radio bearer 402 and map the IP packet m to a second radio bearer 404. An SDAP header (labeled with "H" preceding each SDAP SDU shown in FIG. 4A) may be added to an IP packet to generate an SDAP PDU, which may be referred to as a PDCP SDU. The data unit transferred from/to a higher protocol layer may be referred to as a service data unit (SDU) of the lower protocol layer, and the data unit transferred to/from a lower protocol layer may be referred to as a protocol data unit (PDU) of the higher protocol layer. As shown in FIG. 4A, the data unit from the SDAP 225 may be an SDU of lower protocol layer PDCP 224 (e.g., PDCP SDU) and may be a PDU of the SDAP 225 (e.g., SDAP PDU).

Each protocol layer (e.g., protocol layers shown in FIG. 4A) or at least some protocol laters may: perform its own function(s) (e.g., one or more functions of each protocol layer described with respect to FIG. 3), add a corresponding header, and/or forward a respective output to the next lower layer (e.g., its respective lower layer). The PDCP 224 may perform an IP-header compression and/or ciphering. The PDCP 224 may forward its output (e.g., a PDCP PDU, which is an RLC SDU) to the RLC 223. The RLC 223 may optionally perform segmentation (e.g., as shown for IP packet m in FIG. 4A). The RLC 223 may forward its outputs (e.g., two RLC PDUs, which are two MAC SDUs, generated by adding respective subheaders to two SDU segments (SDU Segs)) to the MAC 222. The MAC 222 may multiplex a number of RLC PDUs (MAC SDUs). The MAC 222 may attach a MAC subheader to an RLC PDU (MAC SDU) to form a TB. The MAC subheaders may be distributed across the MAC PDU (e.g., in an NR configuration as shown in FIG. 4A). The MAC subheaders may be entirely located at the beginning of a MAC PDU (e.g., in an LTE configuration). The NR MAC PDU structure may reduce a processing time and/or associated latency, for example, if the MAC PDU subheaders are computed before assembling the full MAC PDU.

FIG. 4B shows an example format of a MAC subheader in a MAC PDU. A MAC PDU may comprise a MAC subheader (H) and a MAC SDU. Each of one or more MAC subheaders may comprise an SDU length field for indicating the length (e.g., in bytes) of the MAC SDU to which the MAC subheader corresponds; a logical channel identifier (LCID) field for identifying/indicating the logical channel from which the MAC SDU originated to aid in the demultiplexing process; a flag (F) for indicating the size of the SDU length field; and a reserved bit (R) field for future use.

One or more MAC control elements (CEs) may be added to, or inserted into, the MAC PDU by a MAC layer, such as MAC 223 or MAC 222. As shown in FIG. 4B, two MAC CEs may be inserted/added before two MAC PDUs. The MAC CEs may be inserted/added at the beginning of a MAC PDU for downlink transmissions (as shown in FIG. 4B). One or more MAC CEs may be inserted/added at the end of a MAC PDU for uplink transmissions. MAC CEs may be used for in band control signaling. Example MAC CEs may comprise scheduling-related MAC CEs, such as buffer status reports and power headroom reports; activation/deactivation MAC CEs (e.g., MAC CEs for activation/deactivation of PDCP duplication detection, channel state information (CSI) reporting, sounding reference signal (SRS) transmission, and prior configured components); discontinuous reception (DRX)-related MAC CEs; timing advance MAC CEs; and random access-related MAC CEs. A MAC CE may be preceded by a MAC subheader with a similar format as described for the MAC subheader for MAC SDUs and may be identified with a reserved value in the LCID field that indicates the type of control information included in the corresponding MAC CE.

Figure 5:
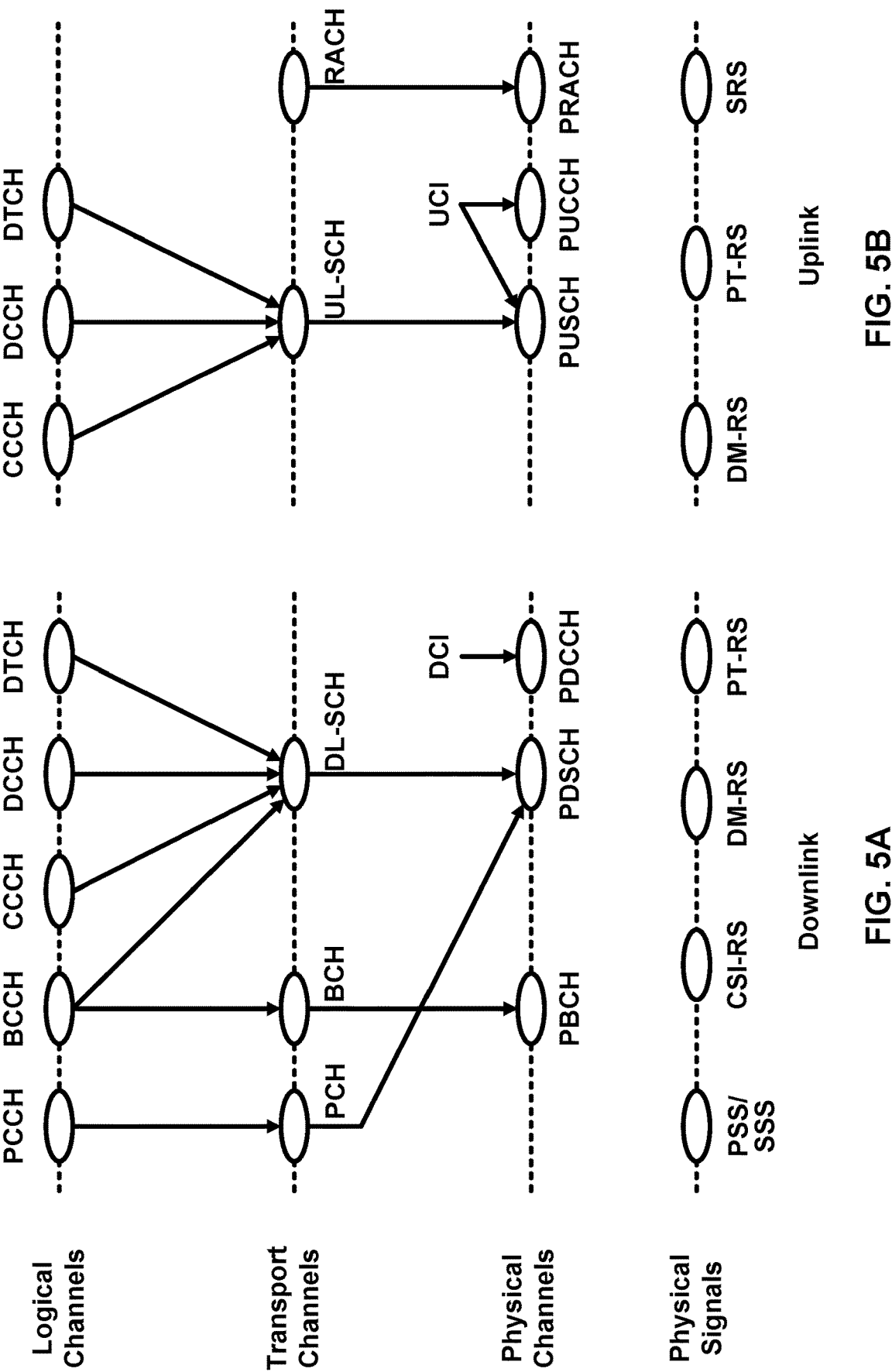
FIG. 5A shows an example mapping for downlink channels.
FIG. 5B shows an example mapping for uplink channels.

FIG. 5A shows an example mapping for downlink channels. The mapping for uplink channels may comprise mapping between channels (e.g., logical channels, transport channels, and physical channels) for downlink. FIG. 5B shows an example mapping for uplink channels. The mapping for uplink channels may comprise mapping between channels (e.g., logical channels, transport channels, and physical channels) for uplink. Information may be passed through/via channels between the RLC, the MAC, and the PHY layers of a protocol stack (e.g., the NR protocol stack). A logical channel may be used between the RLC and the MAC layers. The logical channel may be classified/indicated as a control channel that may carry control and/or configuration information (e.g., in the NR control plane), or as a traffic channel that may carry data (e.g., in the NR user plane). A logical channel may be classified/indicated as a dedicated logical channel that may be dedicated to a specific wireless device, and/or as a common logical channel that may be used by more than one wireless device (e.g., a group of wireless device).

A logical channel may be defined by the type of information it carries. The set of logical channels (e.g., in an NR configuration) may comprise one or more channels described below. A paging control channel (PCCH) may comprise/carry one or more paging messages used to page a wireless device whose location is not known to the network on a cell level. A broadcast control channel (BCCH) may comprise/carry system information messages in the form of a master information block (MIB) and several system information blocks (SIBs). The system information messages may be used by wireless devices to obtain information about how a cell is configured and how to operate within the cell. A common control channel (CCCH) may comprise/carry control messages together with random access. A dedicated control channel (DCCH) may comprise/carry control messages to/from a specific wireless device to configure the wireless device with configuration information. A dedicated traffic channel (DTCH) may comprise/carry user data to/from a specific wireless device.

Transport channels may be used between the MAC and PHY layers. Transport channels may be defined by how the information they carry is sent/transmitted (e.g., via an over the air interface). The set of transport channels (e.g., that may be defined by an NR configuration or any other configuration) may comprise one or more of the following channels. A paging channel (PCH) may comprise/carry paging messages that originated from the PCCH. A broadcast channel (BCH) may comprise/carry the MIB from the BCCH. A downlink shared channel (DL-SCH) may comprise/carry downlink data and signaling messages, including the SIBs from the BCCH. An uplink shared channel (UL-SCH) may comprise/carry uplink data and signaling messages. A random access channel (RACH) may provide a wireless device with an access to the network without any prior scheduling.

The PHY layer may use physical channels to pass/transfer information between processing levels of the PHY layer. A physical channel may have an associated set of time-frequency resources for carrying the information of one or more transport channels. The PHY layer may generate control information to support the low-level operation of the PHY layer. The PHY layer may provide/transfer the control information to the lower levels of the PHY layer via physical control channels (e.g., referred to as L1/L2 control channels). The set of physical channels and physical control channels (e.g., that may be defined by an NR configuration or any other configuration) may comprise one or more of the following channels. A physical broadcast channel (PBCH) may comprise/carry the MIB from the BCH. A physical downlink shared channel (PDSCH) may comprise/carry downlink data and signaling messages from the DL-SCH, as well as paging messages from the PCH. A physical downlink control channel (PDCCH) may comprise/carry downlink control information (DCI), which may comprise downlink scheduling commands, uplink scheduling grants, and uplink power control commands A physical uplink shared channel (PUSCH) may comprise/carry uplink data and signaling messages from the UL-SCH and in some instances uplink control information (UCI) as described below. A physical uplink control channel (PUCCH) may comprise/carry UCI, which may comprise HARQ acknowledgments, channel quality indicators (CQI), pre-coding matrix indicators (PMI), rank indicators (RI), and scheduling requests (SR). A physical random access channel (PRACH) may be used for random access.

The physical layer may generate physical signals to support the low-level operation of the physical layer, which may be similar to the physical control channels. As shown in FIG. 5A and FIG. 5B, the physical layer signals (e.g., that may be defined by an NR configuration or any other configuration) may comprise primary synchronization signals (PSS), secondary synchronization signals (SSS), channel state information reference signals (CSI-RS), demodulation reference signals (DM-RS), sounding reference signals (SRS), phase-tracking reference signals (PT RS), and/or any other signals.

One or more of the channels (e.g., logical channels, transport channels, physical channels, etc.) may be used to carry out functions associated with the control plan protocol stack (e.g., NR control plane protocol stack). FIG. 2B shows an example control plane configuration (e.g., an NR control plane protocol stack). As shown in FIG. 2B, the control plane configuration (e.g., the NR control plane protocol stack) may use substantially the same/similar one or more protocol layers (e.g., PHY 211 and 221, MAC 212 and 222, RLC 213 and 223, and PDCP 214 and 224) as the example user plane configuration (e.g., the NR user plane protocol stack). Similar four protocol layers may comprise the PHYs 211 and 221, the MACs 212 and 222, the RLCs 213 and 223, and the PDCPs 214 and 224. The control plane configuration (e.g., the NR control plane stack) may have radio resource controls (RRCs) 216 and 226 and NAS protocols 217 and 237 at the top of the control plane configuration (e.g., the NR control plane protocol stack), for example, instead of having the SDAPs 215 and 225. The control plane configuration may comprise an AMF 230 comprising the NAS protocol 237.

The NAS protocols 217 and 237 may provide control plane functionality between the wireless device 210 and the AMF 230 (e.g., the AMF 158A or any other AMF) and/or, more generally, between the wireless device 210 and a CN (e.g., the CN 152 or any other CN). The NAS protocols 217 and 237 may provide control plane functionality between the wireless device 210 and the AMF 230 via signaling messages, referred to as NAS messages. There may be no direct path between the wireless device 210 and the AMF 230 via which the NAS messages may be transported. The NAS messages may be transported using the AS of the Uu and NG interfaces. The NAS protocols 217 and 237 may provide control plane functionality, such as authentication, security, a connection setup, mobility management, session management, and/or any other functionality.

The RRCs 216 and 226 may provide/configure control plane functionality between the wireless device 210 and the base station 220 and/or, more generally, between the wireless device 210 and the RAN (e.g., the base station 220). The RRC layers 216 and 226 may provide/configure control plane functionality between the wireless device 210 and the base station 220 via signaling messages, which may be referred to as RRC messages. The RRC messages may be sent/transmitted between the wireless device 210 and the RAN (e.g., the base station 220) using signaling radio bearers and the same/similar PDCP, RLC, MAC, and PHY protocol layers. The MAC layer may multiplex control-plane and user-plane data into the same TB. The RRC layers 216 and 226 may provide/configure control plane functionality, such as one or more of the following functionalities: broadcast of system information related to AS and NAS; paging initiated by the CN or the RAN; establishment, maintenance and release of an RRC connection between the wireless device 210 and the RAN (e.g., the base station 220); security functions including key management; establishment, configuration, maintenance and release of signaling radio bearers and data radio bearers; mobility functions; QoS management functions; wireless device measurement reporting (e.g., the wireless device measurement reporting) and control of the reporting; detection of and recovery from radio link failure (RLF); and/or NAS message transfer. As part of establishing an RRC connection, RRC layers 216 and 226 may establish an RRC context, which may involve configuring parameters for communication between the wireless device 210 and the RAN (e.g., the base station 220).

Figure 6:
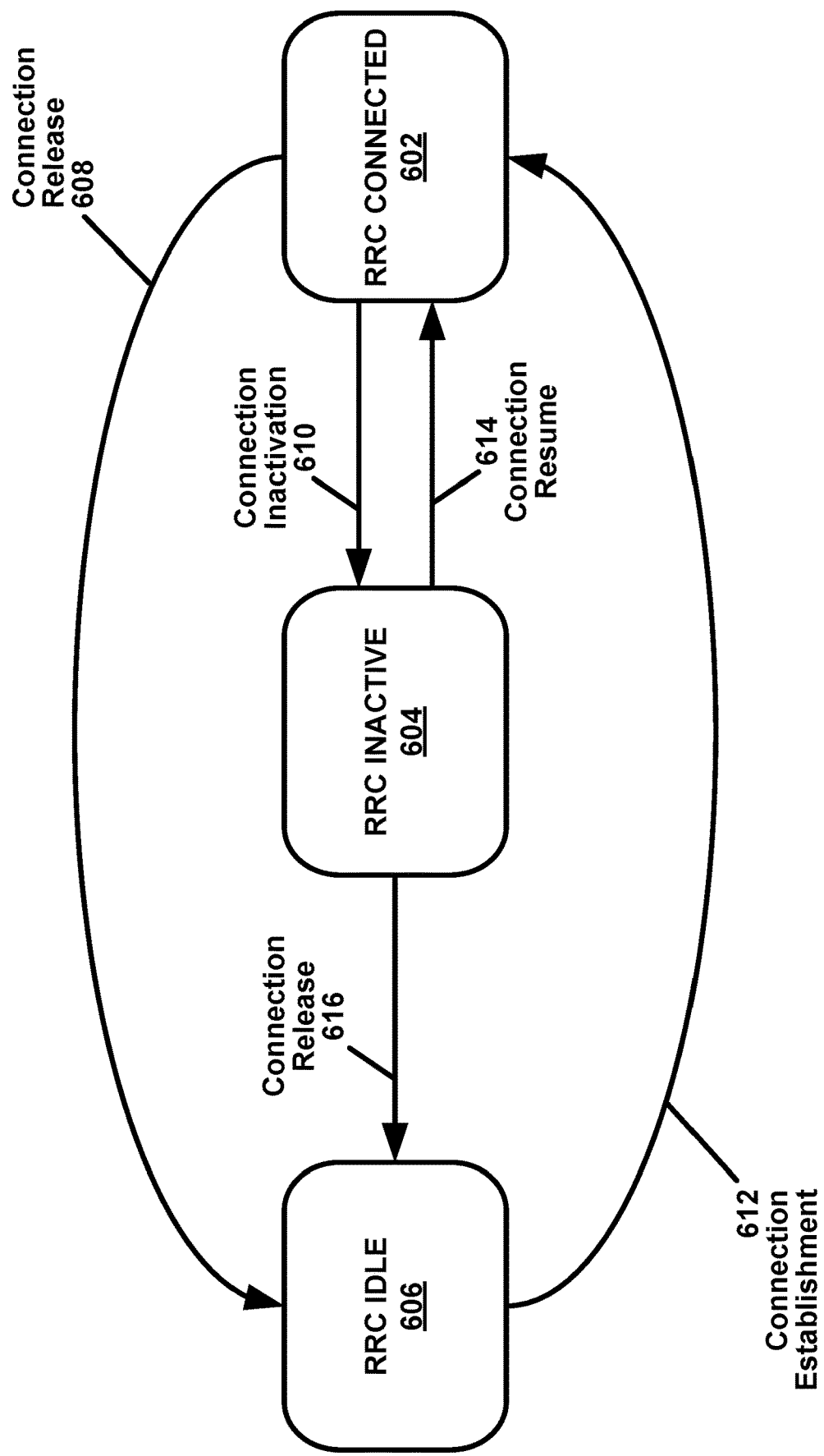
FIG. 6 shows example radio resource control (RRC) states and RRC state transitions.

FIG. 6 shows example RRC states and RRC state transitions. An RRC state of a wireless device may be changed to another RRC state (e.g., RRC state transitions of a wireless device). The wireless device may be substantially the same or similar to the wireless device 106, 210, or any other wireless device. A wireless device may be in at least one of a plurality of states, such as three RRC states comprising RRC connected 602 (e.g., RRC_CONNECTED), RRC idle 606 (e.g., RRC_IDLE), and RRC inactive 604 (e.g., RRC_INACTIVE). The RRC inactive 604 may be RRC connected but inactive.

An RRC connection may be established for the wireless device. For example, this may be during an RRC connected state. During the RRC connected state (e.g., during the RRC connected 602), the wireless device may have an established RRC context and may have at least one RRC connection with a base station. The base station may be similar to one of the one or more base stations (e.g., one or more base stations of the RAN 104 shown in FIG. 1A, one of the gNBs 160 or ng-eNBs 162 shown in FIG. 1B, the base station 220 shown in FIG. 2A and FIG. 2B, or any other base stations). The base station with which the wireless device is connected (e.g., has established an RRC connection) may have the RRC context for the wireless device. The RRC context, which may be referred to as a wireless device context (e.g., the UE context), may comprise parameters for communication between the wireless device and the base station. These parameters may comprise, for example, one or more of: AS contexts; radio link configuration parameters; bearer configuration information (e.g., relating to a data radio bearer, a signaling radio bearer, a logical channel, a QoS flow, and/or a PDU session); security information; and/or layer configuration information (e.g., PHY, MAC, RLC, PDCP, and/or SDAP layer configuration information). During the RRC connected state (e.g., the RRC connected 602), mobility of the wireless device may be managed/controlled by an RAN (e.g., the RAN 104 or the NG RAN 154). The wireless device may measure received signal levels (e.g., reference signal levels, reference signal received power, reference signal received quality, received signal strength indicator, etc.) based on one or more signals sent from a serving cell and neighboring cells. The wireless device may report these measurements to a serving base station (e.g., the base station currently serving the wireless device). The serving base station of the wireless device may request a handover to a cell of one of the neighboring base stations, for example, based on the reported measurements. The RRC state may transition from the RRC connected state (e.g., RRC connected 602) to an RRC idle state (e.g., the RRC idle 606) via a connection release procedure 608. The RRC state may transition from the RRC connected state (e.g., RRC connected 602) to the RRC inactive state (e.g., RRC inactive 604) via a connection inactivation procedure 610.

An RRC context may not be established for the wireless device. For example, this may be during the RRC idle state. During the RRC idle state (e.g., the RRC idle 606), an RRC context may not be established for the wireless device. During the RRC idle state (e.g., the RRC idle 606), the wireless device may not have an RRC connection with the base station. During the RRC idle state (e.g., the RRC idle 606), the wireless device may be in a sleep state for the majority of the time (e.g., to conserve battery power). The wireless device may wake up periodically (e.g., once in every discontinuous reception (DRX) cycle) to monitor for paging messages (e.g., paging messages set from the RAN). Mobility of the wireless device may be managed by the wireless device via a procedure of a cell reselection. The RRC state may transition from the RRC idle state (e.g., the RRC idle 606) to the RRC connected state (e.g., the RRC connected 602) via a connection establishment procedure 612, which may involve a random access procedure.

A previously established RRC context may be maintained for the wireless device. For example, this may be during the RRC inactive state. During the RRC inactive state (e.g., the RRC inactive 604), the RRC context previously established may be maintained in the wireless device and the base station. The maintenance of the RRC context may enable/allow a fast transition to the RRC connected state (e.g., the RRC connected 602) with reduced signaling overhead as compared to the transition from the RRC idle state (e.g., the RRC idle 606) to the RRC connected state (e.g., the RRC connected 602). During the RRC inactive state (e.g., the RRC inactive 604), the wireless device may be in a sleep state and mobility of the wireless device may be managed/controlled by the wireless device via a cell reselection. The RRC state may transition from the RRC inactive state (e.g., the RRC inactive 604) to the RRC connected state (e.g., the RRC connected 602) via a connection resume procedure 614. The RRC state may transition from the RRC inactive state (e.g., the RRC inactive 604) to the RRC idle state (e.g., the RRC idle 606) via a connection release procedure 616 that may be the same as or similar to connection release procedure 608.

An RRC state may be associated with a mobility management mechanism. During the RRC idle state (e.g., RRC idle 606) and the RRC inactive state (e.g., the RRC inactive 604), mobility may be managed/controlled by the wireless device via a cell reselection. The purpose of mobility management during the RRC idle state (e.g., the RRC idle 606) or during the RRC inactive state (e.g., the RRC inactive 604) may be to enable/allow the network to be able to notify the wireless device of an event via a paging message without having to broadcast the paging message over the entire mobile communications network. The mobility management mechanism used during the RRC idle state (e.g., the RRC idle 606) or during the RRC idle state (e.g., the RRC inactive 604) may enable/allow the network to track the wireless device on a cell-group level, for example, so that the paging message may be broadcast over the cells of the cell group that the wireless device currently resides within (e.g. instead of sending the paging message over the entire mobile communication network). The mobility management mechanisms for the RRC idle state (e.g., the RRC idle 606) and the RRC inactive state (e.g., the RRC inactive 604) may track the wireless device on a cell-group level. The mobility management mechanisms may do the tracking, for example, using different granularities of grouping. There may be a plurality of levels of cell-grouping granularity (e.g., three levels of cell-grouping granularity: individual cells; cells within a RAN area identified by a RAN area identifier (RAI); and cells within a group of RAN areas, referred to as a tracking area and identified by a tracking area identifier (TAI)).

Tracking areas may be used to track the wireless device (e.g., tracking the location of the wireless device at the CN level). The CN (e.g., the CN 102, the 5G CN 152, or any other CN) may send to the wireless device a list of TAIs associated with a wireless device registration area (e.g., a UE registration area). A wireless device may perform a registration update with the CN to allow the CN to update the location of the wireless device and provide the wireless device with a new the UE registration area, for example, if the wireless device moves (e.g., via a cell reselection) to a cell associated with a TAI that may not be included in the list of TAIs associated with the UE registration area.

RAN areas may be used to track the wireless device (e.g., the location of the wireless device at the RAN level). For a wireless device in an RRC inactive state (e.g., the RRC inactive 604), the wireless device may be assigned/provided/configured with a RAN notification area. A RAN notification area may comprise one or more cell identities (e.g., a list of RAIs and/or a list of TAIs). A base station may belong to one or more RAN notification areas. A cell may belong to one or more RAN notification areas. A wireless device may perform a notification area update with the RAN to update the RAN notification area of the wireless device, for example, if the wireless device moves (e.g., via a cell reselection) to a cell not included in the RAN notification area assigned/provided/configured to the wireless device.

A base station storing an RRC context for a wireless device or a last serving base station of the wireless device may be referred to as an anchor base station. An anchor base station may maintain an RRC context for the wireless device at least during a period of time that the wireless device stays in a RAN notification area of the anchor base station and/or during a period of time that the wireless device stays in an RRC inactive state (e.g., RRC inactive 604).

A base station (e.g., gNBs 160 in FIG. 1B or any other base station) may be split in two parts: a central unit (e.g., a base station central unit, such as a gNB CU) and one or more distributed units (e.g., a base station distributed unit, such as a gNB DU). A base station central unit (CU) may be coupled to one or more base station distributed units (DUs) using an F1 interface (e.g., an F1 interface defined in an NR configuration). The base station CU may comprise the RRC, the PDCP, and the SDAP layers. A base station distributed unit (DU) may comprise the RLC, the MAC, and the PHY layers.

The physical signals and physical channels (e.g., described with respect to FIG. 5A and FIG. 5B) may be mapped onto one or more symbols (e.g., orthogonal frequency divisional multiplexing (01-DM) symbols in an NR configuration or any other symbols). OFDM is a multicarrier communication scheme that sends/transmits data over F orthogonal subcarriers (or tones). The data may be mapped to a series of complex symbols (e.g., M-quadrature amplitude modulation (M-QAM) symbols or M-phase shift keying (M PSK) symbols or any other modulated symbols), referred to as source symbols, and divided into F parallel symbol streams, for example, before transmission of the data. The F parallel symbol streams may be treated as if they are in the frequency domain. The F parallel symbols may be used as inputs to an Inverse Fast Fourier Transform (IFFT) block that transforms them into the time domain. The IFFT block may take in F source symbols at a time, one from each of the F parallel symbol streams. The IFFT block may use each source symbol to modulate the amplitude and phase of one of F sinusoidal basis functions that correspond to the F orthogonal subcarriers. The output of the IFFT block may be F time-domain samples that represent the summation of the F orthogonal subcarriers. The F time-domain samples may form a single OFDM symbol. An OFDM symbol provided/output by the IFFT block may be sent/transmitted over the air interface on a carrier frequency, for example, after one or more processes (e.g., addition of a cyclic prefix) and up-conversion. The F parallel symbol streams may be mixed, for example, using a Fast Fourier Transform (FFT) block before being processed by the IFFT block. This operation may produce Discrete Fourier Transform (DFT)-precoded OFDM symbols and may be used by one or more wireless devices in the uplink to reduce the peak to average power ratio (PAPR). Inverse processing may be performed on the OFDM symbol at a receiver using an FFT block to recover the data mapped to the source symbols.

Figure 7:
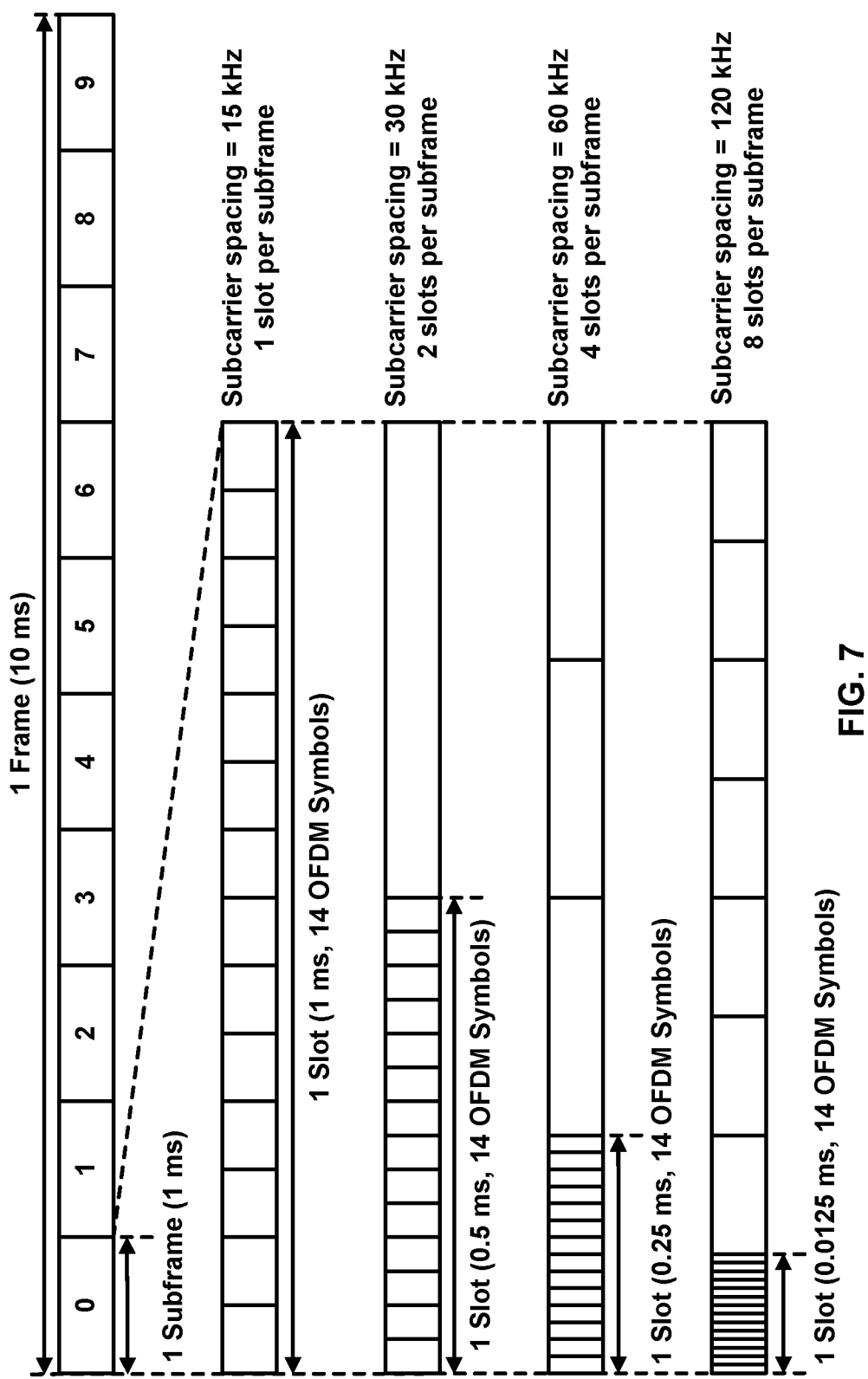
FIG. 7 shows an example configuration of a frame.

FIG. 7 shows an example configuration of a frame. The frame may comprise, for example, an NR radio frame into which OFDM symbols may be grouped. A frame (e.g., an NR radio frame) may be identified/indicated by a system frame number (SFN) or any other value. The SFN may repeat with a period of 1024 frames. One NR frame may be 10 milliseconds (ms) in duration and may comprise 10 subframes that are 1 ms in duration. A subframe may be divided into one or more slots (e.g., depending on numerologies and/or different subcarrier spacings). Each of the one or more slots may comprise, for example, 14 OFDM symbols per slot. Any quantity of symbols, slots, or duration may be used for any time interval.

The duration of a slot may depend on the numerology used for the OFDM symbols of the slot. A flexible numerology may be supported, for example, to accommodate different deployments (e.g., cells with carrier frequencies below 1 GHz up to cells with carrier frequencies in the mm-wave range). A flexible numerology may be supported, for example, in an NR configuration or any other radio configurations. A numerology may be defined in terms of subcarrier spacing and/or cyclic prefix duration. Subcarrier spacings may be scaled up by powers of two from a baseline subcarrier spacing of 15 kHz. Cyclic prefix durations may be scaled down by powers of two from a baseline cyclic prefix duration of 4.7 µs, for example, for a numerology in an NR configuration or any other radio configurations. Numerologies may be defined with the following subcarrier spacing/cyclic prefix duration combinations: 15 kHz/4.7 µs; 30 kHz/2.3 µs; 60 kHz/1.2 µs; 120 kHz/0.59 µs; 240 kHz/0.29 µs, and/or any other subcarrier spacing/cyclic prefix duration combinations.

A slot may have a fixed number/quantity of OFDM symbols (e.g., 14 OFDM symbols). A numerology with a higher subcarrier spacing may have a shorter slot duration and more slots per subframe. Examples of numerology-dependent slot duration and slots-per-subframe transmission structure are shown in FIG. 7 (the numerology with a subcarrier spacing of 240 kHz is not shown in FIG. 7). A subframe (e.g., in an NR configuration) may be used as a numerology-independent time reference. A slot may be used as the unit upon which uplink and downlink transmissions are scheduled. Scheduling (e.g., in an NR configuration) may be decoupled from the slot duration. Scheduling may start at any OFDM symbol. Scheduling may last for as many symbols as needed for a transmission, for example, to support low latency. These partial slot transmissions may be referred to as mini-slot or sub-slot transmissions.

Figure 8:
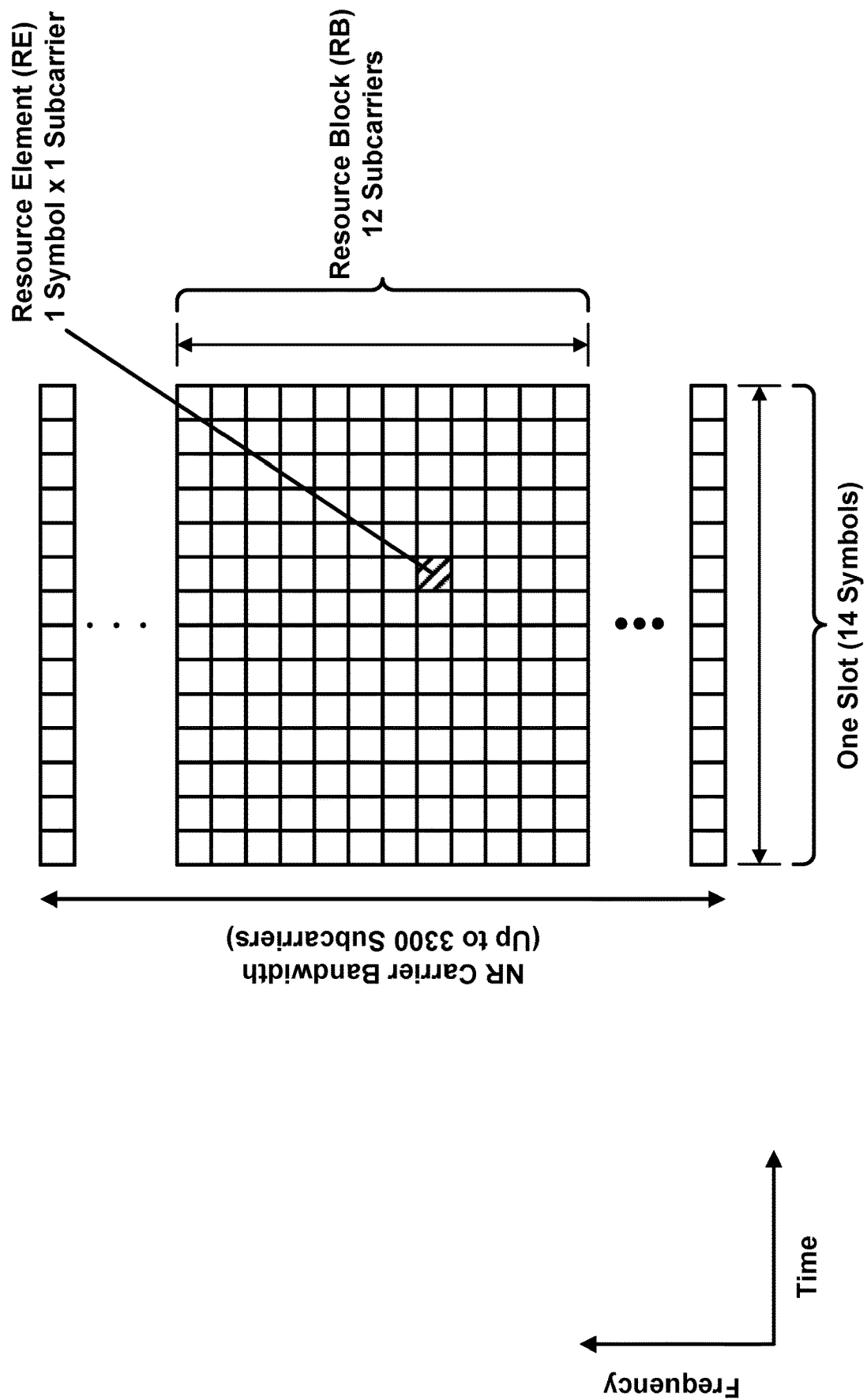
FIG. 8 shows an example resource configuration of one or more carriers.

FIG. 8 shows an example resource configuration of one or more carriers. The resource configuration of may comprise a slot in the time and frequency domain for an NR carrier or any other carrier. The slot may comprise resource elements (REs) and resource blocks (RBs). A resource element (RE) may be the smallest physical resource (e.g., in an NR configuration). An RE may span one OFDM symbol in the time domain by one subcarrier in the frequency domain, such as shown in FIG. 8. An RB may span twelve consecutive REs in the frequency domain, such as shown in FIG. 8. A carrier (e.g., an NR carrier) may be limited to a width of a certain quantity of RBs and/or subcarriers (e.g., 275 RBs or 275×12=3300 subcarriers). Such limitation(s), if used, may limit the carrier (e.g., NR carrier) frequency based on subcarrier spacing (e.g., carrier frequency of 50, 100, 200, and 400 MHz for subcarrier spacings of 15, 30, 60, and 120 kHz, respectively). A 400 MHz bandwidth may be set based on a 400 MHz per carrier bandwidth limit. Any other bandwidth may be set based on a per carrier bandwidth limit.

A single numerology may be used across the entire bandwidth of a carrier (e.g., an NR such as shown in FIG. 8). In other example configurations, multiple numerologies may be supported on the same carrier. NR and/or other access technologies may support wide carrier bandwidths (e.g., up to 400 MHz for a subcarrier spacing of 120 kHz). Not all wireless devices may be able to receive the full carrier bandwidth (e.g., due to hardware limitations and/or different wireless device capabilities). Receiving and/or utilizing the full carrier bandwidth may be prohibitive, for example, in terms of wireless device power consumption. A wireless device may adapt the size of the receive bandwidth of the wireless device, for example, based on the amount of traffic the wireless device is scheduled to receive (e.g., to reduce power consumption and/or for other purposes). Such an adaptation may be referred to as bandwidth adaptation.

Configuration of one or more bandwidth parts (BWPs) may support one or more wireless devices not capable of receiving the full carrier bandwidth. BWPs may support bandwidth adaptation, for example, for such wireless devices not capable of receiving the full carrier bandwidth. A BWP (e.g., a BWP of an NR configuration) may be defined by a subset of contiguous RBs on a carrier. A wireless device may be configured (e.g., via an RRC layer) with one or more downlink BWPs per serving cell and one or more uplink BWPs per serving cell (e.g., up to four downlink BWPs per serving cell and up to four uplink BWPs per serving cell). One or more of the configured BWPs for a serving cell may be active, for example, at a given time. The one or more BWPs may be referred to as active BWPs of the serving cell. A serving cell may have one or more first active BWPs in the uplink carrier and one or more second active BWPs in the secondary uplink carrier, for example, if the serving cell is configured with a secondary uplink carrier.

A downlink BWP from a set of configured downlink BWPs may be linked with an uplink BWP from a set of configured uplink BWPs (e.g., for unpaired spectra). A downlink BWP and an uplink BWP may be linked, for example, if a downlink BWP index of the downlink BWP and an uplink BWP index of the uplink BWP are the same. A wireless device may expect that the center frequency for a downlink BWP is the same as the center frequency for an uplink BWP (e.g., for unpaired spectra).

A base station may configure a wireless device with one or more control resource sets (CORESETs) for at least one search space. The base station may configure the wireless device with one or more CORESETS, for example, for a downlink BWP in a set of configured downlink BWPs on a primary cell (PCell) or on a secondary cell (SCell). A search space may comprise a set of locations in the time and frequency domains where the wireless device may monitor/find/detect/identify control information. The search space may be a wireless device-specific search space (e.g., a UE-specific search space) or a common search space (e.g., potentially usable by a plurality of wireless devices or a group of wireless user devices). A base station may configure a group of wireless devices with a common search space, on a PCell or on a primary secondary cell (PSCell), in an active downlink BWP.

A base station may configure a wireless device with one or more resource sets for one or more PUCCH transmissions, for example, for an uplink BWP in a set of configured uplink BWPs. A wireless device may receive downlink receptions (e.g., PDCCH or PDSCH) in a downlink BWP, for example, according to a configured numerology (e.g., a configured subcarrier spacing and/or a configured cyclic prefix duration) for the downlink BWP. The wireless device may send/transmit uplink transmissions (e.g., PUCCH or PUSCH) in an uplink BWP, for example, according to a configured numerology (e.g., a configured subcarrier spacing and/or a configured cyclic prefix length for the uplink BWP).

One or more BWP indicator fields may be provided/comprised in Downlink Control Information (DCI). A value of a BWP indicator field may indicate which BWP in a set of configured BWPs is an active downlink BWP for one or more downlink receptions. The value of the one or more BWP indicator fields may indicate an active uplink BWP for one or more uplink transmissions.

A base station may semi-statically configure a wireless device with a default downlink BWP within a set of configured downlink BWPs associated with a PCell. A default downlink BWP may be an initial active downlink BWP, for example, if the base station does not provide/configure a default downlink BWP to/for the wireless device. The wireless device may determine which BWP is the initial active downlink BWP, for example, based on a CORESET configuration obtained using the PBCH.

A base station may configure a wireless device with a BWP inactivity timer value for a PCell. The wireless device may start or restart a BWP inactivity timer at any appropriate time. The wireless device may start or restart the BWP inactivity timer, for example, if one or more conditions are satisfied. The one or more conditions may comprise at least one of: the wireless device detects DCI indicating an active downlink BWP other than a default downlink BWP for a paired spectra operation; the wireless device detects DCI indicating an active downlink BWP other than a default downlink BWP for an unpaired spectra operation; and/or the wireless device detects DCI indicating an active uplink BWP other than a default uplink BWP for an unpaired spectra operation. The wireless device may start/run the BWP inactivity timer toward expiration (e.g., increment from zero to the BWP inactivity timer value, or decrement from the BWP inactivity timer value to zero), for example, if the wireless device does not detect DCI during a time interval (e.g., 1 ms or 0.5 ms). The wireless device may switch from the active downlink BWP to the default downlink BWP, for example, if the BWP inactivity timer expires.

A base station may semi-statically configure a wireless device with one or more BWPs. A wireless device may switch an active BWP from a first BWP to a second BWP, for example, after (e.g., based on or in response to) receiving DCI indicating the second BWP as an active BWP. A wireless device may switch an active BWP from a first BWP to a second BWP, for example, after (e.g., based on or in response to) an expiry of the BWP inactivity timer (e.g., if the second BWP is the default BWP).

A downlink BWP switching may refer to switching an active downlink BWP from a first downlink BWP to a second downlink BWP (e.g., the second downlink BWP is activated and the first downlink BWP is deactivated). An uplink BWP switching may refer to switching an active uplink BWP from a first uplink BWP to a second uplink BWP (e.g., the second uplink BWP is activated and the first uplink BWP is deactivated). Downlink and uplink BWP switching may be performed independently (e.g., in paired spectrum/spectra). Downlink and uplink BWP switching may be performed simultaneously (e.g., in unpaired spectrum/spectra). Switching between configured BWPs may occur, for example, based on RRC signaling, DCI signaling, expiration of a BWP inactivity timer, and/or an initiation of random access.

Figure 9:
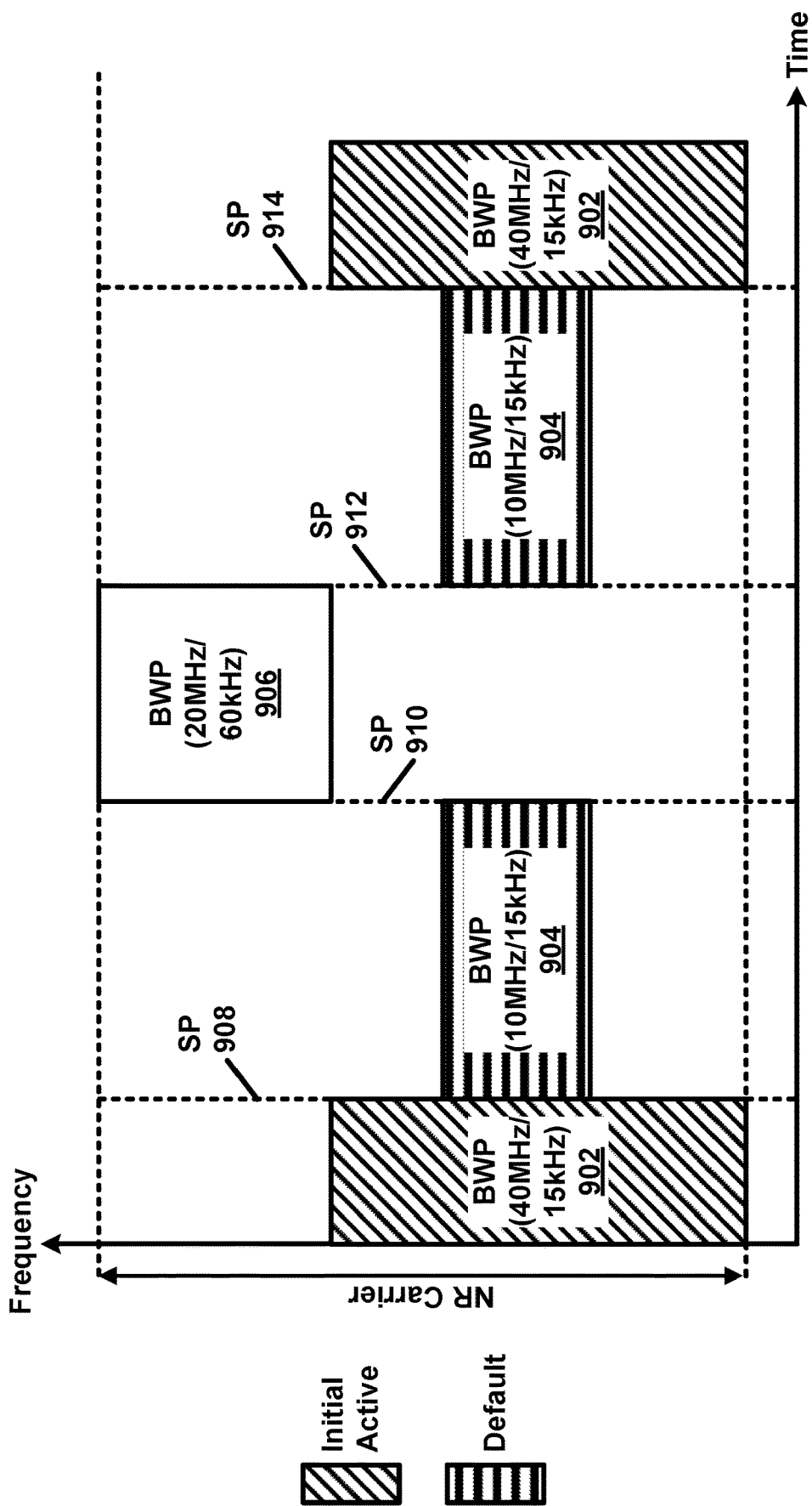
FIG. 9 shows an example configuration of bandwidth parts (BWPs).

FIG. 9 shows an example of configured BWPs. Bandwidth adaptation using multiple BWPs (e.g., three configured BWPs for an NR carrier) may be available. A wireless device configured with multiple BWPs (e.g., the three BWPs) may switch from one BWP to another BWP at a switching point. The BWPs may comprise: a BWP 902 having a bandwidth of 40 MHz and a subcarrier spacing of 15 kHz; a BWP 904 having a bandwidth of 10 MHz and a subcarrier spacing of 15 kHz; and a BWP 906 having a bandwidth of 20 MHz and a subcarrier spacing of 60 kHz. The BWP 902 may be an initial active BWP, and the BWP 904 may be a default BWP. The wireless device may switch between BWPs at switching points. The wireless device may switch from the BWP 902 to the BWP 904 at a switching point 908. The switching at the switching point 908 may occur for any suitable reasons. The switching at a switching point 908 may occur, for example, after (e.g., based on or in response to) an expiry of a BWP inactivity timer (e.g., indicating switching to the default BWP). The switching at the switching point 908 may occur, for example, after (e.g., based on or in response to) an receiving DCI indicating BWP 904 as the active BWP. The wireless device may switch at a switching point 910 from an active BWP 904 to the BWP 906, for example, after or in response receiving DCI indicating BWP 906 as a new active BWP. The wireless device may switch at a switching point 912 from an active BWP 906 to the BWP 904, for example, after (e.g., based on or in response to) an an expiry of a BWP inactivity timer. The wireless device may switch at the switching point 912 from an active BWP 906 to the BWP 904, for example, after or in response receiving DCI indicating BWP 904 as a new active BWP. The wireless device may switch at a switching point 914 from an active BWP 904 to the BWP 902, for example, after or in response receiving DCI indicating the BWP 902 as a new active BWP.

Wireless device procedures for switching BWPs on a secondary cell may be the same/similar as those on a primary cell, for example, if the wireless device is configured for a secondary cell with a default downlink BWP in a set of configured downlink BWPs and a timer value. The wireless device may use the timer value and the default downlink BWP for the secondary cell in the same/similar manner as the wireless device uses the timer value and/or default BWPs for a primary cell. The timer value (e.g., the BWP inactivity timer) may be configured per cell (e.g., for one or more BWPs), for example, via RRC signaling or any other signaling. One or more active BWPs may switch to another BWP, for example, based on an expiration of the BWP inactivity timer.

Figure 10A:
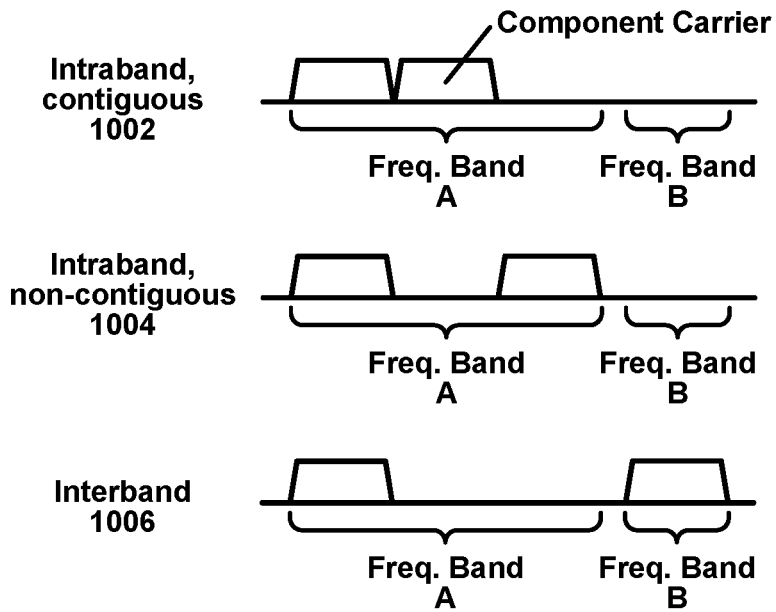
FIG. 10A shows example carrier aggregation configurations based on component carriers.

Two or more carriers may be aggregated and data may be simultaneously sent/transmitted to/from the same wireless device using carrier aggregation (CA) (e.g., to increase data rates). The aggregated carriers in CA may be referred to as component carriers (CCs). There may be a number/quantity of serving cells for the wireless device (e.g., one serving cell for a CC), for example, if CA is configured/used. The CCs may have multiple configurations in the frequency domain. FIG. 10A shows example CA configurations based on CCs. As shown in FIG. 10A, three types of CA configurations may comprise an intraband (contiguous) configuration 1002, an intraband (non-contiguous) configuration 1004, and/or an interband configuration 1006. In the intraband (contiguous) configuration 1002, two CCs may be aggregated in the same frequency band (frequency band A) and may be located directly adjacent to each other within the frequency band. In the intraband (non-contiguous) configuration 1004, two CCs may be aggregated in the same frequency band (frequency band A) but may be separated from each other in the frequency band by a gap. In the interband configuration 1006, two CCs may be located in different frequency bands (e.g., frequency band A and frequency band B, respectively).

A network may set the maximum quantity of CCs that can be aggregated (e.g., up to 32 CCs may be aggregated in NR, or any other quantity may be aggregated in other systems). The aggregated CCs may have the same or different bandwidths, subcarrier spacing, and/or duplexing schemes (TDD, FDD, or any other duplexing schemes). A serving cell for a wireless device using CA may have a downlink CC. One or more uplink CCs may be optionally configured for a serving cell (e.g., for FDD). The ability to aggregate more downlink carriers than uplink carriers may be useful, for example, if the wireless device has more data traffic in the downlink than in the uplink.

One of the aggregated cells for a wireless device may be referred to as a primary cell (PCell), for example, if a CA is configured. The PCell may be the serving cell that the wireless initially connects to or access to, for example, during or at an RRC connection establishment, an RRC connection reestablishment, and/or a handover. The PCell may provide/configure the wireless device with NAS mobility information and the security input. Wireless device may have different PCells. For the downlink, the carrier corresponding to the PCell may be referred to as the downlink primary CC (DL PCC). For the uplink, the carrier corresponding to the PCell may be referred to as the uplink primary CC (UL PCC). The other aggregated cells (e.g., associated with CCs other than the DL PCC and UL PCC) for the wireless device may be referred to as secondary cells (SCells). The SCells may be configured, for example, after the PCell is configured for the wireless device. An SCell may be configured via an RRC connection reconfiguration procedure. For the downlink, the carrier corresponding to an SCell may be referred to as a downlink secondary CC (DL SCC). For the uplink, the carrier corresponding to the SCell may be referred to as the uplink secondary CC (UL SCC).

Configured SCells for a wireless device may be activated or deactivated, for example, based on traffic and channel conditions. Deactivation of an SCell may cause the wireless device to stop PDCCH and PDSCH reception on the SCell and PUSCH, SRS, and CQI transmissions on the SCell. Configured SCells may be activated or deactivated, for example, using a MAC CE (e.g., the MAC CE described with respect to FIG. 4B). A MAC CE may use a bitmap (e.g., one bit per SCell) to indicate which SCells (e.g., in a subset of configured SCells) for the wireless device are activated or deactivated. Configured SCells may be deactivated, for example, after (e.g., based on or in response to) an an expiration of an SCell deactivation timer (e.g., one SCell deactivation timer per SCell may be configured).

DCI may comprise control information, such as scheduling assignments and scheduling grants, for a cell. DCI may be sent/transmitted via the cell corresponding to the scheduling assignments and/or scheduling grants, which may be referred to as a self-scheduling. DCI comprising control information for a cell may be sent/transmitted via another cell, which may be referred to as a cross-carrier scheduling.

Uplink control information (UCI) may comprise control information, such as HARQ acknowledgments and channel state feedback (e.g., CQI, PMI, and/or RI) for aggregated cells. UCI may be sent/transmitted via an uplink control channel (e.g., a PUCCH) of the PCell or a certain SCell (e.g., an SCell configured with PUCCH). For a larger number of aggregated downlink CCs, the PUCCH of the PCell may become overloaded. Cells may be divided into multiple PUCCH groups.

Figure 10B:
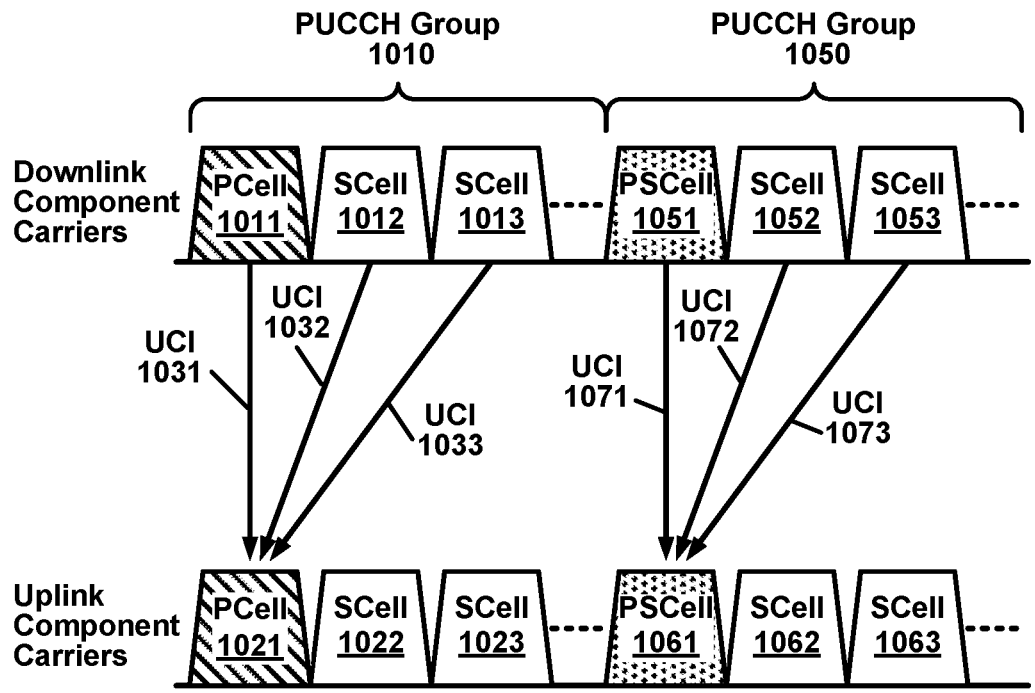
FIG. 10B shows example group of cells.

FIG. 10B shows example group of cells. Aggregated cells may be configured into one or more PUCCH groups (e.g., as shown in FIG. 10B). One or more cell groups or one or more uplink control channel groups (e.g., a PUCCH group 1010 and a PUCCH group 1050) may comprise one or more downlink CCs, respectively. The PUCCH group 1010 may comprise one or more downlink CCs, for example, three downlink CCs: a PCell 1011 (e.g., a DL PCC), an SCell 1012 (e.g., a DL SCC), and an SCell 1013 (e.g., a DL SCC). The PUCCH group 1050 may comprise one or more downlink CCs, for example, three downlink CCs: a PUCCH SCell (or PSCell) 1051 (e.g., a DL SCC), an SCell 1052 (e.g., a DL SCC), and an SCell 1053 (e.g., a DL SCC). One or more uplink CCs of the PUCCH group 1010 may be configured as a PCell 1021 (e.g., a UL PCC), an SCell 1022 (e.g., a UL SCC), and an SCell 1023 (e.g., a UL SCC). One or more uplink CCs of the PUCCH group 1050 may be configured as a PUCCH SCell (or PSCell) 1061 (e.g., a UL SCC), an SCell 1062 (e.g., a UL SCC), and an SCell 1063 (e.g., a UL SCC). UCI related to the downlink CCs of the PUCCH group 1010, shown as UCI 1031, UCI 1032, and UCI 1033, may be sent/transmitted via the uplink of the PCell 1021 (e.g., via the PUCCH of the PCell 1021). UCI related to the downlink CCs of the PUCCH group 1050, shown as UCI 1071, UCI 1072, and UCI 1073, may be sent/transmitted via the uplink of the PUCCH SCell (or PSCell) 1061 (e.g., via the PUCCH of the PUCCH SCell 1061). A single uplink PCell may be configured to send/transmit UCI relating to the six downlink CCs, for example, if the aggregated cells shown in FIG. 10B are not divided into the PUCCH group 1010 and the PUCCH group 1050. The PCell 1021 may become overloaded, for example, if the UCIs 1031, 1032, 1033, 1071, 1072, and 1073 are sent/transmitted via the PCell 1021. By dividing transmissions of UCI between the PCell 1021 and the PUCCH SCell (or PSCell) 1061, overloading may be prevented and/or reduced.

A PCell may comprise a downlink carrier (e.g., the PCell 1011) and an uplink carrier (e.g., the PCell 1021). An SCell may comprise only a downlink carrier. A cell, comprising a downlink carrier and optionally an uplink carrier, may be assigned with a physical cell ID and a cell index. The physical cell ID or the cell index may indicate/identify a downlink carrier and/or an uplink carrier of the cell, for example, depending on the context in which the physical cell ID is used. A physical cell ID may be determined, for example, using a synchronization signal (e.g., PSS and/or SSS) sent/transmitted via a downlink component carrier. A cell index may be determined, for example, using one or more RRC messages. A physical cell ID may be referred to as a carrier ID, and a cell index may be referred to as a carrier index. A first physical cell ID for a first downlink carrier may refer to the first physical cell ID for a cell comprising the first downlink carrier. Substantially the same/similar concept may apply to, for example, a carrier activation. Activation of a first carrier may refer to activation of a cell comprising the first carrier.

A multi-carrier nature of a PHY layer may be exposed/indicated to a MAC layer (e.g., in a CA configuration). A HARQ entity may operate on a serving cell. A transport block may be generated per assignment/grant per serving cell. A transport block and potential HARQ retransmissions of the transport block may be mapped to a serving cell.

For the downlink, a base station may send/transmit (e.g., unicast, multicast, and/or broadcast), to one or more wireless devices, one or more reference signals (RSs) (e.g., PSS, SSS, CSI-RS, DM-RS, and/or PT-RS). For the uplink, the one or more wireless devices may send/transmit one or more RSs to the base station (e.g., DM-RS, PT-RS, and/or SRS). The PSS and the SSS may be sent/transmitted by the base station and used by the one or more wireless devices to synchronize the one or more wireless devices with the base station. A synchronization signal (SS)/physical broadcast channel (PBCH) block may comprise the PSS, the SSS, and the PBCH. The base station may periodically send/transmit a burst of SS/PBCH blocks, which may be referred to as SSBs.

Figure 11A:
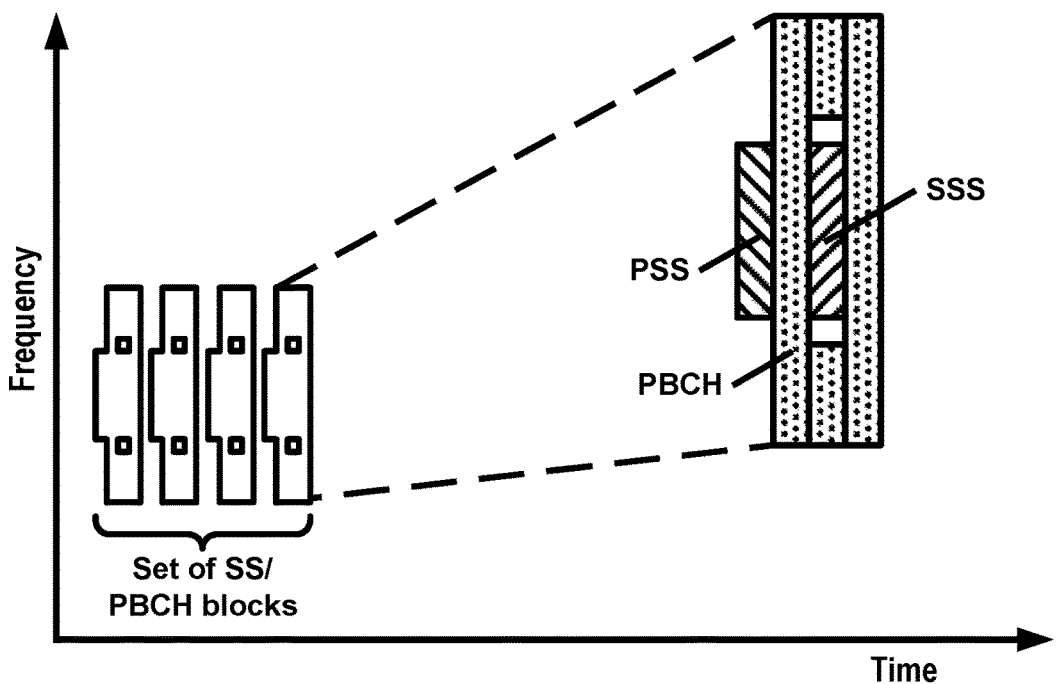
FIG. 11A shows an example mapping of one or more synchronization signal/physical broadcast channel (SS/PBCH) blocks.

FIG. 11A shows an example mapping of one or more SS/PBCH blocks. A burst of SS/PBCH blocks may comprise one or more SS/PBCH blocks (e.g., 4 SS/PBCH blocks, as shown in FIG. 11A). Bursts may be sent/transmitted periodically (e.g., every 2 frames, 20 ms, or any other durations). A burst may be restricted to a half-frame (e.g., a first half-frame having a duration of 5 ms). Such parameters (e.g., the number of SS/PBCH blocks per burst, periodicity of bursts, position of the burst within the frame) may be configured, for example, based on at least one of: a carrier frequency of a cell in which the SS/PBCH block is sent/transmitted; a numerology or subcarrier spacing of the cell; a configuration by the network (e.g., using RRC signaling); and/or any other suitable factor(s). A wireless device may assume a subcarrier spacing for the SS/PBCH block based on the carrier frequency being monitored, for example, unless the radio network configured the wireless device to assume a different subcarrier spacing.

The SS/PBCH block may span one or more OFDM symbols in the time domain (e.g., 4 OFDM symbols, as shown in FIG. 11A or any other quantity/number of symbols) and may span one or more subcarriers in the frequency domain (e.g., 240 contiguous subcarriers or any other quantity/number of subcarriers). The PSS, the SSS, and the PBCH may have a common center frequency. The PSS may be sent/transmitted first and may span, for example, 1 OFDM symbol and 127 subcarriers. The SSS may be sent/transmitted after the PSS (e.g., two symbols later) and may span 1 OFDM symbol and 127 subcarriers. The PBCH may be sent/transmitted after the PSS (e.g., across the next 3 OFDM symbols) and may span 240 subcarriers (e.g., in the second and fourth OFDM symbols as shown in FIG. 11A) and/or may span fewer than 240 subcarriers (e.g., in the third OFDM symbols as shown in FIG. 11A).

The location of the SS/PBCH block in the time and frequency domains may not be known to the wireless device (e.g., if the wireless device is searching for the cell). The wireless device may monitor a carrier for the PSS, for example, to find and select the cell. The wireless device may monitor a frequency location within the carrier. The wireless device may search for the PSS at a different frequency location within the carrier, for example, if the PSS is not found after a certain duration (e.g., 20 ms). The wireless device may search for the PSS at a different frequency location within the carrier, for example, as indicated by a synchronization raster. The wireless device may determine the locations of the SSS and the PBCH, respectively, for example, based on a known structure of the SS/PBCH block if the PSS is found at a location in the time and frequency domains. The SS/PBCH block may be a cell-defining SS block (CD-SSB). A primary cell may be associated with a CD-SSB. The CD-SSB may be located on a synchronization raster. A cell selection/search and/or reselection may be based on the CD-SSB.

The SS/PBCH block may be used by the wireless device to determine one or more parameters of the cell. The wireless device may determine a physical cell identifier (PCI) of the cell, for example, based on the sequences of the PSS and the SSS, respectively. The wireless device may determine a location of a frame boundary of the cell, for example, based on the location of the SS/PBCH block. The SS/PBCH block may indicate that it has been sent/transmitted in accordance with a transmission pattern. An SS/PBCH block in the transmission pattern may be a known distance from the frame boundary (e.g., a predefined distance for a RAN configuration among one or more networks, one or more base stations, and one or more wireless devices).

The PBCH may use a QPSK modulation and/or forward error correction (FEC). The FEC may use polar coding. One or more symbols spanned by the PBCH may comprise/carry one or more DM-RSs for demodulation of the PBCH. The PBCH may comprise an indication of a current system frame number (SFN) of the cell and/or a SS/PBCH block timing index. These parameters may facilitate time synchronization of the wireless device to the base station. The PBCH may comprise a MIB used to send/transmit to the wireless device one or more parameters. The MIB may be used by the wireless device to locate remaining minimum system information (RMSI) associated with the cell. The RMSI may comprise a System Information Block Type 1 (SIB1). The SIB1 may comprise information for the wireless device to access the cell. The wireless device may use one or more parameters of the MIB to monitor a PDCCH, which may be used to schedule a PDSCH. The PDSCH may comprise the SIB1. The SIB1 may be decoded using parameters provided/comprised in the MIB. The PBCH may indicate an absence of SIB1. The wireless device may be pointed to a frequency, for example, based on the PBCH indicating the absence of SIB1. The wireless device may search for an SS/PBCH block at the frequency to which the wireless device is pointed.

The wireless device may assume that one or more SS/PBCH blocks sent/transmitted with a same SS/PBCH block index are quasi co-located (QCLed) (e.g., having substantially the same/similar Doppler spread, Doppler shift, average gain, average delay, and/or spatial Rx parameters). The wireless device may not assume QCL for SS/PBCH block transmissions having different SS/PBCH block indices. SS/PBCH blocks (e.g., those within a half-frame) may be sent/transmitted in spatial directions (e.g., using different beams that span a coverage area of the cell). A first SS/PBCH block may be sent/transmitted in a first spatial direction using a first beam, a second SS/PBCH block may be sent/transmitted in a second spatial direction using a second beam, a third SS/PBCH block may be sent/transmitted in a third spatial direction using a third beam, a fourth SS/PBCH block may be sent/transmitted in a fourth spatial direction using a fourth beam, etc.

A base station may send/transmit a plurality of SS/PBCH blocks, for example, within a frequency span of a carrier. A first PCI of a first SS/PBCH block of the plurality of SS/PBCH blocks may be different from a second PCI of a second SS/PBCH block of the plurality of SS/PBCH blocks. The PCIs of SS/PBCH blocks sent/transmitted in different frequency locations may be different or substantially the same.

The CSI-RS may be sent/transmitted by the base station and used by the wireless device to acquire/obtain/determine channel state information (CSI). The base station may configure the wireless device with one or more CSI-RSs for channel estimation or any other suitable purpose. The base station may configure a wireless device with one or more of the same/similar CSI-RSs. The wireless device may measure the one or more CSI-RSs. The wireless device may estimate a downlink channel state and/or generate a CSI report, for example, based on the measuring of the one or more downlink CSI-RSs. The wireless device may send/transmit the CSI report to the base station (e.g., based on periodic CSI reporting, semi-persistent CSI reporting, and/or aperiodic CSI reporting). The base station may use feedback provided by the wireless device (e.g., the estimated downlink channel state) to perform a link adaptation.

The base station may semi-statically configure the wireless device with one or more CSI-RS resource sets. A CSI-RS resource may be associated with a location in the time and frequency domains and a periodicity. The base station may selectively activate and/or deactivate a CSI-RS resource. The base station may indicate to the wireless device that a CSI-RS resource in the CSI-RS resource set is activated and/or deactivated.

The base station may configure the wireless device to report CSI measurements. The base station may configure the wireless device to provide CSI reports periodically, aperiodically, or semi-persistently. For periodic CSI reporting, the wireless device may be configured with a timing and/or periodicity of a plurality of CSI reports. For aperiodic CSI reporting, the base station may request a CSI report. The base station may command the wireless device to measure a configured CSI-RS resource and provide a CSI report relating to the measurement(s). For semi-persistent CSI reporting, the base station may configure the wireless device to send/transmit periodically, and selectively activate or deactivate the periodic reporting (e.g., via one or more activation/deactivation MAC CEs and/or one or more DCIs). The base station may configure the wireless device with a CSI-RS resource set and CSI reports, for example, using RRC signaling.

The CSI-RS configuration may comprise one or more parameters indicating, for example, up to 32 antenna ports (or any other quantity of antenna ports). The wireless device may be configured to use/employ the same OFDM symbols for a downlink CSI-RS and a CORESET, for example, if the downlink CSI-RS and CORESET are spatially QCLed and resource elements associated with the downlink CSI-RS are outside of the physical resource blocks (PRBs) configured for the CORESET. The wireless device may be configured to use/employ the same OFDM symbols for a downlink CSI-RS and SS/PBCH blocks, for example, if the downlink CSI-RS and SS/PBCH blocks are spatially QCLed and resource elements associated with the downlink CSI-RS are outside of PRBs configured for the SS/PBCH blocks.

Downlink DM-RSs may be sent/transmitted by a base station and received/used by a wireless device for a channel estimation. The downlink DM-RSs may be used for coherent demodulation of one or more downlink physical channels (e.g., PDSCH). A network (e.g., an NR network) may support one or more variable and/or configurable DM-RS patterns for data demodulation. At least one downlink DM-RS configuration may support a front-loaded DM-RS pattern. A front-loaded DM-RS may be mapped over one or more OFDM symbols (e.g., one or two adjacent OFDM symbols). A base station may semi-statically configure the wireless device with a number/quantity (e.g. a maximum number/quantity) of front-loaded DM-RS symbols for a PDSCH. A DM-RS configuration may support one or more DM-RS ports. A DM-RS configuration may support up to eight orthogonal downlink DM-RS ports per wireless device (e.g., for single user-MIMO). A DM-RS configuration may support up to 4 orthogonal downlink DM-RS ports per wireless device (e.g., for multiuser-MIMO). A radio network may support (e.g., at least for CP-OFDM) a common DM-RS structure for downlink and uplink. A DM-RS location, a DM-RS pattern, and/or a scrambling sequence may be the same or different. The base station may send/transmit a downlink DM-RS and a corresponding PDSCH, for example, using the same precoding matrix. The wireless device may use the one or more downlink DM-RSs for coherent demodulation/channel estimation of the PDSCH.

A transmitter (e.g., a transmitter of a base station) may use a precoder matrices for a part of a transmission bandwidth. The transmitter may use a first precoder matrix for a first bandwidth and a second precoder matrix for a second bandwidth. The first precoder matrix and the second precoder matrix may be different, for example, based on the first bandwidth being different from the second bandwidth. The wireless device may assume that a same precoding matrix is used across a set of PRBs. The set of PRBs may be determined/indicated/identified/denoted as a precoding resource block group (PRG).

A PDSCH may comprise one or more layers. The wireless device may assume that at least one symbol with DM-RS is present on a layer of the one or more layers of the PDSCH. A higher layer may configure one or more DM-RSs for a PDSCH (e.g., up to 3 DMRSs for the PDSCH). Downlink PT-RS may be sent/transmitted by a base station and used by a wireless device, for example, for a phase-noise compensation. Whether a downlink PT-RS is present or not may depend on an RRC configuration. The presence and/or the pattern of the downlink PT-RS may be configured on a wireless device-specific basis, for example, using a combination of RRC signaling and/or an association with one or more parameters used/employed for other purposes (e.g., modulation and coding scheme (MCS)), which may be indicated by DCI. A dynamic presence of a downlink PT-RS, if configured, may be associated with one or more DCI parameters comprising at least MCS. A network (e.g., an NR network) may support a plurality of PT-RS densities defined in the time and/or frequency domains. A frequency domain density (if configured/present) may be associated with at least one configuration of a scheduled bandwidth. The wireless device may assume a same precoding for a DM-RS port and a PT-RS port. The quantity/number of PT-RS ports may be fewer than the quantity/number of DM-RS ports in a scheduled resource. Downlink PT-RS may be configured/ allocated/confined in the scheduled time/frequency duration for the wireless device. Downlink PT-RS may be sent/ transmitted via symbols, for example, to facilitate a phase tracking at the receiver.

The wireless device may send/transmit an uplink DM-RS to a base station, for example, for a channel estimation. The base station may use the uplink DM-RS for coherent demodulation of one or more uplink physical channels. The wireless device may send/transmit an uplink DM-RS with a PUSCH and/or a PUCCH. The uplink DM-RS may span a range of frequencies that is similar to a range of frequencies associated with the corresponding physical channel. The base station may configure the wireless device with one or more uplink DM-RS configurations. At least one DM-RS configuration may support a front-loaded DM-RS pattern. The front-loaded DM-RS may be mapped over one or more OFDM symbols (e.g., one or two adjacent OFDM symbols). One or more uplink DM-RSs may be configured to send/ transmit at one or more symbols of a PUSCH and/or a PUCCH. The base station may semi-statically configure the wireless device with a number/quantity (e.g. the maximum number/quantity) of front-loaded DM-RS symbols for the PUSCH and/or the PUCCH, which the wireless device may use to schedule a single-symbol DM-RS and/or a double-symbol DM-RS. A network (e.g., an NR network) may support (e.g., for cyclic prefix orthogonal frequency division multiplexing (CP-OFDM)) a common DM-RS structure for downlink and uplink. A DM-RS location, a DM-RS pattern, and/or a scrambling sequence for the DM-RS may be substantially the same or different.

A PUSCH may comprise one or more layers. A wireless device may send/transmit at least one symbol with DM-RS present on a layer of the one or more layers of the PUSCH. A higher layer may configure one or more DM-RSs (e.g., up to three DMRSs) for the PUSCH. Uplink PT-RS (which may be used by a base station for a phase tracking and/or a phase-noise compensation) may or may not be present, for example, depending on an RRC configuration of the wireless device. The presence and/or the pattern of an uplink PT-RS may be configured on a wireless device-specific basis (e.g., a UE-specific basis), for example, by a combination of RRC signaling and/or one or more parameters configured/ employed for other purposes (e.g., MCS), which may be indicated by DCI. A dynamic presence of an uplink PT-RS, if configured, may be associated with one or more DCI parameters comprising at least MCS. A radio network may support a plurality of uplink PT-RS densities defined in time/frequency domain. A frequency domain density (if configured/present) may be associated with at least one configuration of a scheduled bandwidth. The wireless device may assume a same precoding for a DM-RS port and a PT-RS port. A quantity/number of PT-RS ports may be less than a quantity/number of DM-RS ports in a scheduled resource. An uplink PT-RS may be configured/allocated/ confined in the scheduled time/frequency duration for the wireless device.

One or more SRSs may be sent/transmitted by a wireless device to a base station, for example, for a channel state estimation to support uplink channel dependent scheduling and/or a link adaptation. SRS sent/transmitted by the wireless device may enable/allow a base station to estimate an uplink channel state at one or more frequencies. A scheduler at the base station may use/employ the estimated uplink channel state to assign one or more resource blocks for an uplink PUSCH transmission for the wireless device. The base station may semi-statically configure the wireless device with one or more SRS resource sets. For an SRS resource set, the base station may configure the wireless device with one or more SRS resources. An SRS resource set applicability may be configured, for example, by a higher layer (e.g., RRC) parameter. An SRS resource in a SRS resource set of the one or more SRS resource sets (e.g., with the same/similar time domain behavior, periodic, aperiodic, and/or the like) may be sent/transmitted at a time instant (e.g., simultaneously), for example, if a higher layer parameter indicates beam management. The wireless device may send/transmit one or more SRS resources in SRS resource sets. A network (e.g., an NR network) may support aperiodic, periodic, and/or semi-persistent SRS transmissions. The wireless device may send/transmit SRS resources, for example, based on one or more trigger types. The one or more trigger types may comprise higher layer signaling (e.g., RRC) and/or one or more DCI formats. At least one DCI format may be used/employed for the wireless device to select at least one of one or more configured SRS resource sets. An SRS trigger type 0 may refer to an SRS triggered based on higher layer signaling. An SRS trigger type 1 may refer to an SRS triggered based on one or more DCI formats. The wireless device may be configured to send/transmit an SRS, for example, after a transmission of a PUSCH and a corresponding uplink DM-RS if a PUSCH and an SRS are sent/transmitted in a same slot. A base station may semi-statically configure a wireless device with one or more SRS configuration parameters indicating at least one of following: a SRS resource configuration identifier; a number of SRS ports; time domain behavior of an SRS resource configuration (e.g., an indication of periodic, semi-persistent, or aperiodic SRS); slot, mini-slot, and/or subframe level periodicity; an offset for a periodic and/or an aperiodic SRS resource; a number of OFDM symbols in an SRS resource; a starting OFDM symbol of an SRS resource; an SRS bandwidth; a frequency hopping bandwidth; a cyclic shift; and/or an SRS sequence ID.

An antenna port may be determined/defined such that the channel over which a symbol on the antenna port is conveyed can be inferred from the channel over which another symbol on the same antenna port is conveyed. The receiver may infer/determine the channel (e.g., fading gain, multipath delay, and/or the like) for conveying a second symbol on an antenna port, from the channel for conveying a first symbol on the antenna port, for example, if the first symbol and the second symbol are sent/transmitted on the same antenna port. A first antenna port and a second antenna port may be referred to as quasi co-located (QCLed), for example, if one or more large-scale properties of the channel over which a first symbol on the first antenna port is conveyed may be inferred from the channel over which a second symbol on a second antenna port is conveyed. The one or more large-scale properties may comprise at least one of: a delay spread; a Doppler spread; a Doppler shift; an average gain; an average delay; and/or spatial Receiving (Rx) parameters.

Channels that use beamforming may require beam management. Beam management may comprise a beam measurement, a beam selection, and/or a beam indication. A beam may be associated with one or more reference signals. A beam may be identified by one or more beamformed reference signals. The wireless device may perform a downlink beam measurement, for example, based on one or more downlink reference signals (e.g., a CSI-RS) and generate a beam measurement report. The wireless device may perform the downlink beam measurement procedure, for example, after an RRC connection is set up with a base station.

Figure 11B:
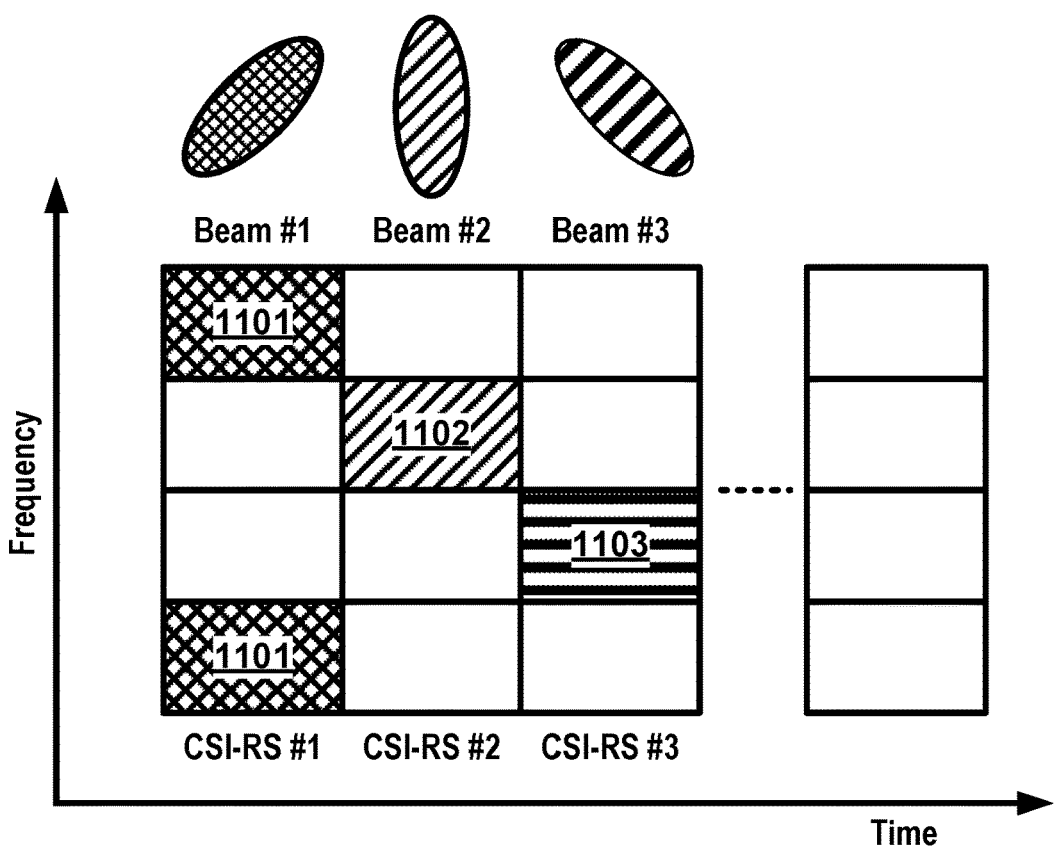
FIG. 11B shows an example mapping of one or more channel state information reference signals (CSI-RSs).

FIG. 11B shows an example mapping of one or more CSI-RSs. The CSI-RSs may be mapped in the time and frequency domains. Each rectangular block shown in FIG. 11B may correspond to a resource block (RB) within a bandwidth of a cell. A base station may send/transmit one or more RRC messages comprising CSI-RS resource configuration parameters indicating one or more CSI-RSs. One or more of parameters may be configured by higher layer signaling (e.g., RRC and/or MAC signaling) for a CSI-RS resource configuration. The one or more of the parameters may comprise at least one of: a CSI-RS resource configuration identity, a number of CSI-RS ports, a CSI-RS configuration (e.g., symbol and resource element (RE) locations in a subframe), a CSI-RS subframe configuration (e.g., a subframe location, an offset, and periodicity in a radio frame), a CSI-RS power parameter, a CSI-RS sequence parameter, a code division multiplexing (CDM) type parameter, a frequency density, a transmission comb, quasi co-location (QCL) parameters (e.g., QCL-scramblingidentity, crs-portscount, mbsfn-subframeconfiglist, csi-rs-configZPid, qcl-csi-rs-configNZPid), and/or other radio resource parameters.

One or more beams may be configured for a wireless device in a wireless device-specific configuration. Three beams are shown in FIG. 11B (beam #1, beam #2, and beam #3), but more or fewer beams may be configured. Beam #1 may be allocated with CSI-RS 1101 that may be sent/transmitted in one or more subcarriers in an RB of a first symbol. Beam #2 may be allocated with CSI-RS 1102 that may be sent/transmitted in one or more subcarriers in an RB of a second symbol. Beam #3 may be allocated with CSI-RS 1103 that may be sent/transmitted in one or more subcarriers in an RB of a third symbol. A base station may use other subcarriers in the same RB (e.g., those that are not used to send/transmit CSI-RS 1101) to send/transmit another CSI-RS associated with a beam for another wireless device, for example, by using frequency division multiplexing (FDM). Beams used for a wireless device may be configured such that beams for the wireless device use symbols different from symbols used by beams of other wireless devices, for example, by using time domain multiplexing (TDM). A wireless device may be served with beams in orthogonal symbols (e.g., no overlapping symbols), for example, by using the TDM.

CSI-RSs (e.g., CSI-RSs 1101, 1102, 1103) may be sent/transmitted by the base station and used by the wireless device for one or more measurements. The wireless device may measure an RSRP of configured CSI-RS resources. The base station may configure the wireless device with a reporting configuration, and the wireless device may report the RSRP measurements to a network (e.g., via one or more base stations) based on the reporting configuration. The base station may determine, based on the reported measurement results, one or more transmission configuration indication (TCI) states comprising a number of reference signals. The base station may indicate one or more TCI states to the wireless device (e.g., via RRC signaling, a MAC CE, and/or DCI). The wireless device may receive a downlink transmission with an Rx beam determined based on the one or more TCI states. The wireless device may or may not have a capability of beam correspondence. The wireless device may determine a spatial domain filter of a transmit (Tx) beam, for example, based on a spatial domain filter of the corresponding Rx beam, if the wireless device has the capability of beam correspondence. The wireless device may perform an uplink beam selection procedure to determine the spatial domain filter of the Tx beam, for example, if the wireless device does not have the capability of beam correspondence. The wireless device may perform the uplink beam selection procedure, for example, based on one or more sounding reference signal (SRS) resources configured to the wireless device by the base station. The base station may select and indicate uplink beams for the wireless device, for example, based on measurements of the one or more SRS resources sent/transmitted by the wireless device.

A wireless device may determine/assess (e.g., measure) a channel quality of one or more beam pair links, for example, in a beam management procedure. A beam pair link may comprise a Tx beam of a base station and an Rx beam of the wireless device. The Tx beam of the base station may send/transmit a downlink signal, and the Rx beam of the wireless device may receive the downlink signal. The wireless device may send/transmit a beam measurement report, for example, based on the assessment/determination. The beam measurement report may indicate one or more beam pair quality parameters comprising at least one of: one or more beam identifications (e.g., a beam index, a reference signal index, or the like), an RSRP, a precoding matrix indicator (PMI), a channel quality indicator (CQI), and/or a rank indicator (RI).

FIG. 12A shows examples of downlink beam management procedures. One or more downlink beam management procedures (e.g., downlink beam management procedures P1, P2, and P3) may be performed. Procedure P1 may enable a measurement (e.g., a wireless device measurement) on Tx beams of a TRP (or multiple TRPs) (e.g., to support a selection of one or more base station Tx beams and/or wireless device Rx beams). The Tx beams of a base station and the Rx beams of a wireless device are shown as ovals in the top row of P1 and bottom row of P1, respectively. Beamforming (e.g., at a TRP) may comprise a Tx beam sweep for a set of beams (e.g., the beam sweeps shown, in the top rows of P1 and P2, as ovals rotated in a counter-clockwise direction indicated by the dashed arrows). Beamforming (e.g., at a wireless device) may comprise an Rx beam sweep for a set of beams (e.g., the beam sweeps shown, in the bottom rows of P1 and P3, as ovals rotated in a clockwise direction indicated by the dashed arrows). Procedure P2 may be used to enable a measurement (e.g., a wireless device measurement) on Tx beams of a TRP (shown, in the top row of P2, as ovals rotated in a counter-clockwise direction indicated by the dashed arrow). The wireless device and/or the base station may perform procedure P2, for example, using a smaller set of beams than the set of beams used in procedure P1, or using narrower beams than the beams used in procedure P1. Procedure P2 may be referred to as a beam refinement. The wireless device may perform procedure P3 for an Rx beam determination, for example, by using the same Tx beam(s) of the base station and sweeping Rx beam(s) of the wireless device.

FIG. 12B shows examples of uplink beam management procedures. One or more uplink beam management procedures (e.g., uplink beam management procedures U1, U2, and U3) may be performed. Procedure U1 may be used to enable a base station to perform a measurement on Tx beams of a wireless device (e.g., to support a selection of one or more Tx beams of the wireless device and/or Rx beams of the base station). The Tx beams of the wireless device and the Rx beams of the base station are shown as ovals in the top row of U1 and bottom row of U1, respectively). Beamforming (e.g., at the wireless device) may comprise one or more beam sweeps, for example, a Tx beam sweep from a set of beams (shown, in the bottom rows of U1 and U3, as ovals rotated in a clockwise direction indicated by the dashed arrows). Beamforming (e.g., at the base station) may comprise one or more beam sweeps, for example, an Rx beam sweep from a set of beams (shown, in the top rows of U1 and U2, as ovals rotated in a counter-clockwise direction indicated by the dashed arrows). Procedure U2 may be used to enable the base station to adjust its Rx beam, for example, if the UE uses a fixed Tx beam. The wireless device and/or the base station may perform procedure U2, for example, using a smaller set of beams than the set of beams used in procedure P1, or using narrower beams than the beams used in procedure P1. Procedure U2 may be referred to as a beam refinement. The wireless device may perform procedure U3 to adjust its Tx beam, for example, if the base station uses a fixed Rx beam.

A wireless device may initiate/start/perform a beam failure recovery (BFR) procedure, for example, based on detecting a beam failure. The wireless device may send/transmit a BFR request (e.g., a preamble, UCI, an SR, a MAC CE, and/or the like), for example, based on the initiating the BFR procedure. The wireless device may detect the beam failure, for example, based on a determination that a quality of beam pair link(s) of an associated control channel is unsatisfactory (e.g., having an error rate higher than an error rate threshold, a received signal power lower than a received signal power threshold, an expiration of a timer, and/or the like).

The wireless device may measure a quality of a beam pair link, for example, using one or more reference signals (RSs) comprising one or more SS/PBCH blocks, one or more CSI-RS resources, and/or one or more DM-RSs. A quality of the beam pair link may be based on one or more of a block error rate (BLER), an RSRP value, a signal to interference plus noise ratio (SINR) value, an RSRQ value, and/or a CSI value measured on RS resources. The base station may indicate that an RS resource is QCLed with one or more DM-RSs of a channel (e.g., a control channel, a shared data channel, and/or the like). The RS resource and the one or more DM-RSs of the channel may be QCLed, for example, if the channel characteristics (e.g., Doppler shift, Doppler spread, an average delay, delay spread, a spatial Rx parameter, fading, and/or the like) from a transmission via the RS resource to the wireless device are similar or the same as the channel characteristics from a transmission via the channel to the wireless device.

A network (e.g., an NR network comprising a gNB and/or an ng-eNB) and/or the wireless device may initiate/start/perform a random access procedure. A wireless device in an RRC idle (e.g., an RRC_IDLE) state and/or an RRC inactive (e.g., an RRC_INACTIVE) state may initiate/perform the random access procedure to request a connection setup to a network. The wireless device may initiate/start/perform the random access procedure from an RRC connected (e.g., an RRC_CONNECTED) state. The wireless device may initiate/start/perform the random access procedure to request uplink resources (e.g., for uplink transmission of an SR if there is no PUCCH resource available) and/or acquire/obtain/determine an uplink timing (e.g., if an uplink synchronization status is non-synchronized). The wireless device may initiate/start/perform the random access procedure to request one or more system information blocks (SIBs) (e.g., other system information blocks, such as SIB2, SIB3, and/or the like). The wireless device may initiate/start/perform the random access procedure for a beam failure recovery request. A network may initiate/start/perform a random access procedure, for example, for a handover and/or for establishing time alignment for an SCell addition.

FIG. 13A shows an example four-step random access procedure. The four-step random access procedure may comprise a four-step contention-based random access procedure. A base station may send/transmit a configuration message 1310 to a wireless device, for example, before initiating the random access procedure. The four-step random access procedure may comprise transmissions of four messages comprising: a first message (e.g., Msg 1 1311), a second message (e.g., Msg 2 1312), a third message (e.g., Msg 3 1313), and a fourth message (e.g., Msg 4 1314). The first message (e.g., Msg 1 1311) may comprise a preamble (or a random access preamble). The first message (e.g., Msg 1 1311) may be referred to as a preamble. The second message (e.g., Msg 2 1312) may comprise as a random access response (RAR). The second message (e.g., Msg 2 1312) may be referred to as an RAR.

The configuration message 1310 may be sent/transmitted, for example, using one or more RRC messages. The one or more RRC messages may indicate one or more random access channel (RACH) parameters to the wireless device. The one or more RACH parameters may comprise at least one of: general parameters for one or more random access procedures (e.g., RACH-configGeneral); cell-specific parameters (e.g., RACH-ConfigCommon); and/or dedicated parameters (e.g., RACH-configDedicated). The base station may send/transmit (e.g., broadcast or multicast) the one or more RRC messages to one or more wireless devices. The one or more RRC messages may be wireless device-specific. The one or more RRC messages that are wireless device-specific may be, for example, dedicated RRC messages sent/transmitted to a wireless device in an RRC connected (e.g., an RRC_CONNECTED) state and/or in an RRC inactive (e.g., an RRC_INACTIVE) state. The wireless devices may determine, based on the one or more RACH parameters, a time-frequency resource and/or an uplink transmit power for transmission of the first message (e.g., Msg 1 1311) and/or the third message (e.g., Msg 3 1313). The wireless device may determine a reception timing and a downlink channel for receiving the second message (e.g., Msg 2 1312) and the fourth message (e.g., Msg 4 1314), for example, based on the one or more RACH parameters.

The one or more RACH parameters provided/configured/comprised in the configuration message 1310 may indicate one or more Physical RACH (PRACH) occasions available for transmission of the first message (e.g., Msg 1 1311). The one or more PRACH occasions may be predefined (e.g., by a network comprising one or more base stations). The one or more RACH parameters may indicate one or more available sets of one or more PRACH occasions (e.g., prach-Config-Index). The one or more RACH parameters may indicate an association between (a) one or more PRACH occasions and (b) one or more reference signals. The one or more RACH parameters may indicate an association between (a) one or more preambles and (b) one or more reference signals. The one or more reference signals may be SS/PBCH blocks and/or CSI-RSs. The one or more RACH parameters may indicate a quantity/number of SS/PBCH blocks mapped to a PRACH occasion and/or a quantity/number of preambles mapped to a SS/PBCH blocks.

The one or more RACH parameters provided/configured/comprised in the configuration message 1310 may be used to determine an uplink transmit power of first message (e.g., Msg 1 1311) and/or third message (e.g., Msg 3 1313). The one or more RACH parameters may indicate a reference power for a preamble transmission (e.g., a received target power and/or an initial power of the preamble transmission). There may be one or more power offsets indicated by the one or more RACH parameters. The one or more RACH parameters may indicate: a power ramping step; a power offset between SSB and CSI-RS; a power offset between transmissions of the first message (e.g., Msg 1 1311) and the third message (e.g., Msg 3 1313); and/or a power offset value between preamble groups. The one or more RACH parameters may indicate one or more thresholds, for example, based on which the wireless device may determine at least one reference signal (e.g., an SSB and/or CSI-RS) and/or an uplink carrier (e.g., a normal uplink (NUL) carrier and/or a supplemental uplink (SUL) carrier).

The first message (e.g., Msg 1 1311) may comprise one or more preamble transmissions (e.g., a preamble transmission and one or more preamble retransmissions). An RRC message may be used to configure one or more preamble groups (e.g., group A and/or group B). A preamble group may comprise one or more preambles. The wireless device may determine the preamble group, for example, based on a pathloss measurement and/or a size of the third message (e.g., Msg 3 1313). The wireless device may measure an RSRP of one or more reference signals (e.g., SSBs and/or CSI-RSs) and determine at least one reference signal having an RSRP above an RSRP threshold (e.g., rsrp-ThresholdSSB and/or rsrp-ThresholdCSI-RS). The wireless device may select at least one preamble associated with the one or more reference signals and/or a selected preamble group, for example, if the association between the one or more preambles and the at least one reference signal is configured by an RRC message.

The wireless device may determine the preamble, for example, based on the one or more RACH parameters provided/configured/comprised in the configuration message 1310. The wireless device may determine the preamble, for example, based on a pathloss measurement, an RSRP measurement, and/or a size of the third message (e.g., Msg 3 1313). The one or more RACH parameters may indicate: a preamble format; a maximum quantity/number of preamble transmissions; and/or one or more thresholds for determining one or more preamble groups (e.g., group A and group B). A base station may use the one or more RACH parameters to configure the wireless device with an association between one or more preambles and one or more reference signals (e.g., SSBs and/or CSI-RSs). The wireless device may determine the preamble to be comprised in first message (e.g., Msg 1 1311), for example, based on the association if the association is configured. The first message (e.g., Msg 1 1311) may be sent/transmitted to the base station via one or more PRACH occasions. The wireless device may use one or more reference signals (e.g., SSBs and/or CSI-RSs) for selection of the preamble and for determining of the PRACH occasion. One or more RACH parameters (e.g., ra-ssb-OccasionMskIndex and/or ra-OccasionList) may indicate an association between the PRACH occasions and the one or more reference signals.

The wireless device may perform a preamble retransmission, for example, if no response is received after (e.g., based on or in response to) an a preamble transmission (e.g., for a period of time, such as a monitoring window for monitoring an RAR). The wireless device may increase an uplink transmit power for the preamble retransmission. The wireless device may select an initial preamble transmit power, for example, based on a pathloss measurement and/or a target received preamble power configured by the network. The wireless device may determine to resend/retransmit a preamble and may ramp up the uplink transmit power. The wireless device may receive one or more RACH parameters (e.g., PREAMBLE_POWER_RAMPING_STEP) indicating a ramping step for the preamble retransmission. The ramping step may be an amount of incremental increase in uplink transmit power for a retransmission. The wireless device may ramp up the uplink transmit power, for example, if the wireless device determines a reference signal (e.g., SSB and/or CSI-RS) that is the same as a previous preamble transmission. The wireless device may count the quantity/number of preamble transmissions and/or retransmissions, for example, using a counter parameter (e.g., PREAMBLE_TRANSMISSION_COUNTER). The wireless device may determine that a random access procedure has been completed unsuccessfully, for example, if the quantity/number of preamble transmissions exceeds a threshold configured by the one or more RACH parameters (e.g., preambleTransMax) without receiving a successful response (e.g., an RAR).

The second message (e.g., Msg 2 1312) (e.g., received by the wireless device) may comprise an RAR. The second message (e.g., Msg 2 1312) may comprise multiple RARs corresponding to multiple wireless devices. The second message (e.g., Msg 2 1312) may be received, for example, after (e.g., based on or in response to) the sending/transmitting of the first message (e.g., Msg 1 1311). The second message (e.g., Msg 2 1312) may be scheduled on the DL-SCH and may be indicated by a PDCCH, for example, using a random access radio network temporary identifier (RA RNTI). The second message (e.g., Msg 2 1312) may indicate that the first message (e.g., Msg 1 1311) was received by the base station. The second message (e.g., Msg 2 1312) may comprise a time-alignment command that may be used by the wireless device to adjust the transmission timing of the wireless device, a scheduling grant for transmission of the third message (e.g., Msg 3 1313), and/or a Temporary Cell RNTI (TC-RNTI). The wireless device may determine/start a time window (e.g., ra-ResponseWindow) to monitor a PDCCH for the second message (e.g., Msg 2 1312), for example, after sending/transmitting the first message (e.g., Msg 1 1311) (e.g., a preamble). The wireless device may determine the start time of the time window, for example, based on a PRACH occasion that the wireless device uses to send/transmit the first message (e.g., Msg 1 1311) (e.g., the preamble). The wireless device may start the time window one or more symbols after the last symbol of the first message (e.g., Msg 1 1311) comprising the preamble (e.g., the symbol in which the first message (e.g., Msg 1 1311) comprising the preamble transmission was completed or at a first PDCCH occasion from an end of a preamble transmission). The one or more symbols may be determined based on a numerology. The PDCCH may be mapped in a common search space (e.g., a Type1-PDCCH common search space) configured by an RRC message. The wireless device may identify/determine the RAR, for example, based on an RNTI. Radio network temporary identifiers (RNTIs) may be used depending on one or more events initiating/starting the random access procedure. The wireless device may use a RA-RNTI, for example, for one or more communications associated with random access or any other purpose. The RA-RNTI may be associated with PRACH occasions in which the wireless device sends/transmits a preamble. The wireless device may determine the RA-RNTI, for example, based on at least one of: an 01-DM symbol index; a slot index; a frequency domain index; and/or a UL carrier indicator of the PRACH occasions. An example RA-RNTI may be determined as follows:

$$RA\text{-}RNTI = 1 + s\_id + 14 \times t\_id + 14 \times 80 \times f\_id + 14 \times 80 \times 8 \times ul\_carrier\_id$$

where s_id may be an index of a first OFDM symbol of the PRACH occasion (e.g., 0≤s_id<14), t_id may be an index of a first slot of the PRACH occasion in a system frame (e.g., 0≤t_id<80), f_id may be an index of the PRACH occasion in the frequency domain (e.g., 0≤f_id<8), and ul_carrier_id may be a UL carrier used for a preamble transmission (e.g., 0 for an NUL carrier, and 1 for an SUL carrier).

The wireless device may send/transmit the third message (e.g., Msg 3 1313), for example, after (e.g., based on or in response to) a successful reception of the second message (e.g., Msg 2 1312) (e.g., using resources identified in the Msg 2 1312). The third message (e.g., Msg 3 1313) may be used, for example, for contention resolution in the contention-based random access procedure. A plurality of wireless devices may send/transmit the same preamble to a base station, and the base station may send/transmit an RAR that corresponds to a wireless device. Collisions may occur, for example, if the plurality of wireless device interpret the RAR as corresponding to themselves. Contention resolution (e.g., using the third message (e.g., Msg 3 1313) and the fourth likelihood message (e.g., Msg 4 1314)) may be used to increase the likelihood that the wireless device does not incorrectly use an identity of another the wireless device. The wireless device may comprise a device identifier in the third message (e.g., Msg 3 1313) (e.g., a C-RNTI if assigned, a TC RNTI comprised in the second message (e.g., Msg 2 1312), and/or any other suitable identifier), for example, to perform contention resolution.

The fourth message (e.g., Msg 4 1314) may be received, for example, after (e.g., based on or in response to) the sending/transmitting of the third message (e.g., Msg 3 1313). The base station may address the wireless on the PDCCH (e.g., the base station may send the PDCCH to the wireless device) using a C-RNTI, for example, If the C-RNTI was included in the third message (e.g., Msg 3 1313). The random access procedure may be determined to be successfully completed, for example, if the unique C RNTI of the wireless device is detected on the PDCCH (e.g., the PDCCH is scrambled by the C-RNTI). fourth message (e.g., Msg 4 1314) may be received using a DL-SCH associated with a TC RNTI, for example, if the TC RNTI is comprised in the third message (e.g., Msg 3 1313) (e.g., if the wireless device is in an RRC idle (e.g., an RRC_IDLE) state or not otherwise connected to the base station). The wireless device may determine that the contention resolution is successful and/or the wireless device may determine that the random access procedure is successfully completed, for example, if a MAC PDU is successfully decoded and a MAC PDU comprises the wireless device contention resolution identity MAC CE that matches or otherwise corresponds with the CCCH SDU sent/transmitted in third message (e.g., Msg 3 1313).

The wireless device may be configured with an SUL carrier and/or an NUL carrier. An initial access (e.g., random access) may be supported via an uplink carrier. A base station may configure the wireless device with multiple RACH configurations (e.g., two separate RACH configurations comprising: one for an SUL carrier and the other for an NUL carrier). For random access in a cell configured with an SUL carrier, the network may indicate which carrier to use (NUL or SUL). The wireless device may determine to use the SUL carrier, for example, if a measured quality of one or more reference signals (e.g., one or more reference signals associated with the NUL carrier) is lower than a broadcast threshold. Uplink transmissions of the random access procedure (e.g., the first message (e.g., Msg 1 1311) and/or the third message (e.g., Msg 3 1313)) may remain on, or may be performed via, the selected carrier. The wireless device may switch an uplink carrier during the random access procedure (e.g., between the Msg 1 1311 and the Msg 3 1313). The wireless device may determine and/or switch an uplink carrier for the first message (e.g., Msg 1 1311) and/or the third message (e.g., Msg 3 1313), for example, based on a channel clear assessment (e.g., a listen-before-talk).

FIG. 13B shows a two-step random access procedure. The two-step random access procedure may comprise a two-step contention-free random access procedure. Similar to the four-step contention-based random access procedure, a base station may, prior to initiation of the procedure, send/transmit a configuration message 1320 to the wireless device. The configuration message 1320 may be analogous in some respects to the configuration message 1310. The procedure shown in FIG. 13B may comprise transmissions of two messages: a first message (e.g., Msg 1 1321) and a second message (e.g., Msg 2 1322). The first message (e.g., Msg 1 1321) and the second message (e.g., Msg 2 1322) may be analogous in some respects to the first message (e.g., Msg 1 1311) and a second message (e.g., Msg 2 1312), respectively. The two-step contention-free random access procedure may not comprise messages analogous to the third message (e.g., Msg 3 1313) and/or the fourth message (e.g., Msg 4 1314).

The two-step (e.g., contention-free) random access procedure may be configured/initiated for a beam failure recovery, other SI request, an SCell addition, and/or a handover. A base station may indicate, or assign to, the wireless device a preamble to be used for the first message (e.g., Msg 1 1321). The wireless device may receive, from the base station via a PDCCH and/or an RRC, an indication of the preamble (e.g., ra-PreambleIndex).

The wireless device may start a time window (e.g., ra-ResponseWindow) to monitor a PDCCH for the RAR, for example, (e.g., based on or in response to) sending/transmitting the preamble. The base station may configure the wireless device with one or more beam failure recovery parameters, such as a separate time window and/or a separate PDCCH in a search space indicated by an RRC message (e.g., recoverySearchSpaceId). The base station may configure the one or more beam failure recovery parameters, for example, in association with a beam failure recovery request. The separate time window for monitoring the PDCCH and/or an RAR may be configured to start after sending/transmitting a beam failure recovery request (e.g., the window may start any quantity of symbols and/or slots after sending/transmitting the beam failure recovery request). The wireless device may monitor for a PDCCH transmission addressed to a Cell RNTI (C-RNTI) on the search space. During the two-step (e.g., contention-free) random access procedure, the wireless device may determine that a random access procedure is successful, for example, after (e.g., based on or in response to) sending/transmitting first message (e.g., Msg 1 1321) and receiving a corresponding second message (e.g., Msg 2 1322). The wireless device may determine that a random access procedure has successfully been completed, for example, if a PDCCH transmission is addressed to a corresponding C-RNTI. The wireless device may determine that a random access procedure has successfully been completed, for example, if the wireless device receives an RAR comprising a preamble identifier corresponding to a preamble sent/transmitted by the wireless device and/or the RAR comprises a MAC sub-PDU with the preamble identifier. The wireless device may determine the response as an indication of an acknowledgement for an SI request.

FIG. 13C shows an example two-step random access procedure. Similar to the random access procedures shown in FIGS. 13A and 13B, a base station may, prior to initiation of the procedure, send/transmit a configuration message 1330 to the wireless device. The configuration message 1330 may be analogous in some respects to the configuration message 1310 and/or the configuration message 1320. The procedure shown in FIG. 13C may comprise transmissions of multiple messages (e.g., two messages comprising: a first message (e.g., Msg A 1331) and a second message (e.g., Msg B 1332)).

Msg A 1320 may be sent/transmitted in an uplink transmission by the wireless device. Msg A 1320 may comprise one or more transmissions of a preamble 1341 and/or one or more transmissions of a transport block 1342. The transport block 1342 may comprise contents that are similar and/or equivalent to the contents of the third message (e.g., Msg 3 1313) (e.g., shown in FIG. 13A). The transport block 1342 may comprise UCI (e.g., an SR, a HARQ ACK/NACK, and/or the like). The wireless device may receive the second message (e.g., Msg B 1332), for example, after (e.g., based on or in response to) sending/transmitting the first message (e.g., Msg A 1331). The second message (e.g., Msg B 1332) may comprise contents that are similar and/or equivalent to the contents of the second message (e.g., Msg 2 1312) (e.g., an RAR shown in FIGS. 13A), the contents of the second message (e.g., Msg 2 1322) (e.g., an RAR shown in FIG. 13B) and/or the fourth message (e.g., Msg 4 1314) (e.g., shown in FIG. 13A).

The wireless device may start/initiate the two-step random access procedure (e.g., the two-step random access procedure shown in FIG. 13C) for a licensed spectrum and/or an unlicensed spectrum. The wireless device may determine, based on one or more factors, whether to start/initiate the two-step random access procedure. The one or more factors may comprise at least one of: a radio access technology in use (e.g., LTE, NR, and/or the like); whether the wireless device has a valid TA or not; a cell size; the RRC state of the wireless device; a type of spectrum (e.g., licensed vs. unlicensed); and/or any other suitable factors.

The wireless device may determine, based on two-step RACH parameters comprised in the configuration message 1330, a radio resource and/or an uplink transmit power for the preamble 1341 and/or the transport block 1342 (e.g., comprised in the first message (e.g., Msg A 1331)). The RACH parameters may indicate an MCS, a time-frequency resource, and/or a power control for the preamble 1341 and/or the transport block 1342. A time-frequency resource for transmission of the preamble 1341 (e.g., a PRACH) and a time-frequency resource for transmission of the transport block 1342 (e.g., a PUSCH) may be multiplexed using FDM, TDM, and/or CDM. The RACH parameters may enable the wireless device to determine a reception timing and a downlink channel for monitoring for and/or receiving second message (e.g., Msg B 1332).

The transport block 1342 may comprise data (e.g., delay-sensitive data), an identifier of the wireless device, security information, and/or device information (e.g., an International Mobile Subscriber Identity (IMSI)). The base station may send/transmit the second message (e.g., Msg B 1332) as a response to the first message (e.g., Msg A 1331). The second message (e.g., Msg B 1332) may comprise at least one of: a preamble identifier; a timing advance command; a power control command; an uplink grant (e.g., a radio resource assignment and/or an MCS); a wireless device identifier (e.g., a UE identifier for contention resolution); and/or an RNTI (e.g., a C-RNTI or a TC-RNTI). The wireless device may determine that the two-step random access procedure is successfully completed, for example, if a preamble identifier in the second message (e.g., Msg B 1332) corresponds to, or is matched to, a preamble sent/transmitted by the wireless device and/or the identifier of the wireless device in second message (e.g., Msg B 1332) corresponds to, or is matched to, the identifier of the wireless device in the first message (e.g., Msg A 1331) (e.g., the transport block 1342).

A wireless device and a base station may exchange control signaling (e.g., control information). The control signaling may be referred to as L1/L2 control signaling and may originate from the PHY layer (e.g., layer 1) and/or the MAC layer (e.g., layer 2) of the wireless device or the base station. The control signaling may comprise downlink control signaling sent/transmitted from the base station to the wireless device and/or uplink control signaling sent/transmitted from the wireless device to the base station.

The downlink control signaling may comprise at least one of: a downlink scheduling assignment; an uplink scheduling grant indicating uplink radio resources and/or a transport format; slot format information; a preemption indication; a power control command; and/or any other suitable signaling. The wireless device may receive the downlink control signaling in a payload sent/transmitted by the base station via a PDCCH. The payload sent/transmitted via the PDCCH may be referred to as downlink control information (DCI). The PDCCH may be a group common PDCCH (GC-PDCCH) that is common to a group of wireless devices. The GC-PDCCH may be scrambled by a group common RNTI.

A base station may attach one or more cyclic redundancy check (CRC) parity bits to DCI, for example, in order to facilitate detection of transmission errors. The base station may scramble the CRC parity bits with an identifier of a wireless device (or an identifier of a group of wireless devices), for example, if the DCI is intended for the wireless device (or the group of the wireless devices). Scrambling the CRC parity bits with the identifier may comprise Modulo-2 addition (or an exclusive-OR operation) of the identifier value and the CRC parity bits. The identifier may comprise a 16-bit value of an RNTI.

DCIs may be used for different purposes. A purpose may be indicated by the type of an RNTI used to scramble the CRC parity bits. DCI having CRC parity bits scrambled with a paging RNTI (P-RNTI) may indicate paging information and/or a system information change notification. The P-RNTI may be predefined as "FFFE" in hexadecimal. DCI having CRC parity bits scrambled with a system information RNTI (SI-RNTI) may indicate a broadcast transmission of the system information. The SI-RNTI may be predefined as "FFFF" in hexadecimal. DCI having CRC parity bits scrambled with a random access RNTI (RA-RNTI) may indicate a random access response (RAR). DCI having CRC parity bits scrambled with a cell RNTI (C-RNTI) may indicate a dynamically scheduled unicast transmission and/or a triggering of PDCCH-ordered random access. DCI having CRC parity bits scrambled with a temporary cell RNTI (TC-RNTI) may indicate a contention resolution (e.g., a Msg 3 analogous to the Msg 3 1313 shown in FIG. 13A). Other RNTIs configured for a wireless device by a base station may comprise a Configured Scheduling RNTI (CS RNTI), a Transmit Power Control-PUCCH RNTI (TPC PUCCH-RNTI), a Transmit Power Control-PUSCH RNTI (TPC-PUSCH-RNTI), a Transmit Power Control-SRS RNTI (TPC-SRS-RNTI), an Interruption RNTI (INT-RNTI), a Slot Format Indication RNTI (SFI-RNTI), a Semi-Persistent CSI RNTI (SP-CSI-RNTI), a Modulation and Coding Scheme Cell RNTI (MCS-C RNTI), and/or the like.

A base station may send/transmit DCIs with one or more DCI formats, for example, depending on the purpose and/or content of the DCIs. DCI format 0_0 may be used for scheduling of a PUSCH in a cell. DCI format 0_0 may be a fallback DCI format (e.g., with compact DCI payloads). DCI format 0_1 may be used for scheduling of a PUSCH in a cell (e.g., with more DCI payloads than DCI format 0_0). DCI format 1_0 may be used for scheduling of a PDSCH in a cell. DCI format 1_0 may be a fallback DCI format (e.g., with compact DCI payloads). DCI format 1_1 may be used for scheduling of a PDSCH in a cell (e.g., with more DCI payloads than DCI format 1_0). DCI format 2_0 may be used for providing a slot format indication to a group of wireless devices. DCI format 2_1 may be used for informing/notifying a group of wireless devices of a physical resource block and/or an OFDM symbol where the group of wireless devices may assume no transmission is intended to the group of wireless devices. DCI format 2_2 may be used for transmission of a transmit power control (TPC) command for PUCCH or PUSCH. DCI format 2_3 may be used for transmission of a group of TPC commands for SRS transmissions by one or more wireless devices. DCI format(s) for new functions may be defined in future releases. DCI formats may have different DCI sizes, or may share the same DCI size.

The base station may process the DCI with channel coding (e.g., polar coding), rate matching, scrambling and/or QPSK modulation, for example, after scrambling the DCI with an RNTI. A base station may map the coded and modulated DCI on resource elements used and/or configured for a PDCCH. The base station may send/transmit the DCI via a PDCCH occupying a number of contiguous control channel elements (CCEs), for example, based on a payload size of the DCI and/or a coverage of the base station. The number of the contiguous CCEs (referred to as aggregation level) may be 1, 2, 4, 8, 16, and/or any other suitable number. A CCE may comprise a number (e.g., 6) of resource-element groups (REGs). A REG may comprise a resource block in an OFDM symbol. The mapping of the coded and modulated DCI on the resource elements may be based on mapping of CCEs and REGs (e.g., CCE-to-REG mapping).

Figure 14A:
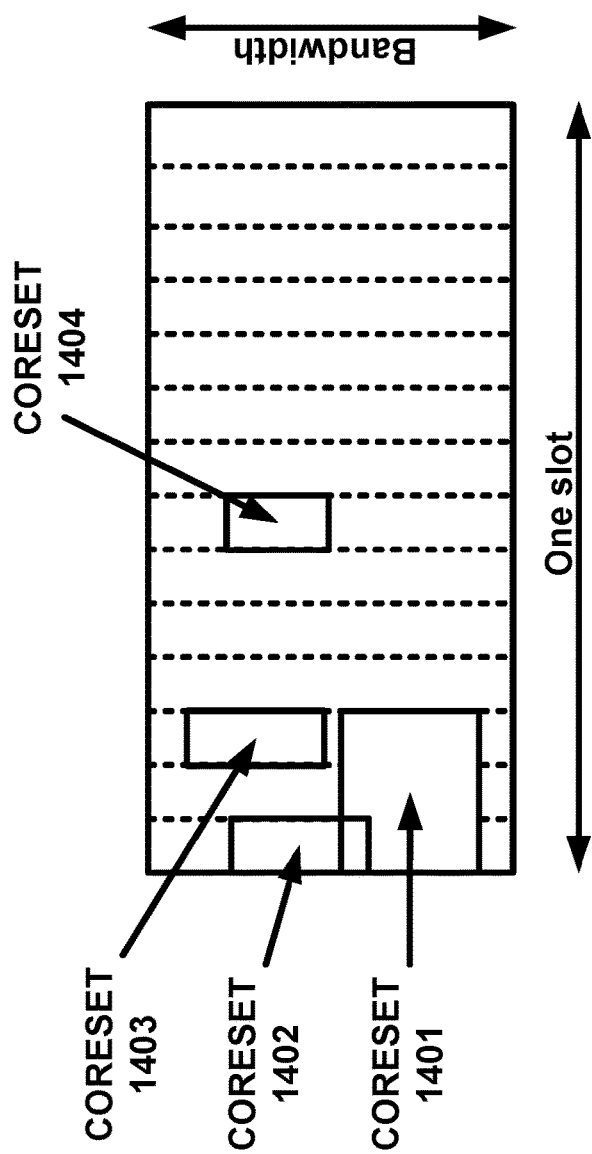
FIG. 14A shows an example of control resource set (CORESET) configurations.

FIG. 14A shows an example of CORESET configurations. The CORESET configurations may be for a bandwidth part or any other frequency bands. The base station may send/transmit DCI via a PDCCH on one or more control resource sets (CORESETs). A CORESET may comprise a time-frequency resource in which the wireless device attempts/tries to decode DCI using one or more search spaces. The base station may configure a size and a location of the CORESET in the time-frequency domain. A first CORESET 1401 and a second CORESET 1402 may occur or may be set/configured at the first symbol in a slot. The first CORESET 1401 may overlap with the second CORESET 1402 in the frequency domain. A third CORESET 1403 may occur or may be set/configured at a third symbol in the slot. A fourth CORESET 1404 may occur or may be set/configured at the seventh symbol in the slot. CORESETs may have a different number of resource blocks in frequency domain.

Figure 14B:
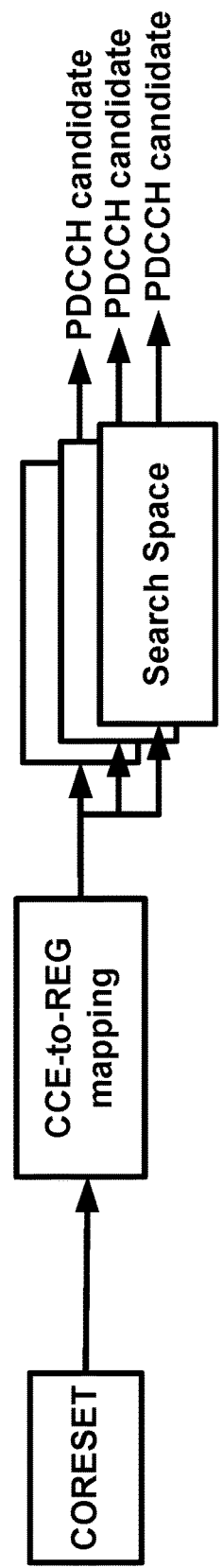
FIG. 14B shows an example of a control channel element to resource element group (CCE-to-REG) mapping.

FIG. 14B shows an example of a CCE-to-REG mapping. The CCE-to-REG mapping may be performed for DCI transmission via a CORESET and PDCCH processing. The CCE-to-REG mapping may be an interleaved mapping (e.g., for the purpose of providing frequency diversity) or a non-interleaved mapping (e.g., for the purposes of facilitating interference coordination and/or frequency-selective transmission of control channels). The base station may perform different or same CCE-to-REG mapping on different CORESETs. A CORESET may be associated with a CCE-to-REG mapping (e.g., by an RRC configuration). A CORESET may be configured with an antenna port QCL parameter. The antenna port QCL parameter may indicate QCL information of a DM-RS for a PDCCH reception via the CORESET.

The base station may send/transmit, to the wireless device, one or more RRC messages comprising configuration parameters of one or more CORESETs and one or more search space sets. The configuration parameters may indicate an association between a search space set and a CORESET. A search space set may comprise a set of PDCCH candidates formed by CCEs (e.g., at a given aggregation level). The configuration parameters may indicate at least one of: a number of PDCCH candidates to be monitored per aggregation level; a PDCCH monitoring periodicity and a PDCCH monitoring pattern; one or more DCI formats to be monitored by the wireless device; and/or whether a search space set is a common search space set or a wireless device-specific search space set (e.g., a UE-specific search space set). A set of CCEs in the common search space set may be predefined and known to the wireless device. A set of CCEs in the wireless device-specific search space set (e.g., the UE-specific search space set) may be configured, for example, based on the identity of the wireless device (e.g., C-RNTI).

As shown in FIG. 14B, the wireless device may determine a time-frequency resource for a CORESET based on one or more RRC messages. The wireless device may determine a CCE-to-REG mapping (e.g., interleaved or non-interleaved, and/or mapping parameters) for the CORESET, for example, based on configuration parameters of the CORESET. The wireless device may determine a number (e.g., at most 10) of search space sets configured on/for the CORESET, for example, based on the one or more RRC messages. The wireless device may monitor a set of PDCCH candidates according to configuration parameters of a search space set. The wireless device may monitor a set of PDCCH candidates in one or more CORESETs for detecting one or more DCIs. Monitoring may comprise decoding one or more PDCCH candidates of the set of the PDCCH candidates according to the monitored DCI formats. Monitoring may comprise decoding DCI content of one or more PDCCH candidates with possible (or configured) PDCCH locations, possible (or configured) PDCCH formats (e.g., the number of CCEs, the number of PDCCH candidates in common search spaces, and/or the number of PDCCH candidates in the wireless device-specific search spaces) and possible (or configured) DCI formats. The decoding may be referred to as blind decoding. The wireless device may determine DCI as valid for the wireless device, for example, after (e.g., based on or in response to) CRC checking (e.g., scrambled bits for CRC parity bits of the DCI matching an RNTI value). The wireless device may process information comprised in the DCI (e.g., a scheduling assignment, an uplink grant, power control, a slot format indication, a downlink preemption, and/or the like).

The wireless device may send/transmit uplink control signaling (e.g., UCI) to a base station. The uplink control signaling may comprise HARQ acknowledgements for received DL-SCH transport blocks. The wireless device may send/transmit the HARQ acknowledgements, for example, after (e.g., based on or in response to) receiving a DL-SCH transport block. Uplink control signaling may comprise CSI indicating a channel quality of a physical downlink channel. The wireless device may send/transmit the CSI to the base station. The base station, based on the received CSI, may determine transmission format parameters (e.g., comprising multi-antenna and beamforming schemes) for downlink transmission(s). Uplink control signaling may comprise scheduling requests (SR). The wireless device may send/transmit an SR indicating that uplink data is available for transmission to the base station. The wireless device may send/transmit UCI (e.g., HARQ acknowledgements (HARQ-ACK), CSI report, SR, and the like) via a PUCCH or a PUSCH. The wireless device may send/transmit the uplink control signaling via a PUCCH using one of several PUCCH formats.

There may be multiple PUCCH formats (e.g., five PUCCH formats). A wireless device may determine a PUCCH format, for example, based on a size of UCI (e.g., a quantity/number of uplink symbols of UCI transmission and a number of UCI bits). PUCCH format 0 may have a length of one or two OFDM symbols and may comprise two or fewer bits. The wireless device may send/transmit UCI via a PUCCH resource, for example, using PUCCH format 0 if the transmission is over/via one or two symbols and the quantity/number of HARQ-ACK information bits with positive or negative SR (HARQ-ACK/SR bits) is one or two. PUCCH format 1 may occupy a number of OFDM symbols (e.g., between four and fourteen OFDM symbols) and may comprise two or fewer bits. The wireless device may use PUCCH format 1, for example, if the transmission is over/via four or more symbols and the number of HARQ-ACK/SR bits is one or two. PUCCH format 2 may occupy one or two OFDM symbols and may comprise more than two bits. The wireless device may use PUCCH format 2, for example, if the transmission is over/via one or two symbols and the quantity/number of UCI bits is two or more. PUCCH format 3 may occupy a number of OFDM symbols (e.g., between four and fourteen OFDM symbols) and may comprise more than two bits. The wireless device may use PUCCH format 3, for example, if the transmission is four or more symbols, the quantity/number of UCI bits is two or more, and the PUCCH resource does not comprise an orthogonal cover code (OCC). PUCCH format 4 may occupy a number of OFDM symbols (e.g., between four and fourteen OFDM symbols) and may comprise more than two bits. The wireless device may use PUCCH format 4, for example, if the transmission is four or more symbols, the quantity/number of UCI bits is two or more, and the PUCCH resource comprises an OCC.

The base station may send/transmit configuration parameters to the wireless device for a plurality of PUCCH resource sets, for example, using an RRC message. The plurality of PUCCH resource sets (e.g., up to four sets in NR, or up to any other quantity of sets in other systems) may be configured on an uplink BWP of a cell. A PUCCH resource set may be configured with a PUCCH resource set index, a plurality of PUCCH resources with a PUCCH resource being identified by a PUCCH resource identifier (e.g., pucch-Resourceid), and/or a number (e.g. a maximum number) of UCI information bits the wireless device may send/transmit using one of the plurality of PUCCH resources in the PUCCH resource set. The wireless device may select one of the plurality of PUCCH resource sets, for example, based on a total bit length of the UCI information bits (e.g., HARQ-ACK, SR, and/or CSI) if configured with a plurality of PUCCH resource sets. The wireless device may select a first PUCCH resource set having a PUCCH resource set index equal to "0," for example, if the total bit length of UCI information bits is two or fewer. The wireless device may select a second PUCCH resource set having a PUCCH resource set index equal to "1," for example, if the total bit length of UCI information bits is greater than two and less than or equal to a first configured value. The wireless device may select a third PUCCH resource set having a PUCCH resource set index equal to "2," for example, if the total bit length of UCI information bits is greater than the first configured value and less than or equal to a second configured value. The wireless device may select a fourth PUCCH resource set having a PUCCH resource set index equal to "3," for example, if the total bit length of UCI information bits is greater than the second configured value and less than or equal to a third value (e.g., 1406, 1706, or any other quantity of bits).

The wireless device may determine a PUCCH resource from the PUCCH resource set for UCI (HARQ-ACK, CSI, and/or SR) transmission, for example, after determining a PUCCH resource set from a plurality of PUCCH resource sets. The wireless device may determine the PUCCH resource, for example, based on a PUCCH resource indicator in DCI (e.g., with DCI format 1_0 or DCI for 1_1) received on/via a PDCCH. An n-bit (e.g., a three-bit) PUCCH resource indicator in the DCI may indicate one of multiple (e.g., eight) PUCCH resources in the PUCCH resource set. The wireless device may send/transmit the UCI (HARQ-ACK, CSI and/or SR) using a PUCCH resource indicated by the PUCCH resource indicator in the DCI, for example, based on the PUCCH resource indicator.

Figure 15A:
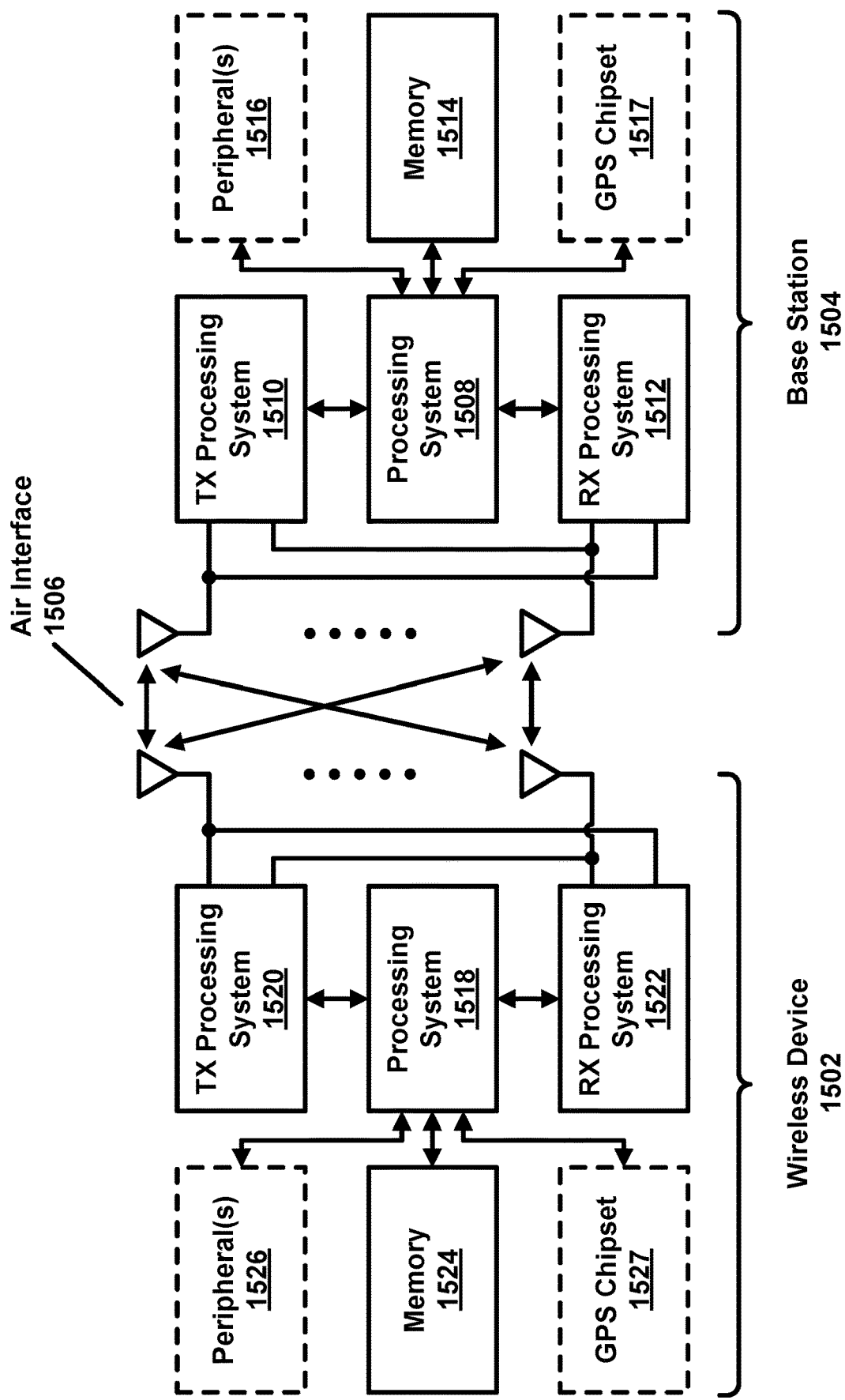
FIG. 15A shows an example of communications between a wireless device and a base station.

FIG. 15A shows an example communications between a wireless device and a base station. A wireless device 1502 and a base station 1504 may be part of a communication network, such as the communication network 100 shown in FIG. 1A, the communication network 150 shown in FIG. 1B, or any other communication network. A communication network may comprise more than one wireless device and/or more than one base station, with substantially the same or similar configurations as those shown in FIG. 15A.

The base station 1504 may connect the wireless device 1502 to a core network (not shown) via radio communications over the air interface (or radio interface) 1506. The communication direction from the base station 1504 to the wireless device 1502 over the air interface 1506 may be referred to as the downlink. The communication direction from the wireless device 1502 to the base station 1504 over the air interface may be referred to as the uplink. Downlink transmissions may be separated from uplink transmissions, for example, using various duplex schemes (e.g., FDD, TDD, and/or some combination of the duplexing techniques).

For the downlink, data to be sent to the wireless device 1502 from the base station 1504 may be provided/transferred/sent to the processing system 1508 of the base station 1504. The data may be provided/transferred/sent to the processing system 1508 by, for example, a core network. For the uplink, data to be sent to the base station 1504 from the wireless device 1502 may be provided/transferred/sent to the processing system 1518 of the wireless device 1502. The processing system 1508 and the processing system 1518 may implement layer 3 and layer 2 OSI functionality to process the data for transmission. Layer 2 may comprise an SDAP layer, a PDCP layer, an RLC layer, and a MAC layer, for example, described with respect to FIG. 2A, FIG. 2B, FIG. 3, and FIG. 4A. Layer 3 may comprise an RRC layer, for example, described with respect to FIG. 2B.

The data to be sent to the wireless device 1502 may be provided/transferred/sent to a transmission processing system 1510 of base station 1504, for example, after being processed by the processing system 1508. The data to be sent to base station 1504 may be provided/transferred/sent to a transmission processing system 1520 of the wireless device 1502, for example, after being processed by the processing system 1518. The transmission processing system 1510 and the transmission processing system 1520 may implement layer 1 OSI functionality. Layer 1 may comprise a PHY layer, for example, described with respect to FIG. 2A, FIG. 2B, FIG. 3, and FIG. 4A. For transmit processing, the PHY layer may perform, for example, forward error correction coding of transport channels, interleaving, rate matching, mapping of transport channels to physical channels, modulation of physical channel, multiple-input multiple-output (MIMO) or multi-antenna processing, and/or the like.

A reception processing system 1512 of the base station 1504 may receive the uplink transmission from the wireless device 1502. The reception processing system 1512 of the base station 1504 may comprise one or more TRPs. A reception processing system 1522 of the wireless device 1502 may receive the downlink transmission from the base station 1504. The reception processing system 1522 of the wireless device 1502 may comprise one or more antenna panels. The reception processing system 1512 and the reception processing system 1522 may implement layer 1 OSI functionality. Layer 1 may include a PHY layer, for example, described with respect to FIG. 2A, FIG. 2B, FIG. 3, and FIG. 4A. For receive processing, the PHY layer may perform, for example, error detection, forward error correction decoding, deinterleaving, demapping of transport channels to physical channels, demodulation of physical channels, MIMO or multi-antenna processing, and/or the like.

The base station 1504 may comprise multiple antennas (e.g., multiple antenna panels, multiple TRPs, etc.). The wireless device 1502 may comprise multiple antennas (e.g., multiple antenna panels, etc.). The multiple antennas may be used to perform one or more MIMO or multi-antenna techniques, such as spatial multiplexing (e.g., single-user MIMO or multi-user MIMO), transmit/receive diversity, and/or beamforming. The wireless device 1502 and/or the base station 1504 may have a single antenna.

The processing system 1508 and the processing system 1518 may be associated with a memory 1514 and a memory 1524, respectively. Memory 1514 and memory 1524 (e.g., one or more non-transitory computer readable mediums) may store computer program instructions or code that may be executed by the processing system 1508 and/or the processing system 1518, respectively, to carry out one or more of the functionalities (e.g., one or more functionalities described herein and other functionalities of general computers, processors, memories, and/or other peripherals). The transmission processing system 1510 and/or the reception processing system 1512 may be coupled to the memory 1514 and/or another memory (e.g., one or more non-transitory computer readable mediums) storing computer program instructions or code that may be executed to carry out one or more of their respective functionalities. The transmission processing system 1520 and/or the reception processing system 1522 may be coupled to the memory 1524 and/or another memory (e.g., one or more non-transitory computer readable mediums) storing computer program instructions or code that may be executed to carry out one or more of their respective functionalities.

The processing system 1508 and/or the processing system 1518 may comprise one or more controllers and/or one or more processors. The one or more controllers and/or one or more processors may comprise, for example, a general-purpose processor, a digital signal processor (DSP), a microcontroller, an application specific integrated circuit (ASIC), a field programmable gate array (FPGA) and/or other programmable logic device, discrete gate and/or transistor logic, discrete hardware components, an on-board unit, or any combination thereof. The processing system 1508 and/or the processing system 1518 may perform at least one of signal coding/processing, data processing, power control, input/output processing, and/or any other functionality that may enable the wireless device 1502 and/or the base station 1504 to operate in a wireless environment.

The processing system 1508 may be connected to one or more peripherals 1516. The processing system 1518 may be connected to one or more peripherals 1526. The one or more peripherals 1516 and the one or more peripherals 1526 may comprise software and/or hardware that provide features and/or functionalities, for example, a speaker, a microphone, a keypad, a display, a touchpad, a power source, a satellite transceiver, a universal serial bus (USB) port, a hands-free headset, a frequency modulated (FM) radio unit, a media player, an Internet browser, an electronic control unit (e.g., for a motor vehicle), and/or one or more sensors (e.g., an accelerometer, a gyroscope, a temperature sensor, a radar sensor, a lidar sensor, an ultrasonic sensor, a light sensor, a camera, and/or the like). The processing system 1508 and/or the processing system 1518 may receive input data (e.g., user input data) from, and/or provide output data (e.g., user output data) to, the one or more peripherals 1516 and/or the one or more peripherals 1526. The processing system 1518 in the wireless device 1502 may receive power from a power source and/or may be configured to distribute the power to the other components in the wireless device 1502. The power source may comprise one or more sources of power, for example, a battery, a solar cell, a fuel cell, or any combination thereof. The processing system 1508 may be connected to a Global Positioning System (GPS) chipset 1517. The processing system 1518 may be connected to a Global Positioning System (GPS) chipset 1527. The GPS chipset 1517 and the GPS chipset 1527 may be configured to determine and provide geographic location information of the wireless device 1502 and the base station 1504, respectively.

Figure 15B:
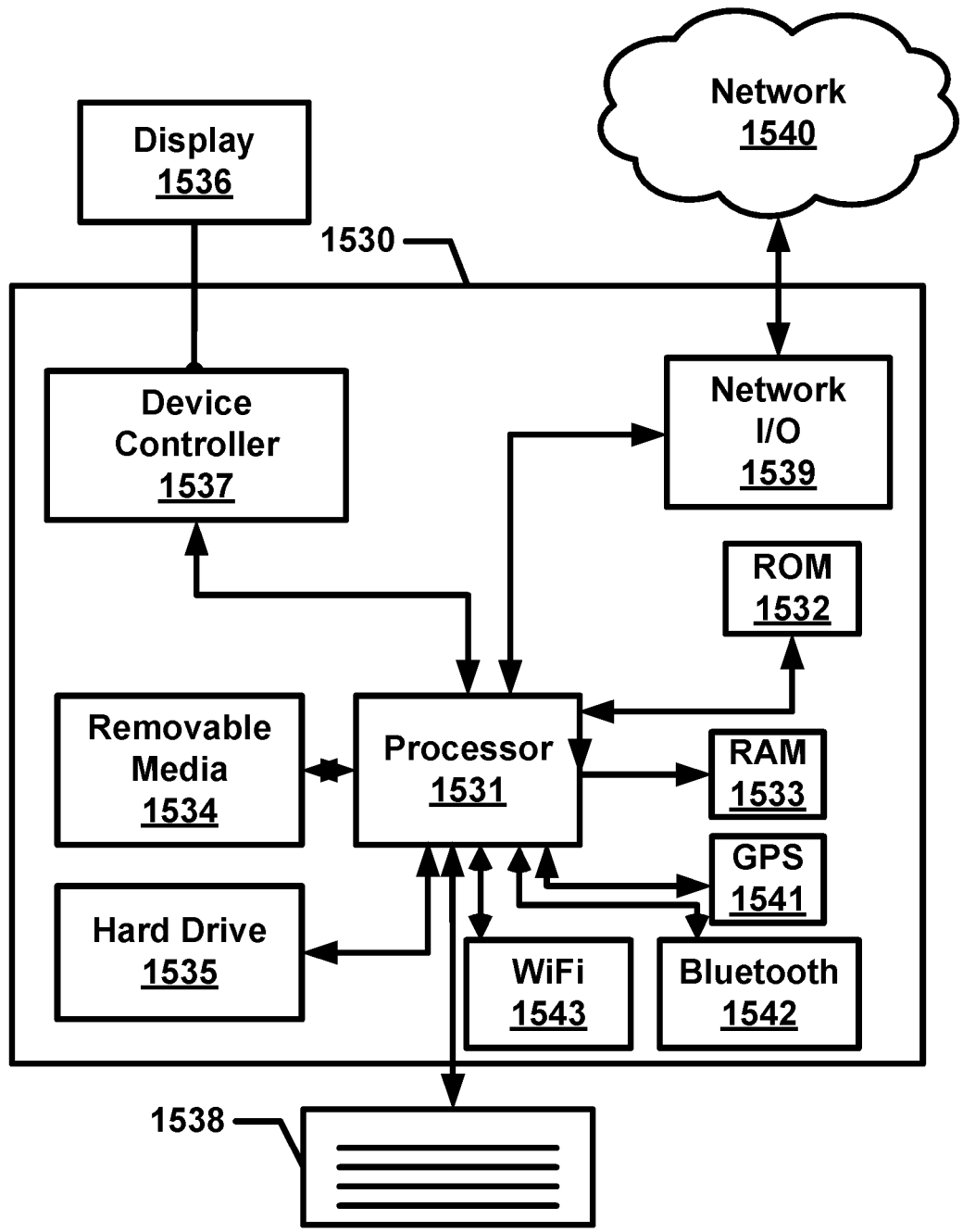
FIG. 15B shows example elements of a computing device that may be used to implement any of the various devices described herein.

FIG. 15B shows example elements of a computing device that may be used to implement any of the various devices described herein, including, for example, the base station 160A, 160B, 162A, 162B, 220, and/or 1504, the wireless device 106, 156A, 156B, 210, and/or 1502, or any other base station, wireless device, AMF, UPF, network device, or computing device described herein. The computing device 1530 may include one or more processors 1531, which may execute instructions stored in the random-access memory (RAM) 1533, the removable media 1534 (such as a Universal Serial Bus (USB) drive, compact disk (CD) or digital versatile disk (DVD), or floppy disk drive), or any other desired storage medium. Instructions may also be stored in an attached (or internal) hard drive 1535. The computing device 1530 may also include a security processor (not shown), which may execute instructions of one or more computer programs to monitor the processes executing on the processor 1531 and any process that requests access to any hardware and/or software components of the computing device 1530 (e.g., ROM 1532, RAM 1533, the removable media 1534, the hard drive 1535, the device controller 1537, a network interface 1539, a GPS 1541, a Bluetooth interface 1542, a WiFi interface 1543, etc.). The computing device 1530 may include one or more output devices, such as the display 1536 (e.g., a screen, a display device, a monitor, a television, etc.), and may include one or more output device controllers 1537, such as a video processor. There may also be one or more user input devices 1538, such as a remote control, keyboard, mouse, touch screen, microphone, etc. The computing device 1530 may also include one or more network interfaces, such as a network interface 1539, which may be a wired interface, a wireless interface, or a combination of the two. The network interface 1539 may provide an interface for the computing device 1530 to communicate with a network 1540 (e.g., a RAN, or any other network). The network interface 1539 may include a modem (e.g., a cable modem), and the external network 1540 may include communication links, an external network, an in-home network, a provider's wireless, coaxial, fiber, or hybrid fiber/coaxial distribution system (e.g., a DOCSIS network), or any other desired network. Additionally, the computing device 1530 may include a location-detecting device, such as a global positioning system (GPS) microprocessor 1541, which may be configured to receive and process global positioning signals and determine, with possible assistance from an external server and antenna, a geographic position of the computing device 1530.

The example in FIG. 15B may be a hardware configuration, although the components shown may be implemented as software as well. Modifications may be made to add, remove, combine, divide, etc. components of the computing device 1530 as desired. Additionally, the components may be implemented using basic computing devices and components, and the same components (e.g., processor 1531, ROM storage 1532, display 1536, etc.) may be used to implement any of the other computing devices and components described herein. For example, the various components described herein may be implemented using computing devices having components such as a processor executing computer-executable instructions stored on a computer-readable medium, as shown in FIG. 15B. Some or all of the entities described herein may be software based, and may co-exist in a common physical platform (e.g., a requesting entity may be a separate software process and program from a dependent entity, both of which may be executed as software on a common computing device).

FIG. 16A shows an example structure for uplink transmission. Processing of a baseband signal representing a physical uplink shared channel may comprise/perform one or more functions. The one or more functions may comprise at least one of: scrambling; modulation of scrambled bits to generate complex-valued symbols; mapping of the complex-valued modulation symbols onto one or several transmission layers; transform precoding to generate complex-valued symbols; precoding of the complex-valued symbols; mapping of precoded complex-valued symbols to resource elements; generation of complex-valued time-domain Single Carrier-Frequency Division Multiple Access (SC-FDMA), CP-OFDM signal for an antenna port, or any other signals; and/or the like. An SC-FDMA signal for uplink transmission may be generated, for example, if transform precoding is enabled. A CP-OFDM signal for uplink transmission may be generated, for example, if transform precoding is not enabled (e.g., as shown in FIG. 16A). These functions are examples and other mechanisms for uplink transmission may be implemented.

FIG. 16B shows an example structure for modulation and up-conversion of a baseband signal to a carrier frequency. The baseband signal may be a complex-valued SC-FDMA, CP-OFDM baseband signal (or any other baseband signals) for an antenna port and/or a complex-valued Physical Random Access Channel (PRACH) baseband signal. Filtering may be performed/employed, for example, prior to transmission.

FIG. 16C shows an example structure for downlink transmissions. Processing of a baseband signal representing a physical downlink channel may comprise/perform one or more functions. The one or more functions may comprise: scrambling of coded bits in a codeword to be sent/transmitted on/via a physical channel; modulation of scrambled bits to generate complex-valued modulation symbols; mapping of the complex-valued modulation symbols onto one or several transmission layers; precoding of the complex-valued modulation symbols on a layer for transmission on the antenna ports; mapping of complex-valued modulation symbols for an antenna port to resource elements; generation of complex-valued time-domain OFDM signal for an antenna port; and/or the like. These functions are examples and other mechanisms for downlink transmission may be implemented.

FIG. 16D shows an example structure for modulation and up-conversion of a baseband signal to a carrier frequency.

The baseband signal may be a complex-valued OFDM baseband signal for an antenna port or any other signal. Filtering may be performed/employed, for example, prior to transmission.

A wireless device may receive, from a base station, one or more messages (e.g. RRC messages) comprising configuration parameters of a plurality of cells (e.g., a primary cell, one or more secondary cells). The wireless device may communicate with at least one base station (e.g., two or more base stations in dual-connectivity) via the plurality of cells. The one or more messages (e.g. as a part of the configuration parameters) may comprise parameters of PHY, MAC, RLC, PCDP, SDAP, RRC layers for configuring the wireless device. The configuration parameters may comprise parameters for configuring PHY and MAC layer channels, bearers, etc. The configuration parameters may comprise parameters indicating values of timers for PHY, MAC, RLC, PCDP, SDAP, RRC layers, and/or communication channels.

A timer may begin running, for example, once it is started and continue running until it is stopped or until it expires. A timer may be started, for example, if it is not running or restarted if it is running A timer may be associated with a value (e.g., the timer may be started or restarted from a value or may be started from zero and expire if it reaches the value). The duration of a timer may not be updated, for example, until the timer is stopped or expires (e.g., due to BWP switching). A timer may be used to measure a time period/window for a process.

With respect to an implementation and/or procedure related to one or more timers or other parameters, it will be understood that there may be multiple ways to implement the one or more timers or other parameters. One or more of the multiple ways to implement a timer may be used to measure a time period/window for the procedure. A random access response window timer may be used for measuring a window of time for receiving a random access response. The time difference between two time stamps may be used, for example, instead of starting a random access response window timer and determine the expiration of the timer. A process for measuring a time window may be restarted, for example, if a timer is restarted. Other example implementations may be configured/provided to restart a measurement of a time window.

Wireless devices (e.g., UE, eNB, gNB) may communicate with each other directly via wireless communications, for example, device-to-device communications, vehicle-to-everything communications, vehicle-to-vehicle communications, vehicle-to-network communications, vehicle-to-roadside infrastructure communications, vehicle-to-pedestrian communications, and/or direct communications, with or without involving a base station as an intermediary. Wireless devices may exchange data without passing the data through a base station in a wireless communications scheme, for example, a direct wireless device-to-wireless device (e.g., UE-to-UE) communication scheme. Communications between wireless devices that establish a direct communication link (e.g., a sidelink) between each other may have reduced latency and/or may utilize fewer radio resources compared to communications established via a central base station.

Figure 17B:
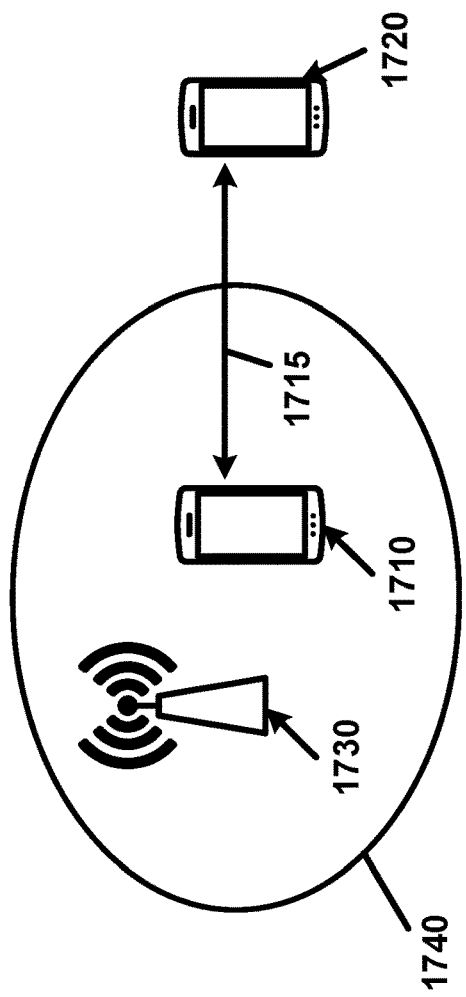
FIG. 17B shows an example of wireless communications between wireless devices with a wireless device having access to a base station of a wireless network.
Figure 17D:
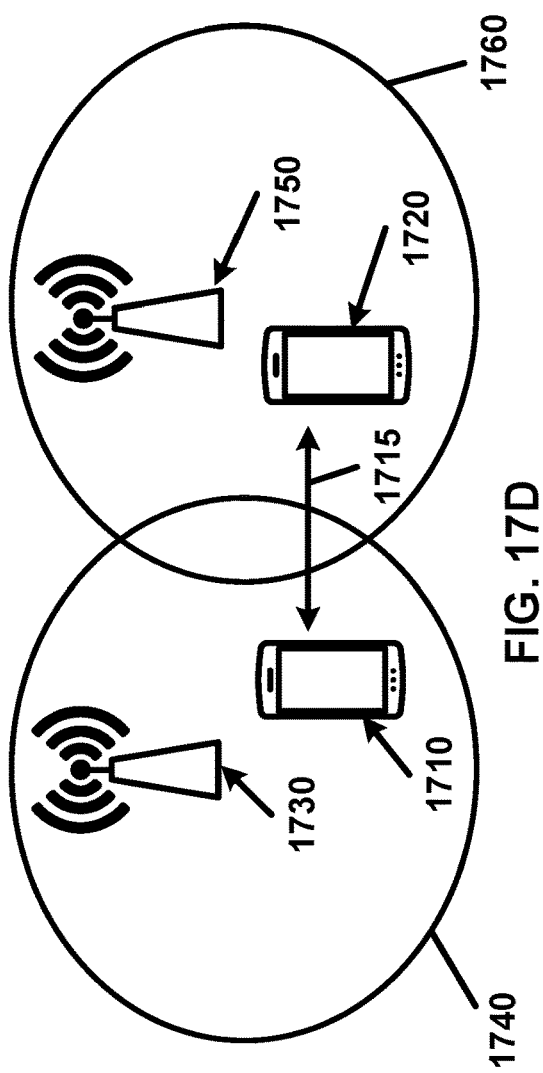
FIG. 17D shows an example of inter-cell wireless communications between wireless devices having accesses to different base stations of a wireless network.
Figure 17A:
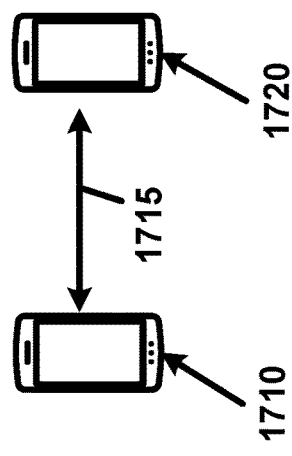
FIG. 17A shows an example of wireless communications between wireless devices.
Figure 17C:
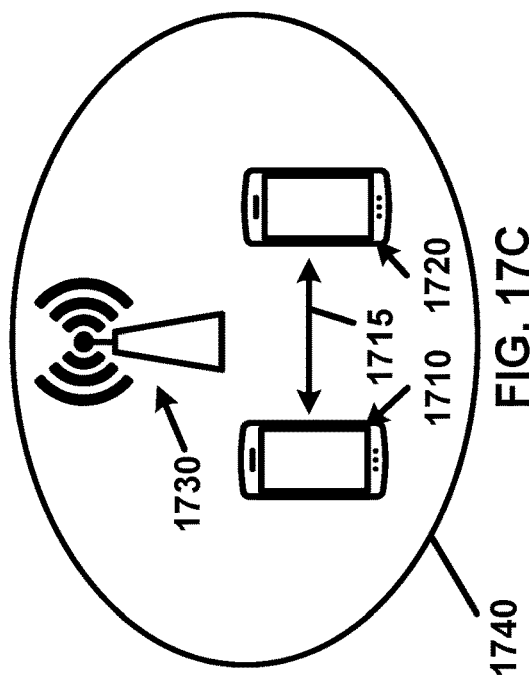
FIG. 17C shows an example of intra-cell wireless communications between wireless devices having access to a same base station of a wireless network.

FIGS. 17A-17D show examples of wireless communications between wireless devices 1710 and 1720. Referring to FIG. 17A, wireless device 1710 and wireless device 1720 may perform wireless communications 1715 if located outside of range of a wireless network cell coverage provided by, for example, a base station or TRP. Referring to FIG. 17B, wireless device 1710 and wireless device 1720 may perform wireless communications 1715 if the wireless device 1710 is located within range of a wireless network cell coverage 1740 provided by, for example, a base station or TRP 1730, and the wireless device 1720 is located outside of range of the wireless network cell coverage 1740. Referring to FIG. 17C, wireless device 1710 and wireless device 1720 may perform intra-cell wireless communications 1715 if located within range of the same wireless network cell coverage 1740 provided by, for example, a base station or TRP 1730. Referring to FIG. 17D, wireless device 1710 and wireless device 1720 may perform inter-cell wireless communications 1715 if the wireless device 1710 is located within a first wireless network cell coverage 1740 provided by, for example, a first base station or TRP 1730, and the wireless device 1720 is located within a second wireless network cell coverage 1760 provided by, for example, a second base station or TRP 1750.

A wireless device (e.g., the wireless device 1710, 1720) may send (e.g., transmit) a wireless communications signal via a sidelink to perform one or more of discovery or communications. The wireless device 1710, 1720 may send the wireless communications signal to discover (e.g., determine) at least one other wireless device 1720, 1710 adjacent (e.g., closer than a base station 1730, 1750) to the wireless device 1710, 1720. The wireless device 1710, 1720 may send (e.g., transmit) and/or receive a wireless communications signal via a physical sidelink discovery channel (PSDCH) to perform discovery of one or more other wireless devices. The wireless device 1710, 1720 may send (e.g., transmit) the wireless communications signal to send general data (e.g., voice data, image data, video data, safety information, etc.) directly to at least one other wireless device 1720, 1710. A physical sidelink broadcast channel (PSBCH), a physical sidelink shared channel (PSSCH), a physical sidelink control channel (PSCCH), or the like may send (e.g., transmitting) and/or receive a wireless communications signal between wireless devices.

Figure 18A:
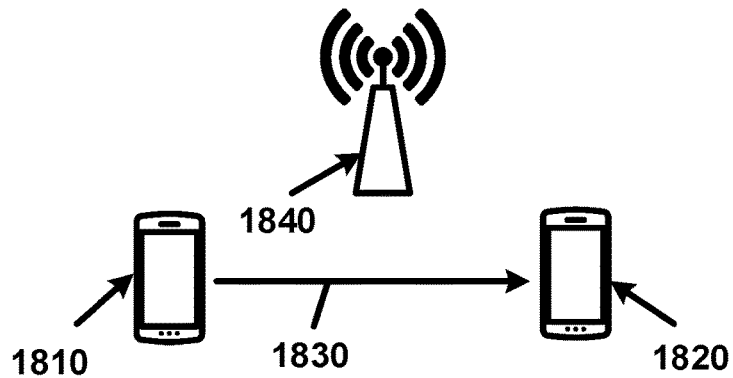
FIG. 18A shows an example of wireless communications between wireless devices having access to a base station of a wireless network.
Figure 18B:
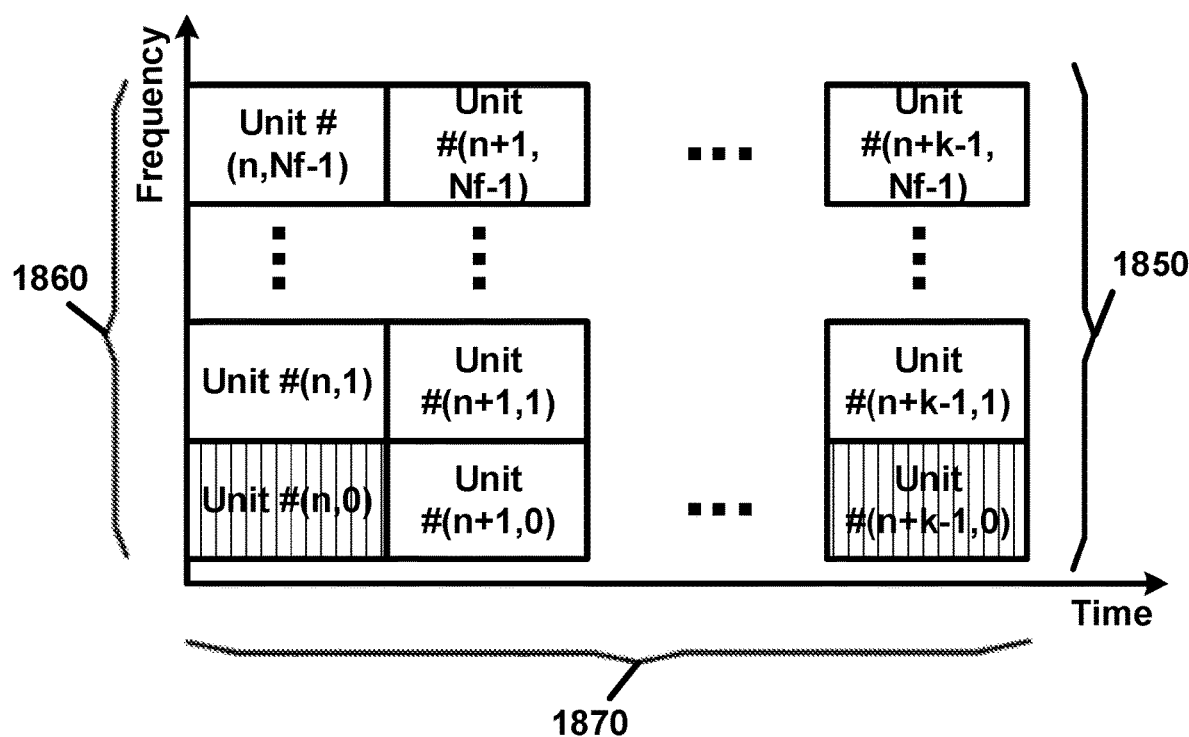
FIG. 18B shows an example of a resource pool for performing wireless communications.

FIG. 18A and FIG. 18B show examples of wireless communications. FIG. 18A shows an example of wireless communications between wireless devices having access to a base station of a wireless network. A wireless device 1810 may perform wireless communications with a wireless device 1820 by sending (e.g., transmitting) a wireless communications signal 1830 directly to the wireless device 1820. FIG. 18B shows an example of a resource pool 1850 for performing wireless communications. The resource pool 1850 may comprise radio resource units associated with the wireless devices 1810 and 1820 performing wireless communications. The wireless devices 1810 and 1820 may comprise a wireless terminal, access point (AP), or base station that sends (e.g., transmits) and/or receives a wireless signal for wireless communications. The wireless device 1810 may designate one or more radio resource unit(s) #(n . . . n+k−1, 0 . . . Nf−1) comprised by the resource pool 1850. The wireless device 1810 may send (e.g., transmit) the wireless communications signal 1830 based on or configured according to the designated one or more radio resource unit(s) #(n . . . n+k−1, 0 . . . Nf−1). The wireless device 1820 may receive a designation of one or more radio resource unit(s) #(n . . . n+k−1, 0 . . . Nf−1) comprised by the resource pool 1850 via which the wireless device 1810 may send (e.g., transmit) and the wireless device 1820 may receive the wireless communications signal 1830.

The base station 1840 may send (e.g., transmit) information regarding the resource pool 1850 to the wireless device 1810, for example, if the wireless device 1810 is located inside of a cell of network coverage provided by the base station 1840. The wireless device 1810 may receive the information regarding the resource pool 1850 from the wireless device 1820, for example, if the wireless device 1810 is located outside of a cell of network coverage provided by the base station 1840. The wireless device 1810 may access internally stored pre-configured information regarding the resource pool 1850, for example, if the wireless device 1810 is located outside of a cell of network coverage provided by any base station.

The resource pool 1850 may comprise a plurality of radio resource units #(n . . . n+k−1, 0 . . . Nf−1) indexed according to time slots (e.g., x axis) and frequency band slots (e.g., y axis). A radio resource unit may comprise one or more resource blocks (e.g., a frequency band slot, a subframe, K OFDM symbols) and a time duration. The wireless device 1810 may designate one or more radio resource unit(s) from a plurality of the radio resource units #(n . . . n+k−1, 0 . . . Nf−1) comprised by the resource pool 1850 and may send (e.g., transmit) a wireless communications signal 1830 according to the designated radio resource unit(s) for wireless communications with the wireless device 1820. A frequency band 1860 may be divided into a plurality of Nf frequency resource blocks. Each of the plurality of radio resource units #(n . . . n+k−1, 0 . . . Nf−1) may designate one (or more) of the Nf frequency resource blocks of the frequency band 1860. A time period 1870 may be divided into a plurality of k time resource blocks (e.g., time slot). Each of the plurality of radio resource units #(n . . . n+k−1, 0 . . . Nf−1) may designate one (or more) of the Nf frequency resource blocks of the frequency band 1860. The resource pool 1850 may be temporally repeated with a period of k time resource blocks. The resource pool 1850 may comprise a frequency band within a bandwidth part (BWP) for wireless communications or sidelink communications (e.g., a SL BWP). The given radio resource units #(n . . . n+k−1, 0 . . . Nf−1) may periodically and/or repeatedly appear over time. An index of a radio resource unit to which a logical resource unit is mapped may change with a predetermined pattern according to a value of time to generate a diversity gain in the time domain and/or the frequency domain. The resource pool 1850 may correspond to a set of radio resource units that the wireless devices 1810, 1820 may utilize for sending (e.g., transmitting) and/or receiving wireless communications signals 1830.

The resource pool 1850 may be classified according to contents of a wireless communications signal 1830 sent/transmitted via the resource pool 1850. A plurality of wireless communications signals 1830 may be classified according to information content to be sent via the respective wireless communications signals 1830, and a separate resource pool 1850 may be allocated for each of the classifications of the wireless communications signals 1830. The resource pool 1850 may be allocated based on information content of the corresponding wireless communications signal 1830. The information contents of the wireless communications signal 1830 may include a control channel, a data channel, and/or a discovery channel. The control channel may correspond to a wireless communications signal 1830 that may comprise information indicating/specifying a radio resource position of a data channel, information indicating/specifying an MCS for modulating and demodulating a data channel, information indicating/specifying a MIMO transmission scheme, information specifying packet priority, information indicating/specifying target coverage, information specifying QoS requirements, or the like. The control channel may be multiplexed with and sent (e.g., transmitted) on a same radio resource unit as a data channel A control and data channel resource pool may correspond to a resource pool 1850 via which control information and data information are multiplexed and sent (e.g., transmitted). The control channel may comprise a physical sidelink control channel (PSCCH). The data channel may comprise a physical sidelink shared channel (PSSCH) corresponding to a resource pool 1850 via which the wireless device 1810 sends (e.g., transmits) user data to the wireless device 1820. A data channel excluding control information may be sent (e.g., transmitted) in a resource pool 1850 dedicated to the data channel, for example, if control information and data information are multiplexed in a same radio resource unit and sent (e.g., transmitted). The wireless devices 1810 and 1820 may send (e.g., transmit) control information in a designated resource unit of a control resource pool and data information in a data resource pool via the same resource elements (REs). The wireless device 1810 may send (e.g., transmit) one or more messages via a discovery channel corresponding to a resource pool 1850 dedicated to the discovery channel to facilitate neighboring wireless devices, for example, the wireless device 1820, to discover the wireless device 1810 sending (e.g., transmitting) information such as identification (ID) information pertaining to the wireless device 1810 and/or the like.

The resource pool 1850 may be classified according to QoS level and/or associated service. The base station 1840 may designate a priority level for each resource pool 1850. The resource pool 1850 may be configured differently for different associated services. A specific resource pool 1850 may be configured for use by only specific unicast or groupcast wireless devices. Different resource pools 1850 may be designated for different wireless communications signals 1830, for example, based on one or more transmission/reception attributes of the wireless communications signals 1830. Different resource pools 1850 may be designated for different wireless communications signals 1830, for example, regardless of whether or not information contents of the wireless communications signals 1830 are identical to each other.

Different instances of a same data channel or a same discovery signal/message may be associated with differently classified resource pools 1850. The resource pool 1850 may be classified according to contents of a data channel or a discovery signal/message based on a transmission timing determination scheme of a wireless communications signal 1830 (e.g., whether the wireless communications signal 1830 is sent (e.g., transmitted) at a time based on a time of receiving a synchronization reference signal, for example, at the time of receiving the synchronization reference signal or a different time based on the addition of a timing advance value). The resource pool 1850 may be classified according to contents of a data channel or a discovery signal/message based on a resource allocation scheme (e.g., whether a base station designates a transmission resource of an individual wireless communications signal 1830 or a wireless device designates the transmission resource of the individual wireless communications signal 1830 from a resource pool 1850). The resource pool 1850 may be classified according to contents of a data channel or a discovery signal/message based on a signal format of a wireless communications signal 1830 (e.g., a number of symbols occupied by a wireless communications signal 1830 in a subframe, or a number of subframes used for sending (e.g., transmitting) a wireless communications signal 1830). The resource pool 1850 may be classified according to contents of a data channel or a discovery signal/message based on signal strength from a base station (e.g., the base station 1840), transmit power level of a wireless device (e.g., wireless device 1810) sending (e.g., transmitting) the wireless communications signal 1830, and/or the like.

Transmission resource designation methods may be categorized as different modes and/or types. A base station (e.g., base station 1840) may designate (e.g., directly designate) a transmission resource to be used by a wireless device (e.g., the wireless device 1810) for sending (e.g., transmitting) a wireless communications signal using a mode 1. The base station (e.g., eNB, gNB, etc.) may send (e.g., transmit) DCI to schedule a transmission of a wireless communications signal 1830 according to mode 1. A wireless device (e.g., wireless device 1810) may directly designate a transmission resource from a pre-configured transmission resource region or resource pool 1850 or from a transmission resource region or resource pool 1850 designated by a base station (e.g., base station 1840) using a mode 2. A base station (e.g., base station 1840) may designate (e.g., directly designate) a transmission resource to be used by a wireless device (e.g., the wireless device 1810) for performing a Type 2 discovery. A wireless device (e.g., wireless device 1810) may designate (e.g., directly designate) a transmission resource from a pre-configured transmission resource region or resource pool 1850 or from a transmission resource region or resource pool 1850 designated by a base station (e.g., base station 1840) for performing a Type 1 discovery.

The wireless device 1810 and the wireless device 1820 may perform time synchronization and/or frequency synchronization with one another, for example, to perform wireless communications with one another. The base station 1840 may synchronize the time and frequency references of the wireless devices 1810 and 1820 (e.g., by PSSs/SSSs of a cell provided by the base station 1840, other reference signals (e.g., CSI-RSs), and/or the like sent/transmitted by the base station 1840), if the wireless devices 1810 and 1820 both are located within the network coverage of the cell. The wireless devices 1810 and 1820 may maintain time/frequency synchronization in a level that the wireless devices 1810 and 1820 are capable of directly sending (e.g., transmitting) and receiving a signal. The wireless device 1810 may send (e.g., transmit) a synchronization signal (e.g., a sidelink synchronization signal (SLSS)) and the wireless device 1820 may receive and synchronize with the synchronization signal. The SLSS may comprise a sidelink primary synchronization signal (S-PSS) and/or a sidelink secondary synchronization signal (S-SSS). The wireless device 1810 may send (e.g., transmit) the SLSS with a physical sidelink broadcast channel (PSBCH) to convey some basic or initial system information. The wireless devices 1810, 1820 may synchronize or derive a timing of transmission time intervals (e.g., frames, subframes, slots, and/or the like) using global navigation satellite system (GNSS) timing. S-PSS, S-SSS and PSBCH may be structured in a block format (e.g., sidelink synchronization signal block (S-SSB)) and may support periodic transmission. The S-SSB may use a same numerology (e.g., SCS and CP length) as a sidelink data channel and a sidelink control channel in a carrier. The S-SSB's transmission bandwidth may be within the pre-configured sidelink BWP. The S-SSB's frequency location may be pre-configured. The wireless device (e.g., the wireless device 1810) may forego performing hypothesis detection in frequency to find S-SSB in a carrier, if the S-SSB's frequency location is pre-configured. Sidelink synchronization sources may include GNSS, gNB, eNB, and/or NR UE. Each sidelink synchronization source may be associated with a synchronization priority level A priority order of the sidelink synchronization sources and/or synchronization priority levels may be pre-configured.

Each of a plurality of neighboring wireless devices 1810, 1820 may designate one or more subchannels of a resource pool 1850 for sending (e.g., transmitting) a wireless communications signal 1830. A frequency bandwidth of the resource pool 1850 may be divided into multiple subchannels. A wireless device 1810, 1820 may designate a subchannel, for example, based on received energy measurements and/or control channel decoding. A wireless device 1810, 1820 may determine a subchannel that another wireless device 1810, 1820 is designating for use, for example, based on control channel decoding and/or an energy measurement for each subchannel. In-band emissions (IBEs) may effectively impose a limit on system performance. An in-band emission may comprise interference caused by one transmitter transmitting on one subchannel and imposed on another transmitter transmitting to a receiver on another subchannel.

Figure 19:
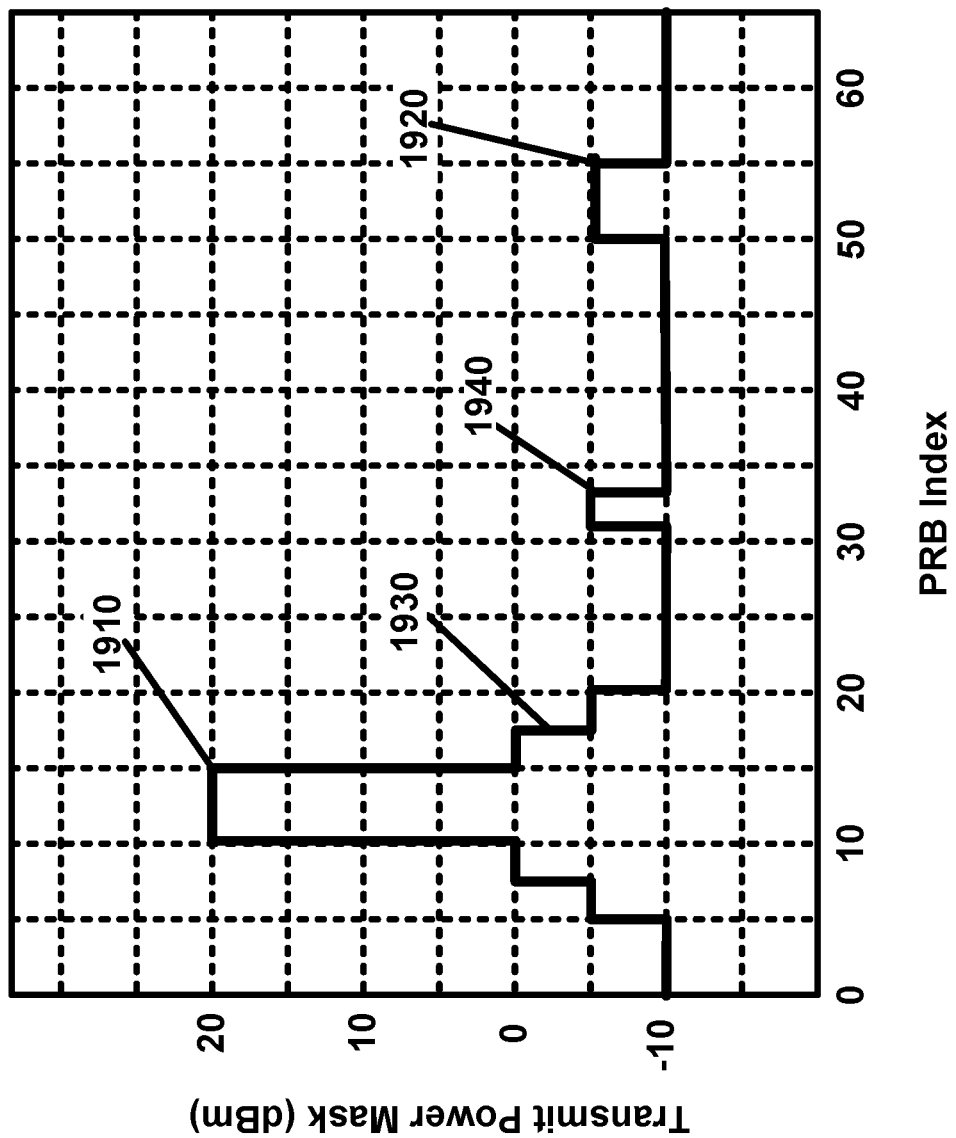
FIG. 19 shows an example of an in-band emissions (IBE) model.

FIG. 19 shows an example of an in-band emissions (IBE) model. Subchannels nearby to a desired transmitted signal 1910, as well as other subchannels (e.g., I/Q image subchannels 1920) may experience more interference, as shown in FIG. 19. General in-band emissions 1930 tend to be stronger close in frequency to the desired transmitted signal 1910. Carrier leakage 1940 tends to be generated around a direct current or direct conversion (DC) subcarrier. The I/Q image subchannels 1920 may be located in symmetrical subchannels of the desired transmitted signal around the DC subcarrier.

A wireless device 1810 radiating power in association with performing wireless communications within a cell of a wireless network provided by a base station 1840 may cause serious interference to the cellular communications of the cell. If the wireless device 1810 performing wireless communications uses only some frequency resources in a particular slot or subframe, the in-band emission of the power radiated by the wireless device 1810 may cause serious interference to the frequency resources used by the cellular communications network. The wireless device 1810 performing wireless communications may perform cellular pathloss-based power control to prevent excess interference that causes these problems. The base station 1840 may configure parameters used for power control (e.g., target power level (P0) and/or pathloss scaling factor (alpha)).

A wireless device 1810 that sends (e.g., transmits) a wireless communications signal 1830 may correspond to a half-duplex wireless device, which may not be capable of receiving a signal at a same time of sending a signal (e.g., performing transmission). The wireless device 1810 may fail to receive a signal sent (e.g., transmitted) by another wireless device 1820 due to the half-duplex problem. Different wireless devices 1810, 1820 performing wireless communications may send (e.g., transmit) signals via one or more different time resources to mitigate the half-duplex problem.

Direct wireless communications between wireless devices in proximity to each other (e.g., closer to each other than the wireless devices are to a base station or sufficiently close to each other for the wireless devices to establish a reliable communication link with each other) may have various advantages. For example, the wireless devices participating in direct wireless communications with each other may have a high data transfer rate with low latency for data communications. Wireless devices performing wireless communications between each other in a wireless network cell may reduce network traffic concentration on a base station of the cell, for example, by distributing network traffic among direct connections between wireless devices in the cell. A wireless device, in a cell of a wireless network, performing wireless communications with another wireless device outside the cell, may perform a communications relay role and thereby effectively extend the communications reach and/or cell coverage of a base station that provides the cell's network communications.

Figure 20:
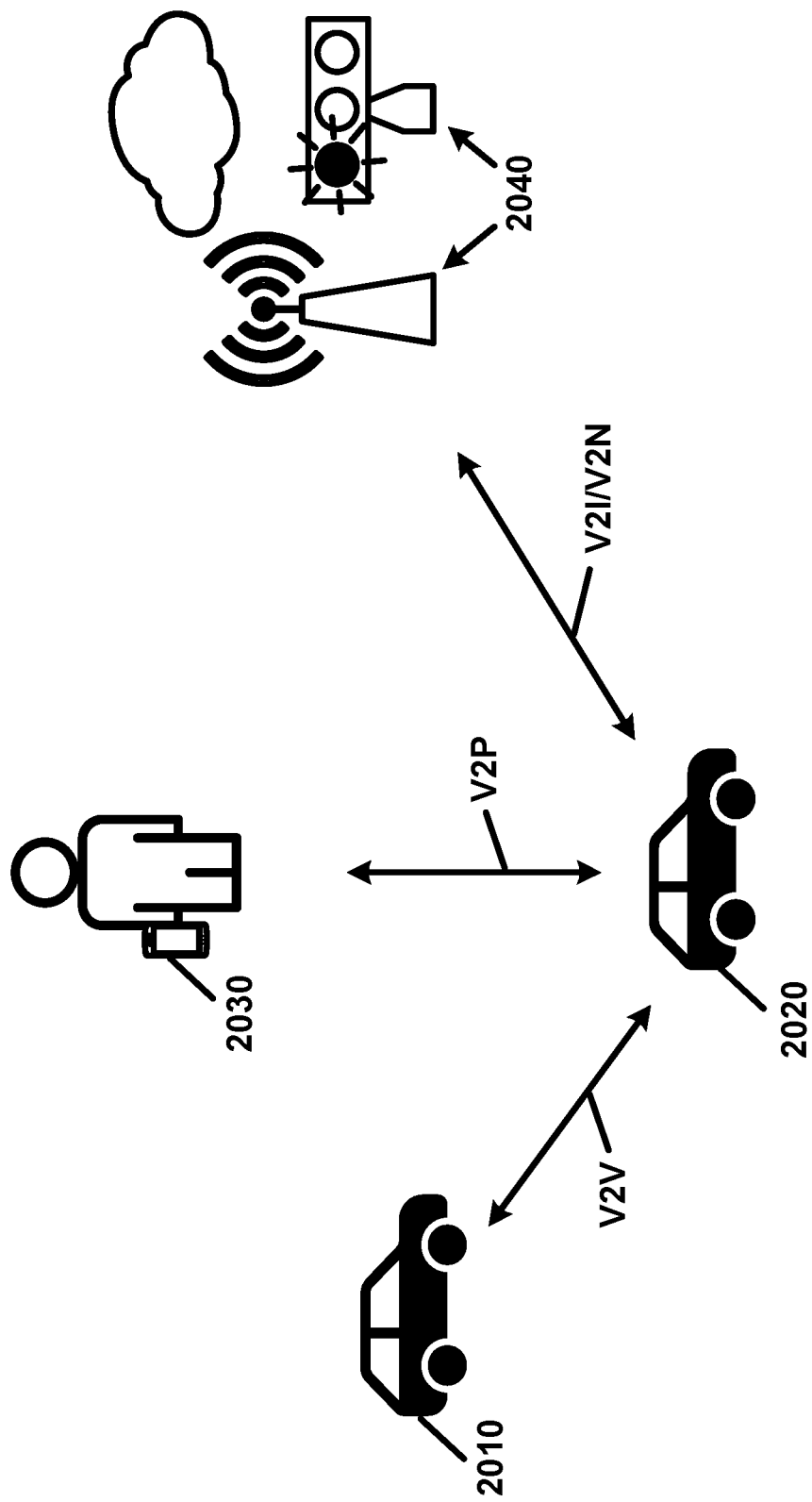
FIG. 20 shows an example of wireless communications between various vehicles and devices.

FIG. 20 shows an example of wireless communications between various vehicles and wireless devices. At least one automotive vehicle 2010, 2020 may apply the wireless communications methods described herein for sending and/or receiving communications signals and messages to and/or from an automotive vehicle (e.g., vehicle-to-everything (V2X) communications). V2X communications may include wireless communications between a vehicle and another vehicle, for example, vehicle-to-vehicle (V2V) wireless communications. V2X communications may include wireless communications between a vehicle and a portable wireless device 2030 carried by an individual (e.g., handheld wireless terminal carried by a pedestrian, cyclist, driver, or passenger), for example, vehicle-to-pedestrian (V2P) wireless communications. V2X communications may include wireless communications between a vehicle and an infrastructure/network and/or roadside unit (RSU)/network 2040 (e.g., traffic light and/or signal), for example, vehicle-to-infrastructure/network (V2I/N) wireless communications. An RSU 2040 may include a transportation infrastructure entity implemented in a base station or a stationary 20 wireless device proximate a road or highway. The RSU may comprise, for example, an entity sending (e.g., transmitting) speed notifications to vehicles and/or wireless devices in the vicinity of a road or highway. A vehicle, an RSU, a stationary wireless device, and/or a portable wireless device may comprise a transceiver configured to perform V2X communications.

A vehicle 2010, 2020, a portable wireless device 2030, and/or an RSU 2040 may perform V2X communications to indicate warnings for various safety-related events and the like. The vehicle 2010 may perform V2X communications to send information regarding an event occurring on the vehicle 2010 or road via which the vehicle 2010 is traveling to another vehicle 2020, the RSU 2040, and/or a pedestrian's portable wireless device 2030. The information regarding the event may comprise a warning of a traffic accident on the road, a change of a road situation, and/or occurrence of an accident involving the vehicle 2010. The vehicle 2010 may perform V2X communications to send information regarding the event to a pedestrian adjacent to or crossing a road via the pedestrian's portable wireless device 2030, for example, as the vehicle 2010 approaches the pedestrian.

At least one vehicle 2010, 2020, portable wireless device 2030, and/or RSU 2040 may be configured for performing V2X communications, for example, to prevent and/or reduce vehicle collisions and/or improve communications quality of service in geographic locations having a high density of wireless devices 2030, for example, in city downtowns. At least one vehicle 2010, 2020, portable wireless device 2030, and/or RSU 2040 may be configured for performing wireless congestion control, for example, in conjunction with V2X communications, to mitigate collisions by adjusting one or more communications parameters to control a congestion level on the wireless channel(s) used by the at least one vehicle 2010, 2020 and improve reliability of V2X communications.

In some types of wireless communications, a wireless device may measure a channel busy ratio (CBR) and/or a channel occupancy ratio (CR). The wireless device may measure the CBR and/or CR, for example, to determine (e.g., characterize) the channel state, and/or allow/facilitate the wireless device to determine and/or take corrective actions. The CBR may be determined based on a portion (or quantity) of subchannels in a radio resource pool having measured received signal strength indicators (RSSIs) exceeding a threshold (e.g., a configured threshold, or a pre-configured threshold such as may be pre-configured by a base station). The total frequency resources of the radio resource pool may be divided into a quantity (e.g., a given number) of subchannels. The CBR may be sensed over, for example, the last 100 subframes (e.g., with subframes determined according to LTE or other standard or access technology), or any other duration or period (e.g., slots determined based on NR or any other access technology). The CBR may determine an estimate of a state of the channel. The CR may be determined at subframe n as a sum of the total number/quantity of subchannels used for sidelink transmissions in subframes ([n−a, n−1] subchannels) and granted in subframes ([n, n+b] subchannels), divided by a total number of subchannels ([n−a, n+b] subchannels). Values for the variables a and b may be determined by the wireless device based on the conditions a+b+1=1000, a≥500. The CR may provide an indication of the channel utilization by the transmitter of the wireless device. A wireless device's CR limit, for each interval of CBR values, may represent a maximum footprint for the transmitter of the wireless device. A base station may establish the CR limit based on a CBR range and packet priority. The base station may establish a low CR limit, for example, if a high CBR is observed. The base station may establish a low CR limit, for example, based on a low packet priority level. The base station may map its CBR value to the correct interval to determine the corresponding CR limit value, for example, if transmitting a data packet. The wireless device may decrease its CR below the CR limit, for example, if the wireless device's CR is higher/greater than the CR limit. Various methods may be practiced to reduce the CR, for example. A base station may disable packet retransmission, for example, via a drop packet retransmission procedure. A base station may disable packet transmission and retransmission, for example, via a drop packet transmission procedure. A wireless device may reduce CR by augmenting the utilized MCS index, for example, via a procedure for adapting the MCS. The wireless device adapting the MCS may reduce the quantity of subchannels used for transmission. The wireless device increasing the MCS may reduce robustness of the message that the wireless device sends, and may consequently reduce a range of the message. A wireless device may reduce transmission power, for example, via a procedure for adapting the transmission power. The wireless device reducing transmission power may reduce overall CBR in the area, and may increase the value of the CR limit.

A PMI (e.g., a preferred PMI) may or may not be indicated by a receiver wireless device, for example, in open-loop MIMO. A cyclic delay diversity (CDD) may be used/considered to enhance decoding performance. CDD may comprise using a different time delay, from a set of delays, for sending/transmitting signals via a corresponding antenna in a set of antennas. A time delay may be applied before a cyclic prefix (CP) is added. Applying the delay before adding the cyclic prefix may enable the delay to be cyclic over the FFT size. Applying a time delay may correspond to (e.g., may be equivalent to/identical to) applying a phase shift in frequency domain A same time delay may be applied to all subcarriers. The phase shift may increase linearly across the subcarriers with increasing subcarrier frequency as the same time delay may be applied to all subcarriers. Each subcarrier may correspond to a different beamforming pattern as a non-delayed subcarrier from one antenna may interfere constructively (or destructively) with a delayed version from other antenna(s). Different subcarriers may pick out different spatial paths in a propagation channel, which may increase frequency-selectivity of the channel Channel coding, may be applied to a whole transport block across the subcarriers. The channel coding ensures that the whole transport block may benefit from the diversity of spatial paths.

Figure 21:
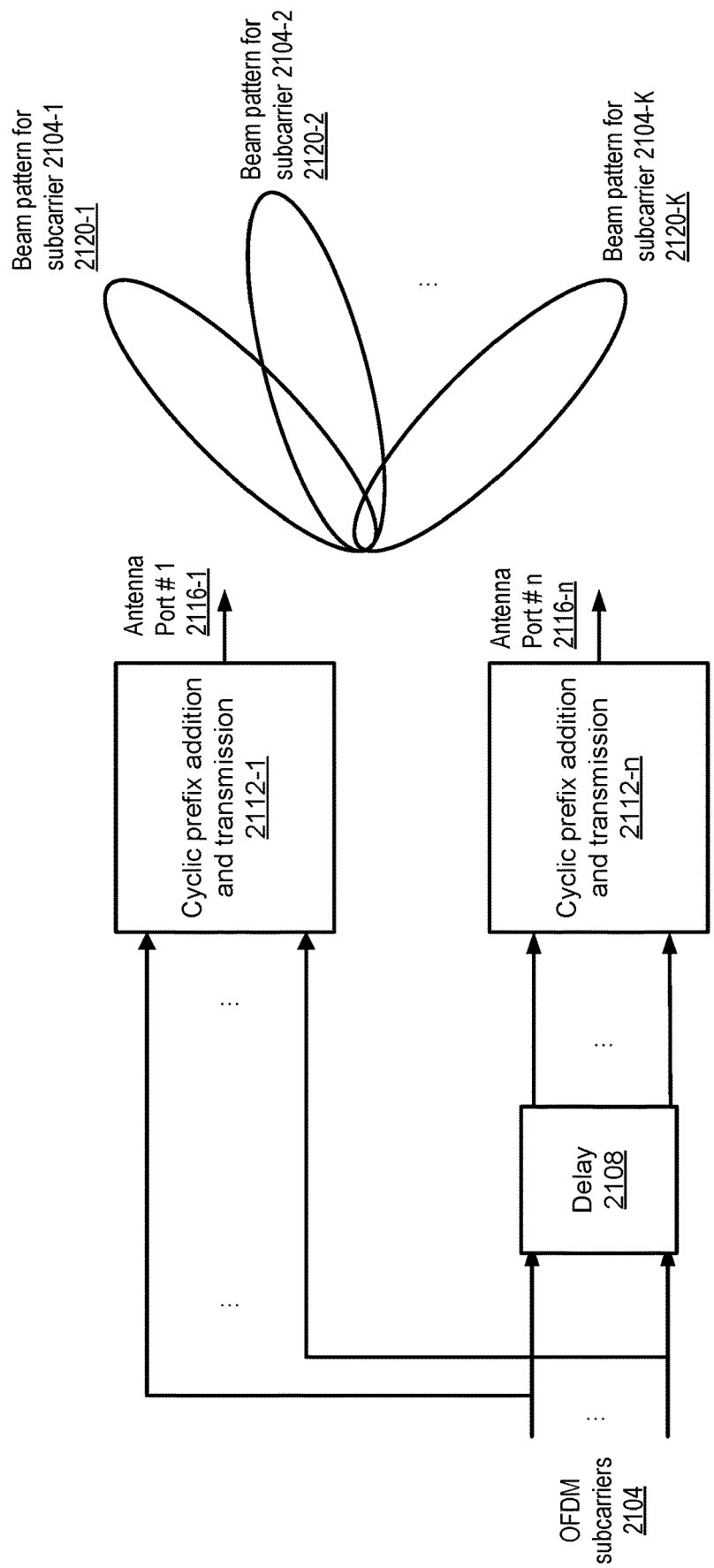
FIG. 21 shows example wireless communication using cyclic delay diversity (CDD).

FIG. 21 shows example communication using CDD. A wireless device may comprise n antenna ports 2116-1 . . . 2116-n. Sending/transmission of a signal via an antenna port 2116 may comprise addition of a cyclic prefix at block 2112. A time delay 2108 may be applied to OFDM subcarriers 2104, prior to addition of the cyclic prefix. Different time delays may be used for different antenna ports 2116. Addition of different time delays for transmissions via different antenna ports 2116 may result in each OFDM subcarrier (of the OFDM subcarriers 2104) having a different beam pattern 2120. For example, subcarrier 2104-1 (of the OFDM subcarriers 2104) may have a beam pattern 2120-1, subcarrier 2104-2 (of the OFDM subcarriers 2104) may have a beam pattern 2120-2, etc.

Adding a time delay before the adding the cyclic prefix may allow a use of any time delay value without increasing the overall delay spread of the channel. An additional RS may be transmitted for channel estimation of a delayed version of the channel, for example, if the time delay value is greater than a length (e.g., duration) of the cyclic prefix. A CDD scheme that uses a delay shorter than the cyclic prefix length may be referred to as a small delay CDD (SD-CDD), and a CDD scheme that requires an additional RS with a delay larger than the cyclic prefix length is called a large delay CDD (LD-CDD).

FIGS. 22A-22D shows example resource configurations for control channels and data channels. An example resource configuration may correspond to division of resources in a resource pool (e.g., the resource pool 1850) between a control channel and a data channel. The resource pool may correspond to resources used for sidelink communications (e.g., a sidelink channel) between two wireless devices. For example, the control channel may comprise a PSCCH and the data channel may comprise a PSSCH.

Figure 22A:
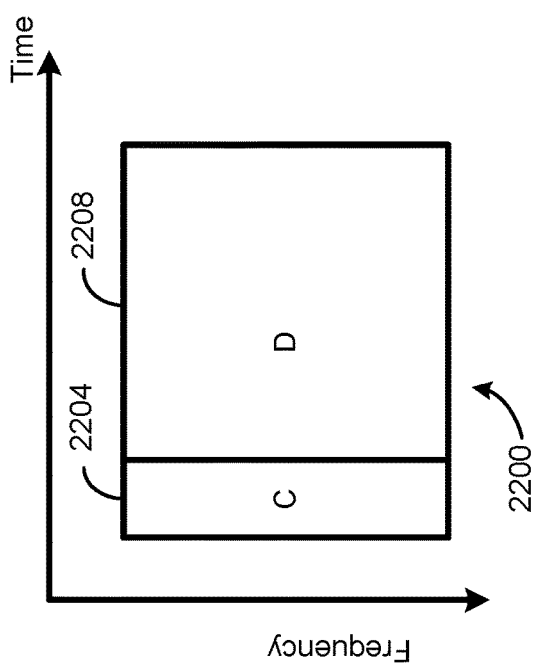
FIGS. 22A-22D shows example resource configurations for control channels and data channels.
Figure 22B:
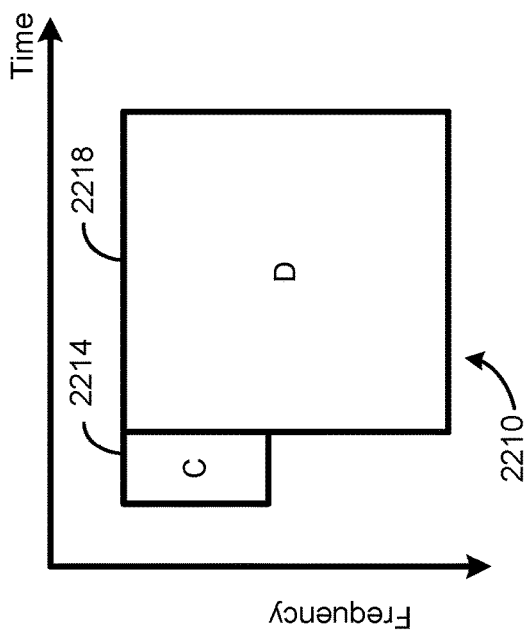
Figure 22C:
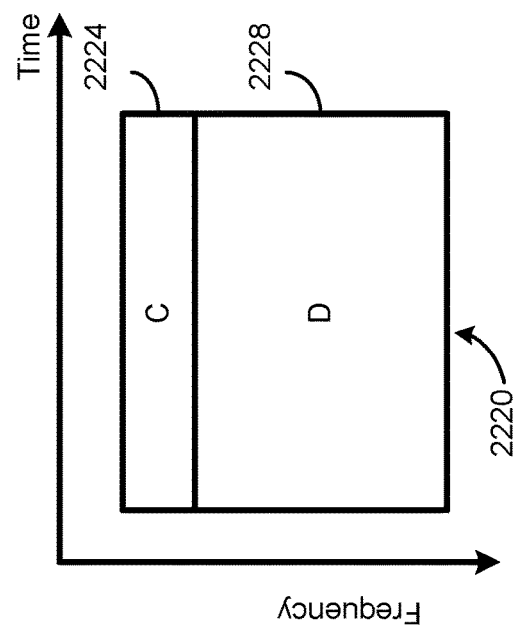
Figure 22D:
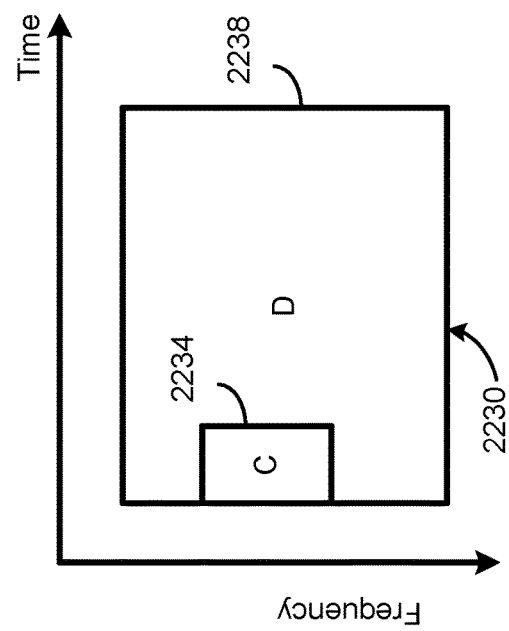

FIG. 22A shows an example resource configuration 2200 of a control channel 2204 and a data channel 2208. The control channel 2204 and the data channel 2208 may share a same frequency band but may correspond to different time periods. FIG. 22B shows an example resource configuration 2210 of a control channel 2214 and a data channel 2218. The control channel 2214 and the data channel 2218 may correspond to different frequency bands and different time periods, but a portion of the data channel 2218 may overlap in frequency with the control channel 2214. FIG. 22C shows an example resource configuration 2220 of a control channel 2224 and a data channel 2228. The control channel 2224 and the data channel 2228 may correspond to different frequency bands but a same time period. FIG. 22D shows an example resource configuration 2230 of a control channel 2234 and a data channel 2238. The control channel 2234 and the data channel 2238 may correspond to different frequency bands and different time periods, but a portion of the data channel 2238 may overlap in time and frequency with the control channel 2234.

Figure 23:
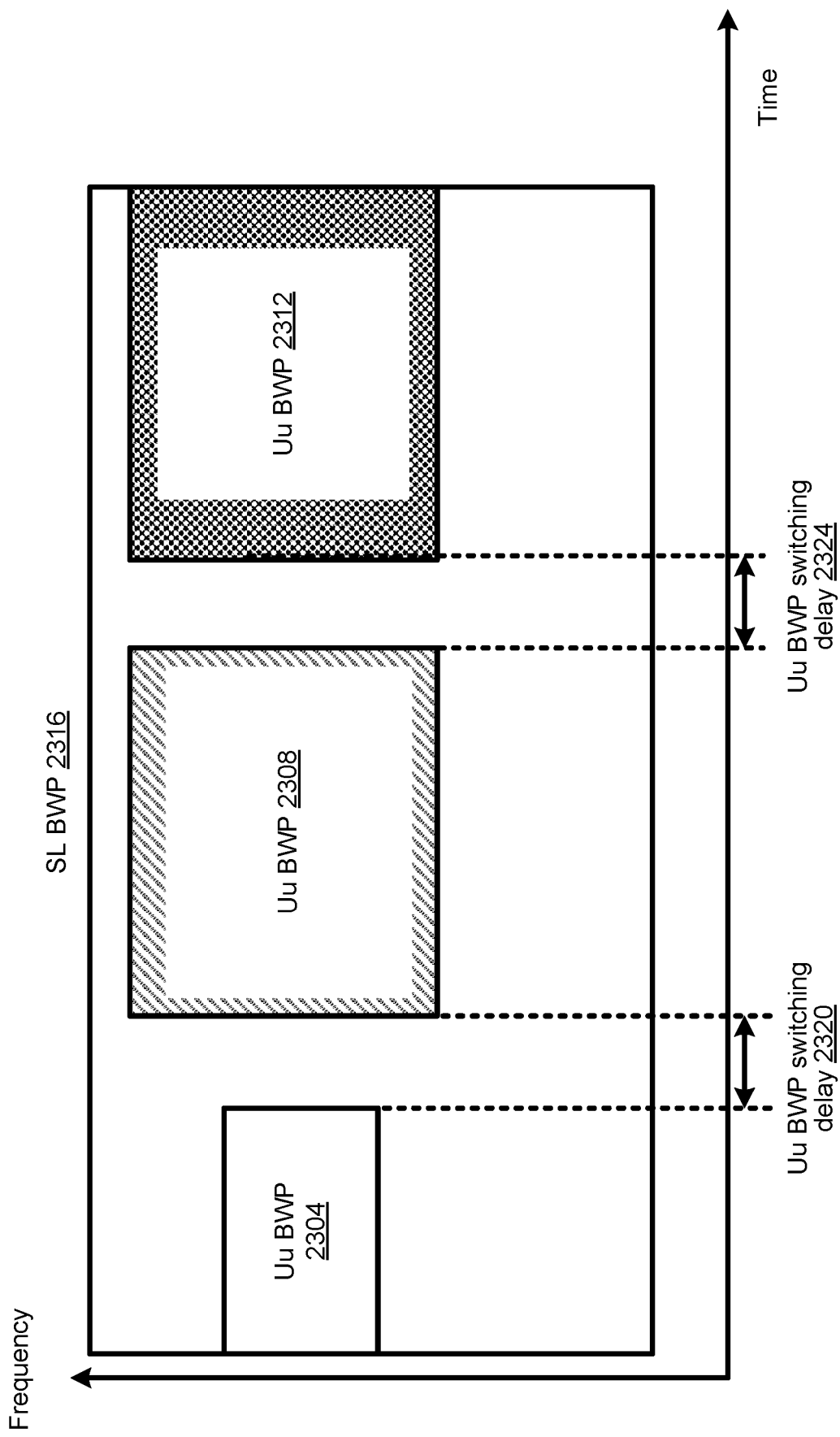
FIG. 23 shows an example configuration of BWPs used for communications.

FIG. 23 shows an example configuration of BWPs used for communications. A sidelink BWP (SL BWP) 2316 may be a BWP for sidelink communications between two wireless devices. The SL BWP 2316 may correspond to a sidelink channel (e.g., comprising a data channel and/or a control channel as described with reference to FIGS. 22A-22D).

The SL BWP 2316 may at least partially overlap (e.g., in frequency and/or time) one or more BWPs (e.g., Uu BWPs) used for communication between a wireless device and a base station. The one or more BWPs may comprise BWP 2304, BWP 2308, and/or BWP 2312. The one or more BWPs may correspond to an interface (e.g., a Uu interface) between the wireless device and the base station. The one or more BWPs may be Uu BWPs corresponding to a Uu interface between the wireless device and the base station. The wireless device and the base station may switch between the one or more BWPs for communications. Switching between the one or more BWPs may comprise a BWP switching delay 2320 or a BWP switching delay 2424, for example, during which the wireless device and/or the base station switch operating frequencies from one BWP to another BWP. The BWP switching delay 2420 and the BWP switching delay 2424 may or may not be same.

Figure 24:
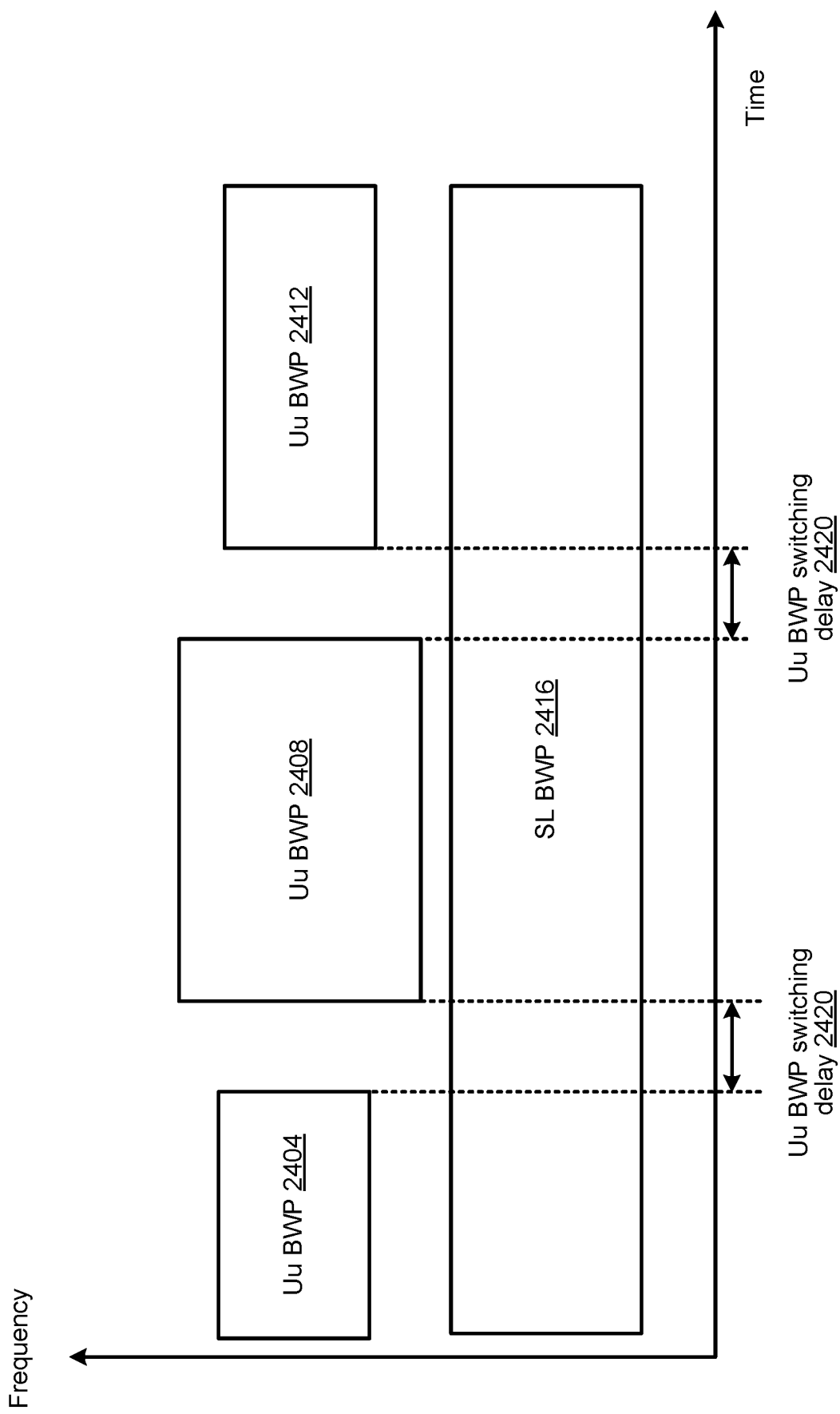
FIG. 24 shows an example configuration of BWPs used for communications.

FIG. 24 shows an example configuration of BWPs used for communications. A sidelink BWP (SL BWP) 2416 may be a BWP for sidelink communications between two wireless devices. The SL BWP 2416 may correspond to a sidelink channel (e.g., comprising a data channel and/or a control channel as described with reference to FIGS. 22A-22D).

One or more other BWPs (e.g., Uu BWPs) may be used for communication between a wireless device and a base station. The one or more other BWPs may not overlap (e.g., in frequency and/or time) with the SL BWP 2416. The one or more BWPs may comprise BWP 2404, BWP 2408, and/or BWP 2412. The one or more BWPs may correspond to an interface (e.g., a Uu interface) between the wireless device and the base station. The one or more BWPs may be Uu BWPs corresponding to a Uu interface between the wireless device and the base station. The wireless device and/or the base station may switch between the one or more BWPs for communications. Switching between the one or more BWPs may comprise a BWP switching delay 2420 or a BWP switching delay 2424, for example, during which the wireless device and/or the base station switch operating frequencies from one BWP to another BWP. The BWP switching delay 2420 and the BWP switching delay 2424 may or may not be same.

Sidelink communications may be established between wireless devices. A sidelink bearer of a wireless device may be configured to use a mode of operation. For example, the sidelink bearer may be configured to use a mode 1 operation or a mode 2 operation (e.g., sidelink resource allocation mode). The sidelink bearer may be configured to use a mode of operation, for example, based on at least one system information block and/or at least one RRC message from a base station. In at least some examples, the mode 1 operation may provide more efficient and/or more reliable sidelink communication compared to the mode 2 operation, for example, depending on a radio resource status/condition of a sidelink resource pool. In other examples, the mode 2 operation may provide more efficient and/or more reliable sidelink communication compared to the mode 1 operation. In at least some wireless communications, a base station may configure a wireless device to use the mode 1 operation or the mode 2 operation, for example, by sending a configuration message (e.g., RRC message). The configuration message may not allow for dynamic updates, which may increase delay to adapt to a changing radio resource status. Inefficient radio resource utilization and/or decreased sidelink communication reliability may result. For example, a wireless device may (or may not) request a first sidelink mode (e.g., mode 1 sidelink bearer), such as by sending a message to a base station. The wireless device may send the message, for example, based on a congestion status of wireless resources associated with the mode (e.g., a sidelink resource pool associated with a mode 1 sidelink bearer or a mode 2 sidelink bearer). The wireless device may send a request to the base station to configure a bearer based upon a mode operation. The base station may configure the bearer to use a resource allocation mode, for example, based on the request. The wireless device may establish communication with one or more wireless devices. The communication may be based on configuration parameters and/or may use sidelink mode bearer information (e.g., for mode 1 operation and/or for mode 2 operation). The base station may send a release indication for the sidelink bearer using, for example, mode 1 bearer information. The base station may send the release indication, for example, due to an overload of the base station, and/or based on a congestion level/status of wireless resources (e.g., a resource pool) associated with the mode 1 bearer. The wireless device may release the mode 1 sidelink bearer connections, for example, based on receiving the release notification. The wireless device may establish communication using another mode (e.g., a mode 2 resource allocation). Releasing a bearer using a first mode (e.g., a mode 1 resource allocation) and establishing another bearer using another mode (e.g., a mode 2 resource allocation) may result in inefficiencies, signal overhead, and/or signaling delay.

As described herein, a wireless device may determine a mode for sidelink communications with another wireless device. Wireless communications between devices may comprise sidelink communications or any device to device communications, generally referred to as sidelink communications herein. Even though various examples described herein refer to sidelink, sidelink communications, and/or sidelink communication channels, one skilled in the art may appreciate that the various examples described herein may apply to any form of communication between communication devices. A base station may configure a wireless device to determine/select a mode (e.g., a mode 1 operation or a mode 2 operation) for a sidelink bearer and/or for the wireless device. Bearers may comprise pipelines for connecting user equipment to, for example, a packet data network (PDN) such as the Internet. Bearers may comprise a series of linked pipelines that connect the user equipment to the PDN through a network gateway. The term bearer may be used throughout, but one skilled understands, that bearers may include various types, for example, radio bearers, end-to-end bearers, evolved packet system bearers, and the like. The wireless device may be configured to determine/select the mode, for example, based on a (latest/recent/current) radio resource status. The base station may send/transmit, to the wireless device, indication(s) of one or more conditions (e.g., decision policy, threshold, etc.) for the determination/selection of a mode. A base station may send/transmit a lower layer signaling for (dynamic) activation/deactivation of the mode (e.g., mode 1 operation or mode 2 operation). A dynamic resource allocation mode selection described herein may reduce signaling delay and/or decrease redundant signaling. The base station may send/transmit, to the wireless device, a decision policy for selecting a mode (e.g., mode 1 operation or mode 2 operation) for a sidelink bearer. The wireless device may determine (e.g., dynamically select) a first mode (e.g., the mode 1 operation) or a second mode (e.g., the mode 2 operation) of a plurality of modes, for example, for each transmission of transport block(s), based on a radio resource status and/or the decision policy. The base station may send/transmit, to the wireless device (e.g., via system information block (SIB) and/or radio resource control (RRC) message), a decision policy for selecting the mode (e.g., mode 1 operation or mode 2 operation) for the sidelink bearer. The decision policy may be based on one or more of: a channel busy ratio (CBR) (e.g., of one or more resource pools), a channel occupancy ratio (CR), a quality of service (QoS) requirement (e.g., associated with a bearer), a received signal strength indication (RSSI) of radio resources, and/or any other parameter (e.g., associated with a bearer) for sidelink communications.

Figure 25:
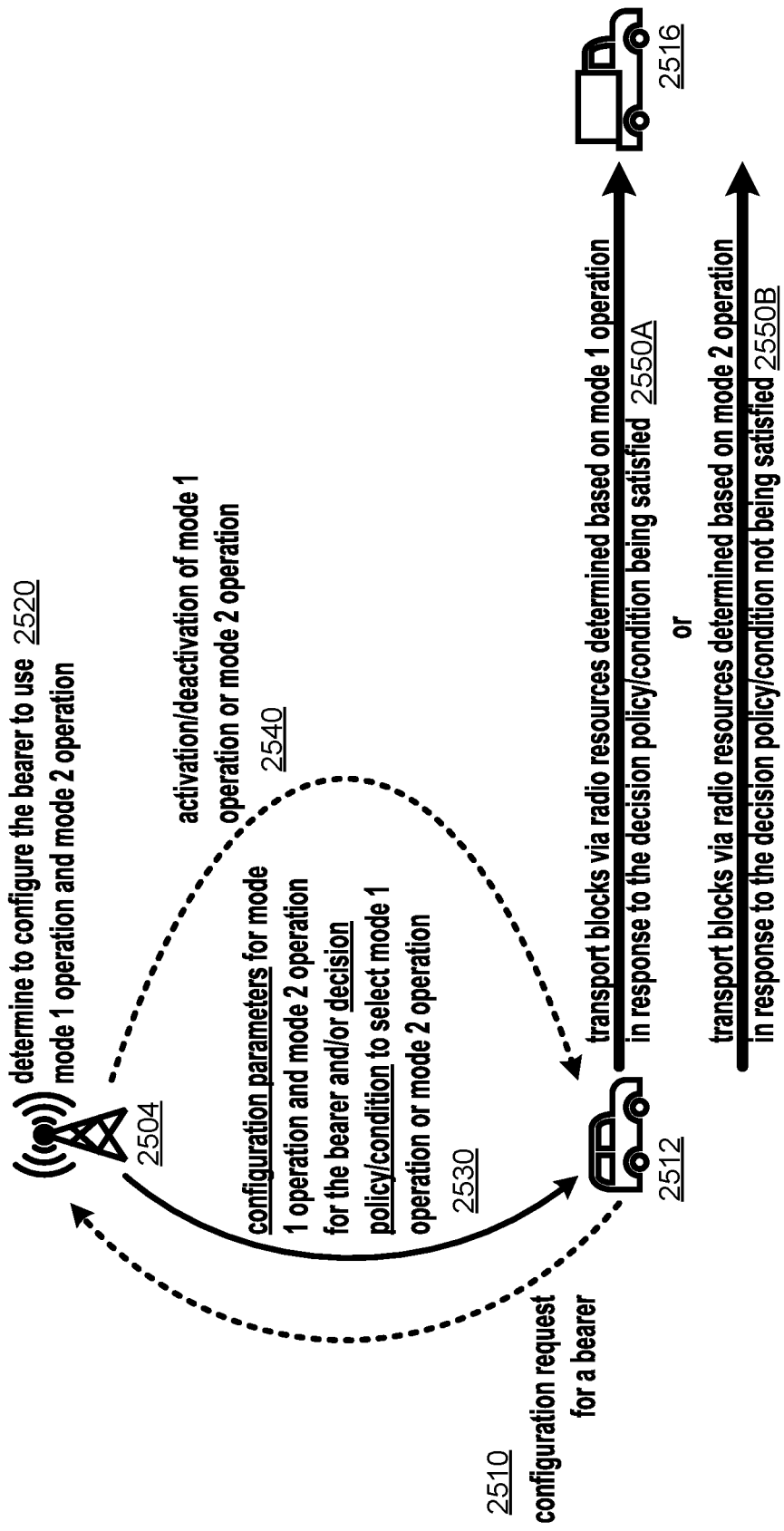
FIG. 25 shows an example configuration of sidelink communications between two wireless devices.

FIG. 25 shows an example of sidelink communications between two wireless devices. A first wireless device 2512 (e.g., a first vehicle, a first sidelink wireless device, a first device-to-device communication wireless device, etc.) may communicate with at least one second wireless device 2516 (e.g., a second vehicle, a second sidelink wireless device, a second device-to-device communication wireless device, etc.). The first wireless device 2512 may have a PC5-RRC connection with the at least one second wireless device 2516. The first wireless device 2512 may have a direct connection (e.g., sidelink direct communication connection), a PC5 connection, a sidelink connection, and/or the like with the at least one second wireless device 2516. The first wireless device 2512 may send (e.g., transmit and/or unicast/multicast/broadcast) transport blocks to the at least one second wireless device 2516. The first wireless device 2512 and the at least one second wireless device 2516 may belong to the same sidelink multicast group.

The first wireless device 2512 may have an RRC connection with a first base station 2504 (e.g., gNB, eNB, RNC, IAB-node, IAB-donor, gNB-DU, gNB-CU, access node, etc.). The first base station 2504 may be a serving base station of the first wireless device 2512. The first base station 2504 may serve the first wireless device 2512 via at least one serving cell (e.g., comprising at least one of: a first primary cell, one or more first secondary cells, etc.) comprising a first cell. The first base station 2504 may be a camp-on base station of the first wireless device 2512 (e.g., if the first wireless device is in an RRC inactive state and/or an RRC idle state). The first wireless device 2512 may communicate with the at least one second wireless device 2516, for example, based on an operation mode, such as a mode 1 operation and/or a mode 2 operation (e.g., model sidelink resource selection and/or mode 2 sidelink resource selection). The first base station 2504 may comprise and/or be associated with a cell that may be a serving cell and/or a camp-on cell of the at least one second wireless device 2516. The first cell may be a serving cell and/or a camp-on cell of the at least one second wireless device 2516.

The first base station 2504 may have a direct connection (e.g., Xn interface, X2 interface, etc.) and/or an indirect connection (e.g., via one or more N2/S1 interfaces, one or more AMFs/MMEs, etc.) with a second base station (not shown). The second base station may be a target base station for a handover or a secondary node configuration for the first wireless device 2512.

The first wireless device 2512 may send, to the first base station 2504, a sidelink configuration request 2510. The sidelink configuration request may comprise a request to establish/configure a sidelink bearer between the first wireless device and the at least one second wireless device 2516. The first wireless device 2512 may receive, from the first base station 2504, a message comprising bearer configuration parameters for the sidelink bearer. The bearer configuration parameters may indicate one or more of: first resource configuration parameters for a first resource allocation mode (e.g., mode 1 operation); second resource configuration parameters for a second resource allocation mode (e.g., mode 2 operation); and one or more conditions/decision policies (e.g., decision condition(s), threshold(s), etc.) for the first wireless device 2512 to select the first resource allocation mode or the second resource allocation mode. The bearer configuration parameters may indicate additional resource configuration parameters for any quantity of additional resource allocation modes. Each resource allocation mode may be associated with a set of the one or more conditions/decision policies. The first wireless device 2512 may establish the sidelink bearer with the at least one second wireless device 2516 based on the bearer configuration parameters 2530. The first wireless device 2512 may determine whether a radio resource status of at least one resource pool meets the decision policy. The first wireless device 2512 may send one or more transport blocks of the sidelink bearer to the at least one second wireless device 2516 via: first radio resources (e.g., determined based on the first resource configuration parameters and/or the first resource allocation mode), based on (e.g., in response to) the radio resource status satisfying the decision policy/policies (e.g., associated with the first mode/mode 1 operation). The first wireless device 2512 may send one or more transport blocks of the sidelink bearer to the at least one second wireless device 2516 via second radio resources (e.g., determined based on the second resource configuration parameters and/or the second resource allocation mode), based on (e.g., in response to) the radio resource status not satisfying the decision policy. The first mode (e.g., first resource allocation mode) may comprise a mode 1 operation. The second mode (e.g., second resource allocation mode) may comprise a mode 2 operation. The first wireless device 2512 may receive (e.g., from the first base station 2504) an activation/deactivation indication 2540 for at least one of the first resource allocation mode or the second resource allocation mode for the sidelink bearer and/or for the first wireless device 2512. The wireless device 2512 may determine a new mode, for example, based on an activation and/or a deactivation of a mode. For example, if the wireless device 2512 is using a first mode and the activation/deactivation indication 2540 indicates a deactivation of the first mode, the wireless device 2512 may determine a second mode for sidelink communications with the at least one second wireless device 2516 (e.g., if the second mode satisfies the decision policy/policies). As another example, if the wireless device 2512 is using a first mode and the activation/deactivation indication 2540 indicates an activation of a new mode (e.g., the second mode), the wireless device may determin to use the new mode for sidelink communications with the at least one second wireless device 2516 (e.g., if the new mode satisfies the decision policy/policies and/or if the new mode is comparatively better than the first mode).

The first wireless device 2512 may receive, from the first base station 2504, an information message (e.g., via SIB or RRC message). The information message may be the same as or different from the message comprising the bearer parameters 2530. The information message may comprise mode selection condition information for determining/selecting the first resource allocation mode and/or the second resource allocation mode for sidelink bearers (and/or any other quantity of resource allocation modes). The mode selection condition information may indicate at least one QoS requirement for the sidelink bearers to select the first resource allocation mode. The information message may comprise at least one of: at least one system information block; an RRC message; and/or the like. The first wireless device 2512 may establish at least one sidelink bearer to use the first resource allocation mode and/or the second resource allocation mode, for example, based on the mode selection condition information. The mode selection condition information may be for configuring a sidelink bearer of a wireless device as a mode 1 sidelink bearer (e.g., sidelink bearer using the mode 1 operation, not using the mode 2 operation) and/or as a mode 2 sidelink bearer (e.g., sidelink bearer using the mode 2 operation, not using the mode 1 operation). The first wireless device 2512 may establish at least one sidelink bearer as the mode 1 sidelink bearer or the mode 2 sidelink bearer, for example, based on the mode selection condition information of the information message.

The first wireless device 2512 may establish a connection (e.g., a PC5 radio resource control (PC5-RRC) connection) with the at least one second wireless device 2516. For a direct sidelink communication, the first wireless device 2512 may send a direct communication request to the at least one second wireless device 2516, and the first wireless device 2512 may receive a direct communication response based on (e.g., in response to) the direct communication request. For a direct sidelink communication, the first wireless device 2512 may receive a direct communication request from the at least one second wireless device 2516, and the first wireless device 2512 may receive a direct communication based on (e.g., response in response to) the direct communication request. The first wireless device 2512 may send, to the at least one second wireless device 2516, first sidelink capability information of the first wireless device 2512, for example, based on the direct sidelink communication. The first wireless device 2512 may receive, from the at least one second wireless device 2516, second sidelink capability information of the at least one second wireless device 2516, for example, Based on the direct sidelink communication. The first wireless device 2512 may send, to the at least one second wireless device 2516, one or more first PC5-RRC configuration parameters to configure the PC5-RRC connection between the first wireless device 2512 and the at least one second wireless device 2516, for example, based on the direct sidelink communication. The first wireless device 2512 may receive, from the at least one second wireless device 2516, one or more second PC5-RRC configuration parameters 2528 to configure the PC5-RRC connection, for example, based on the direct sidelink communication.

The first wireless device 2512 may determine to establish/configure/setup a sidelink bearer with the at least one second wireless device 2516 for sidelink communication with the at least one second wireless device 2516 (e.g., based on application layer request, to establish a service, etc.). The first wireless device 2512 may send, to the first base station 2504, a sidelink configuration request to establish/configure the sidelink bearer between the first wireless device 2512 and the at least one second wireless device 2516. The sidelink bearer may comprise one or more sidelink logical channels, one or more QoS flows, and/or the like. The sidelink bearer may be associated with one or more sidelink PDU sessions. The first wireless device 2512 may send, to the first base station 2504, the sidelink configuration request for the sidelink bearer via at least one RRC message (e.g., UE information message, UE information response message, UE assistance information message, RRC setup request/complete message, RRC reestablishment request/complete message, RRC resume request/complete message, RRC reconfiguration complete message, etc.).

A sidelink configuration request for the sidelink bearer may comprise QoS information/requirement of the sidelink bearer. The QoS information/requirement may indicate at least one of: 5QI, ARP, Priority level, Latency, Loss rate, and/or the like. The QoS information/requirement of the sidelink bearer (e.g., the one or more sidelink logical channels, one or more QoS flows, etc.) may indicate a priority level of the sidelink bearer. The QoS information/requirement of the sidelink bearer may comprise, for example, at least one of: PC5 QoS flow identifier (PFI), PC5 5QI (e.g., PQI and Range), V2xservice type (e.g., PSID or ITS-AID), QoS Class Identifier (QCI), 5G QoS Indicator (5QI: dynamic and/or non-dynamic), priority level, allocation and retention priority (ARP: priority level, pre-emption capability, pre-emption vulnerability, etc.), latency requirement (e.g., tolerable packet transmission latency/delay), reliability requirement (e.g., maximum error rate), session aggregate maximum bit rate (AMBR), bearer type (e.g., PDU session type, QoS flow type, bearer type indicating at least one of: IP, non-IP, ethernet, IPv4, IPv6, IPv4v6, unstructured, etc.), QoS flow identifier, bearer identifier, QoS flow level QoS parameters, bearer level QoS parameters, averaging window, maximum data burst volume, packet delay budget, packet error rate, delay critical indication (e.g., critical or non-critical), maximum flow bit rate, guaranteed flow bit rate, notification control (e.g., indicating notification requested to the first base station based on events), maximum packet loss rate, and/or the like. One or more QoS flows and/or the sidelink bearer may be configured based on the QoS information/requirement (e.g., PC5 QoS rules), such as described below with respect to FIG. 31.

A sidelink configuration request may indicate that a CBR of a resource pool for a mode (e.g., the first resource allocation mode and/or the second resource allocation mode) is equal to or larger than a value. The sidelink configuration request may indicate that a CR of the first wireless device (e.g., channel occupancy ratio of traffic of the first wireless device) for a resource pool configured for a mode (e.g., the first resource allocation mode and/or the second resource allocation mode) is equal to or larger than a value. The sidelink configuration request may indicate that a CR of the sidelink bearer (e.g., channel occupancy ratio of traffic of the sidelink bearer) for a resource pool configured for a mode (e.g., the first resource allocation mode and/or the second resource allocation mode) is equal to or larger than a value. The sidelink configuration request may indicate that an RSSI of sidelink radio resources (e.g., radio resources configured by the first base station; and/or the resource pool for the first resource allocation mode and/or the second resource allocation mode) is equal to or larger than a value.

A sidelink configuration request for the sidelink bearer may indicate request for configuration of the sidelink bearer. The sidelink configuration request may indicate at least one of: a bearer identifier of the sidelink bearer; a QoS information/requirement of the sidelink bearer (e.g., comprising at least one of: 5QI, ARP, bit rate, throughput, priority level, transmission latency, packet loss rate, etc.); measured QoS values (e.g., measured/monitored bit rate or throughput, measured/monitored packet transmission latency, measured/monitored packet loss rate, etc.); a CR of the sidelink bearer and/or the first wireless device (e.g., for a resource pool configured for the first resource allocation mode and/or the second resource allocation mode); a CBR/RSSI of a resource pool configured for the first resource allocation mode and/or the second resource allocation mode; a field (e.g., cast type) indicating whether the sidelink bearer is for a unicast transmission, a multicast (e.g., group cast) transmission, and/or a broadcast transmission; a service type; network slice information; performance measurement results of the sidelink bearer (e.g., the performance measurement results indicating at least one of: whether the QoS information/requirement is met based on the second resource allocation mode; measured quality-of-service information; measured packet loss rate; measured latency; measured throughput; etc.); a destination identifier of the sidelink bearer (e.g., the destination identifier indicating at least one of: a service associated with the sidelink bearer, the at least one second wireless device, layer 2 identifier, and/or the like); (average) ProSe per-packet priority (PPPP); (average) ProSe per-packet reliability (PPPR); a resource pool that is used for the sidelink bearer; at least one QoS flow mapped to the sidelink bearer; at least one PDU session mapped to the sidelink bearer; and/or the like.

The sidelink configuration request, for example, may comprise at least one of: a bearer identifier (e.g., SLRB Identity) of a sidelink bearer (e.g., for unicast/groupcast/broadcast) for at least one of transmission and/or reception; a destination identifier of a sidelink bearer (e.g., for unicast/groupcast/broadcast) for at least one of transmission and/or reception; a cast type of a sidelink bearer (e.g., for unicast/groupcast/broadcast) for at least one of transmission and/or reception; a list of at least one QoS flow mapped to a sidelink bearer (e.g., for unicast/groupcast/broadcast) for at least one of transmission and/or reception; a transmission range of a sidelink bearer (e.g., based on distance to a destination wireless device); a discard timer (e.g., for packet discard) of a sidelink bearer (e.g., for unicast/groupcast/broadcast) for at least one of transmission and/or reception; a PDCP sequence number (SN) size of a wireless device and/or a sidelink bearer (e.g., for unicast/groupcast/broadcast) for at least one of transmission and/or reception; a maximum context identifier (e.g., maxCID) of a wireless device and/or a sidelink bearer (e.g., for unicast/groupcast/broadcast) for at least one of transmission and/or reception; a robust header compression (ROHC) profile of a wireless device and/or sidelink bearer; a T-reordering timer of a sidelink bearer (e.g., for unicast/groupcast/broadcast) for at least one of transmission and/or reception; an OutOfOrderDelivery indication of a sidelink bearer (e.g., for unicast/groupcast/broadcast) for at least one of transmission and/or reception; an RLC mode of a sidelink bearer (e.g., for unicast/groupcast/broadcast) for at least one of transmission and/or reception; an RLC SN field length of a sidelink bearer (e.g., for unicast/groupcast/broadcast) for at least one of transmission and/or reception; a T-Reassembly timer (e.g., timer for reassembly) of a sidelink bearer (e.g., for unicast/groupcast/broadcast) for at least one of transmission and/or reception; a T-PollRetransmit timer of a sidelink bearer (e.g., for unicast/groupcast/broadcast) for at least one of transmission and/or reception; a PollPDU of a sidelink bearer (e.g., for unicast/groupcast/broadcast) for at least one of transmission and/or reception (e.g., for RLC AM, value p4 may correspond to 4 PDUs, value p8 may correspond to 8 PDUs and/or the like, infinity may correspond to an infinite number of PDUs); a PollByte is of a sidelink bearer (e.g., for unicast/groupcast/broadcast) for at least one of transmission and/or reception (e.g., for RLC AM, value kB25 may correspond to 25 kBytes, value kB50 may correspond to 50 kBytes and/or the like, infinity may correspond to an infinite amount of kBytes); a MaxRetxThreshold (e.g., maximum number of retransmission) of a sidelink bearer (e.g., for unicast/groupcast/broadcast) for at least one of transmission and/or reception; a T-StatusProhibit timer (e.g., timer for status reporting) of a sidelink bearer (e.g., for unicast/ groupcast/broadcast) for at least one of transmission and/or reception; a LogicalChannelIdentity of a sidelink bearer (e.g., for unicast/groupcast/broadcast) for at least one of transmission and/or reception; a LogicalChannelGroup of a sidelink bearer (e.g., for unicast/groupcast/broadcast) for at least one of transmission and/or reception; a Priority of a sidelink bearer (e.g., for unicast/groupcast/broadcast) for at least one of transmission and/or reception; a PrioritizedBitRate of a sidelink bearer (e.g., for unicast/groupcast/broadcast) for at least one of transmission and/or reception; a BucketSizeDuration (e.g., logical channel bucket size duration) of a sidelink bearer (e.g., for unicast/groupcast/broadcast) for at least one of transmission and/or reception; a ConfiguredGrantType1Allowed indication indicating whether a sidelink bearer (e.g., for unicast/groupcast/broadcast) for at least one of transmission and/or reception is allowed or not; a SchedulingRequestID for a sidelink bearer (e.g., for unicast/groupcast/broadcast) for at least one of transmission and/or reception; a LogicalChannelSR-DelayTimerApplied of a sidelink bearer (e.g., for unicast/groupcast/broadcast) for at least one of transmission and/or reception; and/or HARQ related information of a sidelink bearer (e.g., for unicast/groupcast/broadcast) for at least one of transmission and/or reception; and/or the like.

The first base station 2504 may determine to configure/establish/setup a sidelink bearer for the first wireless device and/or for the at least one second wireless device 2516. The first base station 2504 may determine to configure/establish/setup the sidelink bearer, for example, based on the sidelink configuration request 2510. The first base station 2504 may determine to configure/establish/setup the sidelink bearer to selectively and/or simultaneously (or substantially simultaneously) use the first resource allocation mode and the second resource allocation mode (e.g., if a radio channel status changes dynamically; if the first wireless device moves in higher speed than a threshold speed; if traffic congestion is higher than a threshold value; and/or if any other condition occurs that may impact a sidelink communication). The first base station 2504 may determine bearer configuration parameters for the sidelink bearer. The first base station 2504 may use a decision policy (e.g., decision condition) to determine that the first wireless device select the first resource allocation mode or the second resource allocation mode.

The first wireless device 2512 may send, to the first base station 2504, capability information. The capability information may indicate that the first wireless device 2512 is capable of simultaneously (or substantially simultaneously) and/or selectively using the first resource allocation mode and the second resource allocation mode. The wireless device 2512 may send the capability information in the configuration request 2510 or in another message (e.g., before, after, or during the sending of the configuration request 2510). The bearer configuration parameters may be determined (e.g., by the base station 2504), for example, based on the capability information and/or based on the sidelink configuration request.

The first base station 2504 may send, to the first wireless device 2512, bearer configuration parameters for the sidelink bearer. The first wireless device 2512 may receive, from the first base station 2504, the bearer configuration parameters for the sidelink bearer. The bearer configuration parameters may indicate one or more of: first resource configuration parameters for the first resource allocation mode (e.g., the mode 1 operation); second resource configuration parameters for the second resource allocation mode (e.g., the mode 2 operation); and/or the decision policy/policies (e.g., decision condition(s), threshold(d), etc.) for the first wireless device to select the first resource allocation mode or the second resource allocation mode for the sidelink bearer and/or for the first wireless device 2512. The bearer configuration parameters may indicate any quantity of resource configuration parameters, and/or any quantity of decision policies, that may be associated with any (e.g., corresponding) quantity of modes. The first resource allocation mode may comprise the mode 1 operation. The second resource allocation mode may comprise the mode 2 operation. The first wireless device 2512 may receive the bearer configuration parameters from the first base station 2504 via at least one of: an RRC reconfiguration message; an RRC resume message; an RRC setup message; an RRC reestablishment message; a handover command message; and/or the like.

The first resource allocation mode (e.g., assigning sidelink resources based on dynamic grant) may comprise at least one of: sending, by the first wireless device 2512 to a base station (e.g., the first base station 2504 or a second base station), a grant request for the sidelink bearer (e.g., the grant request may comprise at least one of a buffer status report or a scheduling request); receiving, from the base station (e.g., the first base station 2504 or the second base station) and based on the grant request, a sidelink grant indicating a radio resource for sending/transmitting a transport block of the sidelink bearer; and/or the like. The first resource allocation mode (e.g., assigning sidelink resources based on type1/2 configured grant, semi-persistent scheduling, etc.) may comprise at least one of: receiving, by the first wireless device from the base station (e.g., the first base station 2504 or the second base station), resource configuration parameters indicating configured grant resources (e.g., a type 1 configured grant resources, a type 2 configured grant resources, and/or semi-persistent scheduling resources, etc.); selecting a radio resource from the configured grant resources for packet transmission of the sidelink bearer; and/or the like.

The second resource allocation mode (e.g., the mode 2 operation) may comprise selecting a radio resource for transmission of at least one transport block for the sidelink bearer (e.g., one or more sidelink bearers) from a mode 2 resource pool (e.g., a resource pool for the second resource allocation mode and/or the mode 2 operation). The second resource allocation mode may comprise selecting by the first wireless device 2512 a radio resource for transmission of at least one transport block for the sidelink bearer. The first wireless device 2512 may receive a resource selection policy for the second resource allocation mode from the first base station 2504 via one or more system information blocks and/or a dedicated RRC message. The first wireless device 2512 may select a radio resource for transmission of at least one transport block for the sidelink bearer, for example, based on the resource selection policy.

The bearer configuration parameters for the sidelink bearer may comprise at least one updated parameter of the sidelink configuration request for the sidelink bearer. The first base station 2504 may update/reconfigure one or more elements of the sidelink configuration request for the sidelink bearer to the at least one updated parameter that comprise the bearer configuration parameters for the sidelink bearer. The bearer configuration parameters may indicate at least one of: a first resource pool for the first resource allocation mode; a second resource pool for the second resource allocation mode; and/or the like. At least one resource pool (e.g., for measuring a radio resource status) may comprise at least one of: the first resource pool; the second resource pool; and/or the like. The at least one resource pool may be for the sidelink bearer. The bearer configuration parameters (e.g., the first resource configuration parameters for the first resource allocation mode) for the sidelink bearer may indicate, for example, at least one of: configured grant resources (e.g., for type 1 configured grant and/or type 2 configured grant; periodicity, timing offset (e.g., from SFN=0), size, etc.); a mode 1 resource pool (e.g., the first resource pool for the first resource allocation mode; e.g., resource pool index, time/frequency domain resource information); a mode 2 resource pool (e.g., the second resource pool for the second resource allocation mode; e.g., resource pool index, time/frequency domain resource information); a cell identifier (e.g., cell index, physical cell identifier, global cell identifier, etc.) of a cell associated with the mode 1 resource pool (e.g., a resource pool for the first resource allocation mode) and/or the mode 2 resource pool (e.g., a resource pool for the second resource allocation mode); and/or the like.

The first resource configuration parameters for the first resource allocation mode (e.g., mode 1 operation) may comprise at least one of: resource parameters (e.g., time/ frequency domain resource information) of the first resource pool for the first resource allocation mode; buffer status report parameters; scheduling request parameters (e.g., CORESET information for SR transmission); configured grant parameters (e.g., periodicity, timing offset (e.g., from SFN=0), size, etc.) for configured grant resources (e.g., type 1 configured grant, type 2 configured grant, semi-persistent scheduling resources, etc.); and/or the like. The second resource configuration parameters for the second resource allocation mode (e.g., mode 2 operation) may comprise, for example, resource parameters (e.g., time/frequency domain resource information) of the second resource pool for the second resource allocation mode.

The bearer configuration parameters may indicate that the first wireless device 2512 is allowed to use simultaneously and/or substantially simultaneously (e.g., selectively) the first resource allocation mode and the second resource allocation mode for the sidelink bearer. The bearer configuration parameters may indicate one or more of: the at least one resource pool for the sidelink bearer; at least one second resource pool for a second sidelink bearer of the wireless device; and/or the like.

The configured grant parameters for the configured grant resources indicated in the bearer configuration parameters may comprise, for example, at least one of: an antenna port (e.g., antennaPort) indicating antenna port(s) to be used for the configured grant resources, and/or the maximum bit-width is 5; a configured grant DMRS configuration (e.g., cg-DMRS-Configuration) indicating DMRS configuration; a configured grant timer (e.g., configuredGrantTimer) indicating an initial value of the configured grant timer in multiples of periodicity; a DMRS sequence initialization (e.g., dmrs-SeqInitialization) that the first base station or the second base station configures if transformPrecoder is disabled; a frequency domain allocation (e.g., frequencyDomainAllocation) indicating a frequency domain resource allocation; a frequency hopping configuration (e.g., frequencyHopping) in which a value intraSlot may enable 'Intra-slot frequency hopping' and a value interSlot may enable 'Inter-slot frequency hopping', if the field is absent, frequency hopping may not be configured; a frequency hopping offset (e.g., frequencyHoppingOffset) that may enable intra-slot frequency hopping with the given frequency hopping offset; a modulation coding scheme table (e.g., mcs-Table) indicating a modulation coding scheme (MCS) the first wireless device uses for PUSCH and/or PSSCH without transform precoding, if the field is absent the first wireless device may apply a 64 QAM; a modulation coding scheme table transform precoder (e.g., mcs-TableTransformPrecoder) indicating an MCS table the first wireless device uses for PUSCH with transform precoding, if the field is absent the first wireless device may apply a 64 QAM; a modulation coding scheme and transport block size (e.g., mcsAndTBS) indicating a modulation order, target code rate, and/or TB size; a number of HARQ process (e.g., nrofHARQ-Processes) that may be applied for Type 1 and/or Type 2; a p0 PUSCH/PSSCH alpha (e.g., p0-PUSCH-Alpha, p0-PSSCH-Alpha) indicating an index of a P0-PUSCH-AlphaSet or P0-PSSCH-AlphaSet used for the configured grant resources; a periodicity for UL and/or sidelink transmission without UL and/or sidelink grant for type 1 and type 2; a power control loop to use (e.g., powerControlLoopToUse) indicating a closed control loop to apply; a resource block group size (e.g., rbg-Size) indicating a selection between configuration 1 and configuration 2 for resource block group (RBG) size for PUSCH and/or PSSCH, the first wireless device may not apply this field if resourceAllocation is set to resourceAllocationType1, the first wireless device may apply the value config1 when the field is absent (e.g., rbg-Size may be used when a transformPrecoder parameter is disabled); a repetition K redundancy version (e.g., repK-RV) indicating a redundancy version (RV) sequence to use, the first base station or the second base station may configure this field if repetitions are used (e.g., if repK may be set to n2, n4 or n8); a repetition K (e.g., repK) indicating a number of repetitions of K; a resource allocation (e.g., resourceAllocation) indicating a configuration of resource allocation type 0 and/or resource allocation type 1 (e.g., for Type 1 UL or sidelink data transmission without grant, resourceAllocation may be resourceAllocationType0 or resourceAllocationType1); an RRC configured uplink/sidelink grant (e.g., rrc-ConfiguredUplinkGrant, rrc-ConfiguredSidelinkGrant) indicating a configuration for "configured grant" transmission with fully RRC-configured UL grant (Type1) (e.g., if this field is absent the first wireless device may use UL or sidelink grant configured by DCI addressed to CS-RNTI (Type2)) (e.g., Type 1 configured grant may be configured for sidelink, UL, and/or SUL); a sounding reference signal resource indicator (e.g., srs-ResourceIndicator) indicating an SRS resource to be used; a time domain allocation (e.g., timeDomainAllocation) indicating a combination of start symbol and length and PUSCH or PSSCH mapping type; a time domain offset (e.g., timeDomainOffset) indicating an offset related to system frame number (SFN)=0; a transform precoder (e.g., transformPrecoder) enabling or disabling transform precoding for type1 and type2 (e.g., if the field is absent, the first wireless device may enable or disable transform precoding in accordance with the field msg3-transformPrecoder in RACH-ConfigCommon; an uplink/sidelink control information on PUSCH/PSSCH (e.g., uci-OnPUSCH or sci-OnPSSCH) indicating a selection between and configuration of dynamic and semi-static beta-offset (e.g., for Type 1 UL or sidelink data transmission without grant, uci-OnPUSCH and/or sci-OnPSSCH may be set to semiStatic); and/or the like.

Figure 26:
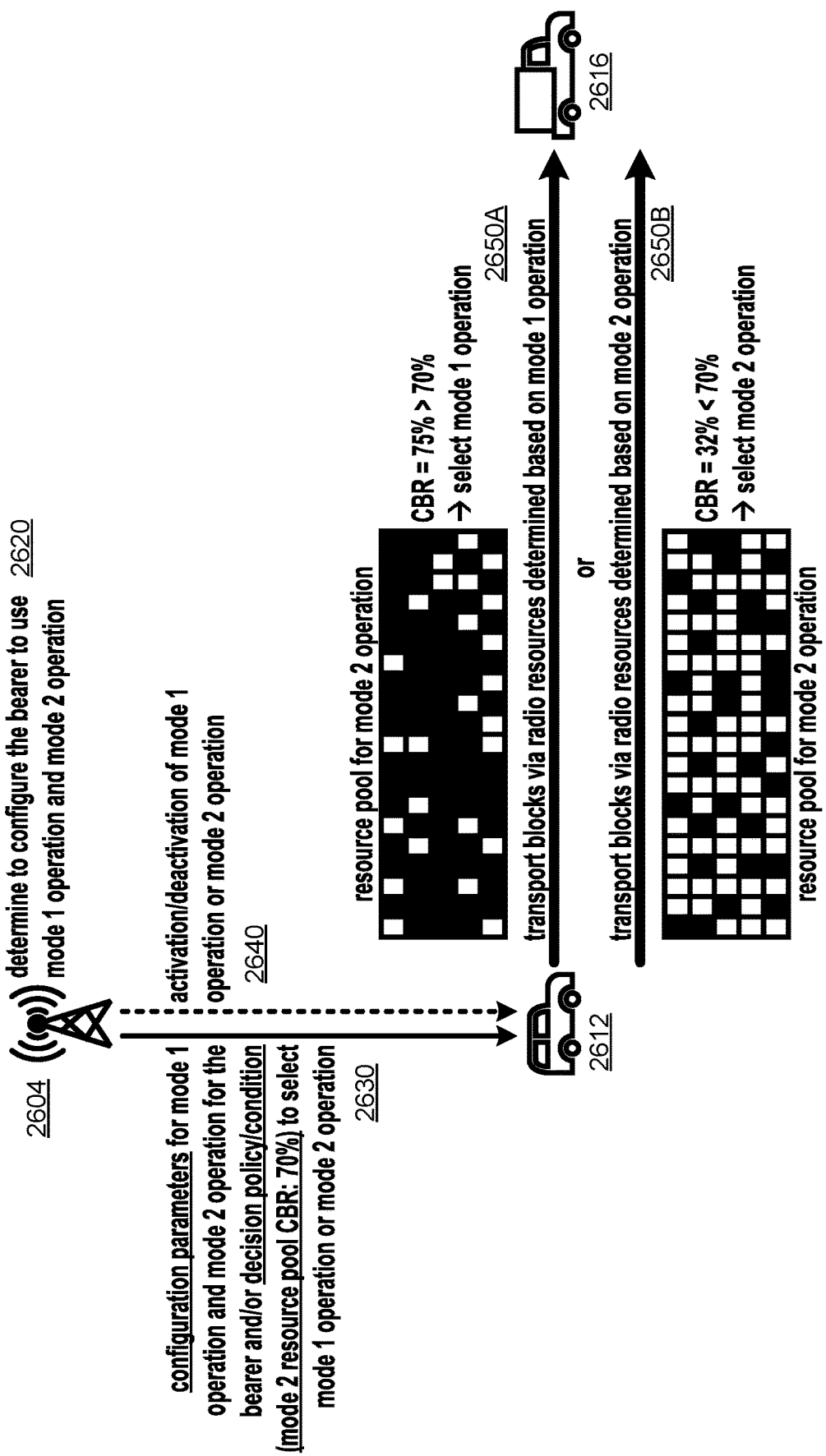
FIG. 26 shows an example for sidelink mode selection based on a channel busy ratio.
Figure 27:
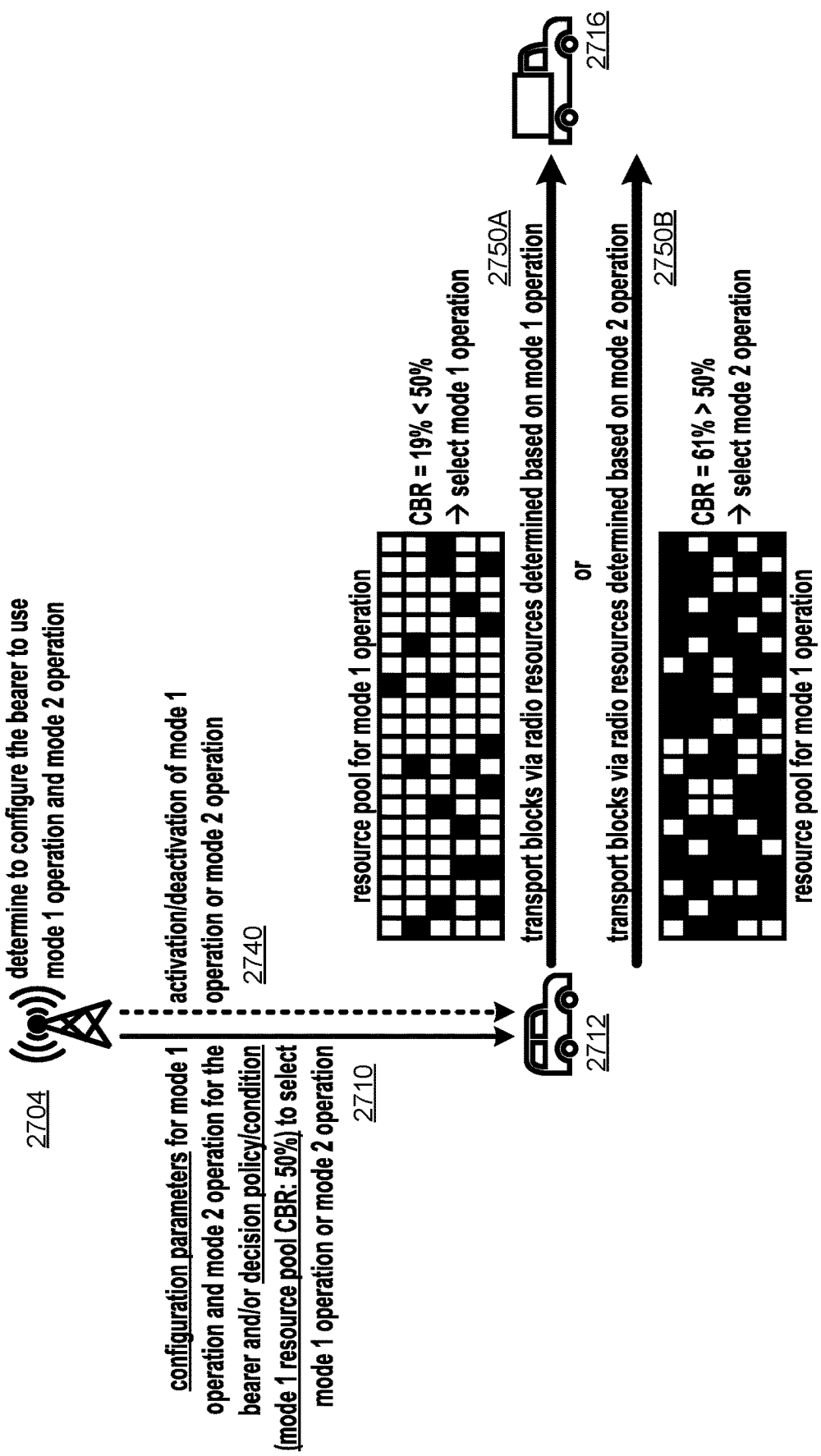
FIG. 27 shows an example for sidelink mode selection based on a channel busy ratio.

FIG. 26 shows an example for sidelink mode selection. A first wireless device 2612, a base station 2604, and a second wireless device 2616 may perform the same (or substantially the same) operations described above regarding FIG. 25 with respect to the first wireless device 2512, the base station 2504, and the at least one second wireless device 2516, respectively. A first wireless device 2612 may determine/select a first resource allocation mode and/or a second resource allocation mode. The wireless device 2612 may determine/select select a first resource allocation mode and/or a second resource allocation mode based on a channel busy ratio (CBR) of a first resource pool (e.g., associated with the first resource allocation mode) and/or a second resource pool (e.g., associated with the second resource allocation mode). The first wireless device 2612 may send a request for configuration information for a bearer. The request may correspond to the request 2510 described above with respect to FIG. 25. The base station 2604 may determine (e.g., at 2620) whether to send configuration parameter information for use of mode 1 operation and/or mode 2 operation. The base station 2604 may determine and/or indicate a recommended and/or a required mode of operation for the wireless device 2612, for example, based on at least one or more conditions (e.g., policy condition) for selecting mode 1 operation or mode 2 operation. Such conditions may comprise, for example, whether the bearer, a resource pool for mode 2 operation or a resource pool for mode 1 operation, is overloaded (e.g., channel occupancy ratio), whether the CBR is greater than a threshold value (e.g., CBR=75%, which is greater than a threshold of 70%), whether the bearer has higher priority request(s) that maintain superior status, a latency threshold (e.g., a network related latency threshold), a packet throughput ratio, a packet loss threshold, a channel occupancy ratio, a received signal strength indicator, a quality of service, and/or generally, the status and/or availability of the resource pool. The base station 2604 may activate and/or deactivate a mode (e.g., mode 1 operation or mode 2 operation), for example, based on the determination 2620. The base station 2604 may send/transmit, to the wireless device 2612, a message comprising configuration parameters 2630 (e.g., for mode 1 operation and/or mode 2 operation for a bearer). The base station 2604 may send/transmit, to the wireless device 2612, one or more conditions (e.g., decision policy/policies, threshold(s), etc.) before, after, or simultaneously (e.g., in the same or different message) as the message comprising the configuration parameters 2620. The first wireless device 2612 may use the configuration parameters to communicate with a second wireless device 2616. The first wireless device 2612 may send/transmit, to the second wireless device 2616 via radio resource, one or more transport information blocks. The first wireless device 2612 may send/transmit the transport blocks to the second wireless device 2616 based on whether mode 1 operation or mode 2 operation may/should be used. FIG. 27 shows an example for sidelink mode selection. The sidelink mode selection may be based on at least one or more channel busy ratios. A first wireless device 2712, a base station 2704, and a second wireless device 2716 may perform the same (or substantially the same) operations described above regarding FIGS. 25 and/or 26 with respect to the first wireless devices 2512/2612, the base stations 2504/2604, and the at least one second wireless devices 2516/2616, respectively. One or more conditions (e.g., decision policy/policies, threshold(s), etc.) for selecting mode 1 operation may be based on whether the channel busy ratio for the resource pool is less than or equal to a particular threshold value (e.g. whether CBR is less than or equal to 50%, or any other percentage). The base station 2704, may send/transmit, to the first wireless device 2712, a message 2710 comprising configuration parameters for mode 1 operation and mode 2 operation and/or the one or more conditions. The base station may send/transmit, to the first wireless device 2712, a message 2740 indicating an activation and/or a deactivation of one or more modes (e.g., mode 1 operation and/or mode 2 operation). The message 2710 and the message 2740 may comprise a same message. The message 2710 may be sent before, during, or after the message 2740, for example in one or more messages. The wireless device 2712 may select, based on the one or more conditions, a mode for sidelink communications with the second wireless device 2716. The wireless device 2712 may use the configuration parameters (e.g., associated with the selected mode) for communicating with the at least one second wireless device 2716 via a sidelink. FIG. 27 shows a resource pool for mode 1 operation with a channel busy ratio of 19%. The resource pool for mode 1 operation may comprise any CBR value, for example, based on network conditions. In this example, a decision policy/condition for mode 1 operation requires a CBR of less than 50%, and as a result of the above CBR being less than that value, the wireless device 2712 may select mode 1 operation. Based on the mode 1 selection, the first wireless device 2712 may send/transmit one or more transport blocks to the at least one second wireless device 2716 via radio resources determined based on mode 1 operation (e.g., message 2750A). Conversely, if the policy/condition for the mode 1 resource pool is be satisfied (e.g., CBR>50%), such as shown in the example in which CBR=61%, then the wireless device 2712 may select mode 2 operation (e.g., which may further depend upon additional network conditions). Based on the mode 2 selection, the first wireless device 2712 may send/transmit one or more transport blocks to the at least one second wireless device 2716 via radio resources determined based on mode 2 operation (e.g., message 2750B). The policy/condition for determining mode operation may be predetermined or changed (e.g., dynamically changed), and/or reset, for example, based on network conditions.

Figure 28:
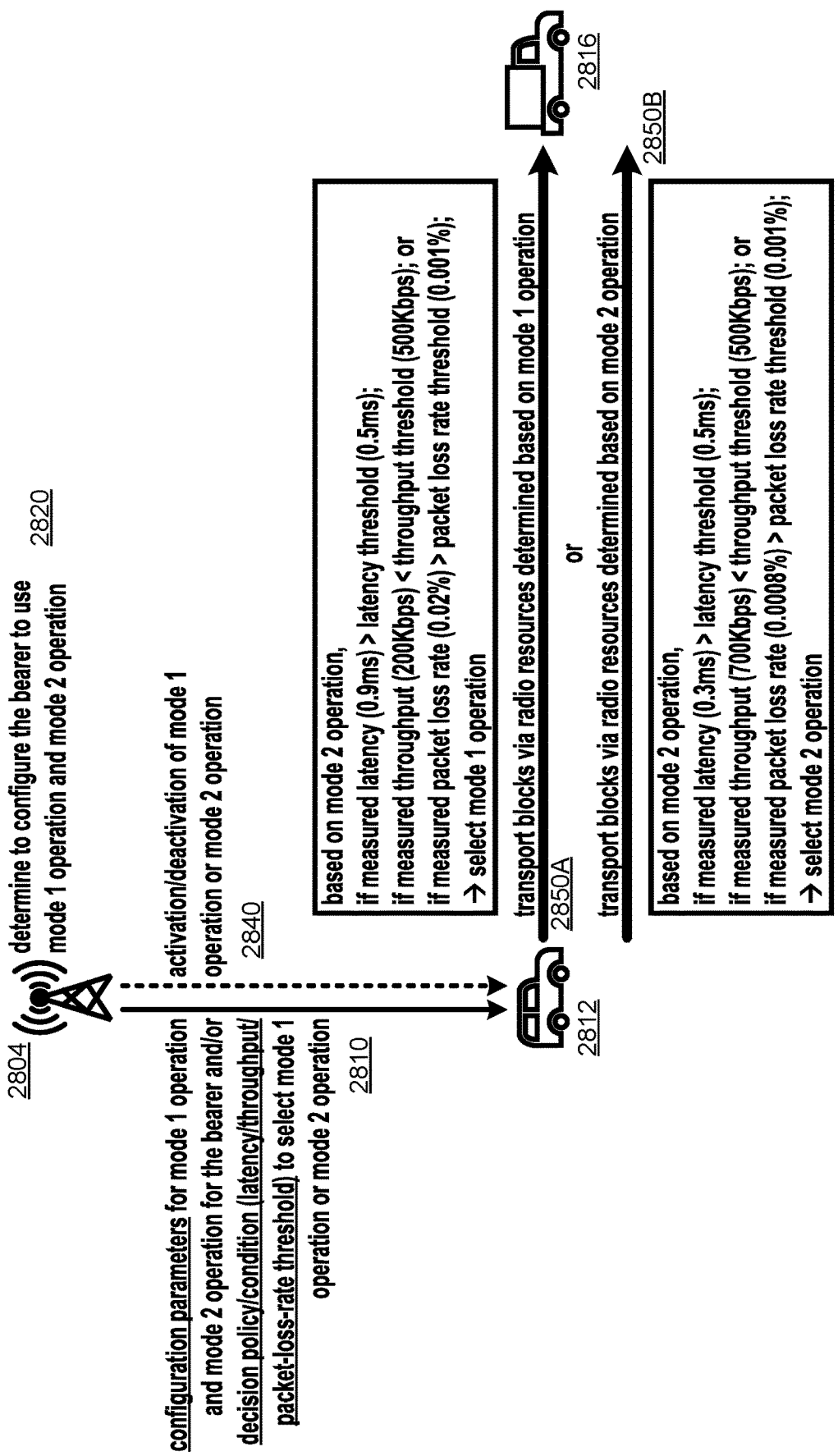
FIG. 28 shows an example for sidelink mode selection based on a mode 2 operation.

FIG. 28 shows an example for sidelink mode selection. The sidelink mode selection may be based on, for example, one or more of: a latency and/or a latency threshold, a throughput and/or a throughput threshold, and/or a packet loss rate and/or a packet loss rate threshold. A first wireless device 2812, a base station 2804, and a second wireless device 2816 may perform the same (or substantially the same) operations described above regarding FIGS. 25, 26, and/or 27 with respect to the first wireless devices 2512/2612/2712, the base stations 2504/2604/2704, and the at least one second wireless devices 2516/2616/2716, respectively. One or more conditions (e.g., decision policy/policies, threshold(s), etc.) for selecting mode 1 operation may be based on for example, a measured latency value being greater than a latency threshold value; a measured throughput value being less than a throughput threshold value; or a measured packet loss value being greater than a packet loss rate threshold value. The base station 2804, may send/transmit, to the first wireless device 2812, a message 2840 indicating an activation and/or a deactivation of one or more modes (e.g., mode 1 operation and/or mode 2 operation). The message 2810 and the message 2740 may comprise a same message. The message 2810 may be sent before, during, or after the message 2840, for example in one or more messages. The wireless device 2812 may select, based on the one or more conditions, a mode for sidelink communications with the second wireless device 2816. The wireless device 2812 may use the configuration parameters 2810 (e.g., associated with the selected mode) for communicating with the at least one second wireless device 2816 via a sidelink.

The wireless device 2812 may apply one or more decisions/policy conditions for determining a mode of operation (e.g., either mode 1 operation or mode 2 operation.) The message 2810 comprising configuration parameters for selecting mode 1 operation may be based on, for example, one or more conditions (e.g., for a system, cell, area, resources, etc.) that may be compared to a latency threshold, a throughput threshold, and/or a packet-loss-rate threshold. A plurality of decisions/policy conditions may be satisfied conjunctively or distinctively, for example, to determine which mode of operation is selected. In particular, a decision/policy condition for mode 1 operation may be based on whether a measured latency value lies above or below a latency threshold. For example, if a latency threshold of 0.5 ms is compared to a measured latency value of 0.9 ms, the measured latency value is greater than the latency threshold value, and as a result, mode 1 operation may be selected by the wireless device 2812. Another condition for selecting mode 1 operation may comprise comparing a measured throughput value to a throughput threshold value (e.g., for system, cell, area, resources, etc.). For example, if a measured throughput rate (e.g., 200 Kbps) is less than a throughput threshold (e.g. 500 Kbps), because the measured throughput rate is less than the throughput threshold, the wireless device 2812 may select mode 1 operation. A further condition for selecting mode 1 operation may comprise comparing a measured packet rate loss rate with a packet loss rate threshold. For example, if the measured packet loss rate (e.g. 0.02%) is greater than the packet loss threshold (e.g., 0.001%), a condition (e.g., for a system, cell, area, resource, etc.) may be satisfied. Because the measured packet loss rate is greater than the packet loss rate threshold, the wireless device 2812 may select mode 1 operation. Conversely, if none of the pre-conditions for selecting mode 2 operation are met, then mode 1 operation may be the default mode to be used. Based on the mode 1 selection, the first wireless device 2812 may send/transmit one or more transport blocks to the at least one second wireless device 2816 via radio resources determined based on mode 1 operation (e.g., message 2850A). The one or more policy/conditions for determining mode operation may be predetermined and/or changed (e.g., dynamically changed), and/or reset, for example, based on one or more conditions (e.g., in a system, cell, area, resource, etc.).

The wireless device 2812 may apply one or more decisions/policy conditions for determining whether mode 2 operation is selected. A plurality of decision/policy conditions may be identified/indicated and/or may (or may not) be satisfied conjunctively or distinctively to determine whether mode 2 operation should be selected. In particular, a decision/policy condition for mode 2 operation may be based on whether a measured latency value is above or below a latency threshold. For example, if a latency threshold value of 0.5 ms is compared to a measured latency value of 0.3 ms, the measured latency value is not greater than the latency threshold value, and as a result, mode 2 operation may not be selected by the wireless device 2812. Another condition for selecting mode 2 operation may comprise comparing a measured throughput value to a throughput threshold value for the network. For example, if a measured throughput rate (e.g. 700 Kbps) is not less than a throughput threshold (e.g. 500 Kbps), because the measured throughput rate is not less than the throughput threshold, the wireless device 2812 may not select mode 2 operation. A further condition for selecting mode 2 operation may comprise comparing a measured packet rate loss rate with a packet loss rate threshold. For example, if the measured packet loss rate (e.g. 0.0008%) is not greater than the packet loss threshold (e.g., 0.001%), a condition (e.g., in a network, cell, area, resource, etc.) may not be satisfied. Because the measured packet loss rate is not greater than the packet loss rate threshold, the wireless device 2812 may not select mode 2 operation. Conversely, if none of the pre-conditions for selecting mode 2 operation are satisfied, then mode 1 operation may be the default mode that may be used. Based on whether mode 2 operation is selected, the first wireless device 2812 may send/transmit one or more transport blocks to the at least one second wireless device 2816 via radio resources determined based on mode 2 operation (e.g., message 2850B). In this portion of the example, the policy conditions for mode 2 operation are not satisfied. As a result, the wireless device 2812 may not select mode 2 operation and the default selection may be mode 1 operation. The policy/conditions for determining mode operation may be predetermined and/or changed (e.g., dynamically changed), and/or reset, for example, based on one or more conditions (e.g., in a system, cell, area, resource, etc.).

The one or more conditions (e.g., decision policy/policies, threshold(s), decision condition, etc.) for the first wireless device 2712 may indicate selection of the first resource allocation mode or the second resource allocation mode, for example, based on at least one of: a first CBR of the first resource pool for the first resource allocation mode being equal to or smaller than a first CBR value (e.g., first threshold CBR), as shown in FIG. 27; a second CBR of the second resource pool for the second resource allocation mode being equal to or larger than a second CBR value (e.g., second threshold CBR), as shown in FIG. 26; the first CBR of the first resource pool being (offset) smaller (e.g., smaller than combination of the second CBR and an offset value) than the second CBR of the second resource pool; and/or the like. The first wireless device 2612 may select the first resource allocation mode for the sidelink bearer and/or for the first wireless device, for example, if one or more elements indicated in a decision policy occur. The first wireless device 2612 may select the second resource allocation mode for the sidelink bearer and/or for the first wireless device, for example, if one or more elements indicated in the decision policy do not occur.

A decision policy may indicate at least one of: a first channel occupancy ratio (CR) of the first resource pool for the first resource allocation mode is equal to or smaller than a first CR value (e.g., first threshold CR); a second CR of the second resource pool for the second resource allocation mode is equal to or larger than a second CR value (e.g., second threshold CR); the first CR of the first resource pool is (offset) smaller (e.g., smaller than combination of the second CR and an offset value) than the second CR of the second resource pool; and/or the like. The first wireless device may select the first resource allocation mode for the sidelink bearer and/or for the first wireless device, for example, if one or more elements indicated in the decision policy occur. The first wireless device may select the second resource allocation mode for the sidelink bearer and/or for the first wireless device, for example, if one or more elements indicated in the decision policy do not occur.

The decision policy may indicate at least one of: a first received signal strength indicator (RSSI) of one or more first resource blocks of the first resource pool for the first resource allocation mode is equal to or smaller than a first RSSI value (e.g., first threshold RSSI); a second RSSI of one or more second resource blocks of the second resource pool for the second resource allocation mode is equal to or larger than a second RSSI value (e.g., second threshold RSSI); the first RSSI of the one or more first resource blocks is (offset) smaller (e.g., smaller than combination of the second RSSI and an offset value) than the second RSSI of the one or more second resource blocks; and/or the like. The first wireless device may select the first resource allocation mode for the sidelink bearer and/or for the first wireless device, for example, if one or more elements indicated in the decision policy occur. The first wireless device may select the second resource allocation mode for the sidelink bearer and/or for the first wireless device, for example, if one or more elements indicated in the decision policy do not occur.

A decision policy may indicate using/selecting the first resource allocation mode for the sidelink bearer, based on at least one QoS requirement (e.g., indicated in the QoS information/requirement of the sidelink bearer). The first resource allocation mode may be selected, for example, based on the at least QoS requirement of the sidelink bearer not being met/satisfied for the second resource allocation mode. The decision policy may indicate using/selecting the first resource allocation mode for the sidelink bearer based on at least one first QoS threshold, which is configured/determined by the base station based on the at least one QoS requirement and/or the QoS information/requirement of the sidelink bearer not being met/satisfied by using the second resource allocation mode.

Figure 29:
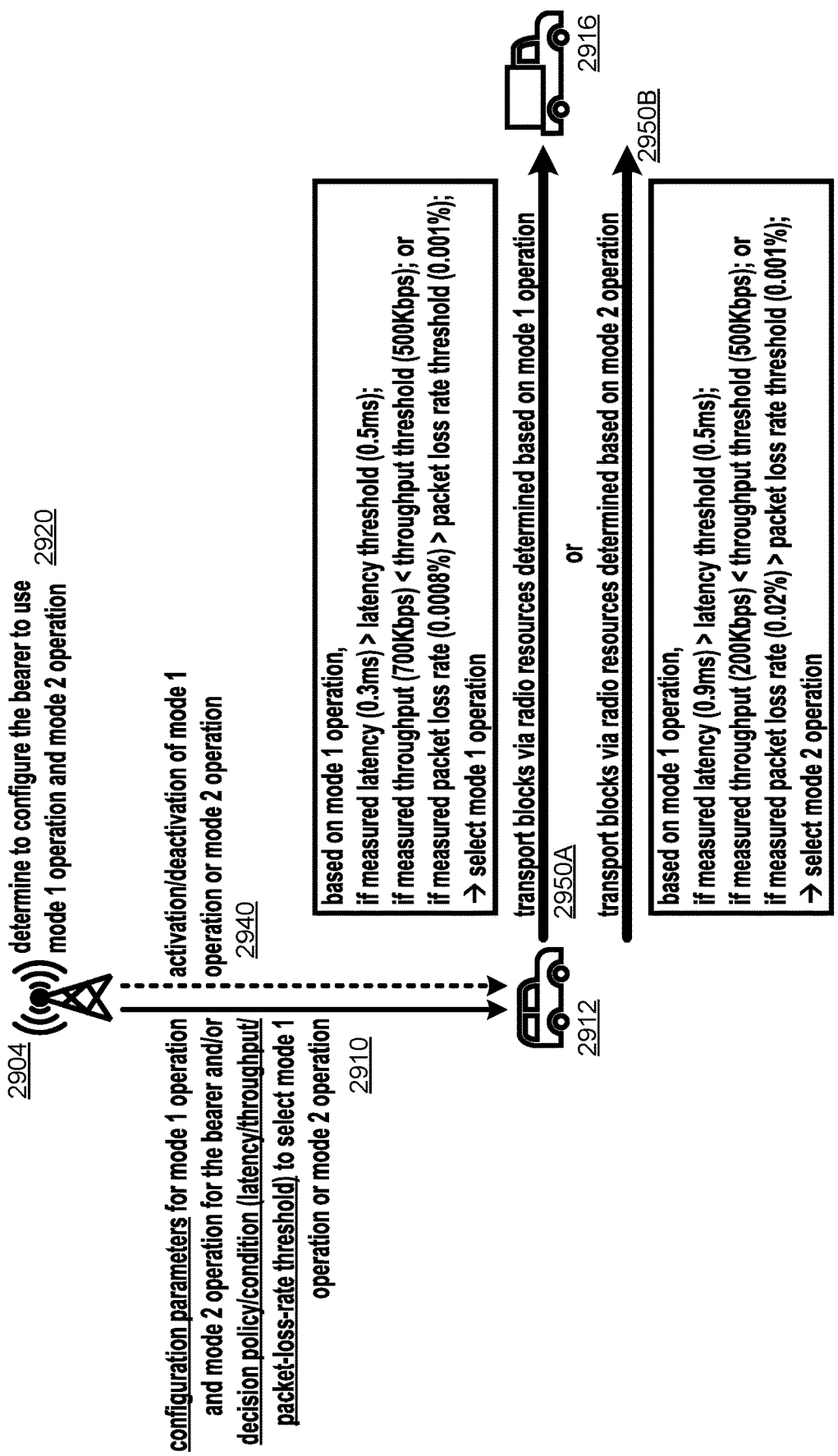
FIG. 29 shows an example for sidelink mode selection based on a mode 1 operation.

FIG. 29 shows an example for sidelink mode selection. The sidelink mode selection may be based on, for example, one or more of: a latency and/or a latency threshold, a throughout and/or a throughput threshold, and/or a packet loss rate and/or a packet loss rate threshold. A first wireless device 2912, a base station 2904, and a second wireless device 2916 may perform the same (or substantially the same) operations described above regarding FIGS. 25, 26, 27, and/or 28 with respect to the first wireless devices 2512/2612/2712/2812, the base stations 2504/2604/2704/2804, and the at least one second wireless devices 2516/2616/2716/2816, respectively. One or more conditions (e.g., decision policy/policies, threshold(s), etc.) for selecting mode 2 operation may be based on for example, a measured latency value being greater than a latency threshold value; a measured throughput value being less than a throughput threshold value; or a measured packet loss value being greater than a packet loss rate threshold value. The base station 2904, may send/transmit, to the first wireless device 2912, a message 2940 indicating an activation and/or a deactivation of one or more modes (e.g., mode 1 operation and/or mode 2 operation). The message 2910 and the message 2940 may comprise a same message. The message 2910 may be sent before, during, or after the message 2940, for example in one or more messages. The wireless device 2912 may select, based on the one or more conditions, a mode for sidelink communications with the second wireless device 2916. The wireless device 2912 may use the configuration parameters 2910 (e.g., associated with the selected mode) for communicating with the at least one second wireless device 2916 via a sidelink.

The wireless device 2912 may apply one or more decisions/policy conditions for determining a mode of operation (e.g., either mode 1 operation or mode 2 operation). The message 2910 comprising configuration parameters for selecting mode 1 or mode 2 operation may be based on, for example, one or more conditions (e.g., in a system, cell, area, resource, etc.) compared to a latency threshold, a throughput threshold, and/or a packet-loss-rate threshold (and/or any other condition threshold). A plurality of decision/policy conditions may be identified/indicated and/or may be satisfied conjunctively or disjunctively to determine which mode of operation is selected. In particular, a decision/policy condition for mode 1 operation may be based on whether a measured latency value lies above or below a latency threshold. For example, if a latency threshold of 0.5 ms is compared to a measured latency value of 0.3 ms, the measured latency value is not greater than the latency threshold value, and as a result, mode 1 operation is not selected by the wireless device 2912. At least one condition for selecting mode 1 operation may comprise comparing a measured throughput value to a throughput threshold value for the network. For example, if a measured throughput rate (e.g. 700 Kbps) is not less than a throughput threshold (e.g. 500 Kbps), because the measured throughput rate is not less than the throughput threshold, the wireless device 2912 may not select mode 1 operation. At least one condition for selecting mode 1 operation may comprise comparing a measured packet rate loss rate with a packet loss rate threshold. For example, if the measured packet loss rate (e.g. 0.0008%) is not greater than the packet loss threshold (e.g., 0.001%), a condition (e.g., in a system, cell, area, resource, etc.) may not be satisfied. Because the measured packet loss rate is not greater than the packet loss rate threshold, the wireless device 2912 may not select mode 1 operation. In this example, because none of the pre-conditions for selecting mode 1 operation are satisfied, then mode 2 may be the default mode of operation that may be used by the wireless device 2912. If mode 1 operation were selected, the first wireless device 2912 would send/transmit one or more transport blocks to the at least one second wireless device 2916 via radio resources determined based on mode 1 operation (e.g., message 2950A). In this portion of the example, the policy conditions for mode 1 operation may not be statisfied. The decision policy/conditions for determining mode operation may be predetermined and/or changed (e.g., dynamically changed), and/or reset, for example, based on one or more conditions (e.g., in a system, cell, area, resource, etc.).

The wireless device 2912 may determine whether to select mode 2 operation based on one or more decisions/policy conditions. For example, a plurality of decisions/policy conditions may be identified/indicated and/or may (or may not) be satisfied conjunctively or disjunctively to determine whether mode 2 operation may be selected. In particular, a decision/policy condition for mode 2 operation may be based on whether a measured latency value is above or below a latency threshold. For example, if a latency threshold value of 0.5 ms is compared to a measured latency value of 0.9 ms, the measured latency value is greater than the latency threshold value, and as a result, mode 2 operation may be selected by the wireless device 2912. At least one condition for selecting mode 2 operation may comprise comparing a measured throughput value to a throughput threshold value for the network. For example, if a measured throughput rate (e.g. 200 Kbps) is less than a throughput threshold (e.g. 500 Kbps), because the measured throughput rate is less than the throughput threshold, the wireless device 2912 may select mode 2 operation. At least one condition for selecting mode 2 operation may comprise comparing a measured packet rate loss rate with a packet loss rate threshold. For example, if the measured packet loss rate (e.g. 0.02%) is greater than the packet loss threshold (e.g., 0.001%), a condition may be satisfied. Since the measured packet loss rate is greater than the packet loss rate threshold, the wireless device 2912 may select mode 2 operation. Conversely, if none of the pre-conditions for selecting mode 2 operation are met, then mode 1 operation may be the default mode used by the wireless device 2912. Based on the policy conditions, in this example, mode 2 operation may be selected. As a result, the first wireless device 2912 may send/transmit one or more transport blocks to the at least one second wireless device 2916 via radio resources determined based on mode 2 operation (e.g., message 2950B). In this portion of the example, the policy conditions for mode 2 operation may be satisfied. The policy/conditions for determining mode operation may be predetermined and/or changed (e.g., dynamically changed), and/or reset, for example, based on one or more conditions (e.g., in a system, cell, area, resource, etc.).

A condition/decision policy may indicate using/selecting the second resource allocation mode (or the first resource allocation mode) for the sidelink bearer based on at least one QoS requirement (e.g., indicated in the QoS information/requirement of the sidelink bearer). The second resource allocation mode may be selected, for example, based on the at least QoS requirement of the sidelink bearer not being met/satisfied for the first resource allocation mode. The decision policy may indicate using/selecting the second resource allocation mode for the sidelink bearer based on (e.g., in response to) at least one second QoS threshold, which may be configured/determined by the base station 2904 based on the at least one QoS requirement and/or the QoS information/requirement of the sidelink bearer not being met/satisfied by using the first resource allocation mode.

The decision policy may indicate a first number/quantity of destination wireless devices for the sidelink bearer. The decision policy may indicate using/selecting the second resource allocation mode for the sidelink bearer based on a number/quantity of the at least one second wireless device being equal to or greater than the first number. The decision policy may indicate using/selecting the second resource allocation mode for the sidelink bearer based on a number/quantity of the at least one second wireless device being equal to or less than the first number.

The decision policy may indicate a second number/quantity of destination wireless devices for the sidelink bearer. The decision policy may indicate to use the first resource allocation mode for the sidelink bearer based on a number/quantity of the at least one second wireless device being equal to or greater than the second number. The decision policy may indicate to use the first resource allocation mode for the sidelink bearer based on a number/quantity of the at least one second wireless device being equal to or less than the second number.

Figure 30:
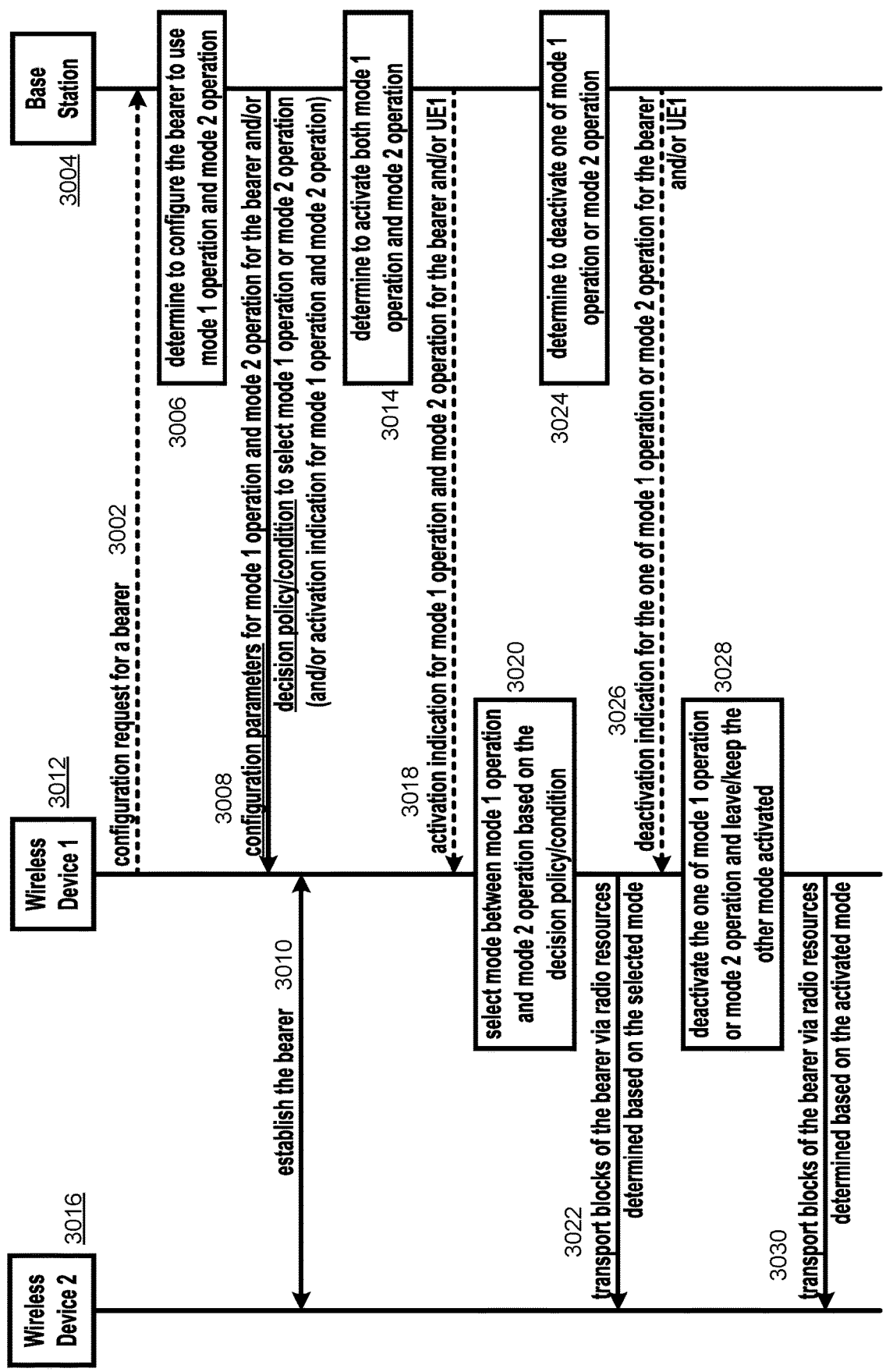
FIG. 30 shows an example for establishing a sidelink communication.

FIG. 30 shows an example for establishing a sidelink communication. A first wireless device 3012, a base station 3004, and/or a second wireless device 3016 may perform the same (or substantially the same) operations described above regarding FIGS. 25, 26, 27, 28, and/or 29 with respect to the first wireless devices 2512/2612/2712/2812/2912, the base stations 2504/2604/2704/2804/2904, and/or the at least one second wireless devices 2516/2616/2716/2816/2916, respectively. At step 3002, the first wireless device 3012 may send/transmit, to the first base station 3004, a message comprising a sidelink configuration request to establish and/or configure a sidelink bearer between the first wireless device 3012 and the at least one second wireless device 3016. At step 3006, the base station 3004 may determine to configure the bearer to use mode 1 operation and/or mode 2 operation.

At step 3008, the base station 3004 may send/transmit, and the first wireless device 3012 may receive, a message comprising bearer configuration parameters for a sidelink bearer. The bearer configuration parameters may indicate one or more of: first resource configuration parameters for a first resource allocation mode (e.g., mode 1 operation); second resource configuration parameters for a second resource allocation mode (e.g., mode 2 operation); and/or one or more conditions (e.g., decision policy/policies, threshold(s), etc.) for the first wireless device 3012 to select the first resource allocation mode or the second resource allocation mode. At step 3010, the first wireless device 3012 may establish a bearer (e.g., a sidelink bearer) with the at least one second wireless device 3016. The bearer may be established, for example, based on the configuration parameters and/or condition(s) received at step 3008. The bearer may be established using a mode of operation comprising either mode 1 operation or mode 2 operation. At step 3014, the base station may determine to activate both mode 1 operation and mode 2 operation. At step 3018, the base station 3004 may send/transmit, to the first wireless device 3012, a message comprising an activation indication for mode 1 operation and mode 2 operation for the bearer and/or the first wireless device 3012 (e.g., based upon the one or more conditions being met). Step 3014 and/or step 3018 may be performed before, during, or after steps 3010, 3020, 3022, 3024, 3026, 3028, and/or 3030.

At step 3020, the first wireless device 3012 may determine/select a mode of operation between mode 1 operation and mode 2 operation. The first wireless device 3012 may determine/select the mode of operation, for example, based on the one or more conditions (e.g., decision policy/policies, threshold(s), etc.). The first wireless device 3012 may determine whether a radio resource status of at least one resource pool (e.g., associated with the mode 1 operation or the mode 2 operation) satisfied the one or more conditions. At step 3022, the first wireless device 3012 may send, to the at least one second wireless device 3016 via first radio resources, one or more transport blocks 3022 of the sidelink bearer. The first radio resource may be determined, for example, based on the selected mode from the first resource configuration parameters and/or the first resource allocation mode. At step 3024, the base station 3004 may determine to deactivate a mode (e.g., mode 1 operation or mode 2 operation). At step 3026, the base station 3004 may send/transmit, to the first wireless device 3012 which may receive, a message comprising a deactivation indication for at least one mode of operation (e.g., mode 1 operation and/or mode 2 operation). Step 3024 and/or step 3026 may be performed before, during, or after steps 3020, 3022, 3028, and/or 3030.

At step 3028, the first wireless device 3012 may deactivate either the mode 1 operation or the mode 2 operation, for example, based on receiving the message comprising a deactivation indication. The first wireless device 3012 may maintain at least one of the modes of operation activated, for example, if the at least one of the modes is not indicated for deactivation in the message comprising the deactivation indication. At step 3030, the first wirelesss device 3012 may send/transmit, to the second wireless device 3016 via radio resources based on the activated mode, one or more transport blocks 3030 of the bearer. At step 3010, the first wireless device 3012 may establish a sidelink bearer with the at least one second wireless device 3016, for example, based on bearer configuration parameters that the first wireless device received (e.g., at step 3008) from the base station 3004. The sidelink bearer may be associated with the PC5-RRC connection and/or based on the PC5-RRC connection. The sidelink bearer may unicast/multicast/broadcast to the at least one second wireless device 3016. The first wireless device 3012 may establish the sidelink bearer based on: sending, by the first wireless device 3012 to the at least one second wireless device 3016, a configuration request (e.g., PC5-RRC bearer configuration request, PC5-RRC reconfiguration request, PC5-RRC modification request, etc.) for establishment of the sidelink bearer; receiving, from the at least one second wireless device 3016, a configuration request acknowledge (e.g., PC5-RRC bearer configuration request acknowledge, PC5-RRC reconfiguration request acknowledge, PC5-RRC modification request acknowledge, etc.) indicating completion of the establishment of the sidelink bearer; and/or the like. Sending the configuration request may comprise sending the configuration request via at least one of: a PC5 RRC message; a PC5-RRC configuration/reconfiguration request message; a PC5-RRC UE information message; a direct communication request message; and/or the like. The configuration request for establishment of the sidelink bearer may be based on the bearer configuration parameters that the first wireless device received 3012 from the base station 3004. The configuration request may comprise the QoS information/requirement of the sidelink bearer. The configuration request may comprise the bearer configuration parameters that the first wireless device 3012 received from the base station 3004.

At step 3020, the first wireless device may determine whether the sidelink bearer and/or a radio resource status of the at least one resource pool (e.g., comprising the first resource pool for the first resource allocation mode and/or the second resource pool for the second resource allocation mode) meets/satisfies the one or more conditions (e.g., decision policy/policies, threshold(s), decision condition(s), etc.). Determining whether the radio resource status of the at least one resource pool meets/satisfies the one or more conditions may be for transmission of at least one transport block of the sidelink bearer.

At step 3020 and/or at step 3022, the first wireless device 3012 may determine/select the sidelink resource allocation mode (e.g., the first resource allocation mode or the second resource allocation mode) during/when and/or before sending at least one transport block of the sidelink bearer. The first wireless device 3012 may select the sidelink resource allocation mode (e.g., the first resource allocation mode or the second resource allocation mode) at a timing of at least one of: (each) transmission of at least one transmission block; at least one time for (each) measurement/monitoring window for a resource pool (e.g., for CBR/CR/RSSI measurement); at least one time for (each) pre-determined or configured (e.g., by the first base station) time period (e.g., 1 ms, 2 ms, 10 ms, 100 ms; 1 subframe, 10 subframes for a first numerology/TTI; 1 slot, 30 slots for a first numerology/TTI; and/or any other duration); and/or the like.

At step 3020 and/or at step 3022, the first wireless device 3012 may determine whether the sidelink bearer and/or a radio resource status of the at least one resource pool (e.g., comprising the first resource pool for the first resource allocation mode and/or the second resource pool for the second resource allocation mode) meets/satisfies the one or more conditions (e.g., decision policy/policies, threshold(d), decision condition(s), etc.) during/when and/or before sending at least one transport block of the sidelink bearer. The first wireless device 3012 may determine whether the sidelink bearer and/or a radio resource status of the at least one resource pool (e.g., comprising the first resource pool for the first resource allocation mode and/or the second resource pool for the second resource allocation mode) meets/satisfies the one or more conditions (e.g., decision policy/policies, threshold(s), decision condition(s), etc.) at a timing of at least one of: (each) transmission of at least one transmission block; at least one time for (each) measurement/monitoring window for a resource pool (e.g., for CBR/CR/RSSI measurement); at least one time for (each) pre-determined or configured (e.g., by the first base station) time period (e.g., 1 ms, 2 ms, 10 ms, 100 ms; 1 subframe, 10 subframes for a first numerology/TTI; 1 slot, 30 slots for a first numerology/TTI; and/or any other duration); and/or the like.

At step 3022 and/or at step 3030, the first wireless device 3012 may send/transmit at least one transport block of the sidelink bearer to the at least one second wireless device 3016 via: first radio resources, which are determined based on the first resource configuration parameters and/or the first resource allocation mode (e.g., the mode 1 operation), based on (e.g., in response to) the radio resource status satisfying/meeting the one or more conditions (e.g., decision policy/policies, threshold(s), decision condition(s), etc.); or via second radio resources, which may be determined based on the second resource configuration parameters and/or the second resource allocation mode (e.g., the mode 2 operation), based on (e.g., in response to) the radio resource status not satisfying/not meeting the one or more conditions (e.g., decision policy/policies, threshold(d), decision condition(s)).

At step 3022 and/or at step 3030, the first wireless device 3012 may send at least one transport block of the sidelink bearer to the at least one second wireless device 3016 via first radio resources, for example, based on (e.g., in response to) the radio resource status satisfying/meeting the one or more conditions (e.g., decision policy/policies, threshold(s)), (e.g., in response to one or more elements indicated in the decision policy occurring/happening). The wireless device 3012 may determine the first radio resources based on the first resource configuration parameters (e.g., in the bearer configuration parameters) and/or the first resource allocation mode (e.g., the mode 1 operation).

The first wireless device 3012 may send a sidelink resource request (e.g., via MAC CE, UCI, PUCCH, etc.) to the base station 3004. The first wireless device 3012 may send a sidelink resource request (e.g., via MAC CE, UCI, PUCCH, etc.) to the base station 3004, for example, after step 3020 (or at any other step), based on (e.g., in response to) the radio resource status satisfying/meeting the one or more conditions (e.g., decision policy/policies, threshold(s), etc.) (e.g., in response to one or more elements indicated in the decision policy occurring/happening and/or based on the first resource allocation mode). The sidelink resource request may comprise at least one of a buffer status report (BSR), a scheduling request (SR), and/or the like. The first wireless device 3012 may receive, from the base station 3004 and/or for the sidelink resource request, a resource grant (e.g., via PDCCH, PDSCH) indicating the first radio resources. The first resource configuration parameters (e.g., in the bearer configuration parameters) for the first resource allocation mode may indicate configurations for the sidelink resource request.

At step 3008, the first resource configuration parameters (e.g., in the bearer configuration parameters) may indicate configured grant resources (e.g., type 1 configured grant, type 2 configured grant, semi-persistent scheduling resources, etc.) associated with the first resource allocation mode. The configured grant resources (e.g., indicated in the bearer configuration parameters) may comprise the first radio resources. at step 3018 and/or at step 3026, the first wireless device 3012 may receive a message comprising an activation/deactivation indication of the configured grant resources via at least one of: a medium access control control element (MAC CE); downlink control information (DCI); a physical downlink control channel (PDCCH) transmission; a downlink radio resource control (RRC) message; and/or the like.

At step 3022 and/or at step 3030, the first wireless device 3012 may send/transmit at least one transport block of the sidelink bearer to the at least one second wireless device 3016 via second radio resources, for example, based on (e.g., in response to) the radio resource status not satisfying/not meeting the decision policy (e.g., in response to one or more elements indicated in the decision policy not occurring/happening). The wireless device 3012 may determine the second radio resources, for example, based on the second resource configuration parameters (e.g., in the bearer configuration parameters) and/or the second resource allocation mode (e.g., the mode 2 operation). The second resource configuration parameters (e.g., in the bearer configuration parameters) may indicate the second resource pool for the second resource allocation mode. The second resource pool may comprise the second radio resources.

At step 3022 and/or at step 3030, the first wireless device 3012 may send/transmit at least one transport block via sidelink resources. The wireless device 3012 may determine the sidelink resources, for example, based on the first resource configuration parameters for the first resource allocation mode, in response to (or based on) sidelink resources (e.g., resource pool) for the second resource allocation mode being unavailable (e.g., congestion level of the sidelink resources for the second resource allocation mode is higher than a threshold value). At step 3022 and/or at step 3030, the first wireless device 3012 may send/transmit at least one transport block via sidelink may be determined based on the second resource configuration parameters for the second resource allocation mode, in response to (or based on) sidelink resources (e.g., sidelink resource grant, configured grant, the first resource pool, the mode 1 resource pool, etc.) based on the first resource allocation mode being unavailable (e.g., not receiving sidelink resource grant; no available configured grant; high congestion level of the resource pool for the first resource allocation mode, etc.).

At step 3018 and/or at step 3026, the first wireless device may receive (e.g., from the base station 3004) an activation/deactivation indication for one of the first resource allocation mode or the second resource allocation mode for the sidelink bearer and/or for the first wireless device 3012. At step 3014 and/or at step 3024, the base station 3004 may determine (e.g., based on radio resource status, traffic congestion level, number of serving wireless devices, radio resource parameter reconfiguration, etc.) to activate or deactivate the one of the first resource allocation mode or the second resource allocation mode for the sidelink bearer and/or for the first wireless device 3012.

At step 3018, the first wireless device 3012 may receive, from the base station 3004, a message comprising a first activation indication indicating that configuration (e.g., the first resource configuration parameters for the first resource allocation mode) of the first resource allocation mode is activated for the sidelink bearer (e.g., and/or for the first wireless device). Sending the at least one transport block of the sidelink bearer via the first radio resources (e.g., at step 3022) may be based on the first activation indication. Receiving the message comprising the first activation indication may comprise receiving the first activation indication via at least one of: a MAC CE) DCI; a PDCCH transmission; a downlink RRC message; and/or the like.

At step 3026, the first wireless device 3012 may receive, from the base station 3012, a message comprising a first deactivation indication indicating that configuration (e.g., the first resource configuration parameters for the first resource allocation mode) of the first resource allocation mode is deactivated for the sidelink bearer (e.g., and/or for the first wireless device). Based on the first deactivation indication, the first wireless device may stop using the first resource allocation mode for transmission of transport blocks of the sidelink bearer (e.g., and/or for the first wireless device). Receiving the first deactivation indication may comprise receiving the first deactivation indication via at least one of: a MAC CE; DCI; a PDCCH transmission; a downlink RRC message; and/or the like.

The first wireless device 3012 may receive, from the base station 3004, a message comprising a second activation indication (e.g., at step 3028) indicating that configuration (e.g., the second resource configuration parameters for the second resource allocation mode) of the second resource allocation mode is activated for the sidelink bearer (e.g., and/or for the first wireless device). Sending the at least one transport block of the sidelink bearer via the second radio resources may be based on the second activation indication. Receiving the second activation indication may comprise receiving the second activation indication via at least one of: a MAC CE; DCI; a PDCCH transmission; a downlink RRC message; and/or the like.

The first wireless device 3012 may receive, from the base station 3004, a message comprising a second deactivation indication (e.g., at step 3026) indicating that configuration (e.g., the second resource configuration parameters for the second resource allocation mode) of the second resource allocation mode is deactivated for the sidelink bearer (e.g., and/or for the first wireless device). Based on the second deactivation indication, the first wireless device may stop using the second resource allocation mode for transmission of transport blocks of the sidelink bearer (e.g., and/or for the first wireless device). Receiving the second deactivation indication may comprise receiving the second deactivation indication via at least one of: a MAC CE; DCI; a PDCCH transmission; a downlink RRC message; and/or the like.

The first activation indication activating the first resource allocation mode and the second deactivation indication deactivating the second resource allocation mode (e.g., for switching from the second resource allocation mode to the first resource allocation mode) may be sent/transmitted (e.g., from the base station 3004) to the first wireless device 3012 via a single indication (e.g., a mode switching indication), or via one or more messages and/or via one or more indications, comprising at least one of: a MAC CE; DCI; a PDCCH transmission; a downlink RRC message; and/or the like. The second activation indication activating the second resource allocation mode and the first deactivation indication deactivating the first resource allocation mode (e.g., for switching from the first resource allocation mode to the second resource allocation mode) may be sent/transmitted (e.g., from the base station 3004) to the first wireless device 3012 via a single indication (e.g., a mode switching indication), or via one or more messages and/or via one or more indications, comprising at least one of: a MAC CE; DCI; a PDCCH transmission; a downlink RRC message; and/or the like. The first activation indication activating the first resource allocation mode and the second activation indication activating the second resource allocation mode (e.g., for all activation of the first resource allocation mode and the second resource allocation mode) may be sent/transmitted (e.g., from the base station 3004) to the first wireless device 3012 via a single indication (e.g., a simultaneous/selective mode activation indication), or via one or more messages and/or via one or more indications, comprising at least one of: a MAC CE; DCI; a PDCCH transmission; a downlink RRC message; and/or the like.

Figure 31:
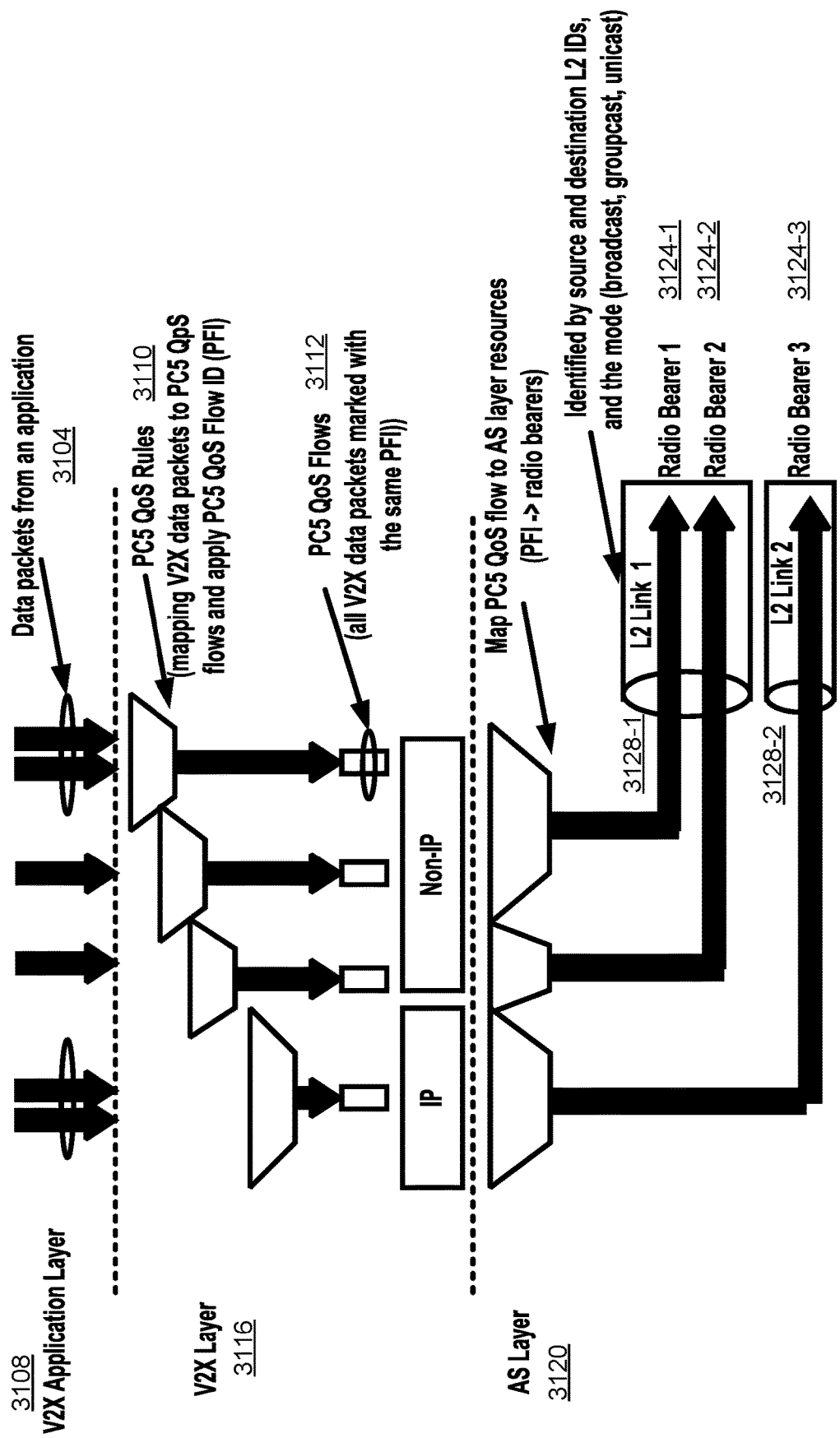
FIG. 31 shows an example mapping of data packets, from an application layer to sidelink radio bearers, for sidelink transmissions from a wireless device.

FIG. 31 shows an example mapping of data packets 3104, from an application layer 3108 to sidelink radio bearers 3124, for sidelink transmissions from a wireless device. The example mapping may be based on QoS parameters received from another wireless device and/or a base station. The example mapping may be determined by the wireless device based on QoS configuration information from a base station (e.g., indicated in a system information block or a dedicated RRC message). The example mapping may be used for QoS flows 3112 corresponding to a PC5 interface between two wireless devices (e.g., PC5 QoS flows). The data packets may be V2X data packets 3104 associated with an application (from a V2X application layer 3108) and may correspond to V2X communications between two wireless devices. The V2X data packets 3104 may be mapped to PC5 QoS flows 3112 in a V2X layer 3116 based on PC5 QoS rules 3110 indicated by the QoS parameters. Mapping the V2X data packets 3112 to the PC5 QoS flows 3112 may comprise applying PFIs associated with the PC5 QoS flows 3112 to the V2X data packets 3112. The V2X data packets 3112 may be mapped to the PC5 QoS flows 3112 based on whether the data packets are IP data packets or non-IP data packets.

The PC5 QoS flows 3112 may be mapped to access stratum (AS) layer resources 3120 in an AS layer. The AS layer resources 3120 may be associated with corresponding sidelink radio bearers 3124. The PC5 QoS flows 3112 may be mapped to the AS layer resources 3120 based on the PFIs associated with the V2X data packets 3104. For example, a PH may be associated with an AS layer resource 3120/sidelink radio bearer 3124.

The sidelink radio bearers 3124-1, 3124-2, 3124-3 may be mapped to one or more L2 links 3128. Each L2 link 3128-1, 3128-2 may correspond to (e.g., be indicated/identified by) a source L2 indicator/identifier (ID), a destination L2 indicator/ID, and a transmission mode (e.g., unicast transmission, multicast/groupcast transmission, or broadcast transmission). Each L2 link may be associated with one or more sidelink radio bearers 3124 for transmission.

Figure 32:
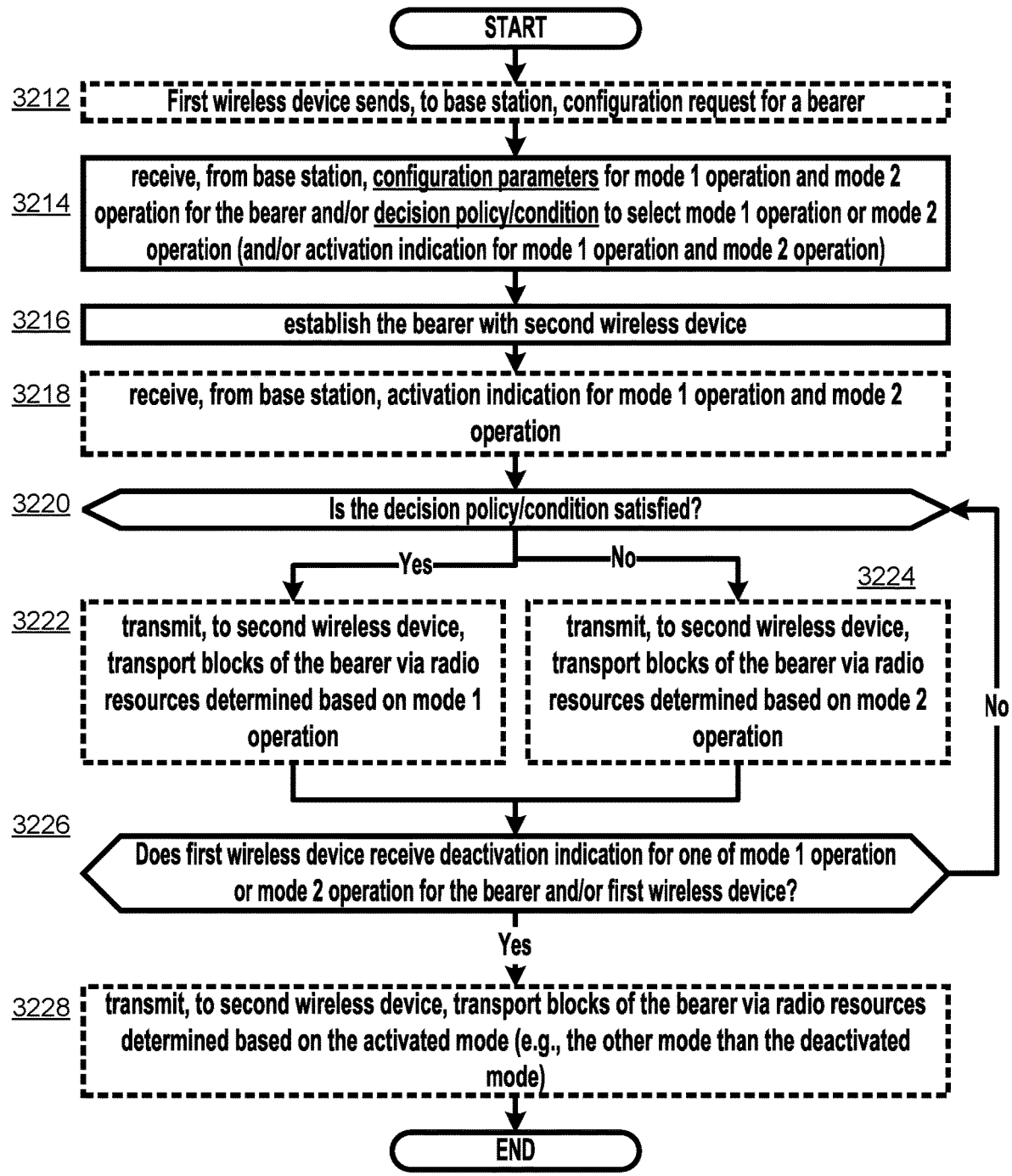
FIG. 32 shows an example method for establishing sidelink communications.

FIG. 32 shows an example method for establishing sidelink communications between two wireless devices. At step 3212, a first wireless device may send/transmit, to a base station a sidelink configuration request for a bearer to establish/configure a sidelink bearer between the first wireless device and an at least one second wireless device. At step 3214, the first wireless device may receive, from the base station, configuration parameters for mode 1 operation and/or mode 2 operation for the bearer. Based on decision policy conditions being satisfied, the first wireless device may select either mode 1 operation or mode 2 operation. At step 3216, the first wireless device may establish the sidelink bearer connection with the at least one second wireless device, for example, based on the bearer configuration parameters for mode 1 operation and mode 2 operation. At step 3218, the first wireless device may receive from the base station, an activation indication for mode 1 operation and/or mode 2 operation. At steps 3220-3224, the first wireless device may determine whether the policy conditions have been satisfied for either activating and/or deactivating mode 1 operation and/or mode 2 operation. At step 3222, the first wireless device may determine whether the decision policy/condition(s) is/are satisfied. If the policy condition(s) is/are satisfied, then the first wireless device may send, to the at least one second wireless device, one or more transport blocks of the bearer via radio resources determined based on mode 1 operation. At step 3224, the first wireless device may determine whether the decision policy/condition(s) is not/are not satisfied. If the decision policy/condition(s) is not/are not satisfied, the first wireless device may send, to the at least one second wireless device, one or more transport blocks of the bearer via radio resources determined based on mode 2 operation. At step 3226, the first wireless device may determine whether it has received a deactivation indication for one of mode 1 operation or mode 2 operation for the bearer and/or the first wireless device. The deactivation indication may be, for example, a downlink RRC message, MAC CE; DCI; or PDCCH transmission. If the first wireless device determines that no deactivation indication was received, the first wireless device may return to step 3220 to determine whether the decision policy/condition(s) has/have been satisfied; otherwise, the first wireless device may follow to step 3228 and send/transmit one or more transport blocks to the at least one second wireless device. At step 3228, the first wireless device may send to the at least one second wireless device, one or more transport blocks of the bearer via radio resources determined based on the activated mode (e.g., the mode other than the deactivated mode).

The first wireless device may receive, from a first base station, bearer configuration parameters for a sidelink bearer between the first wireless device and at least one second wireless device (e.g., step 3212). The bearer configuration parameters (e.g., step 3214) may indicate one or more of: first resource configuration parameters for a first resource allocation mode; second resource configuration parameters for a second resource allocation mode; and a decision policy (e.g., decision condition, steps 3220-3224) for the first wireless device to select the first resource allocation mode or the second resource allocation mode. The first wireless device may determine whether a radio resource status of at least one resource pool satisfies the decision policy (e.g., steps 3220-3224). The first wireless device may send one or more transport blocks (e.g., step 3228) of the sidelink bearer to the at least one second wireless device via: first radio resources, determined based on the first resource configuration parameters, based on the radio resource status meeting the decision policy; or via second radio resources, determined based on the second resource configuration parameters, based on the radio resource status not meeting the decision policy (e.g., steps 3220-3224). The first resource allocation mode may comprise a mode 1 operation. The second resource allocation mode may comprise a mode 2 operation.

The bearer configuration parameters may indicate one or more of: a first resource pool for the first resource allocation mode; a second resource pool for the second resource allocation mode; and/or the like. The at least one resource pool may comprise one or more of: the first resource pool; the second resource pool; and/or the like. The at least one resource pool may be for the sidelink bearer. The bearer configuration parameters may indicate one or more of: the at least one resource pool for the sidelink bearer; at least one second resource pool for a second sidelink bearer of the wireless device; and/or the like. The bearer configuration parameters may indicate that the first wireless device is allowed to use simultaneously (e.g., selectively) the first resource allocation mode and the second resource allocation mode for the sidelink bearer. Determining whether the radio resource status of the at least one resource pool meets/satisfies the decision policy may be for transmission of the transport block of the sidelink bearer.

Based on the radio resource status meeting the decision policy, the first wireless device may send a sidelink resource request (e.g., via MAC CE, UCI, PUCCH, etc.) to the first base station. The sidelink resource request may comprise at least one of a buffer status report (BSR), a scheduling request (SR), and/or the like. The first wireless device may receive, from the first base station, a resource grant (e.g., via PDCCH) indicating the first radio resources. The first resource configuration parameters for the first resource allocation mode may indicate configurations for the sidelink resource request.

The first resource configuration parameters may indicate configured grant resources (e.g., type 1 configured grant, type 2 configured grant, semi-persistent scheduling resources, etc.) associated with the first resource allocation mode. The configured grant resources may comprise the first radio resources. The first wireless device may receive an activation/deactivation indication of the configured grant resources via at least one of: a MAC CE; DCI; a PDCCH transmission; a downlink RRC message; and/or the like. The second resource configuration parameters may indicate a second resource pool for the second resource allocation mode. The second resource pool may comprise the second radio resources.

The decision policy may indicate at least one of: a first channel busy ratio (CBR) of a first resource pool for the first resource allocation mode is equal to or smaller than a first CBR value; a second CBR of a second resource pool for the second resource allocation mode is equal to or larger than a second CBR value; the first CBR of the first resource pool is (offset) smaller than the second CBR of the second resource pool; and/or the like. The decision policy may indicate at least one of: a first channel occupancy ratio (CR) of a first resource pool for the first resource allocation mode is equal to or smaller than a first CR value; a second CR of a second resource pool for the second resource allocation mode is equal to or larger than a second CR value; the first CR of the first resource pool is (offset) smaller than the second CR of the second resource pool; and/or the like.

The decision policy may indicate at least one of: a first received signal strength indicator (RSSI) of one or more first resource blocks of a first resource pool for the first resource allocation mode is equal to or smaller than a first RSSI value; a second RSSI of one or more second resource blocks of a second resource pool for the second resource allocation mode is equal to or larger than a second RSSI value; the first RSSI of the one or more first resource blocks is (offset) smaller than the second RSSI of the one or more second resource blocks; and/or the like.

The decision policy may indicate to use the first resource allocation mode for the sidelink bearer based on at least one quality-of-service (QoS) requirement of the sidelink bearer not-being met/satisfied by using the second resource allocation mode. The decision policy may indicate to use the first resource allocation mode for the sidelink bearer based on at least one first QoS threshold, configured/determined by the first base station based on the at least one QoS requirement of the sidelink bearer, not-being met/satisfied by using the second resource allocation mode. The decision policy may indicate to use the second resource allocation mode for the sidelink bearer based on at least one quality-of-service (QoS) requirement of the sidelink bearer not-being met/ satisfied by using the first resource allocation mode. The decision policy may indicate to use the second resource allocation mode for the sidelink bearer based on at least one second QoS threshold, configured/determined by the first base station based on the at least one QoS requirement of the sidelink bearer, not being met/satisfied by using the first resource allocation mode.

The decision policy may indicate a first number/quantity of destination wireless devices for the sidelink bearer. The decision policy may indicate to use the second resource allocation mode for the sidelink bearer based on a number/ quantity of the at least one second wireless device being equal to or larger than the first number. The decision policy may indicate to use the second resource allocation mode for the sidelink bearer based on a number/quantity of the at least one second wireless device being equal to or smaller than the first number.

The decision policy may indicate a second number/ quantity of destination wireless devices for the sidelink bearer. The decision policy may indicate to use the first resource allocation mode for the sidelink bearer based on a number of the at least one second wireless device being equal to or larger than the second number. The decision policy may indicate to use the first resource allocation mode for the sidelink bearer based on a number/quantity of the at least one second wireless device being equal to or smaller than the second number/quantity.

The first wireless device may receive, from the first base station, an information message comprising mode selection condition information (e.g., via SIB or RRC message) for selecting the first resource allocation mode or the second resource allocation mode for sidelink bearers. The mode selection condition information may indicate at least one QoS requirement for the sidelink bearers to select the first resource allocation mode. The information message may comprise at least one of: at least one system information block; an RRC message; and/or the like. The first wireless device may establish at least one sidelink bearer to use the first resource allocation mode or the second resource allocation mode, for example, based on the mode selection condition information.

The first wireless device may receive, from the first base station, a first activation indication indicating that configuration of the first resource allocation mode is activated for the sidelink bearer (e.g., and/or for the first wireless device). The sending the transport block of the sidelink bearer via the first radio resources may be based on the first activation indication. The receiving the first activation indication may comprise receiving the first activation indication via at least one of: a MAC CE; DCI; a PDCCH transmission; a downlink RRC message; and/or the like.

The first wireless device may receive, from the first base station, a first deactivation indication indicating that configuration of the first resource allocation mode is deactivated for the sidelink bearer (e.g., and/or for the first wireless device). The first wireless device may stop using the first resource allocation mode for the sidelink bearer (e.g., and/or for the first wireless device), for example, based on the first deactivation indication. The receiving the first deactivation indication may comprise receiving the first deactivation indication via at least one of: a MAC CE; DCI; a PDCCH transmission; a downlink RRC message; and/or the like.

The first wireless device may receive, from the first base station, a second activation indication indicating that configuration of the second resource allocation mode is activated for the sidelink bearer (e.g., and/or for the first wireless device). The sending the transport block of the sidelink bearer via the second radio resources may be based on the second activation indication. The receiving the second activation indication may comprise receiving the second activation indication via at least one of: a MAC CE; DCI; a PDCCH transmission; a downlink RRC message; and/or the like.

The first wireless device may receive, from the first base station, a second deactivation indication indicating that configuration of the second resource allocation mode is deactivated for the sidelink bearer (e.g., and/or for the first wireless device). The first wireless device may stop using the second resource allocation mode for the sidelink bearer (e.g., and/or for the first wireless device), for example, based on the second deactivation indication. The receiving the second deactivation indication may comprise receiving the second deactivation indication via at least one of: a MAC CE; DCI; a PDCCH transmission; a downlink RRC message; and/or the like.

The first activation indication activating the first resource allocation mode and the second deactivation indication deactivating the second resource allocation mode (e.g., for switching from the second resource allocation mode to the first resource allocation mode) may be sent/transmitted to the first wireless device via a single indication comprising at least one of: a MAC CE; a DCI; a PDCCH; a downlink RRC message; and/or the like. The second activation indication activating the second resource allocation mode and the first deactivation indication deactivating the first resource allocation mode (e.g., for switching from the first resource allocation mode to the second resource allocation mode) may be sent/transmitted to the first wireless device via a single indication comprising at least one of: a MAC CE; a DCI; a PDCCH; a downlink RRC message; and/or the like.

The first wireless device may send, to the first base station, capability information indicating that the first wireless device is capable of simultaneously (e.g., selectively or substantially simultaneously) using the first resource allocation mode and the second resource allocation mode. The bearer configuration parameters may be based on the capability information. The first wireless device may send/transmit transport blocks via sidelink resources that may be determined based on the first resource configuration parameters for the first resource allocation mode, for example, based on sidelink resources (e.g., resource pool) for the second resource allocation mode being unavailable (e.g., congestion level of the sidelink resources for the second resource allocation mode is higher than a threshold value).

The first wireless device may send/transmit transport blocks via sidelink resource that may be, determined based on the second resource configuration parameters for the second resource allocation mode, for example, based on sidelink resources (e.g., sidelink resource grant, configured grant, resource pool, etc.) and/or based on the first resource allocation mode being unavailable (e.g., not receiving sidelink resource grant; no available configured grant; high congestion level of the resource pool for the first resource allocation mode, etc.).

The first wireless device may establish the sidelink bearer based on one or more of: sending, by the first wireless device to the at least one second wireless device, a configuration request for establishment of the sidelink bearer; receiving, from the at least one second wireless device, a configuration request acknowledge indicating completion of the establishment of the sidelink bearer; and/or the like. The first wireless device sending the configuration request may comprise sending that request via at least one of: a PC5 RRC message; a PC5-RRC configuration/reconfiguration request message; a PC5-RRC UE information message; a direct communication request message; and/or the like. The first wireless device receiving the bearer configuration parameters from the first base station may comprise receiving the bearer configuration parameters via at least one of: an RRC reconfiguration message; an RRC resume message; an RRC setup message; an RRC reestablishment message; a handover command message; and/or the like.

The first wireless device may establish a PC5 radio resource control (PC5-RRC) connection with the at least one second wireless device. The sidelink bearer may be associated with the PC5-RRC connection and/or based on the PC5-RRC connection. The sidelink bearer may be for unicast/multicast/broadcast to the at least one second wireless device.

The first wireless device may send, to the first base station, a sidelink configuration request for the sidelink bearer. The bearer configuration parameters for the sidelink bearer may be based on the sidelink configuration request for the sidelink bearer. The sidelink configuration request for the sidelink bearer may comprise QoS information/requirement of the sidelink bearer. The QoS information/requirement may indicate at least one of: 5QI, ARP, Priority level, Latency, Loss rate, and/or the like.

The sidelink configuration request for the sidelink bearer may indicate a request for configuration of the sidelink bearer. The sidelink configuration request may indicate at least one of: a bearer identifier of the sidelink bearer; a quality-of-service (QoS) requirement of the sidelink bearer (e.g., the QoS requirement comprising at least one of: 5QI, ARP, Priority level, Latency, Loss rate, etc.); a channel occupancy ratio (CR) of the sidelink bearer (e.g., for a resource pool configured for the second resource allocation mode and/or the first resource allocation mode); a field (e.g., cast type) indicating whether the sidelink bearer is for a unicast transmission, a multicast transmission (e.g., group cast), and/or a broadcast transmission; a service type; network slice information; a cast type; performance measurement results of the sidelink bearer (e.g., the performance measurement results indicating at least one of: whether the QoS requirement is met based on the second resource allocation mode; measured QoS information; etc.); a destination identifier of the first sidelink bearer (e.g., the destination identifier indicating at least one of: a service associated with the sidelink bearer, the at least one second wireless device, and/or the like); PPPR/PPPP; a resource pool that is used for the sidelink bearer; at least one QoS flow mapped to the sidelink bearer; and/or the like.

The sidelink configuration request for the sidelink bearer may comprise at least one of: a bearer identifier (e.g., SLRB Identity) of a sidelink bearer (e.g., for unicast/groupcast/broadcast) for at least one of transmission and/or reception; a destination identifier of a sidelink bearer (e.g., for unicast/groupcast/broadcast) for at least one of transmission and/or reception; a cast type of a sidelink bearer (e.g., for unicast/groupcast/broadcast) for at least one of transmission and/or reception; a list of at least one QoS flow mapped to a sidelink bearer (e.g., for unicast/groupcast/broadcast) for at least one of transmission and/or reception; a transmission range of a sidelink bearer (e.g., based on distance to a destination wireless device); a discard timer (e.g., for packet discard) of a sidelink bearer (e.g., for unicast/groupcast/broadcast) for at least one of transmission and/or reception; a PDCP sequence number (SN) size of a wireless device and/or a sidelink bearer (e.g., for unicast/groupcast/broadcast) for at least one of transmission and/or reception; a maximum context identifier (e.g., maxCID) of a wireless device and/or a sidelink bearer (e.g., for unicast/groupcast/broadcast) for at least one of transmission and/or reception; a robust header compression (ROHC) profile of a wireless device and/or sidelink bearer; a T-reordering timer of a sidelink bearer (e.g., for unicast/groupcast/broadcast) for at least one of transmission and/or reception; an OutOfOrderDelivery indication of a sidelink bearer (e.g., for unicast/groupcast/broadcast) for at least one of transmission and/or reception; an RLC mode of a sidelink bearer (e.g., for unicast/groupcast/broadcast) for at least one of transmission and/or reception; an RLC SN field length of a sidelink bearer (e.g., for unicast/groupcast/broadcast) for at least one of transmission and/or reception; a T-Reassembly timer (e.g., timer for reassembly) of a sidelink bearer (e.g., for unicast/groupcast/broadcast) for at least one of transmission and/or reception; a T-PollRetransmit timer of a sidelink bearer (e.g., for unicast/groupcast/broadcast) for at least one of transmission and/or reception; a PollPDU of a sidelink bearer (e.g., for unicast/groupcast/broadcast) for at least one of transmission and/or reception (e.g., for RLC AM, value p4 may correspond to 4 PDUs, value p8 may correspond to 8 PDUs and/or the like, infinity may correspond to an infinite number of PDUs); a PollByte is of a sidelink bearer (e.g., for unicast/groupcast/broadcast) for at least one of transmission and/or reception (e.g., for RLC AM, value kB25 may correspond to 25 kBytes, value kB50 may correspond to 50 kBytes and/or the like, infinity may correspond to an infinite amount of kBytes); a MaxRetxThreshold (e.g., maximum number of retransmission) of a sidelink bearer (e.g., for unicast/groupcast/broadcast) for at least one of transmission and/or reception; a T-StatusProhibit timer (e.g., timer for status reporting) of a sidelink bearer (e.g., for unicast/groupcast/broadcast) for at least one of transmission and/or reception; a LogicalChannelIdentity of a sidelink bearer (e.g., for unicast/groupcast/broadcast) for at least one of transmission and/or reception; a LogicalChannelGroup of a sidelink bearer (e.g., for unicast/groupcast/broadcast) for at least one of transmission and/or reception; a Priority of a sidelink bearer (e.g., for unicast/groupcast/broadcast) for at least one of transmission and/or reception; a PrioritizedBitRate of a sidelink bearer (e.g., for unicast/groupcast/broadcast) for at least one of transmission and/or reception; a BucketSizeDuration (e.g., logical channel bucket size duration) of a sidelink bearer (e.g., for unicast/groupcast/broadcast) for at least one of transmission and/or reception; a ConfiguredGrantType1 Allowed indication indicating whether a sidelink bearer (e.g., for unicast/groupcast/broadcast) for at least one of transmission and/or reception is allowed or not; a SchedulingRequestID for a sidelink bearer (e.g., for unicast/groupcast/broadcast) for at least one of transmission and/or reception; a LogicalChannelSR-DelayTimerApplied of a sidelink bearer (e.g., for unicast/groupcast/broadcast) for at least one of transmission and/or reception; HARQ related information of a sidelink bearer (e.g., for unicast/groupcast/broadcast) for at least one of transmission and/or reception; and/or the like.

The bearer configuration parameters for the sidelink bearer may indicate at least one of: configured grant resources; a mode 1 resource pool; a cell identifier of a cell associated with the mode 1 resource pool (e.g., a resource pool for the first resource allocation mode); and/or the like. The bearer configuration parameters for the sidelink bearer may comprise at least one updated parameter of the sidelink configuration request for the sidelink bearer. The first base station may update/reconfigure one or more elements of the sidelink configuration request for the sidelink bearer to the at least one updated parameter that the bearer configuration parameters for the sidelink bearer comprise.

A first wireless device may receive, from a first base station, bearer configuration parameters for a sidelink bearer between the first wireless device and at least one second wireless device. The bearer configuration parameters may indicate a decision policy for selecting a mode 1 operation or a mode 2 operation. The first wireless device may determine whether a radio resource status meets the decision policy. Based on the determining, the first wireless device may configure radio resources based on one of the mode 1 operation or the mode 2 operation. The first wireless device may send a transport block via the radio resources.

A first wireless device may receive, from a first base station, bearer configuration parameters for a sidelink bearer. The bearer configuration parameters may indicate a decision policy for selecting a mode 1 operation or a mode 2 operation. The first wireless device may determine whether a radio resource status meets the decision policy. The first wireless device may send a transport block associated with the sidelink bearer to the at least one second wireless device via: first radio resources, configured based on the mode 1 operation, based on the radio resource status meeting the decision policy; or second radio resources, configured based on mode 2 operation, based on the radio resource status not meeting the decision policy.

A first wireless device may receive, from a first base station, bearer configuration parameters for a sidelink bearer between the first wireless device and at least one second wireless device. The bearer configuration parameters may indicate a decision policy for the first wireless device to select a first resource allocation mode or a second resource allocation mode. The first wireless device may determine whether a radio resource status of at least one resource pool meets the decision policy. The first wireless device may send a transport block of the sidelink bearer to the at least one second wireless device via: first radio resources, determined based on the first resource allocation mode, based on the radio resource status meeting the decision policy; or second radio resources, determined based on the second resource allocation mode, based on the radio resource status not meeting the decision policy.

A first wireless device may send, to a first base station, a configuration request for a sidelink bearer between the first wireless device and at least one second wireless device. The first wireless device may receive, from the first base station, bearer configuration parameters for the sidelink bearer. The bearer configuration parameters may indicate a decision policy for the first wireless device to select a first resource allocation mode or a second resource allocation mode. The first wireless device may determine whether a radio resource status of at least one resource pool meets the decision policy. The first wireless device may send a transport block of the sidelink bearer to the at least one second wireless device via: first radio resources, determined based on the first resource allocation mode, based on the radio resource status meeting the decision policy; or second radio resources, determined based on the second resource allocation mode, based on the radio resource status not meeting the decision policy.

A first base station may receive, from a first wireless device, a configuration request for a sidelink bearer between the first wireless device and at least one second wireless device. The first base station may send, to the first wireless device, bearer configuration parameters for the sidelink bearer. The bearer configuration parameters may indicate: first resource configuration parameters for a first resource allocation mode; second resource configuration parameters for a second resource allocation mode; and/or a decision policy for the first wireless device to select the first resource allocation mode or the second resource allocation mode.

A wireless device may perform a method comprising multiple operations. The wireless device may receive, by a first wireless device from a base station, sidelink configuration parameters. The configuration parameters may comprise at least one first resource configuration parameter for a first resource allocation mode. The configuration parameters may also include at least one second resource configuration parameter for a second resource allocation mode. The configuration parameters may further include at least one parameter for a selection of one of at least the first resource allocation mode or the second resource allocation mode. The wireless device may select, based on the at least one parameter, at least one of the first resource allocation mode or the second resource allocation mode. The wireless device may also send/transmit, to at least one second wireless device and based on sidelink configuration parameters for the selected resource allocation mode, at least one transport block. The wireless device may send/transmit the at least one transport block utilizing a PC5 radio resource control connection between the first wireless device and the at least one second wireless device. The resource configuration parameters for the selected resource allocation mode may comprise at least one of: the at least one first resource configuration parameter; or the at least one second resource configuration parameter. The first resource allocation mode may be a mode 1 operation; and the second resource allocation mode may be a mode 2 operation. The sidelink configuration parameters indicate at least one of: a first resource pool for the first resource allocation mode; or a second resource pool for the second resource allocation mode. Based on selecting the first resource allocation mode, the first wireless device sends/transmits to the base station, a request for sidelink radio resources. The request for sidelink radio resources may comprises at least one of: a buffer status report; or a scheduling request. The first wireless device may receive from the base station, a resource grant indicating the sidelink radio resources. The sidelink configuration parameters indicate: configured grant resources associated with the first resource allocation mode, wherein the configured grant resources comprise the radio resources; and a second resource pool for the second resource allocation mode, wherein the second resource pool comprises second radio resources. The at least one parameter indicates at least one of: a first channel busy ratio (CBR) threshold of a first resource pool for the first resource allocation mode; a second CBR threshold of a second resource pool for the second resource allocation mode; a first channel occupancy ratio (CR) threshold of the first resource pool for the first resource allocation mode; a second CR threshold of the second resource pool for the second resource allocation mode; or a quality-of-service (QoS) requirement associated with at least one of the first resource allocation mode or the second resource allocation mode. The first wireless device may receive from the base station, an information message comprising mode selection condition information for selecting the first resource allocation mode or the second resource allocation mode for a sidelink bearer. The information message may comprise at least one of: a system information block; or a radio resource control message. Based on the mode selection condition information, the wireless device may establish at least one sidelink bearer using one of the first resource allocation mode or the second resource allocation mode. The first wireless device may receive from the base station an activation indication indicating that the first resource allocation mode may be activated, wherein the receiving the activation indication comprises receiving the activation indication via at least one of: a medium access control control element (MAC CE); downlink control information (DCI); a physical downlink control channel (PDCCH); or a downlink radio resource control message; and sending/transmitting, based on the first resource allocation mode, at least one transport block. The first wireless device further comprising receives, by the first wireless device from the base station, a deactivation indication indicating that the first resource allocation mode may be deactivated, wherein the receiving the deactivation indication comprises receiving the deactivation indication via at least one of: a medium access control control element (MAC CE); downlink control information (DCI); a physical downlink control channel (PDCCH); or a downlink radio resource control message; and stopping based on the deactivation indication, transmission using the first resource allocation mode. The first wireless device may send/transmit to the base station, information indicating that the first wireless device may be capable of selectively using the first resource allocation mode and the second resource allocation mode. A wireless device may comprise one or more processors; and memory storing instructions that when executed by the one or more processors, cause the wireless device to perform the described method. A system may comprise a wireless device configured to perform the described method and a base station configured to send/transmit the sidelink configuration parameters. A computer-readable medium may store instructions that, when executed, cause performance of the described method.

A first wireless device may perform a method comprising multiple operations. The first wireless device may send/transmit to a base station, a request for a bearer to communicate with a second wireless device. The first wireless device may receive a message comprising at least one condition for selecting at least one of a plurality of resource allocation modes of operation for a communication with a second wireless device. The first wireless device may select, based on the at least one condition, at least one of the plurality of resource allocation modes of operation. The first wireless device may also send/transmit to the second wireless device and based on configuration parameters associated with the selected at least one of the plurality of resource allocation modes of operation, at least one transport block. The first wireless device receives configuration parameters that comprise: at least one first resource configuration parameter associated with a first resource allocation mode of the plurality of resource allocation modes of operation; and at least one second resource configuration parameter associated with a second resource allocation mode of the plurality of resource allocation modes of operation. The received configuration parameters indicate at least one of: a first resource pool for a first resource allocation mode of the plurality of resource allocation modes of operation; or a second resource pool for a second resource allocation mode of the plurality of resource allocation modes of operation. The first wireless device sends/transmits to the base station and based on the selecting the at least one of the plurality of resource allocation modes of operation, a request for sidelink radio resources, wherein the request for sidelink radio resources comprises at least one of: a buffer status report; or a scheduling request; and receiving, by the first wireless device from the base station, a resource grant indicating the sidelink radio resources. The at least one condition indicates at least one of: a first channel busy ratio (CBR) threshold of a first resource pool for a first resource allocation mode of the plurality of resource allocation modes of operation; or a second CBR threshold of a second resource pool for a second resource allocation mode of the plurality of resource allocation modes of operation. The at least one condition further indicates at least one of: a first channel occupancy ratio (CR) threshold of a first resource pool for a first resource allocation mode of the plurality of resource allocation modes of operation; or a second CR threshold of a second resource pool for a second resource allocation mode of the plurality of resource allocation modes of operation. A wireless device comprising: one or more processors; and memory storing instructions that when executed by the one or more processors, cause the wireless device to perform the described method. A system comprising: a wireless device configured to perform the described method; and a base station configured to send/transmit the sidelink configuration parameters. A computer-readable medium storing instructions that, when executed, cause performance of the described method.

A wireless device may perform a method comprising multiple operations. A first wireless device may receive from a base station, sidelink configuration parameters. The sidelink configuration parameters may comprise at least one first resource configuration parameter for a first resource allocation mode; at least one second resource configuration parameter for a second resource allocation mode; and at least one parameter for the first wireless device to select at least one of the first resource allocation mode or the second resource allocation mode. The first wireless device selects, based on the at least one parameter, a resource allocation mode between the first resource allocation mode and the second resource allocation mode. The first wireless device may send/transmit, to at least one second wireless device via radio resources, and based on resource configuration parameters for the resource allocation mode, at least one transport block. The resource configuration parameters for the selected resource allocation mode comprise at least one of: the at least one first resource configuration parameter; or the at least one second resource configuration parameter. The first resource allocation mode may include a mode 1 operation. The second resource allocation mode may include a mode 2 operation. The sidelink configuration parameters indicate at least one of: a first resource pool for the first resource allocation mode; or a second resource pool for the second resource allocation mode. The first resource pool or the second resource pool comprises the radio resources. The first resource pool or second resource pool for the selected resource allocation mode. The sidelink configuration parameters may be for a sidelink bearer between the first wireless device and at least one second wireless device. The first wireless device establishes the sidelink bearer with the at least one second wireless device, wherein the sidelink bearer may be allowed to use the first resource allocation mode and the second resource allocation mode. The sending/transmitting the transport block may be based on a PC5 radio resource control connection between the first wireless device and the at least one second wireless device. Based on selecting the first resource allocation mode, the first wireless device sends/transmits to the base station, a sidelink resource request comprising at least one of: a buffer status report; or a scheduling request. The first wireless device may receive from the base station, a resource grant indicating the radio resources for the selected resource allocation mode. The sidelink configuration parameters indicate configured grant resources associated with the first resource allocation mode, and wherein the configured grant resources comprise the radio resources for the selected resource allocation mode. The sidelink configuration parameters indicate a second resource pool for the second resource allocation mode, and wherein the second resource pool comprises second radio resources. The at least one parameter indicates at least one of: a first channel busy ratio (CBR) threshold of a first resource pool for the first resource allocation mode; or a second CBR threshold of a second resource pool for the second resource allocation mode. The at least one parameter indicates to select the first resource allocation mode based on at least one quality-of-service (QoS) requirement of a sidelink bearer being higher than a value. The at least one parameter indicates to select the second resource allocation mode based on at least one quality-of-service (QoS) requirement of a sidelink bearer being smaller than a value. The at least one parameter indicates to select the first resource allocation mode based on a quantity of destination wireless devices being larger than a value. The first wireless device receives from the base station, an information message comprising mode selection condition information for selecting the first resource allocation mode or the second resource allocation mode for a sidelink bearer, wherein the information message comprises at least one of: a system information block; or a radio resource control message. Based on the mode selection condition information, the first wireless device establishes at least one sidelink bearer to use one of the first resource allocation mode or the second resource allocation mode. The first wireless device receives from the base station, an activation indication indicating that the first resource allocation mode may be activated, wherein the receiving the activation indication comprises receiving the activation indication via at least one of: a medium access control control element (MAC CE); downlink control information (DCI); a physical downlink control channel (PDCCH); or a downlink radio resource control message. The first wireless device sends/transmits, based on the first resource allocation mode, at least one transport block. The first wireless device receives from the base station, a deactivation indication indicating that the first resource allocation mode may be deactivated, wherein the receiving the deactivation indication comprises receiving the deactivation indication via at least one of: a medium access control control element (MAC CE); downlink control information (DCI); a physical downlink control channel (PDCCH); or a downlink radio resource control message. Based on the deactivation indication, the first wireless device may stop transmission using the first resource allocation mode. The first wireless device may send/transmit to the base station, capability information indicating that the first wireless device may be capable of selectively using the first resource allocation mode and the second resource allocation mode. A wireless device comprising: one or more processors; and memory storing instructions that when executed by the one or more processors, cause the wireless device to perform the described method. A system comprising: a wireless device configured to perform the described method; and a base station configured to send/transmit the sidelink configuration parameters. A computer-readable medium storing instructions that, when executed, cause performance of the described method.

A wireless device may perform a method comprising multiple operations. The wireless device may receive from a base station sidelink configuration parameters. The sidelink configuration parameters comprise at least one parameter to select one of a first resource allocation mode; or a second resource allocation mode. The wireless device may select, based on the at least one parameter, a resource allocation mode comprising one of: the first resource allocation mode or the second resource allocation mode. The wireless device may send/transmit, via a sidelink and based on the resource allocation mode, at least one transport block.

The wireless device may send/transmit the at least transport block may be further based on resource configuration parameters comprising at least one of: the at least one first resource configuration parameter; or the at least one second resource configuration parameter. The first resource allocation mode may be a mode 1 operation; and the second resource allocation mode may be a mode 2 operation. The sidelink configuration parameters indicate at least one of: a first resource pool for the first resource allocation mode; or a second resource pool for the second resource allocation mode. The wireless device based on selecting the first resource allocation mode, may send/transmit, by the first wireless device to the base station, a request for sidelink radio resources, wherein the request for sidelink radio resources comprises at least one of: a buffer status report; or a scheduling request. The wireless device may also receive from the base station, a resource grant indicating the sidelink radio resources. The sidelink configuration parameters indicate: configured grant resources associated with the first resource allocation mode. The configured grant resources comprise first radio resources; and a second resource pool for the second resource allocation mode. The second resource pool comprises second radio resources. The at least one parameter indicates at least one of: a first channel busy ratio (CBR) threshold of a first resource pool for the first resource allocation mode; a second CBR threshold of a second resource pool for the second resource allocation mode; a first channel occupancy ratio (CR) threshold of the first resource pool for the first resource allocation mode; a second CR threshold of the second resource pool for the second resource allocation mode; or a quality-of-service (QoS) requirement associated with at least one of the first resource allocation mode or the second resource allocation mode. A wireless device comprising: one or more processors; and memory storing instructions that when executed by the one or more processors, cause the wireless device to perform the described method. A system comprising: a wireless device configured to perform the described method; and a base station configured to send/transmit the sidelink configuration parameters. A computer-readable medium storing instructions that, when executed, cause performance of the described method.

A wireless system including a base station that may perform multiple operations of the described method. For example, the base station may receive from a wireless device, a request for sidelink configuration parameters, wherein the request comprises a capability of the wireless device. Based on the capability of the wireless device, sidelink configuration parameters are determined for at least two modes of operation. The sidelink configuration parameters, may comprise: at least one first resource configuration parameter for a first resource allocation mode of the at least two modes of operation; at least one second resource configuration parameter for a second resource allocation mode of the at least two modes of operation; and at least one parameter for a selection of at least one of the first resource allocation mode or the second resource allocation mode. The first resource allocation mode may be a mode 1 operation; and the second resource allocation mode may be a mode 2 operation. The sidelink configuration parameters indicate at least one of: a first resource pool for the first resource allocation mode; or a second resource pool for the second resource allocation mode. The base station may receive from the wireless device a request for sidelink radio resources, wherein the request for sidelink radio resources comprises at least one of: a buffer status report; or a scheduling request. The base station may send/transmit to a wireless device, a resource grant indicating the sidelink radio resources. The sidelink configuration parameters indicate: configured grant resources associated with the first resource allocation mode, wherein the configured grant resources comprise first radio resources; and a second resource pool for the second resource allocation mode, wherein the second resource pool comprises second radio resources. The at least one parameter indicates at least one of: a first channel busy ratio (CBR) threshold of a first resource pool for the first resource allocation mode; a second CBR threshold of a second resource pool for the second resource allocation mode; a first channel occupancy ratio (CR) threshold of the first resource pool for the first resource allocation mode; a second CR threshold of the second resource pool for the second resource allocation mode; or a quality-of-service (QoS) requirement associated with at least one of the first resource allocation mode or the second resource allocation mode. The base station may send/transmit, to the wireless device, a message to activate or deactivate at least one of: the first resource allocation mode, or the second resource allocation mode. A base station comprising: one or more processors; and memory storing instructions that, when executed by the one or more processors, cause the base station to perform the described method. A system comprising: a base station configured to perform the described method; a wireless device configured to send/transmit the sidelink configuration parameters, and send/transmit the request for sidelink configuration parameters. A computer-readable medium storing instructions that, when executed, cause performance of the described method.

A wireless system including a base station that may perform multiple operations of the described method. For example, the base station may receive from a first wireless device, an information message indicating sidelink communication of the first wireless device. The first wireless device may send/transmit, to the base station and based on the information message, sidelink configuration parameters for the sidelink communication. The sidelink configuration parameters comprise: at least one first resource configuration parameter for a first resource allocation mode; at least one second resource configuration parameter for a second resource allocation mode; and at least one parameter for the first wireless device to select one of the first resource allocation mode or the second resource allocation mode. The first resource allocation mode may be a mode 1 operation; and the second resource allocation mode may be a mode 2 operation. The sidelink configuration parameters indicate at least one of: a first resource pool for the first resource allocation mode; or a second resource pool for the second resource allocation mode. The base station may receive from the wireless device, a request for sidelink radio resources, wherein the request for sidelink radio resources comprises at least one of: a buffer status report; or a scheduling request. The base station may send/transmit to the wireless device, a resource grant indicating the sidelink radio resources. The sidelink configuration parameters indicate: configured grant resources associated with the first resource allocation mode. The configured grant resources comprise first radio resources; and a second resource pool for the second resource allocation mode, wherein the second resource pool comprises second radio resources. The at least one parameter indicates at least one of: a first channel busy ratio (CBR) threshold of a first resource pool for the first resource allocation mode; a second CBR threshold of a second resource pool for the second resource allocation mode; a first channel occupancy ratio (CR) threshold of the first resource pool for the first resource allocation mode; a second CR threshold of the second resource pool for the second resource allocation mode; or a quality-of-service (QoS) requirement associated with at least one of the first resource allocation mode or the second resource allocation mode. The base station may also send/transmit to the wireless device, a message to activate or deactivate at least one of: the first resource allocation mode, or the second resource allocation mode. A base station comprising: one or more processors; and memory storing instructions that, when executed by the one or more processors, cause the base station to perform the described method. A system comprising: a base station configured to perform the described method; a wireless device configured to send/transmit the sidelink configuration parameters, and send/transmit the request for sidelink configuration parameters. A computer-readable medium storing instructions that, when executed, cause performance of the described method.

One or more of the operations described herein may be conditional. For example, one or more operations may be performed if certain criteria are met, such as in a wireless device, a base station, a radio environment, a network, a combination of the above, and/or the like. Example criteria may be based on one or more conditions such as wireless device and/or network node configurations, traffic load, initial system set up, packet sizes, traffic characteristics, a combination of the above, and/or the like. If the one or more criteria are met, various examples may be used. It may be possible to implement any portion of the examples described herein in any order and based on any condition.

A base station may communicate with one or more of wireless devices. Wireless devices and/or base stations may support multiple technologies, and/or multiple releases of the same technology. Wireless devices may have some specific capability(ies) depending on wireless device category and/or capability(ies). A base station may comprise multiple sectors, cells, and/or portions of transmission entities. A base station communicating with a plurality of wireless devices may refer to a base station communicating with a subset of the total wireless devices in a coverage area. Wireless devices referred to herein may correspond to a plurality of wireless devices compatible with a given LTE, 5G, or other 3GPP or non-3GPP release with a given capability and in a given sector of a base station. A plurality of wireless devices may refer to a selected plurality of wireless devices, a subset of total wireless devices in a coverage area, and/or any group of wireless devices. Such devices may operate, function, and/or perform based on or according to drawings and/or descriptions herein, and/or the like. There may be a plurality of base stations and/or a plurality of wireless devices in a coverage area that may not comply with the disclosed methods, for example, because those wireless devices and/or base stations may perform based on older releases of LTE, 5G, or other 3GPP or non-3GPP technology.

One or more parameters, fields, and/or information elements (IEs), may comprise one or more information objects, values, and/or any other information. An information object may comprise one or more other objects. At least some (or all) parameters, fields, IEs, and/or the like may be used and can be interchangeable depending on the context. If a meaning or definition is given, such meaning or definition controls.

One or more elements in examples described herein may be implemented as modules. A module may be an element that performs a defined function and/or that has a defined interface to other elements. The modules may be implemented in hardware, software in combination with hardware, firmware, wetware (e.g., hardware with a biological element) or a combination thereof, all of which may be behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or Lab VIEWMathScript. Additionally or alternatively, it may be possible to implement modules using physical hardware that incorporates discrete or programmable analog, digital and/or quantum hardware. Examples of programmable hardware may comprise: computers, microcontrollers, microprocessors, application-specific integrated circuits (ASICs); field programmable gate arrays (FPGAs); and/or complex programmable logic devices (CPLDs). Computers, microcontrollers and/or microprocessors may be programmed using languages such as assembly, C, C++ or the like. FPGAs, ASICs and CPLDs are often programmed using hardware description languages (HDL), such as VHSIC hardware description language (VHDL) or Verilog, which may configure connections between internal hardware modules with lesser functionality on a programmable device. The above-mentioned technologies may be used in combination to achieve the result of a functional module.

One or more features described herein may be implemented in a computer-usable data and/or computer-executable instructions, such as in one or more program modules, executed by one or more computers or other devices. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. The functionality of the program modules may be combined or distributed as desired. The functionality may be implemented in whole or in part in firmware or hardware equivalents such as integrated circuits, field programmable gate arrays (FPGA), and the like. Particular data structures may be used to more effectively implement one or more features described herein, and such data structures are contemplated within the scope of computer executable instructions and computer-usable data described herein.

A non-transitory tangible computer readable media may comprise instructions executable by one or more processors configured to cause operations of multi-carrier communications described herein. An article of manufacture may comprise a non-transitory tangible computer readable machine-accessible medium having instructions encoded thereon for enabling programmable hardware to cause a device (e.g., a wireless device, wireless communicator, a wireless device, a base station, and the like) to allow operation of multi-carrier communications described herein. The device, or one or more devices such as in a system, may include one or more processors, memory, interfaces, and/or the like. Other examples may comprise communication networks comprising devices such as base stations, wireless devices or user equipment (wireless device), servers, switches, antennas, and/or the like. A network may comprise any wireless technology, including but not limited to, cellular, wireless, WiFi, 4G, 5G, any generation of 3GPP or other cellular standard or recommendation, any non-3GPP network, wireless local area networks, wireless personal area networks, wireless ad hoc networks, wireless metropolitan area networks, wireless wide area networks, global area networks, satellite networks, space networks, and any other network using wireless communications. Any device (e.g., a wireless device, a base station, or any other device) or combination of devices may be used to perform any combination of one or more of steps described herein, including, for example, any complementary step or steps of one or more of the above steps.

Although examples are described above, features and/or steps of those examples may be combined, divided, omitted, rearranged, revised, and/or augmented in any desired manner Various alterations, modifications, and improvements will readily occur to those skilled in the art. Such alterations, modifications, and improvements are intended to be part of this description, though not expressly stated herein, and are intended to be within the spirit and scope of the descriptions herein. Accordingly, the foregoing description is by way of example only, and is not limiting.

The invention claimed is:

1. A method comprising:
   receiving, by a first wireless device from a base station, sidelink configuration parameter comprising:
      at least one first resource configuration parameter for a first resource allocation mode;
      at least one second resource configuration parameter for a second resource allocation mode; and
      at least one parameter for selection of one of the first resource allocation mode or the second resource allocation mode;
   selecting at least one of the first resource allocation mode or the second resource allocation mode, wherein the selecting is based on a comparison of the at least one parameter with a measurement of resources associated with at least one of:
      the first resource allocation mode, or
      the second resource allocation mode; and
   sending, to at least one second wireless device and based on at least one resource configuration parameter for the selected resource allocation mode, at least one transport block.

2. The method of claim 1, wherein the at least one resource configuration parameter for the selected resource allocation mode comprises at least one of:
   the at least one first resource configuration parameter; or
   the at least one second resource configuration parameter.

3. The method of claim 1, wherein:
   the first resource allocation mode is a mode 1 operation; and
   the second resource allocation mode is a mode 2 operation.

4. The method of claim 1, wherein the sidelink configuration parameters indicate at least one of:
   a first resource pool for the first resource allocation mode; or
   a second resource pool for the second resource allocation mode.

5. The method of claim 1, further comprising:
   based on selecting the first resource allocation mode, sending, by the first wireless device to the base station, a request for sidelink radio resources, wherein the request for sidelink radio resources comprises at least one of:
      a buffer status report; or
      a scheduling request; and
   receiving, by the first wireless device from the base station, a resource grant indicating the sidelink radio resources.

6. The method of claim 1, wherein the sidelink configuration parameters indicate:
   configured grant resources associated with the first resource allocation mode, wherein the configured grant resources comprise first radio resources; and
   a second resource pool for the second resource allocation mode, wherein the second resource pool comprises second radio resources.

7. The method of claim 1, wherein the at least one parameter indicates at least one of:
   a first channel busy ratio (CBR) threshold of a first resource pool for the first resource allocation mode;
   a second CBR threshold of a second resource pool for the second resource allocation mode;
   a first channel occupancy ratio (CR) threshold of the first resource pool for the first resource allocation mode;
   a second CR threshold of the second resource pool for the second resource allocation mode; or
   a quality-of-service (QoS) requirement associated with at least one of the first resource allocation mode or the second resource allocation mode.

8. A method comprising:
   receiving, by a base station from a wireless device, a request for sidelink configuration parameters, wherein the request comprises a capability of the wireless device;
   determining, based on the capability of the wireless device, sidelink configuration parameters for at least two modes of operation; and
   sending the sidelink configuration parameters, wherein the sidelink configuration parameters comprise:
      at least one first resource configuration parameter for a first resource allocation mode of the at least two modes of operation;
      at least one second resource configuration parameter for a second resource allocation mode of the at least two modes of operation; and
      at least one parameter for a selection of at least one of the first resource allocation mode or the second resource allocation mode, wherein the selection is based on a comparison of the at least one parameter with a measurement of resources associated with at least one of:
         the first resource allocation mode, or
         the second resource allocation mode.

9. The method of claim 8, wherein:
   the first resource allocation mode is a mode 1 operation; and
   the second resource allocation mode is a mode 2 operation.

10. The method of claim 8, wherein the sidelink configuration parameters indicate at least one of:
    a first resource pool for the first resource allocation mode; or
    a second resource pool for the second resource allocation mode.

11. The method of claim 8, further comprising:
    receiving, by the base station from the wireless device, a request for sidelink radio resources, wherein the request for sidelink resources comprises at least one of:
       a buffer status report; or
       a scheduling request; and
    sending, by the base station to the wireless device, a resource grant indicating the sidelink radio resources.

12. The method of claim 8, wherein the sidelink configuration parameters indicate:

configured grant resources associated with the first resource allocation mode, wherein the configured grant resources comprise first radio resources; and a second resource pool for the second resource allocation mode, wherein the second resource pool comprises second radio resources.

13. The method of claim 8, wherein the at least one parameter indicates at least one of:
a first channel busy ratio (CBR) threshold of a first resource pool for the first resource allocation mode;
a second CBR threshold of a second resource pool for the second resource allocation mode;
a first channel occupancy ratio (CR) threshold of the first resource pool for the first resource allocation mode;
a second CR threshold of the second resource pool for the second resource allocation mode; or
a quality-of-service (QoS) requirement associated with at least one of the first resource allocation mode or the second resource allocation mode.

14. The method of claim 8, further comprising sending, to the wireless device, a message to activate or deactivate at least one of:
the first resource allocation mode, or
the second resource allocation mode.

15. A method comprising:
sending, by a first wireless device to a base station, a request for a bearer to communicate with a second wireless device;
receiving a message comprising at least one condition for selecting at least one of a plurality of resource allocation modes of operation for a communication with the second wireless device;
selecting at least one resource allocation mode, of the plurality of resource allocation modes of operation, based on a comparison of the at least one condition with a measurement of resources associated with one of the plurality of resource allocation modes of operation; and
sending, to the second wireless device and based on the selected at least one resource allocation mode, at least one transport block.

16. The method of claim 15, further comprising receiving configuration parameters comprising:
at least one first resource configuration parameter associated with a first resource allocation mode of the plurality of resource allocation modes of operation; and
at least one second resource configuration parameter associated with a second resource allocation mode of the plurality of resource allocation modes of operation.

17. The method of claim 15, further comprising receiving configuration parameters indicating at least one of:
a first resource pool for a first resource allocation mode of the plurality of resource allocation modes of operation; or
a second resource pool for a second resource allocation mode of the plurality of resource allocation modes of operation.

18. The method of claim 15, further comprising:
sending, to the base station and based on the selecting the at least one resource allocation mode, a request for sidelink radio resources, wherein the request for sidelink radio resources comprises at least one of:
a buffer status report; or
a scheduling request; and
receiving, by the first wireless device from the base station, a resource grant indicating the sidelink radio resources.

19. The method of claim 15, wherein the at least one condition indicates at least one of:
a first channel busy ratio (CBR) threshold of a first resource pool for a first resource allocation mode of the plurality of resource allocation modes of operation; or
a second CBR threshold of a second resource pool for a second resource allocation mode of the plurality of resource allocation modes of operation.

20. The method of claim 15, wherein the at least one condition indicates at least one of:
a first channel occupancy ratio (CR) threshold of a first resource pool for a first resource allocation mode of the plurality of resource allocation modes of operation; or
a second CR threshold of a second resource pool for a second resource allocation mode of the plurality of resource allocation modes of operation.

21. The method of claim 1, wherein the measurement of resources associated with at least one of the first resource allocation mode or the second resource allocation mode comprises at least one of:
a measurement of a first channel busy ratio (CBR) of a first resource pool for the first resource allocation mode;
a measurement of a second CBR of a second resource pool for the second resource allocation mode;
a measurement of a first channel occupancy ratio (CR) of the first resource pool for the first resource allocation mode;
a measurement of a second CR of the second resource pool for the second resource allocation mode; or
a measurement of a quality-of-service (QoS) associated with at least one of the first resource allocation mode or the second resource allocation mode.

22. The method of claim 8, wherein the measurement of resources associated with at least one of the first resource allocation mode or the second resource allocation mode comprises at least one of:
a measurement of a first channel busy ratio (CBR) of a first resource pool for the first resource allocation mode;
a measurement of a second CBR of a second resource pool for the second resource allocation mode;
a measurement of a first channel occupancy ratio (CR) of the first resource pool for the first resource allocation mode;
a measurement of a second CR of the second resource pool for the second resource allocation mode; or
a measurement of a quality-of-service (QoS) associated with at least one of the first resource allocation mode or the second resource allocation mode.

23. The method of claim 15, wherein the measurement of resources associated with one of the plurality of resource allocation modes comprises at least one of:
a measurement of a first channel busy ratio (CBR) of a first resource pool for a first resource allocation mode of the plurality of resource allocation modes of operation;
a measurement of a second CBR of a second resource pool for a second resource allocation mode of the plurality of resource allocation modes of operation;
a measurement of a first channel occupancy ratio (CR) of the first resource pool for the first resource allocation mode;
a measurement of a second CR of the second resource pool for the second resource allocation mode; or a measurement of a quality-of-service (QoS) associated with at least one of the first resource allocation mode or the second resource allocation mode.

\* \* \* \* \*